(12) United States Patent
Narine et al.

(10) Patent No.: US 12,459,934 B2
(45) Date of Patent: Nov. 4, 2025

(54) PESTICIDAL COMPOUNDS

(71) Applicant: BASF SE, Ludwigshafen (DE)

(72) Inventors: Arun Narine, Ludwigshafen (DE); Rupsha Chaudhuri, Navi Mumbai (IN); Pulakesh Maity, Navi Mumbai (IN); Sunderraman Sambasivan, Mumbai (IN); Wolfgang von Deyn, Ludwigshafen (DE); Joachim Dickhaut, Ludwigshafen (DE); Nikolas Huwyler, Ludwigshafen (DE); Karsten Koerber, Ludwigshafen (DE); Olesya Kuzmina, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1186 days.

(21) Appl. No.: 17/291,402

(22) PCT Filed: Nov. 18, 2019

(86) PCT No.: PCT/EP2019/081580
§ 371 (c)(1),
(2) Date: May 5, 2021

(87) PCT Pub. No.: WO2020/109039
PCT Pub. Date: Jun. 4, 2020

(65) Prior Publication Data
US 2022/0002284 A1    Jan. 6, 2022

(30) Foreign Application Priority Data
Nov. 28, 2018   (EP) .................................... 18208775

(51) Int. Cl.
| | |
|---|---|
| *C07D 417/12* | (2006.01) |
| *A01N 25/30* | (2006.01) |
| *A01N 43/54* | (2006.01) |
| *A01N 43/58* | (2006.01) |
| *A01N 43/78* | (2006.01) |
| *A01N 47/34* | (2006.01) |
| *C07D 217/26* | (2006.01) |
| *C07D 237/30* | (2006.01) |
| *C07D 239/88* | (2006.01) |
| *C07D 239/94* | (2006.01) |
| *C07H 99/00* | (2006.01) |

(52) U.S. Cl.
CPC .......... *C07D 417/12* (2013.01); *A01N 25/30* (2013.01); *A01N 43/54* (2013.01); *A01N 43/58* (2013.01); *A01N 43/78* (2013.01); *A01N 47/34* (2013.01); *C07D 217/26* (2013.01); *C07D 237/30* (2013.01); *C07D 239/88* (2013.01); *C07D 239/94* (2013.01); *C07H 99/00* (2013.01)

(58) Field of Classification Search
None
See application file for complete search history.

(56) References Cited

U.S. PATENT DOCUMENTS

| | | |
|---|---|---|
| 5,631,072 A | 5/1997 | Samson et al. |
| 6,489,159 B1 * | 12/2002 | Chenchik ............... C07H 21/00 536/22.1 |
| 2006/0265814 A1 | 11/2006 | Ritter |
| 2009/0182140 A1 * | 7/2009 | Furukubo ............ C07D 239/95 544/254 |

FOREIGN PATENT DOCUMENTS

| | | |
|---|---|---|
| EP | 1724392 A2 | 11/2006 |
| WO | WO-00/015615 A1 | 3/2000 |
| WO | WO-2003/034823 A1 | 5/2003 |
| WO | WO-2005/030130 A2 | 4/2005 |
| WO | WO-2005/064072 A2 | 7/2005 |
| WO | WO-2005/113886 A1 | 12/2005 |

(Continued)

OTHER PUBLICATIONS

Bare et al., Synthesis and structure-activity relationships of a series of anxioselective pyrazolopyridine ester and amide anxiolytic agents J. Med. Chem., 32(12):2561-73 (1989).

(Continued)

*Primary Examiner* — Noble E Jarrell
(74) *Attorney, Agent, or Firm* — MARSHALL, GERSTEIN & BORUN LLP

(57) ABSTRACT

The present invention relates to the compounds of formula (I), and the N-oxides, stereoisomers, tautomers and agriculturally or veterinarily acceptable salts thereof wherein the variables are defined according to description formula (I). The compounds of formula (I), as well as the N-oxides, stereoisomers, tautomers and agriculturally or veterinarily acceptable salts thereof, are useful for combating or controlling invertebrate pests, in particular arthropod pests and nematodes. The invention also relates to a method for controlling invertebrate pests by using these compounds and to plant propagation material and to an agricultural and a veterinary composition comprising said compounds.

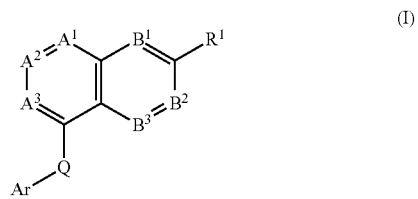

12 Claims, No Drawings

(56) References Cited

FOREIGN PATENT DOCUMENTS

| WO | WO-2006/128870 A2 | 12/2006 |
| WO | WO-2007/090739 A1 | 8/2007 |
| WO | WO-2008/151984 A1 | 12/2008 |
| WO | WO-2009/102736 A1 | 8/2009 |
| WO | WO-2009/112275 A1 | 9/2009 |
| WO | WO-2011/017504 A1 | 2/2011 |
| WO | WO-2012/109125 A1 | 8/2012 |
| WO | WO-2013/116052 A1 | 8/2013 |
| WO | WO-2013/116053 A1 | 8/2013 |
| WO | WO-2014/011429 A1 | 1/2014 |
| WO | WO-2016/116445 A1 | 7/2016 |
| WO | WO-2016/156076 A1 | 10/2016 |

OTHER PUBLICATIONS

Smith et al., March's Advanced Organic Chemistry, 6th edition Wiley (2007).
European Search Report for EP Patent Application No. 18208775.9, Issued on Jul. 9, 2019, 04 pages.
International Application No. PCT/EP2019/081580, International Search Report and Written Opinion, mailed Jan. 23, 2020.

\* cited by examiner

PESTICIDAL COMPOUNDS

CROSS-REFERENCE TO RELATED APPLICATIONS

This is the U.S. national phase of International Application No. PCT/EP2019/081580, filed Nov. 18, 2019, which claims the benefit of European Patent Application No. 18208775.9, filed on Nov. 28, 2018.

Invertebrate pests and in particular insects, arachnids and nematodes destroy growing and harvested crops and attack wooden dwelling and commercial structures, thereby causing large economic loss to the food supply and to property. Accordingly, there is an ongoing need for new agents for combating invertebrate pests.

Carbamoylated and thiocarbamoylated oxime derivatives are known for pesticidal use, for example, in patent publications WO 2016/156076, semi-carbazones and thiosemi-carbazones derivatives are known for pesticidal use in patent publication WO 2016/116445.

Due to the ability of target pests to develop resistance to pesticidally-active agents, there is an ongoing need to identify further compounds, which are suitable for combating invertebrate pests such as insects, arachnids and nematodes. Furthermore, there is a need for new compounds having a high pesticidal activity and showing a broad activity spectrum against a large number of different invertebrate pests, especially against difficult to control insects, arachnids and nematodes.

It is therefore an object of the present invention to identify and provide compounds, which exhibit a high pesticidal activity and have a broad activity spectrum against invertebrate pests.

It has been found that these objects can be achieved by substituted bicyclic compounds of formula I, as depicted and defined below, including their stereoisomers, their salts, in particular their agriculturally or veterinarily acceptable salts, their tautomers and their N-oxides.

In a first aspect, the present invention relates to the compounds of formula I,

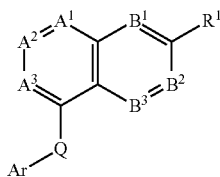

(I)

wherein $A^1$ is N or $CR^{A1}$;
$A^2$ is N or $CR^{A2}$;
$A^3$ is N or $CR^{A3}$;
wherein at least one of the $A^1$, $A^2$, $A^3$ is N;
$B^1$ is N or $CR^{B1}$; preferably $B^1$ is $CR^{B1}$;
$B^2$ is N or $CR^{B2}$; preferably $B^2$ is $CR^{B2}$;
$B^3$ is N or $CR^{B3}$; preferably $B^3$ is $CR^{B3}$;
$R^{A1}$, $R^{A2}$, and $R^{A3}$ independently of each other are selected from H, halogen, N3, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, C(=O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(=O)—$NR^bR^c$, C(=O)—$R^d$, $SO_2NR^bR^c$, or S(=O)$_m R^e$, phenyl, phenoxy, phenylcarbonyl, phenylthio, or —$CH_2$-phenyl, wherein the phenyl rings are unsubstituted or substituted with $R^f$;

$R^{B1}$, $R^{B2}$, and $R^{B3}$, independently of each other are H, halogen, N3, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, C(=O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(=O)—$NR^bR^c$, C(=O)—$R^d$, $SO_2NR^bR^c$, or S(=O)$_m R^e$, phenyl, phenoxy, phenylcarbonyl, phenylthio, or —$CH_2$-phenyl, wherein the phenyl rings are unsubstituted or substituted with $R^f$;

Q is —N=C(X)—, —N($R^2$)—C(=NR)—, or —N($R^2$)—C(=S)—, —C($R^4R^5$)—O—, —C(=O)—O—, —S(=O)$_m$—C($R^7R^8$)—, —N($R^2$)—S(=O)$_m$—, —N($R^2$)—C($R^9R^{10}$)—, —C(=O)—C($R^{19}R^{20}$)—, —N($R^2$)—C(=O)—, —C($R^{13}R^{14}$)—C($R^{15}R^{16}$)—, or —C($R^{17}$)=C($R^{18}$)—; wherein Ar is bound to either side of Q;

X is identical or different, H, halogen, $SR^7$, $OR^8$, $N(R^3)_2$, —$CR^4$=$N(OCH_3)$, CN, $C_1$-$C_6$-alkyl, $C_2$-$C_6$-alkenyl, $C_2$-$C_6$-alkynyl, $C_3$-$C_6$-cycloalkyl, wherein the alkyl, alkenyl, alkynyl and cycloalkyl moieties are unsubstituted or substituted with halogen; phenyl, or —$CH_2$-phenyl, wherein the phenyl rings are unsubstituted or substituted with $R^f$;

R is identical or different, H, CN, $C_1$-$C_6$-alkyl, $C_2$-$C_6$-alkenyl, $C_2$-$C_6$-alkynyl, $C_3$-$C_6$-cycloalkyl, wherein the alkyl, alkenyl, alkynyl and cycloalkyl moieties are unsubstituted or substituted with halogen, $SR^7$, $OR^8$, $N(R^3)_2$, phenyl, or —$CH_2$-phenyl, wherein the phenyl rings are unsubstituted or substituted with $R^f$;

$R^2$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(O)—$OR^a$, $C_1$-$C_6$-alkylen-$NR^bR^c$, $C_1$-$C_6$-alkylen-CN, C(O)—$NR^bR^c$, C(O)—$R^d$, $SO_2NR^bR^c$, S(=O)$_m R^e$, phenyl, or —$CH_2$-phenyl, wherein the phenyl rings are unsubstituted or substituted with $R^f$;

$R^3$ is H, $C_1$-$C_6$-alkyl, $C_1$-$C_6$-alkoxy, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, or $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, $C_1$-$C_6$-alkylene-CN, phenyl, or —$CH_2$-phenyl, wherein the phenyl rings are unsubstituted or substituted with $R^f$;

$R^4$, $R^5$, $R^7$, $R^8$, $R^9$, $R^{10}$, $R^{13}$, $R^{14}$, $R^{15}$, $R^{16}$, $R^{17}$, $R^{18}$, $R^{19}$, $R^{20}$ are, identical or different, H, halogen, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—OR$^a$, $C_1$-$C_6$-alkylene-NR$^b$R$^c$, $C_1$-$C_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

R$^6$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—OR$^a$, $C_1$-$C_6$-alkylene-NR$^b$R$^c$, $C_1$-$C_6$-alkylene-CN, C(=O)—NR$^b$R$^c$, C(=O)—R$^d$, SO$_2$NR$^b$R$^c$, S(=O)$_m$R$^e$, phenyl, —CH$_2$—C(=O)—OR$^a$, or —CH$_2$-phenyl, wherein the phenyl rings are unsubstituted or substituted with R$^f$;

Ar is phenyl or 5- or 6-membered hetaryl, which are unsubstituted or substituted with R$^{Ar}$, wherein R$^{Ar}$ is halogen, N$_3$, OH, CN, NO$_2$, —SCN, —SF$_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—OR$^a$, NR$^b$R$^c$, $C_1$-$C_6$-alkylene-NR$^b$R$^c$, O—$C_1$-$C_6$-alkylene-NR$^b$R$^c$, $C_1$-$C_6$-alkylene-CN, NH—$C_1$-$C_6$-alkylene-NR$^b$R$^c$, C(=O)—NR$^b$R$^c$, C(=O)—R$^d$, SO$_2$NR$^b$R$^c$, or S(=O)$_m$R$^e$, phenyl, phenoxy, phenylcarbonyl, phenylthio or —CH$_2$-phenyl, wherein phenyl rings are unsubstituted or substituted with R$^f$;

R$^1$ is a moiety of formula Y—Z-T-R$^{11}$ or Y—Z-T-R$^{12}$; wherein

Y is —CR$^{ya}$=N—, wherein the N is bound to Z;
—NR$^{yc}$—C(=O)—, wherein C(=O) is bound to Z; or
—NR$^{yc}$—C(=S)—, wherein C(=S) is bound to Z;

Z is a single bond;
—NR$^{zc}$—C(=O)—, wherein C(=O) is bound to T;
—NR$^{zc}$—C(=S)—, wherein C(=S) is bound to T;
—N=C(S—R$^{za}$)—, wherein T is bound to the carbon atom;
O—C(=O)—, wherein T is bound to the carbon atom; or
—NR$^{zc}$—C(S—R$^{za}$)=, wherein T is bound to the carbon atom;

T is O, N or N—R$^T$;

R$^{11}$ is $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, $C_1$-$C_6$-alkylene-NR$^b$R$^c$, $C_1$-$C_6$-alkylene-CN, C(=O)—NR$^b$R$^c$, C(=O)—R$^d$, aryl, aryl-carbonyl, aryl-$C_1$-$C_4$-alkyl, aryloxy-$C_1$-$C_4$-alkyl, heteroaryl, carbonyl-heteroaryl, heteroaryl-$C_1$-$C_4$-alkyl or heteroaryloxy-$C_1$-$C_4$-alkyl, wherein the phenyl rings are unsubstituted or substituted with R$^g$ and wherein the heteroaryl is a 5- or 6-membered monocyclic heteroaryl or a 8-, 9- or 10-membered bicyclic heteroaryl;

R$^{12}$ is a radical of the formula A$^1$;

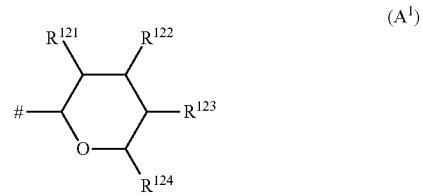

(A$^1$)

wherein # indicates the point of attachment to T;

R$^{121}$, R$^{122}$, R$^{123}$ are, identical or different, H, halogen, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_1$-$C_6$-alkoxy, $C_2$-$C_6$-alkenyloxy, $C_2$-$C_6$-alkynyloxy, $C_1$-$C_6$-alkoxy-$C_1$-$C_4$-alkoxy, $C_1$-$C_6$-alkylcarbonlyoxy, $C_1$-$C_6$-alkenylcarbonlyoxy, $C_3$-$C_6$-cycloalkylcarbonlyoxy, wherein the alkyl, alkoxy, alkenyl, alkenyloxy, alkynyl, alkynyloxy and cycloalkyl moieties are unsubstituted or substituted with halogen, or NR$^b$R$^c$, or one of R$^{121}$, R$^{122}$, R$^{123}$ may also be oxo;

R$^{124}$ is H, $C_1$-$C_6$-alkyl, $C_1$-$C_6$-alkoxy-$C_1$-$C_4$-alkyl, $C_1$-$C_6$-alkoxy, or $C_2$-$C_6$-alkenyloxy, wherein the alkyl, alkoxy, alkenyl and alkenyloxy moieties are unsubstituted or substituted with halogen;

and where

R$^{ya}$ is H, halogen, $C_1$-$C_6$-alkyl, $C_1$-$C_6$-alkoxy, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_1$-$C_4$-alkyl-$C_3$-$C_6$-cycloalkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, C(=O)—OR$^a$, $C_1$-$C_6$-alkylene-NR$^b$R$^c$, $C_1$-$C_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

R$^{yc}$, R$^{zc}$ are, identical or different, H, $C_1$-$C_6$-alkyl, $C_2$-$C_6$-alkenyl, $C_2$-$C_6$-alkynyl, $C_1$-$C_4$-alkyl-$C_1$-$C_6$-alkoxy, $C_3$-$C_6$-cycloalkyl, $C_1$-$C_4$-alkyl-$C_3$-$C_6$-cycloalkyl, or $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen;

R$^T$ is H, $C_1$-$C_6$-alkyl, $C_2$-$C_6$-alkenyl, $C_2$-$C_6$-alkynyl, $C_1$-$C_4$-alkyl-$C_1$-$C_6$-alkoxy, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—OR$^a$, $C_1$-$C_6$-alkylene-NR$^b$R$^c$, $C_1$-$C_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

R$^{zc}$ together with R$^T$ if present, may form $C_1$-$C_6$-alkylene or a linear $C_2$-$C_6$-alkenylene group, where in the linear $C_1$-$C_6$-alkylene and the linear $C_2$-$C_6$-alkenylene a CH$_2$ moiety may be replaced by a carbonyl or a C=N—R' and/or wherein 1 or 2 CH$_2$ moieties may be replaced by O or S and/or wherein the linear $C_1$-$C_6$-alkylene and the linear $C_2$-$C_6$-alkenylene may be unsubstituted or substituted with R$^h$;

$R^{za}$ is H, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_4$-alkyl-$C_1$-$C_6$-alkoxy, $C_3$-$C_6$-cycloalkyl, $C_1$-$C_4$-alkyl-$C_3$-$C_6$-cycloalkoxy, $C_1$-$C_4$-alkyl-$C_3$-$C_6$-cycloalkyl, wherein the alkyl, alkoxy, alkenyl, alkynyl, cycloalkyl and cycloalkoxy moieties are unsubstituted or substituted with halogen, $C_1$-$C_6$-alkylene-$NR^bR^c$, $C_1$-$C_6$-alkylene-CN, $C(=O)$—$NR^bR^c$, $C(=O)$—$R^d$, phenyl, phenylcarbonyl, or —$CH_2$-phenyl, wherein the phenyl rings are unsubstituted or substituted with $R^f$;

$R^{za}$ together with $R^T$ if present, may form $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety may be replaced by a carbonyl or a $C=N$—$R^i$ and/or wherein 1 or 2 $CH_2$ moieties may be replaced by O or S and/or wherein the linear $C_1$-$C_6$-alkylene and the linear $C_2$-$C_6$-alkenylene may be unsubstituted or substituted with $R^h$;

$R^a$, $R^b$ and $R^c$ are, identical or different, H, $C_1$-$C_6$-alkyl, $C_1$-$C_6$-alkoxy, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, $C_1$-$C_6$-alkylene-CN, phenyl, or —$CH_2$-phenyl, wherein the phenyl rings are unsubstituted or substituted with $R^f$;

$R^b$ and $R^c$ together with the nitrogen they are attached may form 5- or 6-membered saturated, partially or fully unsaturated heterocyclic ring;

$R^d$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, phenyl, or —$CH_2$-phenyl, wherein the phenyl rings are unsubstituted or substituted with $R^f$;

$R^e$ is $C_1$-$C_6$-alkyl, $C_3$-$C_6$-cycloalkyl, $C_3$-$C_6$-cycloalkyl-$C_1$-$C_4$-alkyl, wherein the alkyl, cycloalkyl moieties are unsubstituted or substituted with halogen, phenyl and —$CH_2$-phenyl, wherein the phenyl rings are unsubstituted or substituted with $R^f$;

$R^f$ is halogen, N3, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_3$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_3$-$C_6$-cycloalkoxyx-$C_1$-$C_4$-alkyl, wherein the alkyl, alkoxy, alkenyl, alkynyl, cycloalkyl and cycloalkoxy moieties are unsubstituted or substituted with halogen, $C(=O)$—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, $C(=O)$—$NR^bR^c$, $C(=O)$—$R^d$, $SO_2NR^bR^c$, or $S(=O)_mR^e$;

$R^g$ is halogen, $N_3$, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, $C(=O)$—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, $C(=O)$—$NR^bR^c$, $C(=O)$—$R^d$, $SO_2NR^bR^c$, or $S(=O)_mR^e$;

$R^h$ is halogen, OH, $C_1$-$C_6$-alkyl, $C_3$-$C_6$-cycloalkyl, or CN;

m is 0, 1, or 2;

and the N-oxides, stereoisomers, tautomers and agriculturally or veterinarily acceptable salts thereof.

Moreover, the present invention also relates to processes and intermediates for preparing compounds of formula I and to active compound combinations comprising them. Moreover, the present invention relates to agricultural or veterinary compositions comprising the compounds of formula I, and to the use of the compounds of formula I or compositions comprising them for combating or controlling invertebrate pests and/or for protecting crops, plants, plant propagation material and/or growing plants from attack and/or infestation by invertebrate pests. The present invention also relates to methods of applying the compounds of formula I. Furthermore, the present invention relates to seed comprising compounds of formula I. Wherein the compounds of formula I includes N-oxides, stereoisomers, tautomers and agriculturally or veterinarily acceptable salts thereof.

With due modification of the starting compounds, the compounds of formula I can be prepared by procedures as given in below schemes.

Compounds of the formula S1-2 can be prepared in amide coupling reactions between an amine ($ArNHR^2$) and compounds of the formula S1-1 using a coupling reagent such as HATU as described by, for example, Tobinaga, et al WO 2018/021447 (Scheme 1). Alternatively compounds of the formula S1-1 can be pre-activated as an acid chloride by reaction with, for example, $SOCl_2$, prior to reaction with an amine ($ArNHR^2$) in the presense of a base (e.g. $Et_3N$) to form compounds of the formula S1-2. Compounds of the formula S1-3 can, in turn, be prepared by reaction of compounds of the formula S1-2 with a thionating reagent such at $P_2S_5$ as described by, for example, Carroll et al, WO 2008/130953. Compounds of the formula S1-4 can be synthesized by reaction of compounds of the formula S1-2 with a reducing agent such as $BH_3.SMe_2$ as described by, for example, Chen et al, WO 2009/135299.

Scheme 1

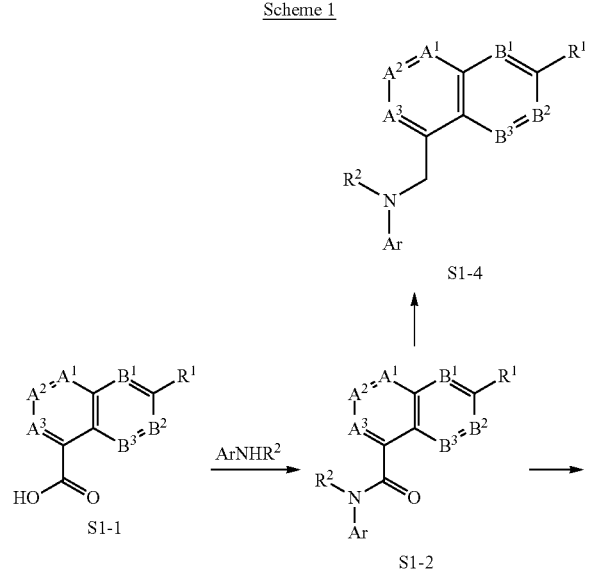

-continued

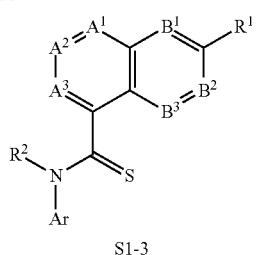

S1-3

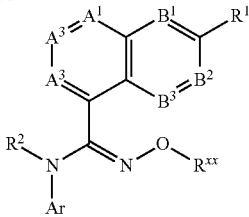

S2-5

Compounds of the formula S2-2 can be prepared from compounds of the formula S2-1 by reaction with, for example, hydroxylamine hydrochloride in the presence of a base (e.g. NaOH, pyridine, triethylamine, $K_2CO_3$, NaH) as described by, for example, Sanders et al, J. Am. Chem. Soc. 2011, 133, 949-957 (Scheme 2). Compounds of the formula S2-3 can be prepared from compounds of the formula S2-2 by reaction with a chlorinating reagent (e.g. N-chlorosuccinimide, NaOCl, t-butylhypochlorite) as described by, for example, Sanders et al, J. Am. Chem. Soc. 2011, 133, 949-957. Compounds of the formula S2-4 can be prepared from compounds of the formula S2-3 by reaction with an amine nucleophile ($ArNHR^2$) as described by, for example, Altug et al, Tetrahedron Lett. 2009, 50, 7392-7394. Compounds of the formula S2-5 can be prepared from compounds of the formula S2-4 by reaction with an electrophile (e.g. methyl iodide, cyanogen bromide, acetyl chloride etc.) in the presence of a base (e.g. NaOH, pyridine, triethylamine, $K_2CO_3$, NaH) as described by, for example, Lui et al, Pest. Manag. Sci. 2009, 65, 229-234.

Scheme 2

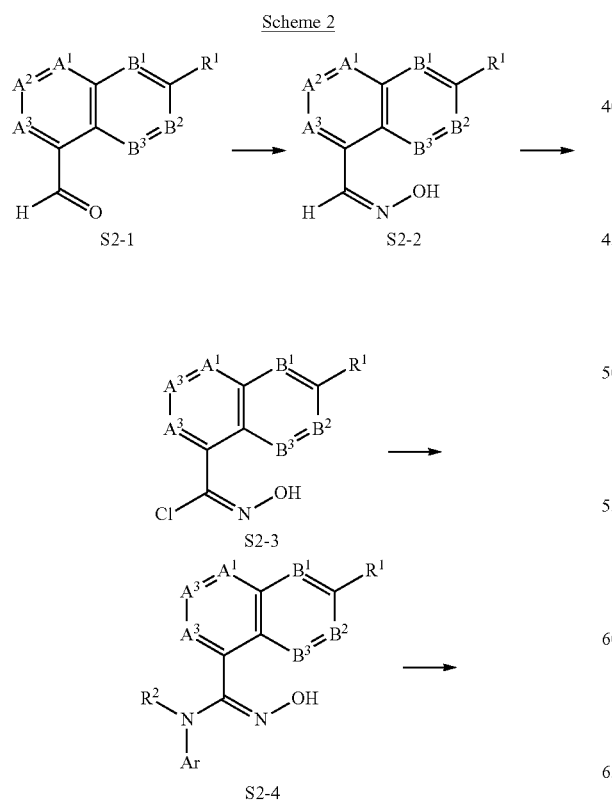

Compounds of the formula S3-2 (R=Me, Et) can be prepared from compounds of the formula S3-1 by reaction with, for example, hydrochloric acid in methanol as described by, for example, Laurent et al, Molecules, 2010, 15, 4283-4293 (Scheme 3). Compounds of the formula S3-3 can be prepared from compounds of the formula S3-2 by reaction with an amine nucleophile ($ArNHR^2$) as described by, for example, Arnold et al, WO 2008/124849.

Scheme 3

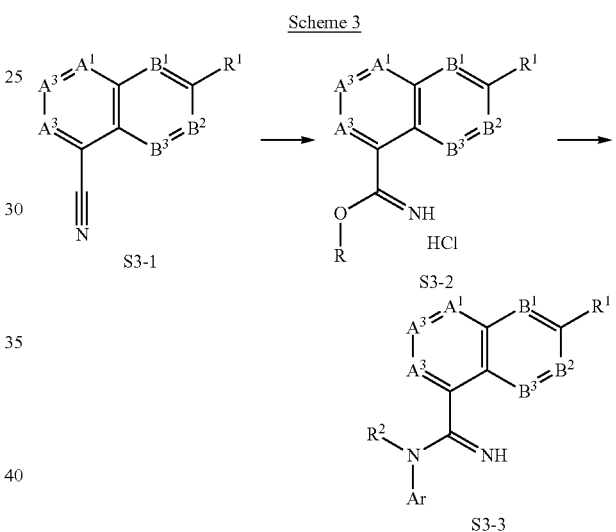

Compounds of the formula S4-2 can be prepared via compounds of the formula S4-1 by reaction of compounds of the formula S1-2 with a chlorinating agent (e.g. N-chlorosuccinimide, NaOCl, t-butylhypochlorite) followed by a hydrazine [$H_2NN(R^3)_2$] as described by, for example, Crimmin et al, Dalton Trans., 2011, 42, 514-522 (Scheme 4). Compounds of the formula S4-2 can also be prepared from compounds of the formula S1-3 by reaction with, for example, a hydrazine [$H_2NN(R^3)_2$] as described by, for example, Burlison et al, WO 2009/158026.

Scheme 4

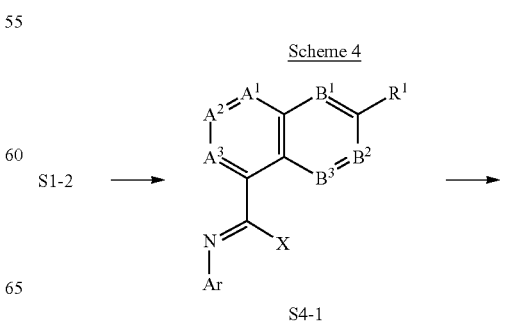

-continued

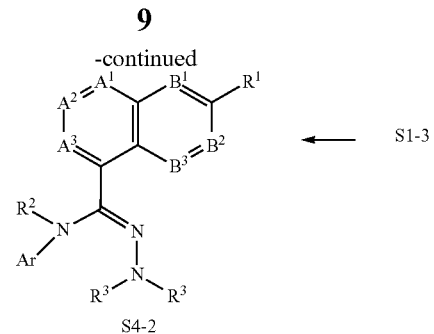

S4-2

Compounds of the formula S5-3 can be prepared by reaction of compounds of the formula S5-1 with a reducing agent, for example, LiAlH$_4$. The resultant compounds of the formula S5-2 can then by reacted with aryl alcohol (ArOH) under Mitsonobu conditions to form compounds of the formula S5-3 (Scheme 5). Compounds for the formula S5-5 can be prepared by reaction of compounds of the formula S5-2 with a chlorinating reagent (e.g. SOCl$_2$, POCl$_3$) as described by, for example, Miyahara et al, WO 2017/209155. The resultant compounds of the formula S5-4 can then be converted into compounds of the formula S5-2 by reaction with an arylthiol (ArSH). Compounds of the formula of the formula S5-6 can, in turn, be prepared by reaction of compounds of the formula S5-5 with an oxidizing agent (e.g. MCPBA). Compounds of the formula S1-4 can also be prepared by reducing compounds of the formula of the formula S5-1 with, e.g. DIBAL. The resultant compounds of the formula 52-1 can then be reacted with an amine (ArNHR$^2$) in a reductive amination with, e.g. Na(CN)BH$_3$ to form compounds of the formula S1-4.

Scheme 5

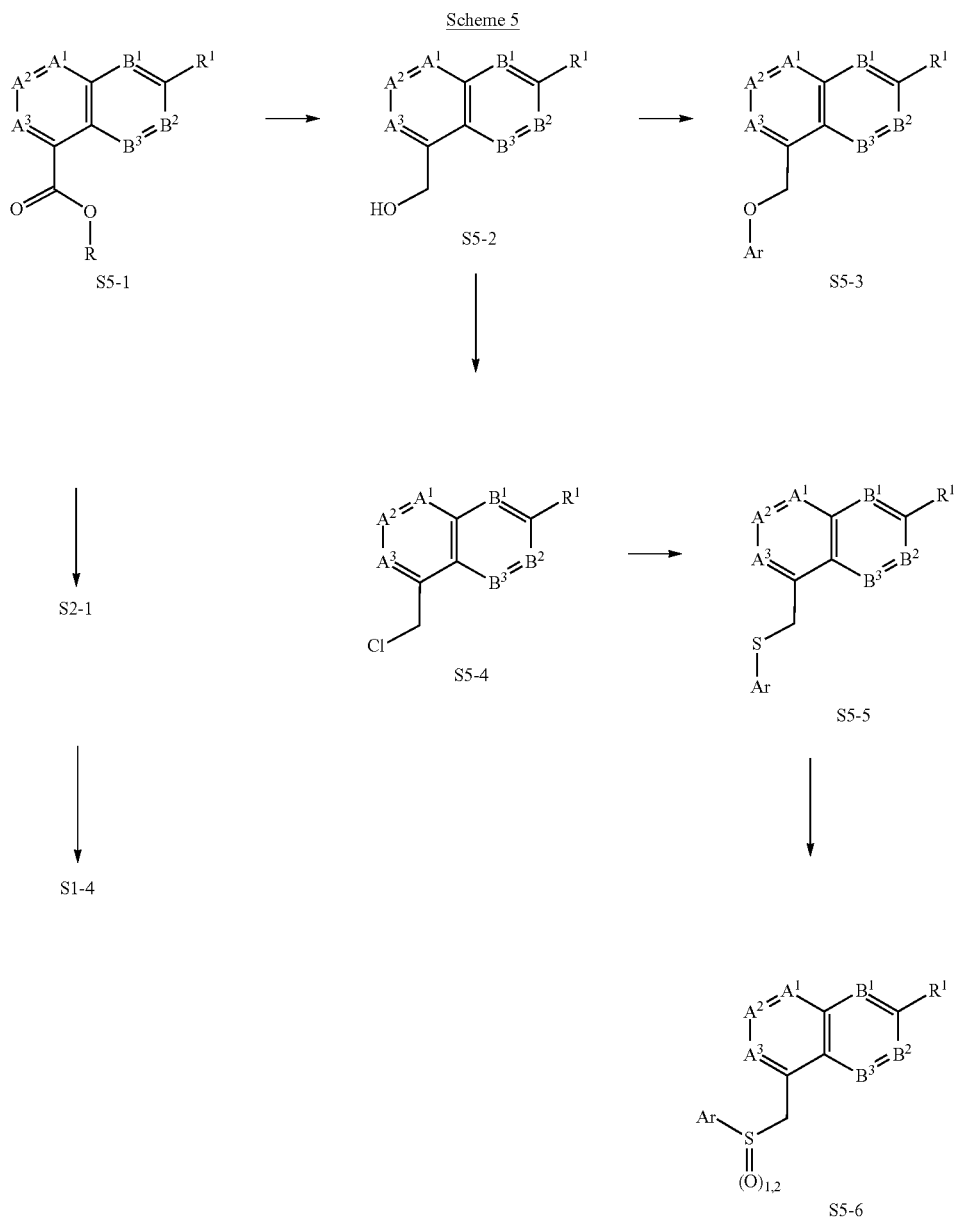

Compounds of the formula S6-4 can be prepared by treating compounds of the formula S6-1 a halogenating agent (e.g. POCl₃, PBr₃) (Scheme 6). The resultant compounds of the formula S6-2 can then be reacted with an amine (R²NH₂) in an S$_N$Ar reaction or palladium-catalyzed amination as described by, for example, Ojida et al, WO 2018/084321 or Hatakeyama et al, WO 2018/110497, respectively. Alternatively The resultant compounds of the formula S6-2 can be acylated with an aryl acid (or chloride) to form compounds of the formula S6-3.

Scheme 6

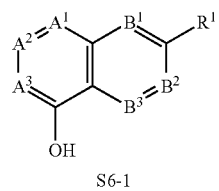

S6-1

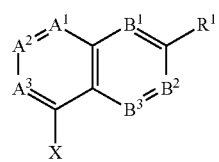

S6-2

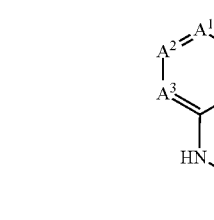

S6-3

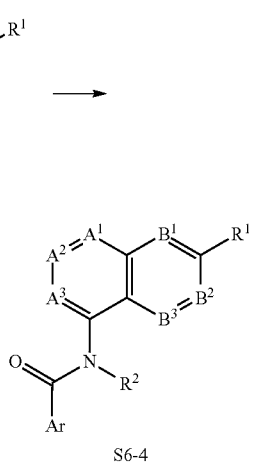

S6-4

Compounds of the formula S7-1, S7-2, S7-3 and S7-4 are isomers of compounds depicted in Scheme 1-4 and, as such, can be synthesized using analogous procedures are those described above (Scheme 7).

Scheme 7

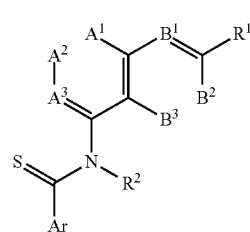

S7-1

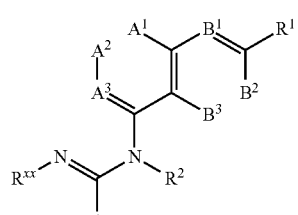

S7-2

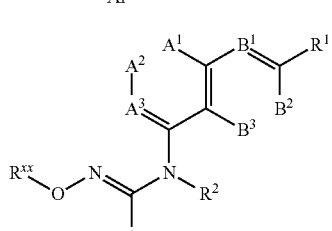

S7-3

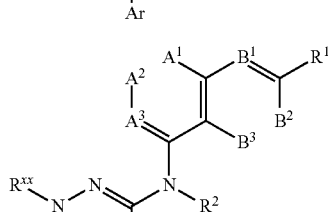

S7-4

Compounds of the formula S8-1 can be prepared in analogy to compounds of the formula S6-3 (Scheme 8). Compounds of the formula S8-2 can be prepared from compounds of the formula S6-1 by reaction with an alcohol [ArC(R⁹)(R¹⁰)OH] in an S$_N$Ar reaction or copper-catalyzed ether formation reaction as described by, for example, Long et al, WO 2018/059534 or Gao et al WO 2016/150193, respectively. Compounds of the formula S8-3 can be prepared from compounds of the formula S6-1 by reaction with a thiol [ArC(R⁹)(R¹⁰)SH] in an S$_N$Ar reaction or palladium-catalyzed thioether formation reaction as described by, for example, Wang et al, WO 2017/198196 or Barrow et al, WO 2016/123577.

Scheme 8

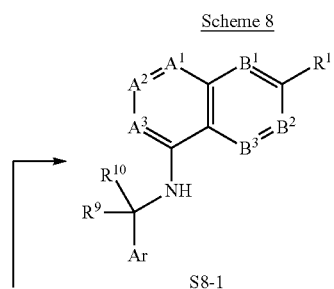

S8-1

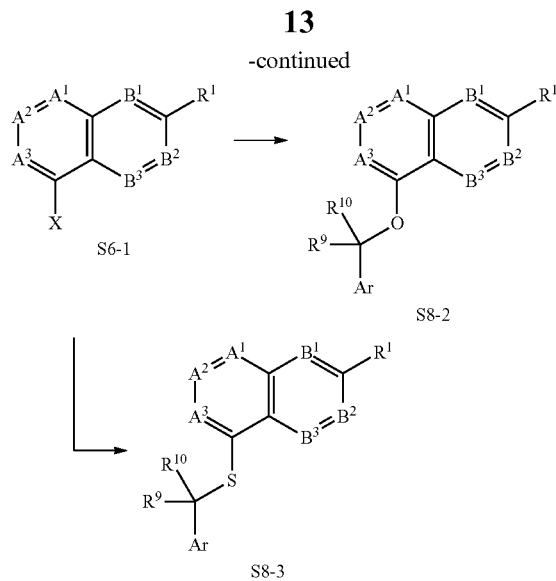

Compounds of the formula S9-3 can be prepared by oxidation of compounds of the formula S9-1 with, e.g. MCPBA as described by, for example, Rinderspacher et al, US 2017/0210759 (Scheme 9). The resultant compounds of the formula S9-2 can be converted into compounds of the formula S9-3 by reaction with an acylating agent (e.g. Ac$_2$O) followed by a basic hydrolysis (e.g. with NaOH).

Scheme 9

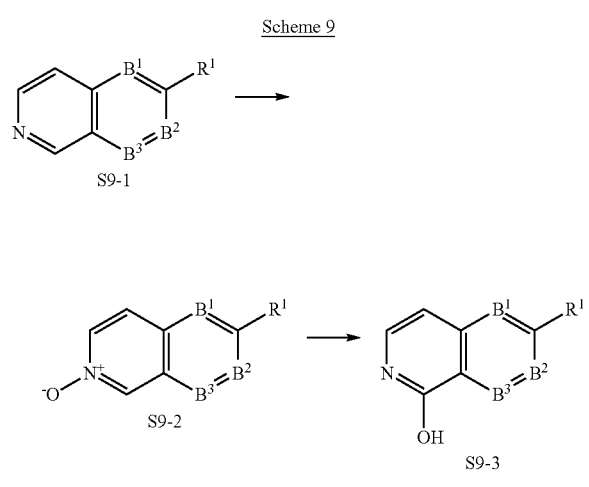

Compounds of the formula S10-2 can be prepared by condensation of compounds of the formula S10-1 with, e.g. formamide as described by, for example, Ojida et al, WO 2018/084321 (Scheme 10).

Scheme 10

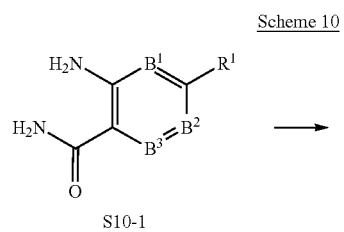

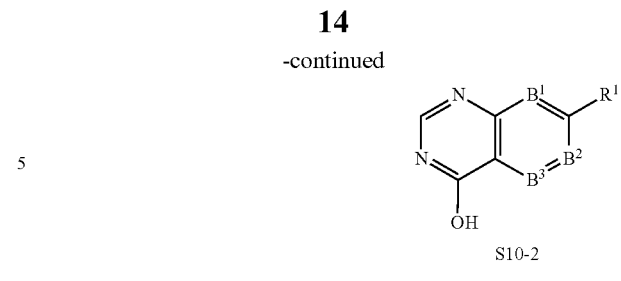

Compounds of the formula S11-2 can be prepared by reaction of compounds of the formula S11-1 with hydrazine as described by, for example, Siu et al, WO 2016/164285 (Scheme 11).

Scheme 11

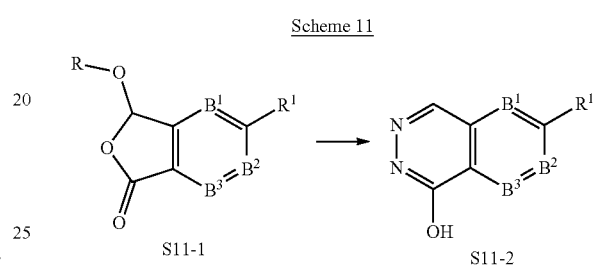

Compounds of the formula S12-2 (R=Me, Et) can be prepared in a palladium-catalyzed carbonylation of compounds of the formula S12-1 using CO (g) and MeOH or EtOH as described by, for example, Evans et al, WO 2017/214269 (Scheme 12). Compounds of the formula S12-4 can, in turn, be prepared from Compounds of the formula S12-2 by, e.g. basic hydrolysis, compounds of the formula S12-3 can also be prepared from compounds of the formula S12-2 by reduction with, e.g. DIBAL.

Scheme 12

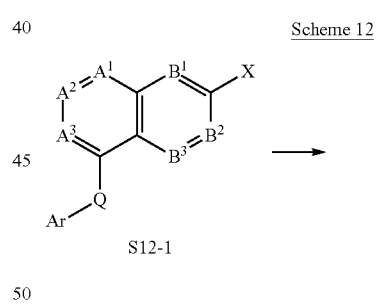

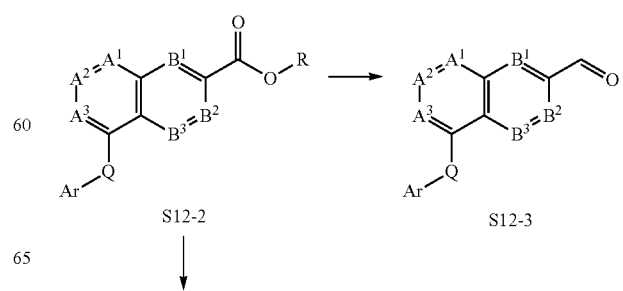

-continued

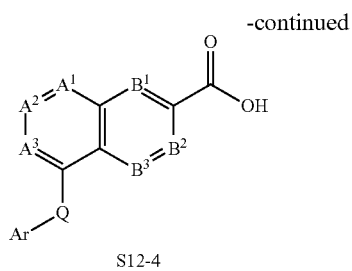

S12-4

Compounds of the formula S12-4, S12-3 and S13-1 can be converted in known syntheses into compounds on the formula (I) as described by, for example, Crouse et al, WO 2009/102736, Crouse et al, WO 2010/093764, Crouse et al, US 2012/0202687, Crouse et al, WO 2013/009791, Baum et al, WO 2013/116052, Fischer et al, WO 2013/116053, Crouse et al, WO 2014/011429, Jeanguenat et al, WO 2016/116445 and Narine et al, WO 2018/177781 (Scheme 13).

Scheme 13

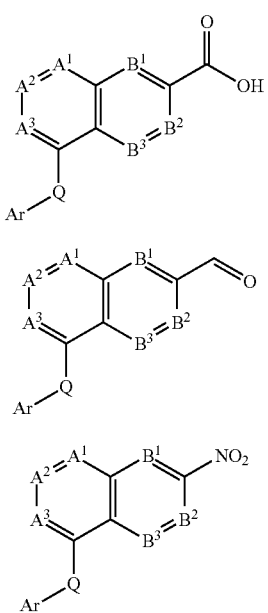

Individual compounds of formula I can also be prepared by derivatisation of other compounds of formula I or the intermediates thereof.

If the synthesis yields mixtures of isomers, a separation is generally not necessarily required since in some cases the individual isomers can be interconverted during work-up for use or during application (for example under the action of light, acids or bases). Such conversions may also take place after use, for example in the treatment of plants in the treated plant, or in the harmful fungus to be controlled.

A skilled person will readily understand that the preferences for the substituents, also in particular the ones given in the tables below for the respective substituents, given herein in connection with compounds I apply for the intermediates accordingly. Thereby, the substituents in each case have independently of each other or more preferably in combination the meanings as defined herein.

Unless otherwise indicated, the term "compound(s) according to the invention" or "compound(s) of the invention" or "compound(s) of formula (I)", refers to the compounds of formula I.

The term "compound(s) according to the invention", or "compounds of formula I" comprises the compound(s) as defined herein as well as a stereoisomer, salt, tautomer or N-oxide thereof. The term "compound(s) of the present invention" is to be understood as equivalent to the term "compound(s) according to the invention", therefore also comprising a stereoisomer, salt, tautomer or N-oxide thereof.

The term "composition(s) according to the invention" or "composition(s) of the present invention" encompasses composition(s) comprising at least one compound of formula I according to the invention as defined above. The compositions of the invention are preferably agricultural or veterinary compositions.

Depending on the substitution pattern, the compounds according to the invention may have one or more centers of chirality, in which case they are present as mixtures of enantiomers or diastereomers. The invention provides both the single pure enantiomers or pure diastereomers of the compounds according to the invention, and their mixtures and the use according to the invention of the pure enantiomers or pure diastereomers of the compounds according to the invention or their mixtures. Suitable compounds according to the invention also include all possible geometrical stereoisomers (cis/trans isomers) and mixtures thereof. Cis/trans isomers may be present with respect to an alkene, carbon-nitrogen double-bond or amide group. The term "stereoisomer(s)" encompasses both optical isomers, such as enantiomers or diastereomers, the latter existing due to more than one center of chirality in the molecule, as well as geometrical isomers (cis/trans isomers). The present invention relates to every possible stereoisomer of the compounds of formula I, i.e. to single enantiomers or diastereomers, as well as to mixtures thereof.

The compounds according to the invention may be amorphous or may exist in one or more different crystalline states (polymorphs) which may have different macroscopic properties such as stability or show different biological properties such as activities. The present invention relates to amorphous and crystalline compounds according to the invention, mixtures of different crystalline states of the respective compounds according to the invention, as well as amorphous or crystalline salts thereof.

The term "tautomers" encompasses isomers, which are derived from the compounds of formula I by the shift of an H-atom involving at least one H-atom located at a nitrogen, oxygen or sulphur atom. Examples of tautomeric forms are keto-enol forms, imine-enamine forms, urea-isourea forms, thiourea-isothiourea forms, (thio)amide-(thio)imidate forms etc.

The term "stereoisomers" encompasses both optical isomers, such as enantiomers or diastereomers, the latter existing due to more than one center of chirality in the molecule, as well as geometrical isomers (cis/trans isomers).

Depending on the substitution pattern, the compounds of the formula I may have one or more centers of chirality, in which case they are present as mixtures of enantiomers or diastereomers. One center of chirality is the carbon ring atom of the isothiazoline ring carrying radical $R^1$. The invention provides both the pure enantiomers or diastereomers and their mixtures and the use according to the invention of the pure enantiomers or diastereomers of the compound I or its mixtures. Suitable compounds of the formula I also include all possible geometrical stereoisomers (cis/trans isomers) and mixtures thereof.

The term N-oxides relates to a form of compounds I in which at least one nitrogen atom is present in oxidized form (as NO). To be more precise, it relates to any compound of the present invention which has at least one tertiary nitrogen atom that is oxidized to an N-oxide moiety. N-oxides of compounds I can in particular be prepared by oxidizing e.g. the ring nitrogen atom of an N-heterocycle, e.g. a pyridine or pyrimidine ring present in Ar or $R^{11}$, or an imino-nitrogen present in central tricyclic core, with a suitable oxidizing agent, such as peroxo carboxylic acids or other peroxides. The person skilled in the art knows if and in which positions compounds of the present invention may form N-oxides.

Salts of the compounds of the formula I are preferably agriculturally and veterinarily acceptable salts. They can be formed in a customary method, e.g. by reacting the compound with an acid of the anion in question if the compound of formula I has a basic functionality or by reacting an acidic compound of formula I with a suitable base.

Suitable agriculturally or veterinarily acceptable salts are especially the salts of those cations or the acid addition salts of those acids whose cations and anions, which are known and accepted in the art for the formation of salts for agricultural or veterinary use respectively, and do not have any adverse effect on the action of the compounds according to the present invention. Suitable cations are in particular the ions of the alkali metals, preferably lithium, sodium and potassium, of the alkaline earth metals, preferably calcium, magnesium and barium, and of the transition metals, preferably manganese, copper, zinc and iron, and also ammonium ($NH^{4+}$) and substituted ammonium in which one to four of the hydrogen atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or —$CH_2$-phenyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxy-ethoxy) ethylammonium, bis(2-hydroxyethyl)ammonium, benzyltrimethylammonium and benzyl-triethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium. Suitable acid addition veterinarily acceptable salts, e.g. formed by compounds of formula I containing a basic nitrogen atom, e.g. an amino group, include salts with inorganic acids, for example hydrochlorides, sulphates, phosphates, and nitrates and salts of organic acids for example acetic acid, maleic acid, dimaleic acid, fumaric acid, difumaric acid, methane sulfenic acid, methane sulfonic acid, and succinic acid.

Anions of useful acid addition salts are primarily chloride, bromide, fluoride, hydrogen sulfate, sulfate, dihydrogen phosphate, hydrogen phosphate, phosphate, nitrate, hydrogen carbonate, carbonate, hexafluorosilicate, hexafluorophosphate, benzoate, and the anions of $C_1$-$C_4$-alkanoic acids, preferably formate, acetate, propionate and butyrate. They can be formed by reacting a compound of formulae I with an acid of the corresponding anion, preferably of hydrochloric acid, hydrobromic acid, sulfuric acid, phosphoric acid or nitric acid.

The term "invertebrate pest" as used herein encompasses animal populations, such as insects, arachnids and nematodes, which may attack plants, thereby causing substantial damage to the plants attacked, as well as ectoparasites which may infest animals, in particular warm blooded animals such as e.g. mammals or birds, or other higher animals such as reptiles, amphibians or fish, thereby causing substantial damage to the animals infested.

The term "plant propagation material" is to be understood to denote all the generative parts of the plant such as seeds and vegetative plant material such as cuttings and tubers (e. g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil. The plant propagation materials may be treated prophylactically with a plant protection compound either at or before planting or transplanting. Said young plants may also be protected before transplantation by a total or partial treatment by immersion or pouring.

The term "plants" comprises any types of plants including "modified plants" and in particular "cultivated plants".

The term "modified plants" refers to any wild type species or related species or related genera of a cultivated plant.

The term "cultivated plants" is to be understood as including plants which have been modified by breeding, mutagenesis or genetic engineering including but not limiting to agricultural biotech products on the market or in development (cf. http://www.bio.org/speeches/pubs/er/agri_products.asp). Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant. Such genetic modifications also include but are not limited to targeted post-translational modification of protein(s), oligo- or polypeptides e. g. by glycosylation or polymer additions such as prenylated, acetylated or farnesylated moieties or PEG moieties.

Plants that have been modified by breeding, mutagenesis or genetic engineering, e. g. have been rendered tolerant to applications of specific classes of herbicides, such as auxin herbicides such as dicamba or 2,4-D; bleacher herbicides such as hydroxylphenylpyruvate dioxygenase (HPPD) inhibitors or phytoene desaturase (PDS) inhibitors; acetolactate synthase (ALS) inhibitors such as sulfonyl ureas or imidazolinones; enolpyruvylshikimate-3-phosphate synthase (EPSPS) inhibitors, such as glyphosate; glutamine synthetase (GS) inhibitors such as glufosinate; protoporphyrinogen-IX oxidase inhibitors; lipid biosynthesis inhibitors such as acetyl CoA carboxylase (ACCase) inhibitors; or oxynil (i. e. bromoxynil or ioxynil) herbicides as a result of conventional methods of breeding or genetic engineering. Furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are e. g. described in Pest Managem. Sci. 61, 2005, 246; 61, 2005, 258; 61, 2005, 277; 61, 2005, 269; 61, 2005, 286; 64, 2008, 326; 64, 2008, 332; Weed Sci. 57, 2009, 108; Austral. J. Agricult. Res. 58, 2007, 708; Science 316, 2007, 1185; and references quoted therein. Several cultivated plants have been rendered tolerant to herbicides by conventional methods of breeding (mutagenesis), e. g. Clearfield® summer rape (Canola, BASF SE, Germany) being tolerant to imidazolinones, e. g. imazamox, or ExpressSun® sunflowers (DuPont, USA) being tolerant to sulfonyl ureas, e. g. tribenuron. Genetic engineering methods have been used to render cultivated plants such as soybean, cotton, corn, beets and rape, tolerant to herbicides such as glyphosate and glufosinate, some of which are commercially available under the trade names RoundupReady® (glyphosate-tolerant, Monsanto, U.S.A.), Cultivance® (imidazolinone tolerant, BASF SE, Germany) and LibertyLink® (glufosinate-tolerant, Bayer CropScience, Germany).

Furthermore, plants are also covered that are by the use of recombinant DNA techniques capable to synthesize one or more insecticidal proteins, especially those known from the bacterial genus *Bacillus*, particularly from *Bacillus thuringiensis*, such as 5-endotoxins, e. g. CryIA(b), CryIA(c), CryIF, CryIF(a2), CryIIA(b), CryIIIA, CryIIIB(b1) or Cry9c; vegetative insecticidal proteins (VIP), e. g. VIP1, VIP2, VIP3 or VIP3A; insecticidal proteins of bacteria colonizing nematodes, e. g. *Photorhabdus* spp. or Xenorhabdus spp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, e. g. WO 02/015701). Further examples of such toxins or genetically modified plants capable of synthesizing such toxins are disclosed, e. g., in EP-A 374 753, WO 93/007278, WO 95/34656, EP-A 427 529, EP-A 451 878, WO 03/18810 und WO 03/52073. The methods for producing such genetically modified plants are generally known to the person skilled in the art and are described, e. g. in the publications mentioned above. These insecticidal proteins contained in the genetically modified plants impart to the plants producing these proteins tolerance to harmful pests from all taxonomic groups of athropods, especially to beetles (*Coeloptera*), two-winged insects (*Diptera*), and moths (*Lepidoptera*) and to nematodes (Nematoda). Genetically modified plants capable to synthesize one or more insecticidal proteins are, e. g., described in the publications mentioned above, and some of which are commercially available such as YieldGard® (corn cultivars producing the CryIAb toxin), YieldGard® Plus (corn cultivars producing CryIAb and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e. g. Agrisure® CB) and Bt176 from Syngenta Seeds SAS, France, (corn cultivars producing the Cry1Ab toxin and PAT enzyme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e. g. EP-A 392 225), plant disease resistance genes (e. g. potato cultivars, which express resistance genes acting against *Phytophthora infestans* derived from the mexican wild potato *Solanum bulbocastanum*) or T4-lysozym (e. g. potato cultivars capable of synthesizing these proteins with increased resistance against bacteria such as *Erwinia amylvora*). The methods for producing such genetically modified plants are generally known to the person skilled in the art and are described, e. g. in the publications mentioned above.

Furthermore, plants are also covered that are by the use of recombinant DNA techniques capable to synthesize one or more proteins to increase the productivity (e. g. bio mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e. g. oil crops that produce health-promoting long-chain omega-3 fatty acids or unsaturated omega-9 fatty acids (e. g. Nexera® rape, DOW Agro Sciences, Canada).

Furthermore, plants are also covered that contain by the use of recombinant DNA techniques a modified amount of substances of content or new substances of content, specifically to improve raw material production, e. g. potatoes that produce increased amounts of amylopectin (e. g. Amflora® potato, BASF SE, Germany).

The organic moieties mentioned in the above definitions of the variables are—like the term halogen—collective terms for individual listings of the individual members. The prefix $C_n$-$C_m$ indicates in each case the possible number of carbon atoms in the group.

The term halogen denotes in each case F, Br, Cl or I, in particular F, Cl or Br.

The term "alkyl" as used herein and in the alkyl moieties of alkoxy, alkylthio, and the like refers to saturated straight-chain or branched hydrocarbon radicals having 1 to 2 ("$C_1$-$C_2$-alkyl"), 1 to 3 ("$C_1$-$C_3$-alky"), 1 to 4 ("$C_1$-$C_6$-alkyl") or 1 to 6 ("$C_1$-$C_6$-alkyl") carbon atoms. $C_1$-$C_2$-Alkyl is $CH_3$ or $C_2H_5$. $C_1$-$C_3$-Alkyl is additionally propyl and isopropyl. $C_1$-$C_4$-Alkyl is additionally butyl, 1-methylpropyl (sec-butyl), 2-methylpropyl (isobutyl) or 1,1-dimethylethyl (tert-butyl). $C_1$-$C_6$-Alkyl is additionally also, for example, pentyl, 1-methylbutyl, 2-methylbutyl, 3-methylbutyl, 2,2-dimethylpropyl, 1-ethylpropyl, 1,1-dimethylpropyl, 1,2-dimethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl.

The term "haloalkyl" as used herein, which is also expressed as "alkyl which is partially or fully halogenated", refers to straight-chain or branched alkyl groups having 1 to 2 ("$C_1$-$C_2$-haloalkyl"), 1 to 3 ("$C_1$-$C_3$-haloalkyl"), 1 to 4 ("$C_1$-$C_4$-haloalkyl") or 1 to 6 ("$C_1$-$C_6$-haloalkyl") carbon atoms (as mentioned above), where some or all of the hydrogen atoms in these groups are replaced by halogen atoms as mentioned above: in particular $C_1$-$C_2$-haloalkyl, such as chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl or pentafluoroethyl. $C_1$-$C_3$-haloalkyl is additionally, for example, 1-fluoropropyl, 2-fluoropropyl, 3-fluoropropyl, 1,1-difluoropropyl, 2,2-difluoropropyl, 1,2-difluoropropyl, 3,3-difluoropropyl, 3,3,3-trifluoropropyl, heptafluoropropyl, 1,1,1-trifluoroprop-2-yl, 3-chloropropyl and the like. Examples for $C_1$-$C_4$-haloalkyl are, apart those mentioned for $C_1$-$C_3$-haloalkyl, 4-chlorobutyl and the like.

The term "alkylene" (or alkanediyl) as used herein in each case denotes an alkyl radical as defined above, wherein one hydrogen atom at any position of the carbon backbone is replaced by one further binding site, thus forming a bivalent moiety. Alkylene has preferably 1 to 6 carbon atoms ($C_1$-$C_6$-alkylene), 2 to 6 carbon atoms ($C_2$-$C_6$-alkylene), in particular 1 to 4 carbon atoms ($C_1$-$C_4$-alkylene) or 2 to 4 carbon atoms ($C_2$-$C_4$-alkylene). Examples of alkylene are methylene ($CH_2$), 1,1-ethandiyl, 1,2-ethandiyl, 1,3-propandiyl, 1,2-propandiyl, 2,2-propandiyl, 1,4-butandiyl, 1,2-butandiyl, 1,3-butandiyl, 2,3-butandiyl, 2,2-butandiyl, 1,5-pentandiyl, 2,2-dimethylpropan-1,3-diyl, 1,3-dimethyl-1,3-propandiyl, 1,6-hexandiyl etc.

The term "alkenyl" as used herein refers to monounsaturated straight-chain or branched hydrocarbon radicals having 2 to 3 ("$C_2$-$C_3$-alkenyl"), 2 to 4 ("$C_2$-$C_4$-alkenyl") or 2 to 6 ("$C_2$-$C_6$-alkenyl") carbon atoms and a double bond in any position, for example $C_2$-$C_3$-alkenyl, such as ethenyl, 1-propenyl, 2-propenyl or 1-methylethenyl; $C_2$-$C_4$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl; $C_2$-$C_6$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like.

The term "alkynyl" as used herein refers to straight-chain or branched hydrocarbon groups having 2 to 3 ("$C_2$-$C_3$-alkynyl"), 2 to 4 ("$C_2$-$C_4$-alkynyl") or 2 to 6 ("$C_2$-$C_6$-alkynyl") carbon atoms and one or two triple bonds in any position, for example $C_2$-$C_3$-alkynyl, such as ethynyl, 1-propynyl or 2-propynyl; $C_2$-$C_4$-alkynyl, such as ethynyl, 1-propynyl, 2-propynyl, 1-butynyl, 2-butynyl, 3-butynyl, 1-methyl-2-propynyl and the like, $C_2$-$C_6$-alkynyl, such as ethynyl, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-1-methyl-2-propynyl and the like;

The term "cycloalkyl" as used herein refers to mono- or bi- or polycyclic saturated hydrocarbon radicals having in particular 3 to 6 ("$C_3$-$C_6$-cycloalkyl") or 3 to 5 ("$C_3$-$C_5$-cycloalkyl") or 3 to 4 ("$C_3$-$C_4$-cycloalkyl") carbon atoms. Examples of monocyclic radicals having 3 to 4 carbon atoms comprise cyclopropyl and cyclobutyl. Examples of monocyclic radicals having 3 to 5 carbon atoms comprise cyclopropyl, cyclobutyl and cyclopentyl. Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.2.1]heptyl, bicyclo[3.1.1]heptyl, bicyclo[2.2.2]octyl and bicyclo[3.2.1]octyl. Preferably, the term cycloalkyl denotes a monocyclic saturated hydrocarbon radical.

The term "cycloalkoxy" as used herein refers to a cycloalkyl radical, in particular a monocyclic cycloalkyl radical, as defined above having in particular 3 to 6 ("$C_3$-$C_6$-cycloalkoxy") or 3 to 5 ("$C_3$-$C_5$-cycloalkoxy") or 3 to 4 ("$C_3$-$C_4$-cycloalksoxy") carbon atoms, which is bound via an oxygen atom to the remainder of the molecule.

The term "cycloalkyl-$C_1$-$C_4$-alkyl" refers to a $C_3$-$C_8$-cycloalkyl ("$C_3$-$C_8$-cycloalkyl-$C_1$-$C_4$-alkyl"), preferably a $C_3$-$C_6$-cycloalkyl ("$C_3$-$C_6$-cycloalkyl-$C_1$-$C_4$-alkyl"), more preferably a $C_3$-$C_4$-cycloalkyl ("$C_3$-$C_4$-cycloalkyl-$C_1$-$C_4$-alkyl") as defined above (preferably a monocyclic cycloalkyl group) which is bound to the remainder of the molecule via a $C_1$-$C_4$-alkyl group, as defined above. Examples for $C_3$-$C_4$-cycloalkyl-$C_1$-$C_4$-alkyl are cyclopropylmethyl, cyclopropylethyl, cyclopropylpropyl, cyclobutylmethyl, cyclobutylethyl and cyclobutylpropyl, Examples for $C_3$-$C_6$-cycloalkyl-$C_1$-$C_4$-alkyl, apart those mentioned for $C_3$-$C_4$-cycloalkyl-$C_1$-$C_4$-alkyl, are cyclopentylmethyl, cyclopentylethyl, cyclopentyl propyl, cyclohexylmethyl, cyclohexylethyl and cyclohexylpropyl.

The term "$C_1$-$C_2$-alkoxy" is a $C_1$-$C_2$-alkyl group, as defined above, attached via an oxygen atom. The term "$C_1$-$C_3$-alkoxy" is a $C_1$-$C_3$-alkyl group, as defined above, attached via an oxygen atom. The term "$C_1$-$C_4$-alkoxy" is a $C_1$-$C_4$-alkyl group, as defined above, attached via an oxygen atom. The term "$C_1$-$C_6$-alkoxy" is a $C_1$-$C_6$-alkyl group, as defined above, attached via an oxygen atom. The term "$C_1$-$C_{10}$-alkoxy" is a $C_1$-$C_{10}$-alkyl group, as defined above, attached via an oxygen atom. $C_1$-$C_2$-Alkoxy is $OCH_3$ or $OC_2H_5$. $C_1$-$C_3$-Alkoxy is additionally, for example, n-propoxy and 1-methylethoxy (isopropoxy). $C_1$-$C_4$-Alkoxy is additionally, for example, butoxy, 1-methylpropoxy (sec-butoxy), 2-methylpropoxy (isobutoxy) or 1,1-dimethylethoxy (tert-butoxy). $C_1$-$C_6$-Alkoxy is additionally, for example, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy. $C_1$-$C_8$-Alkoxy is additionally, for example, heptyloxy, octyloxy, 2-ethylhexyloxy and positional isomers thereof. $C_1$-$C_{10}$-Alkoxy is additionally, for example, nonyloxy, decyloxy and positional isomers thereof.

The term "$C_1$-$C_2$-haloalkoxy" is a $C_1$-$C_2$-haloalkyl group, as defined above, attached via an oxygen atom. The term "$C_1$-$C_3$-haloalkoxy" is a $C_1$-$C_3$-haloalkyl group, as defined above, attached via an oxygen atom. The term "$C_1$-$C_4$-haloalkoxy" is a $C_1$-$C_4$-haloalkyl group, as defined above, attached via an oxygen atom. The term "$C_1$-$C_6$-haloalkoxy" is a $C_1$-$C_6$-haloalkyl group, as defined above, attached via an oxygen atom. $C_1$-$C_2$-Haloalkoxy is, for example, $OCH_2F$, $OCHF_2$, $OCF_3$, $OCH_2Cl$, $OCHCl_2$, $OCCl_3$, chlorofluoromethoxy, dichlorofluoromethoxy, chlorodifluoromethoxy, 2-fluoroethoxy, 2-chloroethoxy, 2-bromoethoxy, 2-iodoethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy or $OC_2F_5$. $C_1$-$C_3$-Haloalkoxy is additionally, for example, 2-fluoropropoxy, 3-fluoropropoxy, 2,2-difluoropropoxy, 2,3-difluoropropoxy, 2-chloropropoxy, 3-chloropropoxy, 2,3-dichloropropoxy, 2-bromopropoxy, 3-bromopropoxy, 3,3,3-trifluoropropoxy, 3,3,3-trichloropropoxy, $OCH_2$—$C_2F_5$, $OCF_2$—$C_2F_5$, 1—($CH_2F$)-2-fluoroethoxy, 1-($CH_2Cl$)-2-chloroethoxy or 1-($CH_2Br$)-2-bromoethoxy. $C_1$-$C_4$-Haloalkoxy is additionally, for example, 4-fluorobutoxy, 4-chlorobutoxy, 4-bromobutoxy or nonafluorobutoxy. $C_1$-$C_6$-Haloalkoxy is additionally, for example, 5-fluoropentoxy, 5-chloropentoxy, 5-brompentoxy, 5-iodopentoxy, undecafluoropentoxy, 6-fluorohexoxy, 6-chlorohexoxy, 6-bromohexoxy, 6-iodohexoxy or dodecafluorohexoxy.

The term "$C_1$-$C_6$-alkoxy-$C_1$-$C_4$-alkyl" as used herein, refers to a straight-chain or branched alkyl having 1 to 4 carbon atoms, as defined above, where one hydrogen atom is replaced by a $C_1$-$C_6$-alkoxy group, as defined above. Examples are methoxymethyl, ethoxymethyl, propoxymethyl, isopropoxymethyl, n-butoxymethyl, sec-butoxymethyl, isobutoxymethyl, tert-butoxymethyl, 1-methoxyethyl, 1-ethoxyethyl, 1-propoxyethyl, 1-isopropoxyethyl, 1-n-butoxyethyl, 1-sec-butoxyethyl, 1-isobutoxyethyl, 1-tert-butoxyethyl, 2-methoxyethyl, 2-ethoxyethyl, 2-propoxyethyl, 2-isopropoxyethyl, 2-n-butoxyethyl, 2-sec-butoxyethyl, 2-isobutoxyethyl, 2-tert-butoxyethyl, 1-methoxypropyl, 1-ethoxypropyl, 1-propoxypropyl, 1-isopropoxypropyl, 1-n-butoxypropyl, 1-sec-butoxypropyl, 1-isobutoxypropyl, 1-tert-butoxypropyl, 2-methoxypropyl, 2-ethoxypropyl, 2-propoxypropyl, 2-isopropoxypropyl, 2-n-butoxypropyl, 2-sec-butoxypropyl, 2-isobutoxypropyl, 2-tert-butoxypropyl, 3-methoxypropyl, 3-ethoxypropyl, 3-propoxypropyl, 3-isopropoxypropyl, 3-n-butoxypropyl, 3-sec-butoxypropyl, 3-isobutoxypropyl, 3-tert-butoxypropyl and the like.

The term "alkoxyalkoxy" as used herein refers to an alkoxyalkyl radical, in particular a $C_1$-$C_6$-alkoxy-$C_1$-$C_4$-alkyl radical, as defined above, which is bound via an oxygen atom to the remainder of the molecule. Examples thereof are $OCH_2$—$OCH_3$, $OCH_2$—$OC_2H_5$, n-propoxymethoxy, $OCH_2$—$OCH(CH_3)_2$, n-butoxymethoxy, (1-methylpropoxy)methoxy, (2-methylpropoxy)methoxy, $OCH_2$—$OC(CH_3)_3$, 2-(methoxy)ethoxy, 2-(ethoxy)ethoxy, 2-(n-propoxy)ethoxy, 2-(1-methylethoxy)ethoxy, 2-(n-butoxy)ethoxy, 2-(1-methylpropoxy)ethoxy, 2-(2-methylpropoxy)ethoxy, 2-(1,1-dimethylethoxy)ethoxy, etc.

The substituent "oxo" replaces a $CH_2$ by a C(=O) group.

The term "aryl" relates to phenyl and bi- or polycyclic carbocycles having at least one fused phenylene ring, which is bound to the remainder of the molecule. Examples of bi- or polycyclic carbocycles having at least one phenylene ring include naphthyl, tetrahydronaphthyl, indanyl, indenyl, anthracenyl, fluorenyl etc.

The term "aryl-$C_1$-$C_4$-alkyl" relates to $C_1$-$C_4$-alkyl, as defined above, wherein one hydrogen atom has been replaced by an aryl radical, in particular a phenyl radical. Particular examples of aryl-$C_1$-$C_4$-alkyl include —$CH_2$-phenyl, 1-phenethyl, 2-phenetyl, 1-phenylpropyl, 2-phenylpropyl, 3-phenyl-1-propyl and 2-phenyl-2-propyl.

The term "aryloxy-$C_1$-$C_4$-alkyl" relates to $C_1$-$C_4$-alkyl, as defined above, wherein one hydrogen atom has been replaced by an aryloxy radical, in particular a phenoxy radical. Particular examples of aryloxy-$C_1$-$C_4$-alkyl include phenoxymethyl, 1-phenoxyethyl, 2-phenoxyetyl, 1-phenoxypropyl, 2-phenoxypropyl, 3-phenoxy-1-propyl and 2-phenoxy-2-propyl.

The term "aryl-$C_1$-$C_4$-carbonyl" relates to aryl as defined above, in particular a phenyl radical, which is bound by a carbonyl to the remainder of the molecule. Particular examples of arylcarbonyl include benzoyl, 1-naphthoyl and 2-naphthoyl.

The term "hetaryl" relates to aromatic heterocycles having either 5 or 6 ring atoms (5- or 6-membered hetaryl) and being monocyclic or 8, 9 or 10 ring atoms and bing bicyclic. Hetaryl will generally have at least one ring atom selected from O, S and N, which in case of N may be an imino-nitrogen or an amino-nitrogen, which carries hydrogen or a radical different from hydrogen. Hetaryl may have 1, 2, 3 or 4 further nitrogen atoms as ring members, which are imino nitrogens. Examples of 5- or 6-membered hetaryl include 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 2-oxazolyl, 4-oxazolyl, 5-oxazolyl, 2-thiazolyl, 4-thiazolyl, 5-thiazolyl, 1-imidazolyl, 2-imidazolyl, 4-imidazolyl, 1,3,4-triazol-1-yl, 1,3,4-triazol-2-yl, 1,3,4-oxadiazolyl-2-yl, 1,3,4-thiadiazol-2-yl, 2-pyridinyl, 3-pyridinyl, 4-pyridinyl, 3-pyridazinyl, 4-pyridazinyl, 2-pyrimidinyl, 4-pyrimidinyl, 5-pyrimidinyl, 2-pyrazinyl and 1,3,5-triazin-2-yl. Examples of 8-, 9- or 10-membered hetaryl include, for example, quinolinyl, isoquinolinyl, cinnolinyl, indolyl, indolizynyl, isoindolyl, indazolyl, benzofuryl, benzothienyl, benzo[b]thiazolyl, benzoxazolyl, benzthiazolyl, benzimidazolyl, imidazo[1,2-a]pyridine-2-yl, thieno[3,2-b]pyridine-5-yl, imidazo-[2,1-b]-thiazol-6-yl and 1,2,4-triazolo[1,5-a]pyridine-2-yl.

Examples of N-bound 5-, 6-, 7 or 8-membered saturated heterocycles include: pyrrolidin-1-yl, pyrazolidin-1-yl, imidazolidin-1-yl, oxazolidin-3-yl, isoxazolidin-2-yl, thiazolidin-3-yl, isothiazolidin-2-yl, piperidin-1-yl, piperazin-1-yl, morpholin-4-yl, thiomorpholin-4-yl, 1-oxothiomorpholin-4-yl, 1,1-dioxothiomorpholin-4-yl, azepan-1-yl and the like.

The term "hetaryl-$C_1$-$C_4$-alkyl" relates to $C_1$-$C_4$-alkyl, as defined above, wherein one hydrogen atom has been replaced by a hetaryl radical, in particular a pyridyl radical. Particular examples of hetaryl-$C_1$-$C_4$-alkyl include 2-pyridylmethyl, 3-pyridylmethyl, 4-pyridylmethyl, 1-(2-pyridyl)ethyl, 2-(2-pyridyl)ethyl, 1-(3-pyridyl)ethyl, 2-(3-pyridyl)ethyl, 1-(4-pyridyl)ethyl, 2-(4-pyridyl)ethyl etc.

The term "hetaryloxy-$C_1$-$C_4$-alkyl" relates to $C_1$-$C_4$-alkyl, as defined above, wherein one hydrogen atom has been replaced by an hetaryloxy radical, in particular a pyridyloxy radical. Particular examples of hetaryloxy-$C_1$-$C_4$-alkyl include 2-pyridyloxymethyl, 3-pyridyloxymethyl, 4-pyridyloxymethyl, 1-(2-pyridyloxy)ethyl, 2-(2-pyridyloxy)ethyl, 1-(3-pyridyloxy)ethyl, 2-(3-pyridyloxy)ethyl, 1-(4-pyridyloxy)ethyl, 2-(4-pyridyloxy)ethyl etc.

The term "hetaryl-$C_1$-$C_4$-carbonyl" relates to hetaryl as defined above, in particular a C-bound hetaryl radical, e.g. 2-, 3- or 4-pyridyl, 2- or 3-thienyl, 2- or 3-furyl, 1-, 2- or 3-pyrrolyl, 2- or 4-pyrimidinyl, pyridazinyl, 1-, 3- or 4-pyrazolyl, 1-, 2- or 4-imidazolyl radical, which is bound by a carbonyl to the remainder of the molecule.

The term "substituted" if not specified otherwise refers to substituted with 1, 2 or maximum possible number of substituents. If substituents as defined in compounds of formula I are more than one then they are independently from each other are same or different if not mentioned otherwise.

In one preferred embodiment, $A^1$ is N, $A^2$ is $CR^{A2}$, $A^3$ is $CR^{A3}$;

In another preferred embodiment, $A^1$ is $CR^{A1}$, $A^2$ is N, $A^3$ is $CR^{A3}$;

In another preferred embodiment, $A^1$ is $CR^{A1}$, $A^2$ is $CR^{A2}$, $A^3$ is N;

In another preferred embodiment, $A^1$ is N, $A^2$ is N, $A^3$ is $CR^{A3}$;

In another preferred embodiment, $A^1$ is N, $A^2$ is $CR^{A2}$, $A^3$ is N;

In another preferred embodiment, $A^1$ is $CR^{A1}$, $A^2$ is N, $A^3$ is N;

In one preferred embodiment, $B^1$ is $CR^{B1}$, $B^2$ is $CR^{B2}$, $B^3$ is $CR^{B3}$;

In another preferred embodiment, $B^1$ is N, $B^2$ is $CR^{B2}$, $B^3$ is $CR^{B3}$;

In another preferred embodiment, $B^1$ is $CR^{B1}$, $B^2$ is N, $B^3$ is $CR^{B3}$;

In another preferred embodiment, $B^1$ is N, $B^2$ is N, $B^3$ is $CR^{B3}$;

In another preferred embodiment, $B^1$ is N, $B^2$ is N, $B^3$ is N;

In another preferred embodiment, $A^1$ is N, $A^2$ is $CR^{A2}$, $A^3$ is $CR^{A3}$, $B^1$ is $CR^{B1}$, $B^2$ is $CR^{B2}$, $B^3$ is $CR^{B3}$;

In another preferred embodiment, $A^1$ is N, $A^2$ is $CR^{A2}$, $A^3$ is $CR^{A3}$, $B^1$ is N, $B^2$ is $CR^{B2}$, $B^3$ is $CR^{B3}$;

In another preferred embodiment, $A^1$ is N, $A^2$ is $CR^{A2}$, $A^3$ is $CR^{A3}$, $B^1$ is $CR^{B1}$, $B^2$ is N, $B^3$ is $CR^{B3}$;

In another preferred embodiment, $A^1$ is N, $A^2$ is $CR^{A2}$, $A^3$ is $CR^{A3}$, $B^1$ is N, $B^2$ is N, $B^3$ is $CR^{B3}$;

In another preferred embodiment, $A^1$ is N, $A^2$ is $CR^{A2}$, $A^3$ is $CR^{A3}$, $B^1$ is N, $B^2$ is N, $B^3$ is N;

In another preferred embodiment, $A^1$ is $CR^{A1}$, $A^2$ is N, $A^3$ is $CR^{A3}$, $B^1$ is $CR^{B1}$, $B^2$ is $CR^{B2}$, $B^3$ is $CR^{B3}$;

In another preferred embodiment, $A^1$ is $CR^{A1}$, $A^2$ is N, $A^3$ is $CR^{A3}$, $B^1$ is N, $B^2$ is $CR^{B2}$, $B^3$ is $CR^{B3}$;

In another preferred embodiment, $A^1$ is $CR^{A1}$, $A^2$ is N, $A^3$ is $CR^{A3}$, $B^1$ is $CR^{B1}$, $B^2$ is N, $B^3$ is $CR^{B3}$;

In another preferred embodiment, $A^1$ is $CR^{A1}$, $A^2$ is N, $A^3$ is $CR^{A3}$, $B^1$ is N, $B^2$ is N, $B^3$ is $CR^{B3}$;

In another preferred embodiment, $A^1$ is $CR^{A1}$, $A^2$ is N, $A^3$ is $CR^{A3}$, $B^1$ is N, $B^2$ is N, $B^3$ is N;

In another preferred embodiment, $A^1$ is $CR^{A1}$, $A^2$ is $CR^{A2}$, $A^3$ is N, $B^1$ is $CR^{B1}$, $B^2$ is $CR^{B2}$, $B^3$ is $CR^{B3}$;

In another preferred embodiment, $A^1$ is $CR^{A1}$, $A^2$ is $CR^{A2}$, $A^3$ is N, $B^1$ is N, $B^2$ is $CR^{B2}$, $B^3$ is $CR^{B3}$;

In another preferred embodiment, $A^1$ is $CR^{A1}$, $A^2$ is $CR^{A2}$, $A^3$ is N, $B^1$ is $CR^{B1}$, $B^2$ is N, $B^3$ is $CR^{B3}$;

In another preferred embodiment, $A^1$ is $CR^{A1}$, $A^2$ is $CR^{A2}$, $A^3$ is N, $B^1$ is N, $B^2$ is N, $B^3$ is $CR^{B3}$;

In another preferred embodiment, $A^1$ is $CR^{A1}$, $A^2$ is $CR^{A2}$, $A^3$ is N, $B^1$ is N, $B^2$ is N, $B^3$ is N;

In another preferred embodiment, $A^1$ is N, $A^2$ is N, $A^3$ is $CR^{A3}$, $B^1$ is $CR^{B1}$, $B^2$ is $CR^{B2}$, $B^3$ is $CR^{B3}$;

In another preferred embodiment, $A^1$ is N, $A^2$ is N, $A^3$ is $CR^{A3}$, $B^1$ is N, $B^2$ is $CR^{B2}$, $B^3$ is $CR^{B3}$;

In another preferred embodiment, $A^1$ is N, $A^2$ is N, $A^3$ is $CR^{A3}$, $B^1$ is $CR^{B1}$, $B^2$ is N, $B^3$ is $CR^{B3}$;

In another preferred embodiment, $A^1$ is N, $A^2$ is N, $A^3$ is $CR^{A3}$, $B^1$ is N, $B^2$ is N, $B^3$ is $CR^{B3}$;

In another preferred embodiment, $A^1$ is N, $A^2$ is N, $A^3$ is $CR^{A3}$, $B^1$ is N, $B^2$ is N, $B^3$ is N;

In another preferred embodiment, $A^1$ is N, $A^2$ is $CR^{A2}$, $A^3$ is N, $B^1$ is $CR^{B1}$, $B^2$ is $CR^{B2}$, $B^3$ is $CR^{B3}$;

In another preferred embodiment, $A^1$ is N, $A^2$ is $CR^{A2}$, $A^3$ is N, $B^1$ is N, $B^2$ is $CR^{B2}$, $B^3$ is $CR^{B3}$;

In another preferred embodiment, $A^1$ is N, $A^2$ is $CR^{A2}$, $A^3$ is N, $B^1$ is $CR^{B1}$, $B^2$ is N, $B^3$ is $CR^{B3}$;

In another preferred embodiment, $A^1$ is N, $A^2$ is $CR^{A2}$, $A^3$ is N, $B^1$ is N, $B^2$ is N, $B^3$ is $CR^{B3}$;

In another preferred embodiment, $A^1$ is N, $A^2$ is $CR^{A2}$, $A^3$ is N, $B^1$ is N, $B^2$ is N, $B^3$ is N;

In one preferred embodiment, $R^{A1}$, $R^{A2}$, $R^{A3}$ independently of each other are selected from H, halogen, OH, CN, $C_1$-$C_6$-alkyl, $C_1$-$C_6$-alkoxy, tri-$C_1$-$C_6$-alkylsilyl, $C_1$-$C_6$-alkoxy-$C_1$-$C_4$-alkyl, $C_3$-$C_6$-cycloalkyl, wherein the alkyl, alkoxy, cycloalkyl moieties are unsubstituted or substituted with halogen, $C(=O)-OR^a$, $NR^bR^c$, $C(=O)-NR^bR^c$, $C(=O)-R^d$, $SO_2NR^bR^c$, and $S(=O)_mR^e$;

In another preferred embodiment, $R^{A1}$, $R^{A2}$, $R^{A3}$ independently of each other are selected from H, halogen, $C_1$-$C_6$-alkyl, and $C_3$-$C_6$-cycloalkyl, wherein the alkyl or cycloalkyl moieties are unsubstituted or substituted with halogen.

In another preferred embodiment, $R^{A1}$, $R^{A2}$, $R^{A3}$ independently of each other are selected from H, Cl, Br, F, $CH_3$, $C_2H_5$, n-$C_3H_7$, isopropyl, cyclopropyl, $CH_2F$, $CHF_2$, and $CF_3$.

In another preferred embodiment, $R^{A1}$, $R^{A2}$, $R^{A3}$ are H.

In one preferred embodiment, $R^{B1}$, $R^{B2}$, $R^{B3}$ independently of each other are H, halogen, or $C_1$-$C_6$-alkyl;

In another preferred embodiment, $R^{B1}$, $R^{B2}$, $R^{B3}$ independently of each other are H, Cl, Br, F, $CH_3$, $C_2H_5$, n-$C_3H_7$, or isopropyl.

In another preferred embodiment, $R^{B1}$, $R^{B2}$, $R^{B3}$ independently of each other are H, or $CH_3$.

In another preferred embodiment, $R^{B1}$, $R^{B2}$, $R^{B3}$ are H.

In one preferred embodiment, Q is —C($R^4R^5$)—O—, wherein C is bound to Ar.

In another preferred embodiment, Q is —C($R^4R^5$)—O—, wherein O is bound to Ar.

In another preferred embodiment, Q is —C(=O)—O—, wherein C is bound to Ar.

In another preferred embodiment, Q is —C(=O)—O—, wherein O is bound to Ar.

In another preferred embodiment, Q is —S(=O)$_m$—C(R$^7$R$^8$)—, wherein S is bound to Ar.

In another preferred embodiment, Q is —S(=O)$_m$—C(R$^7$R$^8$)—, wherein C is bound to Ar.

In another preferred embodiment, Q is —N(R$^2$)—S(=O)$_m$—, wherein N is bound to Ar.

In another preferred embodiment, Q is —N(R$^2$)—S(=O)$_m$—, wherein S is bound to Ar.

In another preferred embodiment, Q is —N(R$^2$)—C(R$^9$R$^{10}$)—, wherein N is bound to Ar.

In another preferred embodiment, Q is —N(R$^2$)—C(R$^9$R$^{10}$)—, wherein C is bound to Ar.

In another preferred embodiment, Q is —C(=O)—C(R$^{19}$R$^{20}$)—, wherein C(=O) is bound to Ar.

In another preferred embodiment, Q is —C(=O)—C(R$^{19}$R$^{20}$)—, wherein C(R$^{19}$R$^{20}$) is bound to Ar.

In another preferred embodiment, Q is —N(R$^2$)—C(=O)—, wherein N is bound to Ar.

In another preferred embodiment, Q is —N(R$^2$)—C(=O)—, wherein C is bound to Ar.

In another preferred embodiment, Q is —N(R$^2$)—C(=S)—, wherein N is bound to Ar.

In another preferred embodiment, Q is —N(R$^2$)—C(=S)—, wherein C is bound to Ar.

In another preferred embodiment, Q is —N=C(X)—, wherein N is bound to Ar.

In another preferred embodiment, Q is —N=C(X)—, wherein C is bound to Ar.

In another preferred embodiment, Q is —N(R$^2$)—C(=NR)—, wherein N is bound to Ar.

In another preferred embodiment, Q is —N(R$^2$)—C(=NR)—, wherein C is bound to Ar.

In another preferred embodiment, Q is —C(R$^{13}$R$^{14}$)—C(R$^{15}$R$^{16}$)—.

In another preferred embodiment, Q is —C(R$^{17}$)=C(R$^{18}$)—.

In another preferred embodiment, Q is —C(R$^4$R$^5$)—O—, —N(R$^2$)—S(=O)$_m$—, —N(R$^2$)—C(R$^9$R$^{10}$)—, —N(R$^2$)—C(=O)—, —N(R$^2$)—C(=S)—, —N=C(X)—, or —N(R$^2$)—C(=NR)—, wherein Ar is bound to either side of Q;

In another preferred embodiment, Q is —C(R$^4$R$^5$)—O—, —N(R$^2$)—C(R$^9$R$^{10}$)—, —N(R$^2$)—C(=O)—, —N(R$^2$)—C(=NR)—, wherein Ar is bound to either side of Q;

In another preferred embodiment, Q is —C(R$^4$R$^5$)—O—, —N(R$^2$)—C(R$^9$R$^{10}$)—, or —N(R$^2$)—C(=O)—, wherein Ar is bound to either side of Q;

In another preferred embodiment, Q is -N(R$^2$)—C(R$^9$R$^{10}$)—, wherein C is bound to Ar, or —N(R$^2$)—C(=O)—, wherein N is bound to Ar, or —C(R$^4$R$^5$)—O—, wherein C is bound to Ar;

In one preferred embodiment, X is H or N(R$^3$)$_2$;

In another preferred embodiment, X is H;

In another preferred embodiment, X is N(R$^3$)$_2$;

In one preferred embodiment, R$^3$ is C$_1$-C$_6$-alkyl, C$_1$-C$_6$-alkoxy, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_3$-C$_6$-cycloalkyl-C$_1$-C$_4$-alkyl, or C$_3$-C$_6$-cycloalkoxy-C$_1$-C$_4$-alkyl, wherein the alkyl, alkoxy, alkenyl, alkynyl, cycloalkyl and cycloalkoxy moieties are unsubstituted or substituted with halogen, C$_1$-C$_6$-alkylene-CN, phenyl, or —CH$_2$-phenyl, wherein the phenyl rings are unsubstituted or substituted with R$^f$;

In another preferred embodiment, R$^3$ is H, C$_1$-C$_6$-alkyl, or C$_1$-C$_6$-alkoxy-C$_1$-C$_4$-alkyl;

In another preferred embodiment, R$^3$ is H, or C$_1$-C$_6$-alkyl;

In another preferred embodiment, R$^3$ is C$_1$-C$_6$-alkyl;

In another preferred embodiment, R$^3$ is H;

In one preferred embodiment, R is H, CN, C$_1$-C$_6$-alkyl, C$_1$-C$_6$-haloalkyl, C$_2$-C$_6$-alkenyl, C$_2$-C$_6$-haloalkenyl, C$_2$-C$_6$-alkynyl, C$_2$-C$_6$-haloalkynyl, C$_3$-C$_6$-cycloalkyl, C$_3$-C$_6$-halocycloalkyl, OR$^8$, or N(R$^3$)$_2$;

In another preferred embodiment, R is H, CN, C$_1$-C$_6$-alkyl, or OR$^8$;

In another preferred embodiment, R is H, or C$_1$-C$_6$-alkyl;

In another preferred embodiment, R is H, CH$_3$, C$_2$H$_5$, n-C$_3$H$_7$, or isopropyl;

In one preferred embodiment, R$^6$ is H, C$_1$-C$_6$-alkyl, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_3$-C$_6$-cycloalkyl-C$_1$-C$_4$-alkyl, C$_3$-C$_6$-cycloalkoxy-C$_1$-C$_4$-alkyl, wherein the alkyl, alkoxy, alkenyl, alkynyl, cycloalkyl and cycloalkoxy moieties are unsubstituted or substituted with halogen, C(=O)—OR$^a$, C$_1$-C$_6$-alkylene-NR$^b$R$^c$, C$_1$-C$_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

In another preferred embodiment, R$^6$ is H, C$_1$-C$_6$-alkyl, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_3$-C$_6$-cycloalkyl-C$_1$-C$_4$-alkyl, C$_3$-C$_6$-cycloalkoxy-C$_1$-C$_4$-alkyl, wherein the alkyl, alkoxy, alkenyl, alkynyl, cycloalkyl and cycloalkoxy moieties are unsubstituted or substituted with halogen, In another preferred embodiment, R$^6$ is C(=O)—OR$^a$, C$_1$-C$_6$-alkylene-NR$^b$R$^c$, C$_1$-C$_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

In another preferred embodiment, R$^6$ is H, C$_1$-C$_6$-alkyl, C$_1$-C$_6$-haloalkyl, —CH$_2$—C(=O)—OR$^a$, or —CH$_2$-phenyl;

In another preferred embodiment, R$^6$ is H, C$_1$-C$_6$-alkyl, C$_1$-C$_6$-haloalkyl, or —CH$_2$-phenyl;

In another preferred embodiment, R$^6$ is H, C$_1$-C$_6$-alkyl, C$_1$-C$_6$-haloalkyl, or —CH$_2$—C(=O)—OR$^a$;

In another preferred embodiment, R$^6$ is H, C$_1$-C$_6$-alkyl, or C$_1$-C$_6$-haloalkyl;

In another preferred embodiment, R$^6$ is H;

In another preferred embodiment, R$^6$ is C$_1$-C$_6$-alkyl;

In another preferred embodiment, R$^6$ is C$_1$-C$_6$-haloalkyl;

In another preferred embodiment, R$^6$ is H, CH$_3$, C$_2$H$_5$, CH$_2$CF$_3$, or CHF$_2$;

In another preferred embodiment, R$^6$ is H, CH$_3$, C$_2$H$_5$, or CH$_2$CF$_3$;

In one preferred embodiment, R$^4$, R$^5$, R$^7$, R$^8$, R$^9$, R$^{10}$, R$^{13}$, R$^{14}$, R$^{15}$, R$^{16}$, R$^{17}$, R$^{18}$, R$^{19}$, R$^{20}$ are, identical or different, H, halogen, C$_1$-C$_6$-alkyl, C$_1$-C$_6$-haloalkylalkyl, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_3$-C$_6$-halocycloalkyl, C$_3$-C$_6$-cycloalkyl-C$_1$-C$_4$-alkyl, C$_3$-C$_6$-cycloalkoxy-C$_1$-C$_4$-alkyl, C(=O)—OR$^a$, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

In another preferred embodiment, R$^4$, R$^5$, R$^7$, R$^8$, R$^9$, R$^{10}$, R$^{13}$, R$^{14}$, R$^{15}$, R$^{16}$, R$^{17}$, R$^{18}$, R$^{19}$, R$^{20}$ are, identical or different, H, halogen, C$_1$-C$_6$-alkyl, C$_1$-C$_6$-haloalkylalkyl, C$_3$-C$_6$-cycloalkyl, C$_3$-C$_6$-halocycloalkyl, C(=O)—OR$^a$, C(=O)—NR$^b$R$^c$, C(=O)—R$^d$, phenyl, or —CH$_2$-phenyl, wherein the phenyl rings are unsubstituted or substituted with R$^f$;

In another preferred embodiment, R$^4$, R$^5$, R$^7$, R$^8$, R$^9$, R$^{10}$, R$^{13}$, R$^{14}$, R$^{15}$, R$^{16}$, R$^{17}$, R$^{18}$, R$^{19}$, R$^{20}$ are, identical or different, H, halogen, C$_1$-C$_6$-alkyl, or C$_1$-C$_6$-haloalkylalkyl;

In another preferred embodiment, $R^4, R^5, R^7, R^8, R^9, R^{10}$, $R^{13}, R^{14}, R^{15}, R^{16}, R^{17}, R^{18}, R^{19}, R^{20}$ are, identical or different, H, halogen, or $C_1$-$C_6$-alkyl;

In another preferred embodiment, $R^4, R^5, R^7, R^8, R^9, R^{10}$, $R^{13}, R^{14}, R^{15}, R^{16}, R^{17}, R^{18}, R^{19}, R^{20}$ are, identical or different, H or $C_1$-$C_6$-alkyl;

In one preferred embodiment, Ar is phenyl which is unsubstituted or substituted with $R^{Ar}$.

In another preferred embodiment, Ar is 5- or 6-membered hetaryl, which is unsubstituted or substituted with $R^{Ar}$.

In more preferred embodiment, Ar is phenyl, pyrimidinyl, pyridazinyl, or pyridyl, which are unsubstituted or substituted with $R^{Ar}$.

In one preferred embodiment, $R^{Ar}$ is halogen, OH, CN, $NO_2$, SCN, $C_1$-$C_6$-alkyl, $C_1$-$C_6$-haloalkyl, $C_1$-$C_6$-alkoxy, $C_1$-$C_6$-haloalkoxy, or S—$R^e$.

In more preferred embodiment, $R^{Ar}$ is F, Cl, Br, OH, CN, $NO_2$, SCN, $CH_3$, $C_2H_5$, n-$C_3H_7$, isopropyl, $CH_2F$, $CHF_2$, $CF_3$, $CH_2CF_3$, $CF_2CHF_2$, $C_2F_5$, $CH_2CH_2CF_3$, $CH_2CF_2CHF_2$, $CH_2CF_2CF_3$, $OCH_3$, $OC_2H_5$, n-propyloxy, isopropyloxy, $OCH_2F$, $OCHF_2$, $OCF_3$, $OCH_2CF_3$, $OCF_2CHF_2$, $OC_2F_5$, $OCH_2CH_2CF_3$, $OCH_2CF_2CHF_2$, $OCH_2CF_2CF_3$, or S—$R^e$, where $R^e$ is $C_1$-$C_6$-alkyl, in particular $C_1$-$C_3$-alkyl such as $CH_3$, $C_2H_5$, n-$C_3H_7$ or isopropyl, or $C_1$-$C_6$-haloalkyl, in particular fluorinated $C_1$-$C_3$-alkyl such as $CH_2F$, $CHF_2$, $CF_3$, $CH_2CF_3$, $CF_2CHF_2$, $C_2F_5$, $CH_2CH_2CF_3$, $CH_2CF_2CHF_2$ or $CH_2CF_2CF_3$.

Particularly preferred Ar are listed in Table A below.

TABLE A

| | |
|---|---|
| Ar-1 | 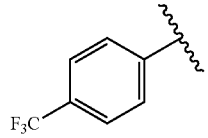 [SMILES: *c1ccc(C(F)(F)F)cc1] |
| Ar-2 | 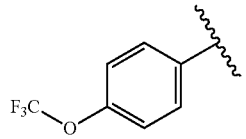 [SMILES: *c1ccc(OC(F)(F)F)cc1] |
| Ar-3 | 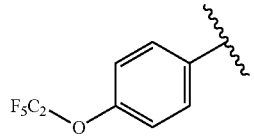 |
| Ar-4 | 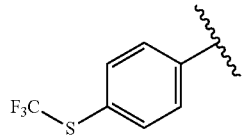 [SMILES: *c1ccc(SC(F)(F)F)cc1] |
| Ar-5 | 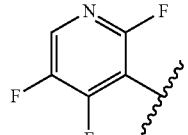 |
| Ar-6 | 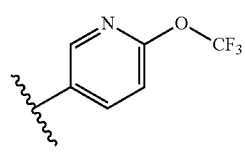 [SMILES: *c1ccc(OC(F)(F)F)nc1] |

TABLE A-continued

| | |
|---|---|
| Ar-7 | 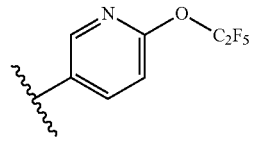 |
| Ar-8 | 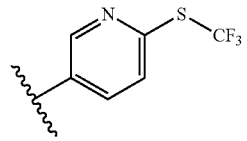 [SMILES: *c1ccc(SC(F)(F)F)nc1] |
| Ar-9 | 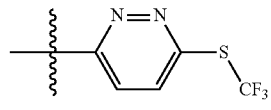 |
| Ar-10 | 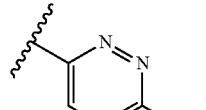 |
| Ar-11 | 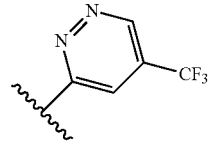 [SMILES: *c1cc(C(F)(F)F)cnn1] |
| Ar-12 | 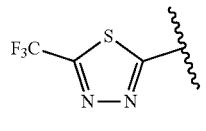 |
| Ar-13 | 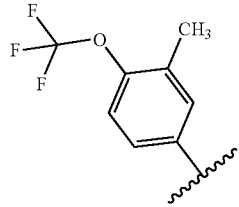 [SMILES: *c1ccc(OC(F)(F)F)c(C)c1] |
| Ar-14 | 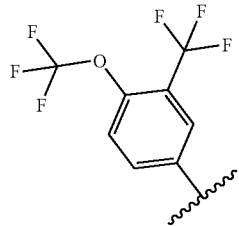 [SMILES: *c1ccc(OC(F)(F)F)c(C(F)(F)F)c1] |
| Ar-15 | 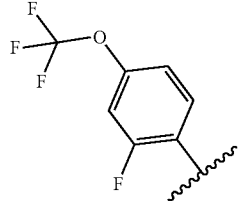 [SMILES: *c1ccc(OC(F)(F)F)cc1F] |

TABLE A-continued

Ar-16: [structure: benzene with CF3 and F substituents]

Ar-17: [structure: benzene with CF3 and F substituents]

Ar-18: [structure: benzene with OCF3 and F substituents]

Ar-19: [structure: benzene with OCH2CF3 substituent]

Ar-20: [structure: benzene with OCHF2 substituent]

Particularly preferred Ar is selected from Ar-1 to Ar-20;
also particularly preferred Ar is selected from Ar-1 to Ar-13;
also particularly preferred Ar is selected from Ar-1 to Ar-13 and Ar-17 to Ar-18;
also particularly preferred Ar is selected from Ar-1, Ar-2, Ar-3, Ar-4, Ar-10, Ar-17, and Ar-18.
also particularly preferred Ar is Ar-2;
also particularly preferred Ar is selected from Ar-17 and Ar-18;
also particularly preferred Ar is Ar-17;
also particularly preferred Ar is Ar-18;
In one preferred embodiment, $R^1$ is Y—Z-T-$R^{11}$.
In another preferred embodiment, $R^1$ is Y—Z-T-$R^{12}$.
In one preferred embodiment, Y is —C$R^{ya}$=N—, wherein the N is bound to Z.
In another preferred embodiment, Y is —N$R^{yc}$—C(=S)—, wherein C(=S) is bound to Z.
In another preferred embodiment, Y is —N$R^{yc}$—C(=O)—, wherein C(=O) is bound to Z.

In one preferred embodiment, Z is a single bond;
—N$R^{zc}$—C(=O)—, wherein C(=O) is bound to T;
—N$R^{zc}$—C(=S)—, wherein C(=S) is bound to T;
—N=C(S—$R^{za}$)—, wherein T is bound to the carbon atom; or
—N$R^{zc}$—C(S—$R^{za}$)=, wherein T is bound to the carbon atom;

In another preferred embodiment, Z is —N$R^{zc}$—C(=S)—, wherein C(=S) is bound to T.
In another preferred embodiment, Z is —N$R^{zc}$—C(=O)—, wherein C(=O) is bound to T.
In another preferred embodiment, Z is-N=C(S—$R^{za}$)—, wherein T is bound to the carbon atom.
In another preferred embodiment, Z is-N$R^{zc}$—C(S—$R^{za}$)=, wherein T is bound to the carbon atom.
In another preferred embodiment, Z is —O—C(=O)—, wherein T is bound to the carbon atom;
In another preferred embodiment, Z is a single bond.
In one preferred embodiment, T is O.
In another preferred embodiment, T is N—$R^T$.
In another preferred embodiment, T is N.
In one preferred embodiment, $R^{ya}$ is H, halogen, $C_1$-$C_6$-alkyl, $C_1$-$C_6$-alkoxy, which are unsubstituted or substituted with halogen,
phenyl, or —CH$_2$-phenyl, wherein the phenyl rings are unsubstituted or substituted with $R^f$.
In more preferred embodiment, $R^{ya}$ is H, halogen, $C_1$-$C_6$-alkyl, $C_1$-$C_6$-alkoxy, which are unsubstituted or substituted with halogen,
or phenyl which is unsubstituted or substituted with $R^f$.
In most preferred embodiment, $R^{ya}$ is H, F, Cl, Br, CH$_3$, C$_2$H$_5$, n-C$_3$H$_7$, isopropyl, CH$_2$F, CHF$_2$, CF$_3$, CH$_2$CF$_3$, CF$_2$CHF$_2$, C$_2$F$_5$, CH$_2$CH$_2$CF$_3$, CH$_2$CF$_2$CHF$_2$, CH$_2$CF$_2$CF$_3$, OCH$_3$, OC$_2$H$_5$, n-propyloxy, isopropyloxy, OCH$_2$F, OCHF$_2$, OCF$_3$, OCH$_2$CF$_3$, OCF$_2$CHF$_2$, OC$_2$F$_5$, OCH$_2$CH$_2$CF$_3$, OCH$_2$CF$_2$CHF$_2$, OCH$_2$CF$_2$CF$_3$, or phenyl which is unsubstituted or substituted with $R^f$.
In further most preferred embodiment, $R^{ya}$ is H or CH$_3$;
In one embodiment, $R^{yc}$, $R^{zc}$ independently are H, $C_1$-$C_6$-alkyl, $C_3$-$C_6$-cycloalkyl, which are unsubstituted or substituted with halogen,
phenyl, or —CH$_2$-phenyl, wherein the rings are unsubstituted or substituted with $R^f$.
In more preferred embodiment, $R^{yc}$ and $R^{zc}$ are H, $C_1$-$C_6$-alkyl, $C_1$-$C_6$-haloalkyl, or phenyl which is unsubstituted or substituted with $R^f$.
In most preferred embodiment, $R^{yc}$ and $R^{zc}$ are H, CH$_3$, C$_2$H$_5$, n-C$_3$H$_7$, isopropyl, CH$_2$F, CHF$_2$, CF$_3$, CH$_2$CF$_3$, CF$_2$CHF$_2$, C$_2$F$_5$, CH$_2$CH$_2$CF$_3$, CH$_2$CF$_2$CHF$_2$, CH$_2$CF$_2$CF$_3$, or phenyl which is unsubstituted or substituted with $R^f$.
In further most preferred embodiment, $R^{yc}$ and $R^{zc}$ are H or CH$_3$;
In one preferred embodiment, $R^T$ is H, $C_1$-$C_6$-alkyl, $C_2$-$C_6$-alkenyl, $C_2$-$C_6$-alkynyl, $C_1$-$C_4$-alkyl-$C_1$-$C_6$-alkoxy, which are unsubstituted or substituted with halogen,
C(=O)—N$R^b R^c$, C(=O)—$R^d$, SO$_2$N$R^b R^c$, S(=O)$_m R^e$, phenyl, or —CH$_2$-phenyl, wherein the phenyl rings are unsubstituted or substituted with $R^f$.
In more preferred embodiment, $R^T$ is H, $C_1$-$C_6$-alkyl, $C_2$-$C_6$-alkenyl, $C_2$-$C_6$-alkynyl, $C_1$-$C_4$-alkyl-$C_1$-$C_6$-alkoxy, which are unsubstituted or substituted with halogen.
In most preferred embodiment, $R^T$ is H or $C_1$-$C_6$-alkyl.
In another preferred embodiment, $R^{zc}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a CH$_2$ moiety may be replaced by a carbonyl or a C=N—R' and/or wherein 1 or 2 CH$_2$ moieties may be replaced by O or S and/or wherein the linear $C_1$-$C_6$-alkylene and the linear $C_2$-$C_6$-alkenylene may be unsubstituted or substituted with $R^h$.

In more preferred embodiment, $R^{zc}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety is replaced by a carbonyl group.

In another more preferred embodiment, $R^{zc}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety is replaced by a C=N—R' and wherein 1 or 2 $CH_2$ moieties may be replaced by O or S and/or wherein the linear $C_1$-$C_6$-alkylene and the linear $C_2$-$C_6$-alkenylene may be unsubstituted or substituted with $R^h$.

In another more preferred embodiment, $R^{zc}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene 1 or 2 $CH_2$ moieties are replaced by O or S and/or wherein the linear $C_1$-$C_6$-alkylene and the linear $C_2$-$C_6$-alkenylene may be unsubstituted or substituted with $R^h$.

In one preferred embodiment, $R^{za}$ is H, $C_1$-$C_6$-alkyl, $C_1$-$C_6$-haloalkyl, $C_1$-$C_6$-alkylene-$NR^bR^c$, $C_1$-$C_6$—C(=O)—$R^d$, phenyl, phenylcarbonyl, or —$CH_2$-phenyl, wherein the phenyl rings are unsubstituted or substituted with $R^f$;

In more preferred embodiment, $R^{za}$ is H, $C_1$-$C_6$-alkyl, or $C_1$-$C_6$-haloalkyl;

In most preferred embodiment, $R^{za}$ is H, $C_1$-$C_6$-alkyl.

In another preferred embodiment, $R^{za}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety may be replaced by a carbonyl or a C=N—R' and/or wherein 1 or 2 $CH_2$ moieties may be replaced by O or S and/or wherein the linear $C_1$-$C_6$-alkylene and the linear $C_2$-$C_6$-alkenylene may be unsubstituted or substituted with $R^h$;

In more preferred embodiment, $R^{za}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety is replaced by a carbonyl group.

In another more preferred embodiment, $R^{za}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety is replaced by a C=N—R' and wherein 1 or 2 $CH_2$ moieties may be replaced by O or S and/or wherein the linear $C_1$-$C_6$-alkylene and the linear $C_2$-$C_6$-alkenylene may be unsubstituted or substituted with $R^h$.

In another more preferred embodiment, $R^{za}$ together with $R^T$ if present, forms $C_1$-$C_6$-alkylene or a linear $C_2$-$C_6$-alkenylene group, where in the linear $C_1$-$C_6$-alkylene and the linear $C_2$-$C_6$-alkenylene 1 or 2 $CH_2$ moieties are replaced by O or S and/or wherein the linear $C_1$-$C_6$-alkylene and the linear $C_2$-$C_6$-alkenylene may be unsubstituted or substituted with $R^h$.

In a preferred embodiment, $R^a$, $R^b$ and $R^c$ are H, $C_1$-$C_6$-alkyl, $C_2$-$C_6$-alkenyl, $C_2$-$C_6$-alkynyl, which are unsubstituted or substituted with halogen,
$C_1$-$C_6$-alkylene-CN, phenyl, or —$CH_2$-phenyl, wherein the phenyl rings are unsubstituted or substituted with $R^f$;

In more preferred embodiment, $R^a$, $R^b$ and $R^c$ are H, $C_1$-$C_6$-alkyl, $C_2$-$C_6$-alkenyl, $C_2$-$C_6$-alkynyl, which are unsubstituted or substituted with halogen,
phenyl, or —$CH_2$-phenyl, wherein the phenyl rings are unsubstituted or substituted with $R^f$.

In a preferred embodiment, $R^d$ is H, $C_1$-$C_6$-alkyl, $C_2$-$C_6$-alkenyl, $C_2$-$C_6$-alkynyl, which are unsubstituted or substituted with halogen,
phenyl, or —$CH_2$-phenyl, wherein the phenyl rings are unsubstituted or substituted with $R^f$.

In more preferred embodiment, $R^d$ is H, $C_1$-$C_6$-alkyl, $C_1$-$C_6$-haloalkyl, or phenyl which is unsubstituted or substituted with $R^f$.

In one preferred embodiment, $R^e$ is $C_1$-$C_6$-alkyl, $C_1$-$C_6$-haloalkyl, $C_3$-$C_6$-cycloalkyl, $C_3$-$C_6$-halocycloalkyl, phenyl, or —$CH_2$-phenyl, wherein the phenyl rings are unsubstituted or substituted with $R^f$.

In more preferred embodiment, $R^e$ is H, $C_1$-$C_6$-alkyl, $C_1$-$C_6$-haloalkyl, or phenyl unsubstituted or substituted with $R^f$.

In one preferred embodiment, $R^f$ is halogen, N3, OH, CN, $NO_2$, —SCN, —$SF_5$, $C_1$-$C_6$-alkyl, $C_1$-$C_6$-alkoxy, $C_2$-$C_6$-alkenyl, $C_2$-$C_6$-alkynyl, $C_3$-$C_6$-cycloalkyl, $C_3$-$C_6$-cycloalkoxy, which are unsubstituted or substituted with halogen,
C(=O)—$OR^a$, $NR^bR^c$, $C_1$-$C_6$-alkylene-$NR^bR^c$, $C_1$-$C_6$-alkylene-CN, C(=O)—$NR^bR^c$, C(=O)—$R^d$, $SO_2NR^bR^c$, or S(=O)$_m R^e$.

In more preferred embodiment, $R^f$ is halogen, N3, OH, CN, $C_1$-$C_6$-alkyl, $C_1$-$C_6$-alkoxy, $C_2$-$C_6$-alkenyl, $C_2$-$C_6$-alkynyl, $C_3$-$C_6$-cycloalkyl, $C_3$-$C_6$-cycloalkoxy, which are unsubstituted or substituted with halogen,
C(=O)—$OR^a$, $NR^bR^c$, $C_1$-$C_6$-alkylene-$NR^bR^c$, $C_1$-$C_6$-alkylene-CN, C(=O)—$NR^bR^c$, C(=O)—$R^d$, $SO_2NR^bR^c$, or S(=O)$_m R^e$.

In a preferred embodiment, $R^9$ is halogen, N3, OH, CN, $NO_2$, —SCN, —$SF_5$, $C_1$-$C_6$-alkyl, $C_1$-$C_6$-alkoxy, $C_2$-$C_6$-alkenyl, $C_2$-$C_6$-alkynyl, $C_3$-$C_6$-cycloalkyl, $C_3$-$C_6$-cycloalkoxy, which are unsubstituted or substituted with halogen,
C(=O)—$OR^a$, $NR^bR^c$, $C_1$-$C_6$-alkylene-$NR^bR^c$, NH—$C_1$-$C_6$-alkylene-$NR^bR^c$, C(=O)—$NR^bR^c$, C(=O)—$R^d$, $SO_2NR^bR^c$, or S(=O)$_m R^e$.

In more preferred embodiment, $R^9$ is halogen, $N_3$, OH, CN, $NO_2$, $C_1$-$C_6$-alkyl, $C_1$-$C_6$-alkoxy, $C_2$-$C_6$-alkenyl, $C_3$-$C_6$-cycloalkyl, $C_3$-$C_6$-cycloalkoxy, which are unsubstituted or substituted with halogen,
C(=O)—$OR^a$, $NR^bR^c$, $C_1$-$C_6$-alkylene-$NR^bR^c$, C(=O)—$NR^bR^c$, C(=O)—$R^d$, $SO_2NR^bR^c$, or S(=O)$_m R^e$.

In one embodiment, m is 0.

In another embodiment, m is 1.

In another embodiment, m is 2.

In another embodiment, m is 0 or 1.

In another embodiment, m is 1 or 2.

In more preferred embodiment, $R^1$ are formulas Y-1 to Y-9 wherein

denotes attachment to the 10 membered hetaryl, D is $R^{11}$ or $R^{12}$ and wherein $R^T$, $R^{11}$, $R^{12}$, $R^{ya}$, $R^{yc}$, $R^{za}$ and $R^{zc}$ are as defined in compounds of formula I.

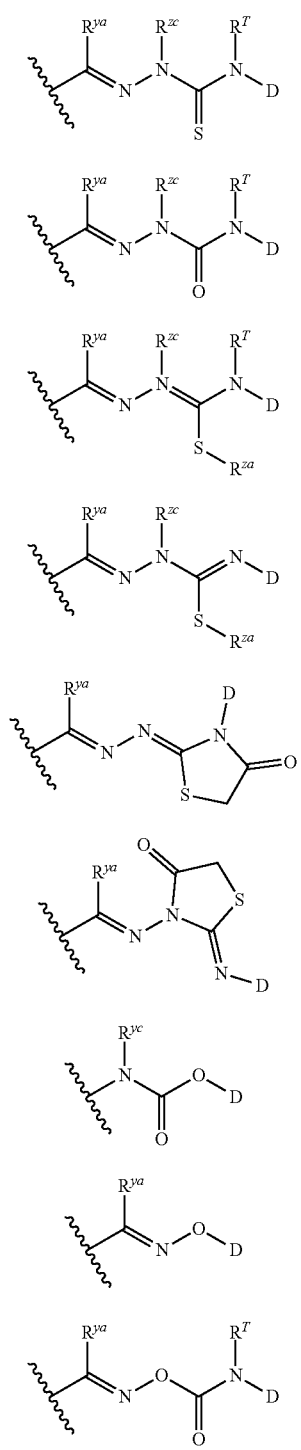

In more preferred embodiment, $R^1$ are formulas Y-1 to Y-8 wherein denotes attachment to the 10 membered hetaryl, D is $R^{11}$ or $R^{12}$ and wherein $R^T$, $R^{11}$, $R^{12}$, $R^{ya}$, $R^{yc}$, $R^{za}$ and $R^{zc}$ are as defined in compounds of formula I.

In another more preferred embodiment, $R^1$ are formulas YZT-1 to YZT-9, wherein denotes attachment to the 10 membered hetaryl and $R^{11}$, $R^{12}$, $R^T$, $R^{ya}$, $R^{za}$ and $R^{zc}$ are as defined in compounds of formula I.

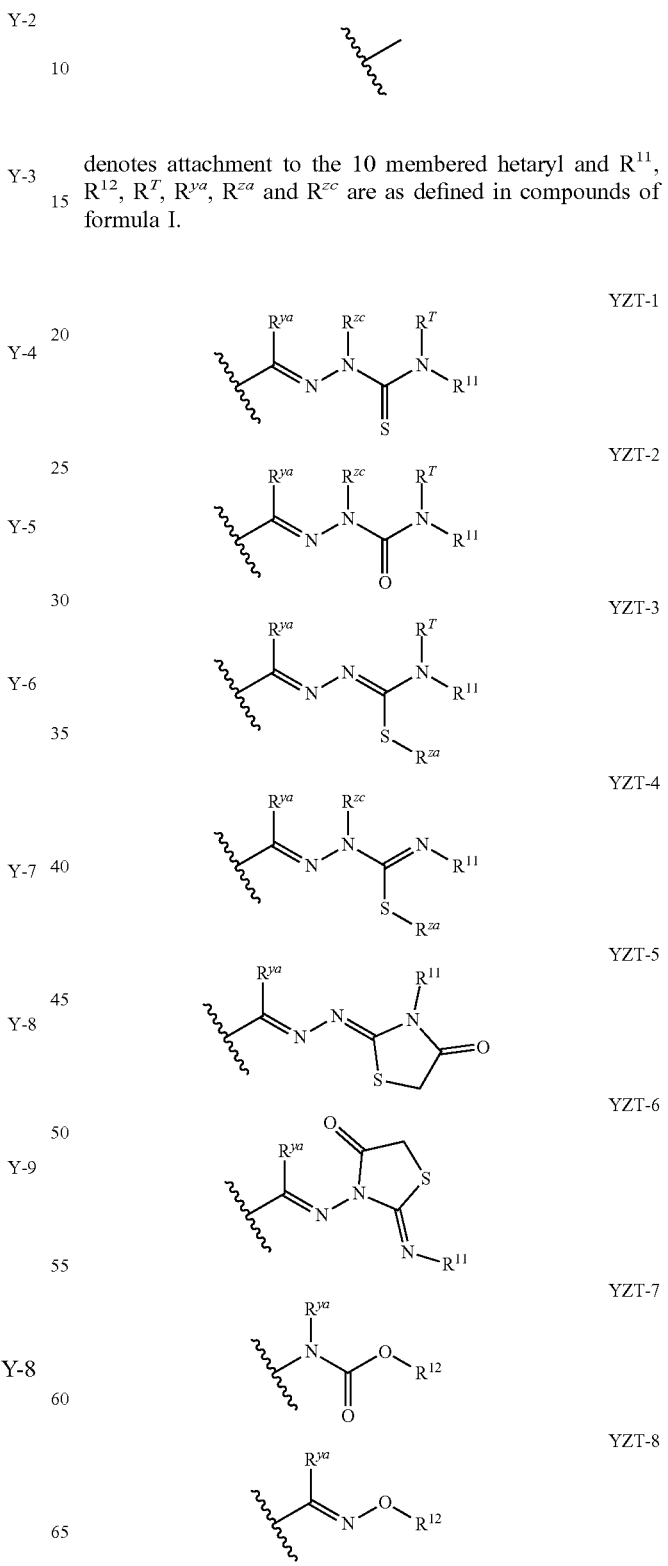

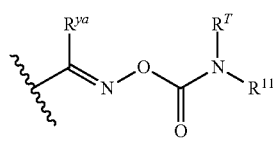 YZT-9

In another more preferred embodiment, $R^1$ are formulas YZT-1 to YZT-8, wherein

denotes attachment to the 10 membered hetaryl and $R^{11}$, $R^{12}$, $R^T$, $R^{ya}$, $R^{za}$ and $R^{zc}$ are as defined in compounds of formula I.

In another more preferred embodiment, $R^1$ are formulas YZT-1, YZT-5, YZT-6, or YZT-8, wherein

denotes attachment to the 10 membered hetaryl and $R^{11}$, $R^{12}$, $R^T$, $R^{ya}$, $R^{za}$ and $R^{zc}$ are as defined in compounds of formula I.

In most preferred embodiment, $R^1$ are formulas Y-1A to Y-9A, wherein

denotes attachment to the 10 membered hetaryl, D is $R^{11}$ or $R^{12}$.

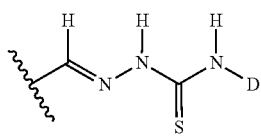 Y-1A

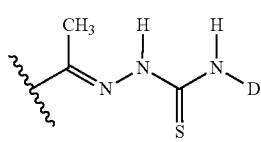 Y-1B

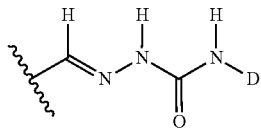 Y-2A

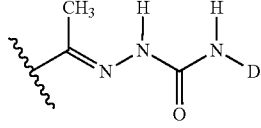 Y-2B

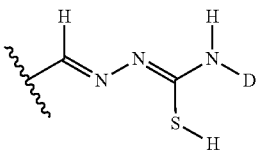 Y-3A

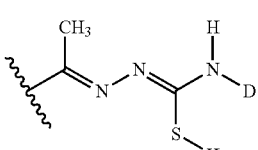 Y-3B

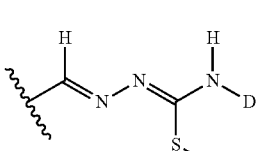 Y-3C

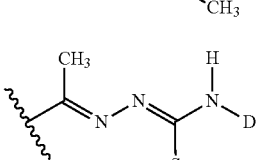 Y-3D

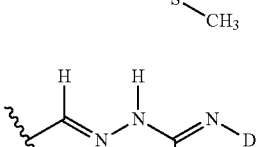 Y-4A

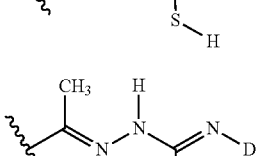 Y-4B

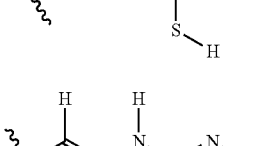 Y-4C

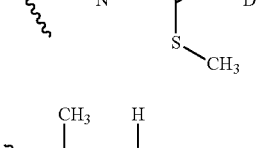 Y-4D

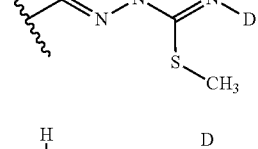 Y-5A

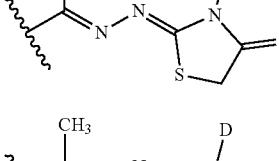 Y-5B

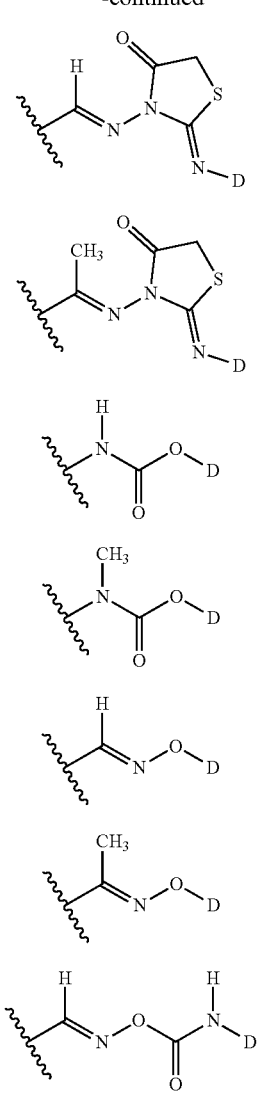

| | |
|---|---|
| | Y-6A |
| | Y-6B |
| | Y-7A |
| | Y-7B |
| | Y-8A |
| | Y-8B |
| | Y-9A |

In most preferred embodiment, $R^1$ are formulas Y-1A to Y-8B, wherein

denotes attachment to the 10 membered hetaryl, D is $R^{11}$ or $R^{12}$.

In most preferred embodiment, $R^1$ are formulas Y-1A, Y-5A, Y-6A, or Y-8A, wherein

denotes attachment to the 10 membered hetaryl, D is $R^{11}$ or $R^{12}$.

In one preferred embodiment, $R^{11}$ is $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_1$-$C_4$-alkyl-$C_3$-$C_6$-cycloalkoxy, which are unsubstituted or substituted with halogen, aryl, arylcarbonyl, aryl-$C_1$-$C_4$-alkyl, aryloxy-$C_1$-$C_4$-alkyl, hetaryl, carbonylhetaryl, $C_1$-$C_4$-alkyl-hetaryl and $C_1$-$C_4$-alkyl-hetaryloxy, wherein the aryl or hetaryl rings are unsubstituted or substituted with $R^g$ and wherein the hetaryl is a 5- or 6-membered monocyclic hetaryl or a 8-, 9- or 10-membered bicyclic hetaryl.

In more preferred embodiment, $R^{11}$ is $C_1$-$C_6$-alkyl, $C_2$-$C_6$-alkenyl, $C_2$-$C_6$-alkynyl, $C_3$-$C_6$-cycloalkyl, which are unsubstituted or substituted with halogen, aryl, arylcarbonyl, aryl-$C_1$-$C_4$-alkyl, aryloxy-$C_1$-$C_4$-alkyl, hetaryl, carbonylhetaryl, $C_1$-$C_4$-alkyl-hetaryl and $C_1$-$C_4$-alkyl-hetaryloxy, where the rings are unsubstituted or substituted with $R^g$ and wherein the hetaryl is a 5- or 6-membered monocyclic hetaryl or a 8-, 9- or 10-membered bicyclic hetaryl.

In most preferred embodiment, $R^{11}$ is aryl, aryl-$C_1$-$C_4$-alkyl, hetaryl, or hetaryl-$C_1$-$C_4$-alkyl, wherein the rings are unsubstituted or substituted with $R^g$ and where hetaryl in hetaryl or hetaryl-$C_1$-$C_4$-alkyl, is preferably a 5- or 6-membered monocyclic hetaryl such as pyridyl, pyrimidinyl, pyridazinyl, pyrrolyl, pyrazolyl, imidazolyl, oxazolyl, thiazolyl, isoxazolyl or isothiazolyl which is unsubstituted or substituted with $R^9$.

Examples of particularly preferred radicals $R^{11}$ are the radicals $R^{11}$-1 to $R^{11}$-29 summarized in Table A-1 below.

TABLE A-1

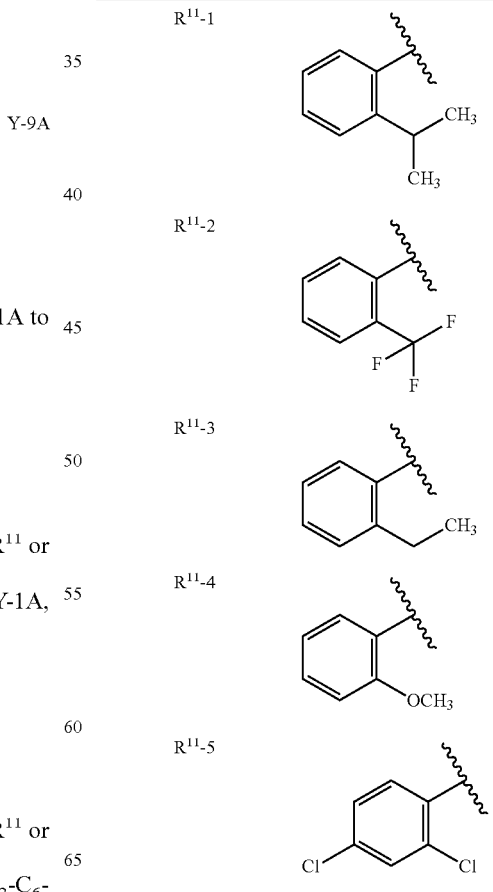

TABLE A-1-continued
| | | |
|---|---|---|
| R<sup>11</sup>-6 | 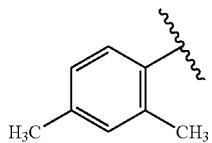 | |
| R<sup>11</sup>-7 | 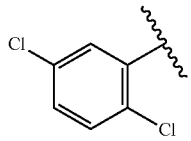 | |
| R<sup>11</sup>-8 | 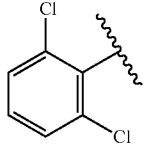 [SMILES: *c1c(Cl)cccc1Cl] | |
| R<sup>11</sup>-9 | 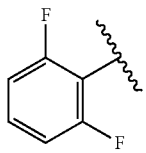 [SMILES: *c1c(F)cccc1F] | |
| R<sup>11</sup>-10 | 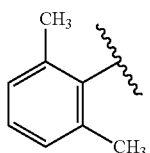 | |
| R<sup>11</sup>-11 | 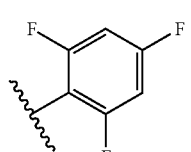 | |
| R<sup>11</sup>-12 | 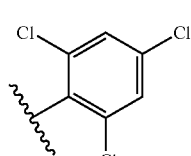 | |
| R<sup>11</sup>-13 | 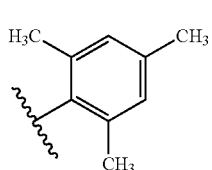 | |
| R<sup>11</sup>-14 | 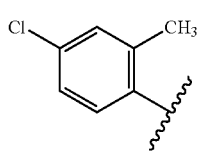 | |
| R<sup>11</sup>-15 | 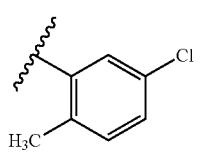 | |
| R<sup>11</sup>-16 | 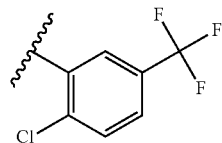 [SMILES: *c1cc(C(F)(F)F)ccc1Cl] | |
| R<sup>11</sup>-17 | 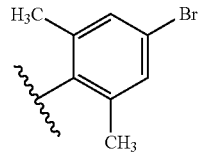 | |
| R<sup>11</sup>-18 | 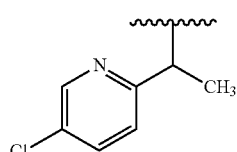 | |
| R<sup>11</sup>-19 | 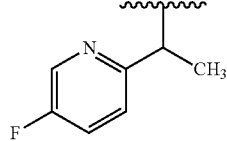 [SMILES: *C(C)c1ccc(F)cn1] | |
| R<sup>11</sup>-20 | 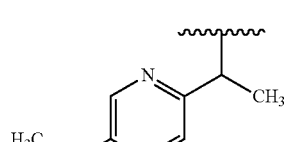 | |
| R<sup>11</sup>-21 | 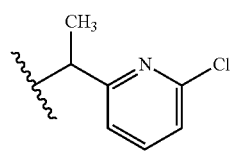 [SMILES: *C(C)c1cccc(Cl)n1] | |
| R<sup>11</sup>-22 | 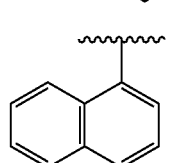 | |
| R<sup>11</sup>-23 | 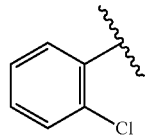 | |
| R<sup>11</sup>-24 | 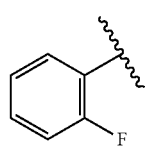 | |
| R<sup>11</sup>-25 | 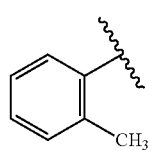 | |

TABLE A-1-continued

| R$^{11}$-26 | 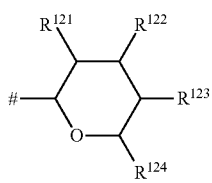 |
| --- | --- |
| R$^{11}$-27 | |
| R$^{11}$-28 | |
| R$^{11}$-29 | |

In another preferred embodiment, R$^{11}$ is R$^{11}$-1 or R$^{11}$-29;

In another preferred embodiment, R$^{11}$ is R$^{11}$-1;

In one embodiment, R$^{12}$ is a radical of the formula (A$^1$),

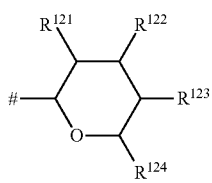

(A$^1$)

wherein # indicates the point of attachment to T and wherein R$^{121}$, R$^{122}$, R$^{123}$ and R$^{124}$ are as defined above and wherein R$^{121}$, R$^{122}$, R$^{123}$ and R$^{124}$ independently of each other and especially in combination preferably have the following meanings:

R$^{121}$ is C$_1$-C$_4$-alkoxy, in particular OCH$_3$, OC$_2$H$_5$;

R$^{122}$ is C$_1$-C$_4$-alkoxy, such as OCH$_3$, OC$_2$H$_5$, n-propoxyx or isopropoxy, or C$_3$-C$_4$-alkenyloxy, such as allyloxy, with R$^{122}$ in particular being OCH$_3$, OC$_2$H$_5$, or n-propoxy;

R$^{123}$ is OH, C$_1$-C$_4$-alkoxy, such as OCH$_3$, OC$_2$H$_5$, or C$_3$-C$_4$-alkenyloxy, such as allyloxy, with R$^{123}$ in particular being OCH$_3$, OC$_2$H$_5$;

R$^{124}$ is C$_1$-C$_4$-alkyl, such as CH$_3$ or C$_2$H$_5$, or C$_1$-C$_4$-alkoxy-C$_1$-C$_4$-alkyl, such as methoxymethyl, ethoxymethyl, 2-methoxyethyl or 2-ethoxyethyl, with R$^{124}$ in particular being methyl.

In more preferred embodiment, R$^{12}$ is in particular a radical of the formula (A$^{11}$), e.g. (A$^{11}$-a) or (A$^{11}$-b)

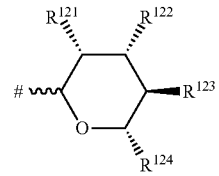

(A$^{11}$)

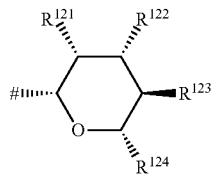

(A$^{11}$-a)

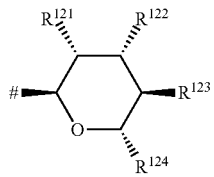

(A$^{11}$-b)

wherein # indicates the point of attachment to T and wherein R$^{121}$, R$^{122}$, R$^{123}$ and R$^{124}$ are as defined above and wherein R$^{121}$, R$^{122}$, R$^{123}$ and R$^{124}$ independently of each other and especially in combination preferably have the following meanings:

R$^{121}$ is C$_1$-C$_4$-alkoxy, in particular OCH$_3$ or OC$_2$H$_5$;

R$^{122}$ is C$_1$-C$_4$-alkoxy, such as OCH$_3$, OC$_2$H$_5$, n-propoxyx or isopropoxy, or C$_3$-C$_4$-alkenyloxy, such as allyloxy, with R$^{122}$ in particular being OCH$_3$, OC$_2$H$_5$ or n-propoxy;

R$^{123}$ is OH, C$_1$-C$_4$-alkoxy, such as OCH$_3$ or OC$_2$H$_5$, or C$_3$-C$_4$-alkenyloxy, such as allyloxy, with R$^{123}$ in particular being OCH$_3$ or OC$_2$H$_5$;

R$^{124}$ is C$_1$-C$_4$-alkyl, such as CH$_3$ or C$_2$H$_5$, or C$_1$-C$_4$-alkoxy-C$_1$-C$_4$-alkyl, such as methoxymethyl, ethoxymethyl, 2-methoxyethyl or 2-ethoxyethyl, with R$^{124}$ in particular being methyl.

Particular examples of radicals R$^{12}$ are the following radicals A$^{11}$-1, A$^{11}$-1a, A$^{11}$-1b, A$^{11}$-2, A$^{11}$-2a, A$^{11}$-2b, A$^{11}$-3, A$^{11}$-3a and A$^{11}$-3b:

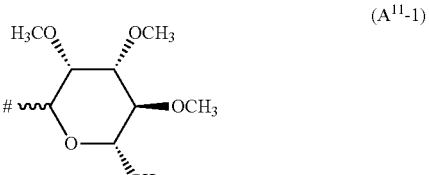

(A$^{11}$-1)

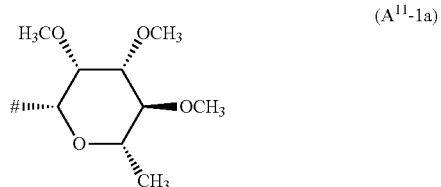

(A$^{11}$-1a)

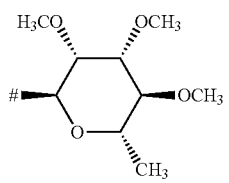 (A^11-1b)

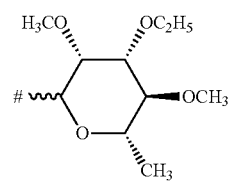 (A^11-2)

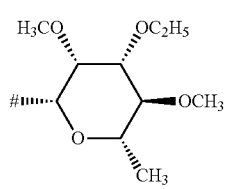 (A^11-2a)

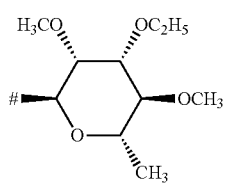 (A^11-2b)

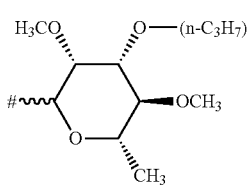 (A^11-3)

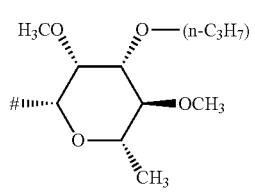 (A^11-3a)

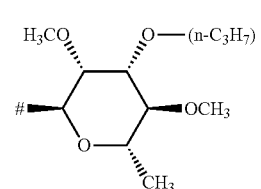 (A^11-3b)

In another preferred embodiment compounds of formula I, $R^{12}$ is $A^{11}$, preferably $A^{11}$-1;

In another preferred embodiment compounds of formula I are selected from compounds of formula I.A to I.F;

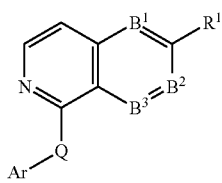 I.A

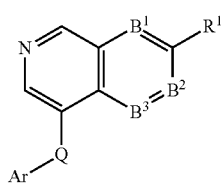 I.B

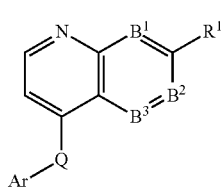 I.C

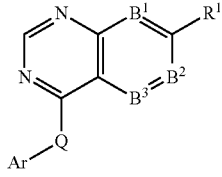 I.D

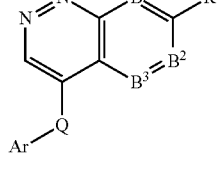 I.E

I.F wherein, Ar is phenyl or 5- or 6-membered hetaryl ring which is substituted with $R^{Ar}$;

$R^{Ar}$ is halogen, OH, CN, NO$_2$, SCN, C$_1$-C$_6$-alkyl, C$_1$-C$_6$-alkoxy, or S—R$^e$, wherein the alkyl and alkoxy are unsubstituted or substituted with halogen;

B$^1$ is CR$^{B1}$;
B$^2$ is CR$^{B2}$;
B$^3$ is CR$^{B3}$;
R$^{B1}$, R$^{B2}$, and R$^{B3}$ independently of each other are H, halogen, or C$_1$-C$_6$-alkyl;

Q is —C(R$^4$R$^5$)—O—, —N(R$^2$)—S(=O)$_m$—, —N(R$^2$)—C(R$^9$R$^{10}$)—, —N(R$^2$)—C(=O)—, —N(R$^2$)—C(=S)—, —N=C(X)—, —N(R$^2$)—C(=NR)—; wherein Ar is bound to either side of Q;

X is N(R$^3$)$_2$;

and R$^1$ is Y—Z-T-R$^{11}$ or Y—Z-T-R$^{12}$, as defined in formula I.

also In a more preferred embodiment compounds of formula I are compounds of formula I.A or I.F, wherein Ar is phenyl or 5- or 6-membered hetaryl ring which is substituted with $R^{Ar}$;

$R^{Ar}$ is halogen, OH, CN, $NO_2$, SCN, $C_1$-$C_6$-alkyl, $C_1$-$C_6$-alkoxy, or S—$R^e$, wherein the alkyl and alkoxy are unsubstituted or substituted with halogen;

$B^1$ is $CR^{B1}$;
$B^2$ is $CR^{B2}$;
$B^3$ is $CR^{B3}$;
$R^{B1}$, $R^{B2}$, and $R^{B3}$ independently of each other are H, halogen, or $C_1$-$C_6$-alkyl;
Ar is $Ar^1$, $Ar^2$, $Ar^3$, $Ar^4$, $Ar^{10}$, $Ar^{17}$, or $Ar^{18}$;
Q is —C($R^4R^5$)—O—, —N($R^2$)—C($R^9R^{10}$)—, or —N($R^2$)—C(=O)—; wherein Ar is bound to either side of Q;
$R^1$ are formulas YZT-1, YZT-5, YZT-6, or YZT-8;

In another preferred embodiment of compounds of formula I, wherein
$A^1$ is N or $CR^{A1}$;
$A^2$ is N or $CR^{A2}$;
$A^3$ is N or $CR^{A3}$;
wherein at least one of the $A^1$, $A^2$, $A^3$ is N;
$B^1$ is $CR^{B1}$, $B^2$ is $CR^{B2}$, $B^3$ is $CR^{B3}$;
$R^{B1}$, $R^{B2}$, $R^{B3}$ independently of each other are H, halogen, or $C_1$-$C_6$-alkyl;
Q is —C($R^4R^5$)—O—, —N($R^2$)—C($R^9R^{10}$)—, or —N($R^2$)—C(=O)—; wherein Ar is bound to either side of Q;
Ar is $Ar^1$, $Ar^2$, $Ar^3$, $Ar^4$, $Ar^{10}$, $Ar^{17}$, or $Ar^{18}$;
$R^1$ are formulas Y-1A, Y-5A, Y-6A, or Y-8A, wherein D is $R^{11}$ or $R^{12}$;
$R^{11}$ is selected from $R^{11}$-1 to $R^{11}$-29
$R^{12}$ is $A^{11}$; preferably $A^{11}$-1;

In another preferred embodiment of compounds of formula I, wherein
$A^1$ is N, $A^2$ is $CR^{A2}$, and $A^3$ is N; or $A^1$ is $CR^{A1}$, $A^2$ is N, and $A^3$ is N; or $A^1$ is $CR^{A1}$, $A^2$ is $CR^{A2}$, and $A^3$ is N;
$B^1$ is $CR^{B1}$, $B^2$ is $CR^{B2}$, $B^3$ is $CR^{B3}$;
$R^{B1}$, $R^{B2}$, $R^{63}$ are H;
Ar is $Ar^2$;
Q is —N($R^2$)—C($R^9R^{10}$)—, wherein C is bound to Ar; or
Q is —N($R^2$)—C(=O)—, wherein N is bound to Ar; or
Q is —C($R^4R^5$)—O—, wherein C is bound to Ar;
$R^1$ are formulas Y-1A, Y-5A, Y-6A, or Y-8A, wherein D is $R^{11}$ or $R^{12}$;
$R^{11}$ is $R^{11}$-1 or $R^{11}$-29;
$R^{12}$ is $A^{11}$-1;

more preferred compounds of formula I are selected from compounds of formula I.1A to I.6C as shown below, wherein $R^1$ is selected from Y-1A, Y-1B, Y-2A, Y-2B, Y-3A, Y-3B, Y-3C, Y-3D, Y-4A, Y-4B, Y-4C, Y-4D, Y-5A, Y-5B, Y-6A, Y-6B, Y-7A, Y-7B, Y-8A, and Y-8B; wherein D is $R^{11}$ or $R^{12}$, and other variables are as defined herein.

-continued

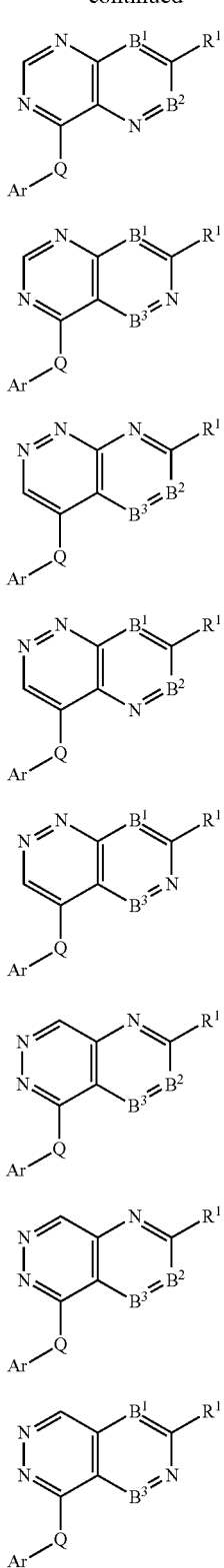

I.4B

I.4C

I.5A

I.5B

I.5C

I-6A

I.6B

I.6C

Also more preferred compound of formula I are formulae I.1 to I.6, wherein
B¹ is $CR^{B1}$, B² is $CR^{B2}$, B³ is $CR^{B3}$,
$R^{B1}$, $R^{B2}$, and $R^{B3}$ independently of each other are H, halogen, $C_1$-$C_6$-alkyl;

Q is —$C(R^4R^5)$—O—, —$N(R^2)$—$C(R^9R^{10})$—, —$N(R^2)$—C(=O)—, —$N(R^2)$—C(=NR)—; wherein Ar is bound to either side of Q;
m is 0, 1, or 2;
R is H, CN, or $C_1$-$C_6$-alkyl;
$R^2$ is H or $C_1$-$C_6$-alkyl;
$R^4$, $R^5$, $R^9$, $R^{10}$, are identical or different H or $C_1$-$C_6$-alkyl;
$R^6$ is H, $C_1$-$C_6$-alkyl, $C_1$-$C_6$-haloalkyl, or —$CH_2$-phenyl;
Ar is $Ar^1$, $Ar^2$, $Ar^3$, $Ar^4$, $Ar^{10}$, $Ar^{17}$, or $Ar^{18}$;
$R^1$ is Y-1A, Y-3C, Y-5A, Y-6A, Y-7A, Y-8A, or Y-9A;
D is $R^{11}$ or $R^{12}$;
$R^{11}$ is $R^{11}$-1 or $R^{11}$-10;
$R^{12}$ is $A^{11}$-1b or $A^{11}$-3b;

In another preferred embodiment, the compound of formula I are selected from compounds of formula I.1 to I.48, wherein the variables are as defined in the compound of formula I;

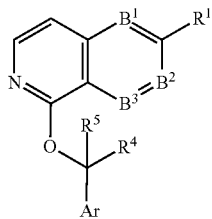

I.1

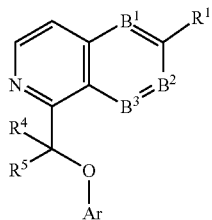

I.2

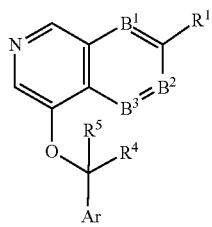

I.3

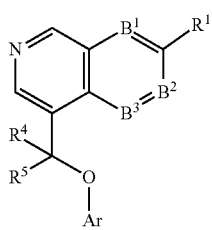

I.4

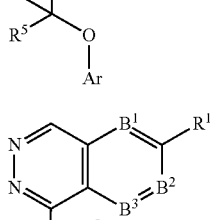

I.5

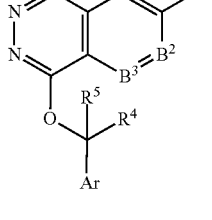

-continued
I.6 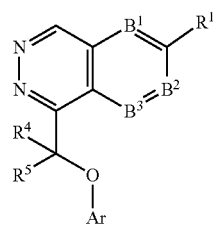
I.7 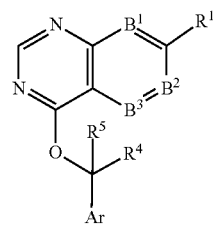
I.8 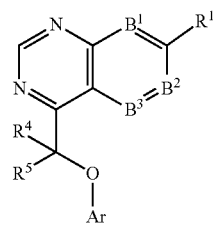
I.9 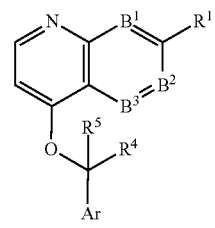
I.10 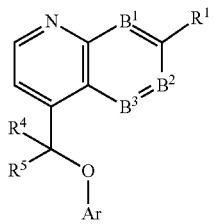
I.11 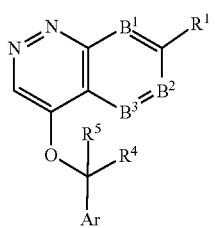
I.12 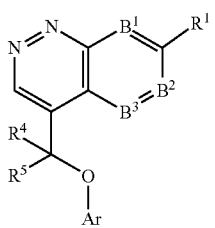
-continued
I.13 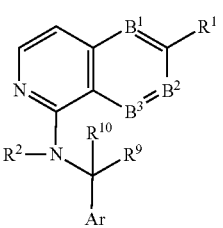
I.14 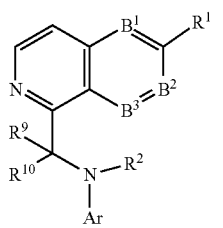
I.15 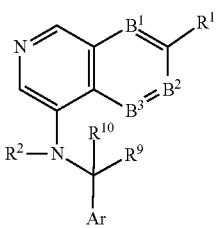
I.16 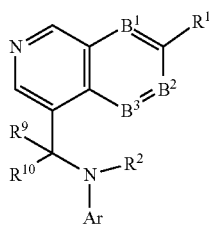
I.17 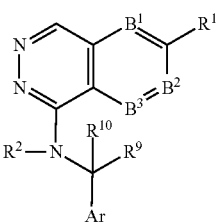
I.18 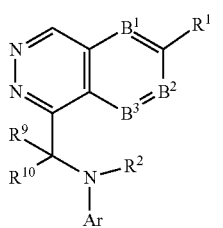
I.19 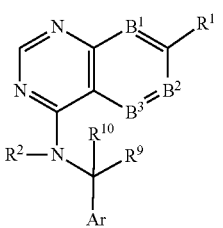

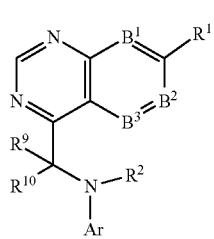
I.20
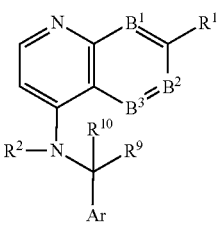
I.21
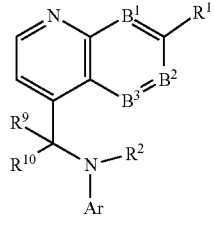
I.22
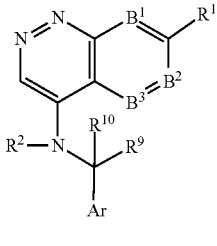
I.23
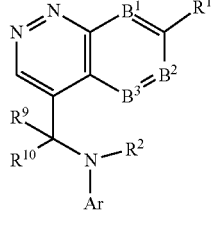
I.24
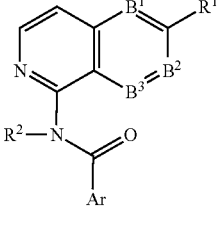
I.25
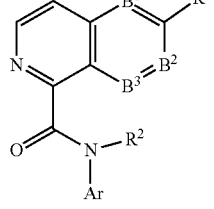
I.26
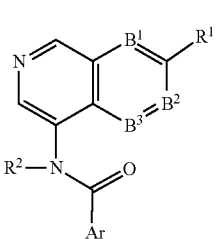
I.27
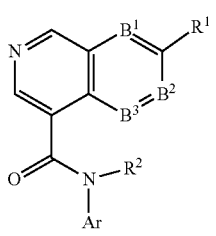
I.28
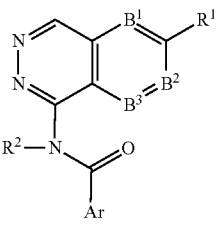
I.29
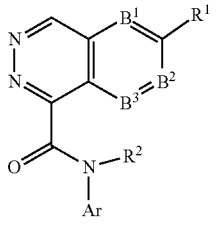
I.30
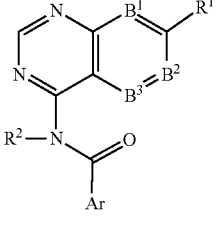
I.31
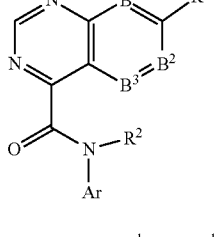
I.32
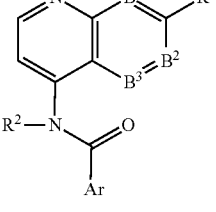
I.33

-continued
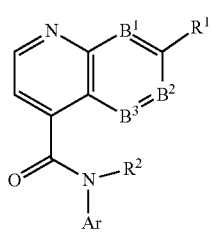   I.34
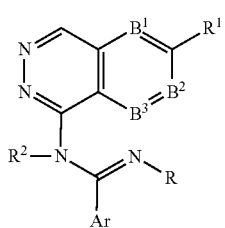   I.41
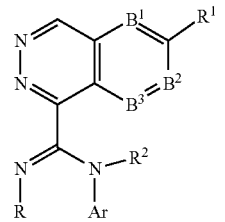   I.42
I.35
I.36
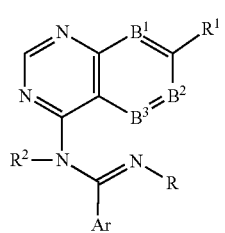   I.43
I.37
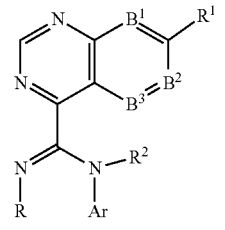   I.44
I.38
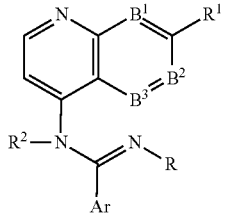   I.45
I.39
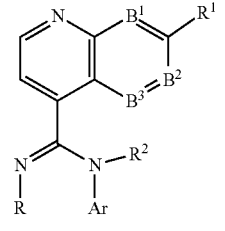   I.46
I.40
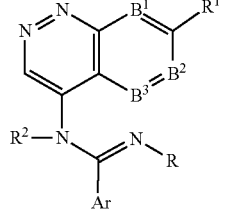   I.47

-continued

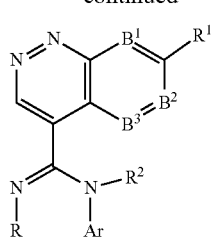

I.48

In another preferred embodiment, the compound of formula I are selected from compounds of formula I.1 to I.48, wherein
Ar is $Ar^1$, $Ar^2$, $Ar^3$, $Ar^4$, $Ar^{10}$, $Ar^{17}$, or $Ar^{18}$;
$B^1$ is CH;
$B^2$ is CH;
$B^3$ is CH;
$R^1$ is Y-1A, Y-1B, Y-2A, Y-2B, Y-3A, Y-3B, Y-3C, Y-3D, Y-4A, Y-4B, Y-4C, Y-4D, Y-5A, Y-5B, Y-6A, Y-6B, Y-7A, Y-7B, Y-8A, or Y-8B; wherein D is $R^{11}$ or $R^{12}$;
$R^{11}$ is $R^{11}$-1, $R^{11}$-2, $R^{11}$-3, $R^{11}$-4, $R^{11}$-5, $R^{11}$-6, $R^{11}$-7, $R^{11}$-8, $R^{11}$-9, $R^{11}$-10, $R^{11}$-11, $R^{11}$-12, $R^{11}$-13, $R^{11}$-14, $R^{11}$-15, $R^{11}$-16, $R^{11}$-17, $R^{11}$-18, $R^{11}$-19, $R^{11}$-20, $R^{11}$-21, $R^{11}$-22, $R^{11}$-23, $R^{11}$-24, $R^{11}$-25, $R^{11}$-26, $R^{11}$-27, $R^{11}$-28, or $R^{11}$-29;
$R^{12}$ is ($A^{11}$-1), ($A^{11}$-2), or ($A^{11}$-3).
$R^4$ and $R^5$ independently are H or $CH_3$,
$R^9$ and $R^{10}$ independently are H or $CH_3$,
$R^2$ is H, $CH_3$, or c-$C_3H_5$
R is NH, $NCH_3$, or NCN;

Particular compounds of formula I are the compounds of the formulae I.1 to I.24 that are compiled in the following tables 1 to 2160, wherein the term Formula denotes compounds of formula, and wherein combination of variables $B^1$, $B^2$, $B^3$, Ar, and D for each compound of tables 1 to 2160 corresponds to each line of Table B. Each of the groups mentioned for a substituent in the tables is furthermore per se, independently of the combination in which it is mentioned, a particularly preferred aspect of the substituent in question.

Table 1. Formula I.1 wherein $R^1$ is Y-1A, $R^4$ is H and $R^5$ is H.
Table 2. Formula I.1 wherein $R^1$ is Y-1B, $R^4$ is H and $R^5$ is H.
Table 3. Formula I.1 wherein $R^1$ is Y-2A, $R^4$ is H and $R^5$ is H.
Table 4. Formula I.1 wherein $R^1$ is Y-2B, $R^4$ is H and $R^5$ is H.
Table 5. Formula I.1 wherein $R^1$ is Y-3A, $R^4$ is H and $R^5$ is H.
Table 6. Formula I.1 wherein $R^1$ is Y-3B, $R^4$ is H and $R^5$ is H.
Table 7. Formula I.1 wherein $R^1$ is Y-3C, $R^4$ is H and $R^5$ is H.
Table 8. Formula I.1 wherein $R^1$ is Y-3D, $R^4$ is H and $R^5$ is H.
Table 9. Formula I.1 wherein $R^1$ is Y-4A, $R^4$ is H and $R^5$ is H.
Table 10. Formula I.1 wherein $R^1$ is Y-4B, $R^4$ is H and $R^5$ is H.
Table 11. Formula I.1 wherein $R^1$ is Y-4C, $R^4$ is H and $R^5$ is H.
Table 12. Formula I.1 wherein $R^1$ is Y-4D, $R^4$ is H and $R^5$ is H.
Table 13. Formula I.1 wherein $R^1$ is Y-5A, $R^4$ is H and $R^5$ is H.
Table 14. Formula I.1 wherein $R^1$ is Y-5B, $R^4$ is H and $R^5$ is H.
Table 15. Formula I.1 wherein $R^1$ is Y-6A, $R^4$ is H and $R^5$ is H.
Table 16. Formula I.1 wherein $R^1$ is Y-6B, $R^4$ is H and $R^5$ is H.
Table 17. Formula I.1 wherein $R^1$ is Y-7A, $R^4$ is H and $R^5$ is H.
Table 18. Formula I.1 wherein $R^1$ is Y-7B, $R^4$ is H and $R^5$ is H.
Table 19. Formula I.1 wherein $R^1$ is Y-8A, $R^4$ is H and $R^5$ is H.
Table 20. Formula I.1 wherein $R^1$ is Y-8B, $R^4$ is H and $R^5$ is H.
Table 21. Formula I.1 wherein $R^1$ is Y-1A, $R^4$ is $CH_3$ and $R^5$ is H.
Table 22. Formula I.1 wherein $R^1$ is Y-1B, $R^4$ is $CH_3$ and $R^5$ is H.
Table 23. Formula I.1 wherein $R^1$ is Y-2A, $R^4$ is $CH_3$ and $R^5$ is H.
Table 24. Formula I.1 wherein $R^1$ is Y-2B, $R^4$ is $CH_3$ and $R^5$ is H.
Table 25. Formula I.1 wherein $R^1$ is Y-3A, $R^4$ is $CH_3$ and $R^5$ is H.
Table 26. Formula I.1 wherein $R^1$ is Y-3B, $R^4$ is $CH_3$ and $R^5$ is H.
Table 27. Formula I.1 wherein $R^1$ is Y-3C, $R^4$ is $CH_3$ and $R^5$ is H.
Table 28. Formula I.1 wherein $R^1$ is Y-3D, $R^4$ is $CH_3$ and $R^5$ is H.
Table 29. Formula I.1 wherein $R^1$ is Y-4A, $R^4$ is $CH_3$ and $R^5$ is H.
Table 30. Formula I.1 wherein $R^1$ is Y-4B, $R^4$ is $CH_3$ and $R^5$ is H.
Table 31. Formula I.1 wherein $R^1$ is Y-4C, $R^4$ is $CH_3$ and $R^5$ is H.
Table 32. Formula I.1 wherein $R^1$ is Y-4D, $R^4$ is $CH_3$ and $R^5$ is H.
Table 33. Formula I.1 wherein $R^1$ is Y-5A, $R^4$ is $CH_3$ and $R^5$ is H.
Table 34. Formula I.1 wherein $R^1$ is Y-5B, $R^4$ is $CH_3$ and $R^5$ is H.
Table 35. Formula I.1 wherein $R^1$ is Y-6A, $R^4$ is $CH_3$ and $R^5$ is H.
Table 36. Formula I.1 wherein $R^1$ is Y-6B, $R^4$ is $CH_3$ and $R^5$ is H.
Table 37. Formula I.1 wherein $R^1$ is Y-7A, $R^4$ is $CH_3$ and $R^5$ is H.
Table 38. Formula I.1 wherein $R^1$ is Y-7B, $R^4$ is $CH_3$ and $R^5$ is H.
Table 39. Formula I.1 wherein $R^1$ is Y-8A, $R^4$ is $CH_3$ and $R^5$ is H.
Table 40. Formula I.1 wherein $R^1$ is Y-8B, $R^4$ is $CH_3$ and $R^5$ is H.
Table 41. Formula I.1 wherein $R^1$ is Y-1A, $R^4$ is $CH_3$ and $R^5$ is $CH_3$.
Table 42. Formula I.1 wherein $R^1$ is Y-1B, $R^4$ is $CH_3$ and $R^5$ is $CH_3$.
Table 43. Formula I.1 wherein $R^1$ is Y-2A, $R^4$ is $CH_3$ and $R^5$ is $CH_3$.
Table 44. Formula I.1 wherein $R^1$ is Y-2B, $R^4$ is $CH_3$ and $R^5$ is $CH_3$.
Table 45. Formula I.1 wherein $R^1$ is Y-3A, $R^4$ is $CH_3$ and $R^5$ is $CH_3$.

Table 46. Formula I.1 wherein $R^1$ is Y-3B, $R^4$ is $CH_3$ and $R^5$ is $CH_3$.
Table 47. Formula I.1 wherein $R^1$ is Y-3C, $R^4$ is $CH_3$ and $R^5$ is $CH_3$.
Table 48. Formula I.1 wherein $R^1$ is Y-3D, $R^4$ is $CH_3$ and $R^5$ is $CH_3$.
Table 49. Formula I.1 wherein $R^1$ is Y-4A, $R^4$ is $CH_3$ and $R^5$ is $CH_3$.
Table 50. Formula I.1 wherein $R^1$ is Y-4B, $R^4$ is $CH_3$ and $R^5$ is $CH_3$.
Table 51. Formula I.1 wherein $R^1$ is Y-4C, $R^4$ is $CH_3$ and $R^5$ is $CH_3$.
Table 52. Formula I.1 wherein $R^1$ is Y-4D, $R^4$ is $CH_3$ and $R^5$ is $CH_3$.
Table 53. Formula I.1 wherein $R^1$ is Y-5A, $R^4$ is $CH_3$ and $R^5$ is $CH_3$.
Table 54. Formula I.1 wherein $R^1$ is Y-5B, $R^4$ is $CH_3$ and $R^5$ is $CH_3$.
Table 55. Formula I.1 wherein $R^1$ is Y-6A, $R^4$ is $CH_3$ and $R^5$ is $CH_3$.
Table 56. Formula I.1 wherein $R^1$ is Y-6B, $R^4$ is $CH_3$ and $R^5$ is $CH_3$.
Table 57. Formula I.1 wherein $R^1$ is Y-7A, $R^4$ is $CH_3$ and $R^5$ is $CH_3$.
Table 58. Formula I.1 wherein $R^1$ is Y-7B, $R^4$ is $CH_3$ and $R^5$ is $CH_3$.
Table 59. Formula I.1 wherein $R^1$ is Y-8A, $R^4$ is $CH_3$ and $R^5$ is $CH_3$.
Table 60. Formula I.1 wherein $R^1$ is Y-8B, $R^4$ is $CH_3$ and $R^5$ is $CH_3$.
Table 61. Formula I.2 wherein $R^1$ is Y-1A, $R^4$ is H and $R^5$ is H.
Table 62. Formula I.2 wherein $R^1$ is Y-1B, $R^4$ is H and $R^5$ is H.
Table 63. Formula I.2 wherein $R^1$ is Y-2A, $R^4$ is H and $R^5$ is H.
Table 64. Formula I.2 wherein $R^1$ is Y-2B, $R^4$ is H and $R^5$ is H.
Table 65. Formula I.2 wherein $R^1$ is Y-3A, $R^4$ is H and $R^5$ is H.
Table 66. Formula I.2 wherein $R^1$ is Y-3B, $R^4$ is H and $R^5$ is H.
Table 67. Formula I.2 wherein $R^1$ is Y-3C, $R^4$ is H and $R^5$ is H.
Table 68. Formula I.2 wherein $R^1$ is Y-3D, $R^4$ is H and $R^5$ is H.
Table 69. Formula I.2 wherein $R^1$ is Y-4A, $R^4$ is H and $R^5$ is H.
Table 70. Formula I.2 wherein $R^1$ is Y-4B, $R^4$ is H and $R^5$ is H.
Table 71. Formula I.2 wherein $R^1$ is Y-4C, $R^4$ is H and $R^5$ is H.
Table 72. Formula I.2 wherein $R^1$ is Y-4D, $R^4$ is H and $R^5$ is H.
Table 73. Formula I.2 wherein $R^1$ is Y-5A, $R^4$ is H and $R^5$ is H.
Table 74. Formula I.2 wherein $R^1$ is Y-5B, $R^4$ is H and $R^5$ is H.
Table 75. Formula I.2 wherein $R^1$ is Y-6A, $R^4$ is H and $R^5$ is H.
Table 76. Formula I.2 wherein $R^1$ is Y-6B, $R^4$ is H and $R^5$ is H.
Table 77. Formula I.2 wherein $R^1$ is Y-7A, $R^4$ is H and $R^5$ is H.
Table 78. Formula I.2 wherein $R^1$ is Y-7B, $R^4$ is H and $R^5$ is H.
Table 79. Formula I.2 wherein $R^1$ is Y-8A, $R^4$ is H and $R^5$ is H.
Table 80. Formula I.2 wherein $R^1$ is Y-8B, $R^4$ is H and $R^5$ is H.
Table 81. Formula I.2 wherein $R^1$ is Y-1A, $R^4$ is $CH_3$ and $R^5$ is H.
Table 82. Formula I.2 wherein $R^1$ is Y-1B, $R^4$ is $CH_3$ and $R^5$ is H.
Table 83. Formula I.2 wherein $R^1$ is Y-2A, $R^4$ is $CH_3$ and $R^5$ is H.
Table 84. Formula I.2 wherein $R^1$ is Y-2B, $R^4$ is $CH_3$ and $R^5$ is H.
Table 85. Formula I.2 wherein $R^1$ is Y-3A, $R^4$ is $CH_3$ and $R^5$ is H.
Table 86. Formula I.2 wherein $R^1$ is Y-3B, $R^4$ is $CH_3$ and $R^5$ is H.
Table 87. Formula I.2 wherein $R^1$ is Y-3C, $R^4$ is $CH_3$ and $R^5$ is H.
Table 88. Formula I.2 wherein $R^1$ is Y-3D, $R^4$ is $CH_3$ and $R^5$ is H.
Table 89. Formula I.2 wherein $R^1$ is Y-4A, $R^4$ is $CH_3$ and $R^5$ is H.
Table 90. Formula I.2 wherein $R^1$ is Y-4B, $R^4$ is $CH_3$ and $R^5$ is H.
Table 91. Formula I.2 wherein $R^1$ is Y-4C, $R^4$ is $CH_3$ and $R^5$ is H.
Table 92. Formula I.2 wherein $R^1$ is Y-4D, $R^4$ is $CH_3$ and $R^5$ is H.
Table 93. Formula I.2 wherein $R^1$ is Y-5A, $R^4$ is $CH_3$ and $R^5$ is H.
Table 94. Formula I.2 wherein $R^1$ is Y-5B, $R^4$ is $CH_3$ and $R^5$ is H.
Table 95. Formula I.2 wherein $R^1$ is Y-6A, $R^4$ is $CH_3$ and $R^5$ is H.
Table 96. Formula I.2 wherein $R^1$ is Y-6B, $R^4$ is $CH_3$ and $R^5$ is H.
Table 97. Formula I.2 wherein $R^1$ is Y-7A, $R^4$ is $CH_3$ and $R^5$ is H.
Table 98. Formula I.2 wherein $R^1$ is Y-7B, $R^4$ is $CH_3$ and $R^5$ is H.
Table 99. Formula I.2 wherein $R^1$ is Y-8A, $R^4$ is $CH_3$ and $R^5$ is H.
Table 100. Formula I.2 wherein $R^1$ is Y-8B, $R^4$ is $CH_3$ and $R^5$ is H.
Table 101. Formula I.2 wherein $R^1$ is Y-1A, $R^4$ is $CH_3$ and $R^5$ is $CH_3$.
Table 102. Formula I.2 wherein $R^1$ is Y-1B, $R^4$ is $CH_3$ and $R^5$ is $CH_3$.
Table 103. Formula I.2 wherein $R^1$ is Y-2A, $R^4$ is $CH_3$ and $R^5$ is $CH_3$.
Table 104. Formula I.2 wherein $R^1$ is Y-2B, $R^4$ is $CH_3$ and $R^5$ is $CH_3$.
Table 105. Formula I.2 wherein $R^1$ is Y-3A, $R^4$ is $CH_3$ and $R^5$ is $CH_3$.
Table 106. Formula I.2 wherein $R^1$ is Y-3B, $R^4$ is $CH_3$ and $R^5$ is $CH_3$.
Table 107. Formula I.2 wherein $R^1$ is Y-3C, $R^4$ is $CH_3$ and $R^5$ is $CH_3$.
Table 108. Formula I.2 wherein $R^1$ is Y-3D, $R^4$ is $CH_3$ and $R^5$ is $CH_3$.
Table 109. Formula I.2 wherein $R^1$ is Y-4A, $R^4$ is $CH_3$ and $R^5$ is $CH_3$.
Table 110. Formula I.2 wherein $R^1$ is Y-4B, $R^4$ is $CH_3$ and $R^5$ is $CH_3$.
Table 111. Formula I.2 wherein $R^1$ is Y-4C, $R^4$ is $CH_3$ and $R^5$ is $CH_3$.

Table 112. Formula I.2 wherein $R^1$ is Y-4D, $R^4$ is $CH_3$ and $R^5$ is $CH_3$.
Table 113. Formula I.2 wherein $R^1$ is Y-5A, $R^4$ is $CH_3$ and $R^5$ is $CH_3$.
Table 114. Formula I.2 wherein $R^1$ is Y-5B, $R^4$ is $CH_3$ and $R^5$ is $CH_3$.
Table 115. Formula I.2 wherein $R^1$ is Y-6A, $R^4$ is $CH_3$ and $R^5$ is $CH_3$.
Table 116. Formula I.2 wherein $R^1$ is Y-6B, $R^4$ is $CH_3$ and $R^5$ is $CH_3$.
Table 117. Formula I.2 wherein $R^1$ is Y-7A, $R^4$ is $CH_3$ and $R^5$ is $CH_3$.
Table 118. Formula I.2 wherein $R^1$ is Y-7B, $R^4$ is $CH_3$ and $R^5$ is $CH_3$.
Table 119. Formula I.2 wherein $R^1$ is Y-8A, $R^4$ is $CH_3$ and $R^5$ is $CH_3$.
Table 120. Formula I.2 wherein $R^1$ is Y-8B, $R^4$ is $CH_3$ and $R^5$ is $CH_3$.
Table 121. Formula I.5 wherein $R^1$ is Y-1A, $R^4$ is H and $R^5$ is H.
Table 122. Formula I.5 wherein $R^1$ is Y-1B, $R^4$ is H and $R^5$ is H.
Table 123. Formula I.5 wherein $R^1$ is Y-2A, $R^4$ is H and $R^5$ is H.
Table 124. Formula I.5 wherein $R^1$ is Y-2B, $R^4$ is H and $R^5$ is H.
Table 125. Formula I.5 wherein $R^1$ is Y-3A, $R^4$ is H and $R^5$ is H.
Table 126. Formula I.5 wherein $R^1$ is Y-3B, $R^4$ is H and $R^5$ is H.
Table 127. Formula I.5 wherein $R^1$ is Y-3C, $R^4$ is H and $R^5$ is H.
Table 128. Formula I.5 wherein $R^1$ is Y-3D, $R^4$ is H and $R^5$ is H.
Table 129. Formula I.5 wherein $R^1$ is Y-4A, $R^4$ is H and $R^5$ is H.
Table 130. Formula I.5 wherein $R^1$ is Y-4B, $R^4$ is H and $R^5$ is H.
Table 131. Formula I.5 wherein $R^1$ is Y-4C, $R^4$ is H and $R^5$ is H.
Table 132. Formula I.5 wherein $R^1$ is Y-4D, $R^4$ is H and $R^5$ is H.
Table 133. Formula I.5 wherein $R^1$ is Y-5A, $R^4$ is H and $R^5$ is H.
Table 134. Formula I.5 wherein $R^1$ is Y-5B, $R^4$ is H and $R^5$ is H.
Table 135. Formula I.5 wherein $R^1$ is Y-6A, $R^4$ is H and $R^5$ is H.
Table 136. Formula I.5 wherein $R^1$ is Y-6B, $R^4$ is H and $R^5$ is H.
Table 137. Formula I.5 wherein $R^1$ is Y-7A, $R^4$ is H and $R^5$ is H.
Table 138. Formula I.5 wherein $R^1$ is Y-7B, $R^4$ is H and $R^5$ is H.
Table 139. Formula I.5 wherein $R^1$ is Y-8A, $R^4$ is H and $R^5$ is H.
Table 140. Formula I.5 wherein $R^1$ is Y-8B, $R^4$ is H and $R^5$ is H.
Table 141. Formula I.5 wherein $R^1$ is Y-1A, $R^4$ is $CH_3$ and $R^5$ is H.
Table 142. Formula I.5 wherein $R^1$ is Y-1B, $R^4$ is $CH_3$ and $R^5$ is H.
Table 143. Formula I.5 wherein $R^1$ is Y-2A, $R^4$ is $CH_3$ and $R^5$ is H.
Table 144. Formula I.5 wherein $R^1$ is Y-2B, $R^4$ is $CH_3$ and $R^5$ is H.
Table 145. Formula I.5 wherein $R^1$ is Y-3A, $R^4$ is $CH_3$ and $R^5$ is H.
Table 146. Formula I.5 wherein $R^1$ is Y-3B, $R^4$ is $CH_3$ and $R^5$ is H.
Table 147. Formula I.5 wherein $R^1$ is Y-3C, $R^4$ is $CH_3$ and $R^5$ is H.
Table 148. Formula I.5 wherein $R^1$ is Y-3D, $R^4$ is $CH_3$ and $R^5$ is H.
Table 149. Formula I.5 wherein $R^1$ is Y-4A, $R^4$ is $CH_3$ and $R^5$ is H.
Table 150. Formula I.5 wherein $R^1$ is Y-4B, $R^4$ is $CH_3$ and $R^5$ is H.
Table 151. Formula I.5 wherein $R^1$ is Y-4C, $R^4$ is $CH_3$ and $R^5$ is H.
Table 152. Formula I.5 wherein $R^1$ is Y-4D, $R^4$ is $CH_3$ and $R^5$ is H.
Table 153. Formula I.5 wherein $R^1$ is Y-5A, $R^4$ is $CH_3$ and $R^5$ is H.
Table 154. Formula I.5 wherein $R^1$ is Y-5B, $R^4$ is $CH_3$ and $R^5$ is H.
Table 155. Formula I.5 wherein $R^1$ is Y-6A, $R^4$ is $CH_3$ and $R^5$ is H.
Table 156. Formula I.5 wherein $R^1$ is Y-6B, $R^4$ is $CH_3$ and $R^5$ is H.
Table 157. Formula I.5 wherein $R^1$ is Y-7A, $R^4$ is $CH_3$ and $R^5$ is H.
Table 158. Formula I.5 wherein $R^1$ is Y-7B, $R^4$ is $CH_3$ and $R^5$ is H.
Table 159. Formula I.5 wherein $R^1$ is Y-8A, $R^4$ is $CH_3$ and $R^5$ is H.
Table 160. Formula I.5 wherein $R^1$ is Y-8B, $R^4$ is $CH_3$ and $R^5$ is H.
Table 161. Formula I.5 wherein $R^1$ is Y-1A, $R^4$ is $CH_3$ and $R^5$ is $CH_3$.
Table 162. Formula I.5 wherein $R^1$ is Y-1B, $R^4$ is $CH_3$ and $R^5$ is $CH_3$.
Table 163. Formula I.5 wherein $R^1$ is Y-2A, $R^4$ is $CH_3$ and $R^5$ is $CH_3$.
Table 164. Formula I.5 wherein $R^1$ is Y-2B, $R^4$ is $CH_3$ and $R^5$ is $CH_3$.
Table 165. Formula I.5 wherein $R^1$ is Y-3A, $R^4$ is $CH_3$ and $R^5$ is $CH_3$.
Table 166. Formula I.5 wherein $R^1$ is Y-3B, $R^4$ is $CH_3$ and $R^5$ is $CH_3$.
Table 167. Formula I.5 wherein $R^1$ is Y-3C, $R^4$ is $CH_3$ and $R^5$ is $CH_3$.
Table 168. Formula I.5 wherein $R^1$ is Y-3D, $R^4$ is $CH_3$ and $R^5$ is $CH_3$.
Table 169. Formula I.5 wherein $R^1$ is Y-4A, $R^4$ is $CH_3$ and $R^5$ is $CH_3$.
Table 170. Formula I.5 wherein $R^1$ is Y-4B, $R^4$ is $CH_3$ and $R^5$ is $CH_3$.
Table 171. Formula I.5 wherein $R^1$ is Y-4C, $R^4$ is $CH_3$ and $R^5$ is $CH_3$.
Table 172. Formula I.5 wherein $R^1$ is Y-4D, $R^4$ is $CH_3$ and $R^5$ is $CH_3$.
Table 173. Formula I.5 wherein $R^1$ is Y-5A, $R^4$ is $CH_3$ and $R^5$ is $CH_3$.
Table 174. Formula I.5 wherein $R^1$ is Y-5B, $R^4$ is $CH_3$ and $R^5$ is $CH_3$.
Table 175. Formula I.5 wherein $R^1$ is Y-6A, $R^4$ is $CH_3$ and $R^5$ is $CH_3$.
Table 176. Formula I.5 wherein $R^1$ is Y-6B, $R^4$ is $CH_3$ and $R^5$ is $CH_3$.
Table 177. Formula I.5 wherein $R^1$ is Y-7A, $R^4$ is $CH_3$ and $R^5$ is $CH_3$.

Table 178. Formula I.5 wherein $R^1$ is Y-7B, $R^4$ is $CH_3$ and $R^5$ is $CH_3$.
Table 179. Formula I.5 wherein $R^1$ is Y-8A, $R^4$ is $CH_3$ and $R^5$ is $CH_3$.
Table 180. Formula I.5 wherein $R^1$ is Y-8B, $R^4$ is $CH_3$ and $R^5$ is $CH_3$.
Table 181. Formula I.6 wherein $R^1$ is Y-1A, $R^4$ is H and $R^5$ is H.
Table 182. Formula I.6 wherein $R^1$ is Y-1B, $R^4$ is H and $R^5$ is H.
Table 183. Formula I.6 wherein $R^1$ is Y-2A, $R^4$ is H and $R^5$ is H.
Table 184. Formula I.6 wherein $R^1$ is Y-2B, $R^4$ is H and $R^5$ is H.
Table 185. Formula I.6 wherein $R^1$ is Y-3A, $R^4$ is H and $R^5$ is H.
Table 186. Formula I.6 wherein $R^1$ is Y-3B, $R^4$ is H and $R^5$ is H.
Table 187. Formula I.6 wherein $R^1$ is Y-3C, $R^4$ is H and $R^5$ is H.
Table 188. Formula I.6 wherein $R^1$ is Y-3D, $R^4$ is H and $R^5$ is H.
Table 189. Formula I.6 wherein $R^1$ is Y-4A, $R^4$ is H and $R^5$ is H.
Table 190. Formula I.6 wherein $R^1$ is Y-4B, $R^4$ is H and $R^5$ is H.
Table 191. Formula I.6 wherein $R^1$ is Y-4C, $R^4$ is H and $R^5$ is H.
Table 192. Formula I.6 wherein $R^1$ is Y-4D, $R^4$ is H and $R^5$ is H.
Table 193. Formula I.6 wherein $R^1$ is Y-5A, $R^4$ is H and $R^5$ is H.
Table 194. Formula I.6 wherein $R^1$ is Y-5B, $R^4$ is H and $R^5$ is H.
Table 195. Formula I.6 wherein $R^1$ is Y-6A, $R^4$ is H and $R^5$ is H.
Table 196. Formula I.6 wherein $R^1$ is Y-6B, $R^4$ is H and $R^5$ is H.
Table 197. Formula I.6 wherein $R^1$ is Y-7A, $R^4$ is H and $R^5$ is H.
Table 198. Formula I.6 wherein $R^1$ is Y-7B, $R^4$ is H and $R^5$ is H.
Table 199. Formula I.6 wherein $R^1$ is Y-8A, $R^4$ is H and $R^5$ is H.
Table 200. Formula I.6 wherein $R^1$ is Y-8B, $R^4$ is H and $R^5$ is H.
Table 201. Formula I.6 wherein $R^1$ is Y-1A, $R^4$ is $CH_3$ and $R^5$ is H.
Table 202. Formula I.6 wherein $R^1$ is Y-1B, $R^4$ is $CH_3$ and $R^5$ is H.
Table 203. Formula I.6 wherein $R^1$ is Y-2A, $R^4$ is $CH_3$ and $R^5$ is H.
Table 204. Formula I.6 wherein $R^1$ is Y-2B, $R^4$ is $CH_3$ and $R^5$ is H.
Table 205. Formula I.6 wherein $R^1$ is Y-3A, $R^4$ is $CH_3$ and $R^5$ is H.
Table 206. Formula I.6 wherein $R^1$ is Y-3B, $R^4$ is $CH_3$ and $R^5$ is H.
Table 207. Formula I.6 wherein $R^1$ is Y-3C, $R^4$ is $CH_3$ and $R^5$ is H.
Table 208. Formula I.6 wherein $R^1$ is Y-3D, $R^4$ is $CH_3$ and $R^5$ is H.
Table 209. Formula I.6 wherein $R^1$ is Y-4A, $R^4$ is $CH_3$ and $R^5$ is H.
Table 210. Formula I.6 wherein $R^1$ is Y-4B, $R^4$ is $CH_3$ and $R^5$ is H.
Table 211. Formula I.6 wherein $R^1$ is Y-4C, $R^4$ is $CH_3$ and $R^5$ is H.
Table 212. Formula I.6 wherein $R^1$ is Y-4D, $R^4$ is $CH_3$ and $R^5$ is H.
Table 213. Formula I.6 wherein $R^1$ is Y-5A, $R^4$ is $CH_3$ and $R^5$ is H.
Table 214. Formula I.6 wherein $R^1$ is Y-5B, $R^4$ is $CH_3$ and $R^5$ is H.
Table 215. Formula I.6 wherein $R^1$ is Y-6A, $R^4$ is $CH_3$ and $R^5$ is H.
Table 216. Formula I.6 wherein $R^1$ is Y-6B, $R^4$ is $CH_3$ and $R^5$ is H.
Table 217. Formula I.6 wherein $R^1$ is Y-7A, $R^4$ is $CH_3$ and $R^5$ is H.
Table 218. Formula I.6 wherein $R^1$ is Y-7B, $R^4$ is $CH_3$ and $R^5$ is H.
Table 219. Formula I.6 wherein $R^1$ is Y-8A, $R^4$ is $CH_3$ and $R^5$ is H.
Table 220. Formula I.6 wherein $R^1$ is Y-8B, $R^4$ is $CH_3$ and $R^5$ is H.
Table 221. Formula I.6 wherein $R^1$ is Y-1A, $R^4$ is $CH_3$ and $R^5$ is $CH_3$.
Table 222. Formula I.6 wherein $R^1$ is Y-1B, $R^4$ is $CH_3$ and $R^5$ is $CH_3$.
Table 223. Formula I.6 wherein $R^1$ is Y-2A, $R^4$ is $CH_3$ and $R^5$ is $CH_3$.
Table 224. Formula I.6 wherein $R^1$ is Y-2B, $R^4$ is $CH_3$ and $R^5$ is $CH_3$.
Table 225. Formula I.6 wherein $R^1$ is Y-3A, $R^4$ is $CH_3$ and $R^5$ is $CH_3$.
Table 226. Formula I.6 wherein $R^1$ is Y-3B, $R^4$ is $CH_3$ and $R^5$ is $CH_3$.
Table 227. Formula I.6 wherein $R^1$ is Y-3C, $R^4$ is $CH_3$ and $R^5$ is $CH_3$.
Table 228. Formula I.6 wherein $R^1$ is Y-3D, $R^4$ is $CH_3$ and $R^5$ is $CH_3$.
Table 229. Formula I.6 wherein $R^1$ is Y-4A, $R^4$ is $CH_3$ and $R^5$ is $CH_3$.
Table 230. Formula I.6 wherein $R^1$ is Y-4B, $R^4$ is $CH_3$ and $R^5$ is $CH_3$.
Table 231. Formula I.6 wherein $R^1$ is Y-4C, $R^4$ is $CH_3$ and $R^5$ is $CH_3$.
Table 232. Formula I.6 wherein $R^1$ is Y-4D, $R^4$ is $CH_3$ and $R^5$ is $CH_3$.
Table 233. Formula I.6 wherein $R^1$ is Y-5A, $R^4$ is $CH_3$ and $R^5$ is $CH_3$.
Table 234. Formula I.6 wherein $R^1$ is Y-5B, $R^4$ is $CH_3$ and $R^5$ is $CH_3$.
Table 235. Formula I.6 wherein $R^1$ is Y-6A, $R^4$ is $CH_3$ and $R^5$ is $CH_3$.
Table 236. Formula I.6 wherein $R^1$ is Y-6B, $R^4$ is $CH_3$ and $R^5$ is $CH_3$.
Table 237. Formula I.6 wherein $R^1$ is Y-7A, $R^4$ is $CH_3$ and $R^5$ is $CH_3$.
Table 238. Formula I.6 wherein $R^1$ is Y-7B, $R^4$ is $CH_3$ and $R^5$ is $CH_3$.
Table 239. Formula I.6 wherein $R^1$ is Y-8A, $R^4$ is $CH_3$ and $R^5$ is $CH_3$.
Table 240. Formula I.6 wherein $R^1$ is Y-8B, $R^4$ is $CH_3$ and $R^5$ is $CH_3$.
Table 241. Formula I.7 wherein $R^1$ is Y-1A, $R^4$ is H and $R^5$ is H.
Table 242. Formula I.7 wherein $R^1$ is Y-1B, $R^4$ is H and $R^5$ is H.
Table 243. Formula I.7 wherein $R^1$ is Y-2A, $R^4$ is H and $R^5$ is H.

Table 244. Formula I.7 wherein $R^1$ is Y-2B, $R^4$ is H and $R^5$ is H.
Table 245. Formula I.7 wherein $R^1$ is Y-3A, $R^4$ is H and $R^5$ is H.
Table 246. Formula I.7 wherein $R^1$ is Y-3B, $R^4$ is H and $R^5$ is H.
Table 247. Formula I.7 wherein $R^1$ is Y-3C, $R^4$ is H and $R^5$ is H.
Table 248. Formula I.7 wherein $R^1$ is Y-3D, $R^4$ is H and $R^5$ is H.
Table 249. Formula I.7 wherein $R^1$ is Y-4A, $R^4$ is H and $R^5$ is H.
Table 250. Formula I.7 wherein $R^1$ is Y-4B, $R^4$ is H and $R^5$ is H.
Table 251. Formula I.7 wherein $R^1$ is Y-4C, $R^4$ is H and $R^5$ is H.
Table 252. Formula I.7 wherein $R^1$ is Y-4D, $R^4$ is H and $R^5$ is H.
Table 253. Formula I.7 wherein $R^1$ is Y-5A, $R^4$ is H and $R^5$ is H.
Table 254. Formula I.7 wherein $R^1$ is Y-5B, $R^4$ is H and $R^5$ is H.
Table 255. Formula I.7 wherein $R^1$ is Y-6A, $R^4$ is H and $R^5$ is H.
Table 256. Formula I.7 wherein $R^1$ is Y-6B, $R^4$ is H and $R^5$ is H.
Table 257. Formula I.7 wherein $R^1$ is Y-7A, $R^4$ is H and $R^5$ is H.
Table 258. Formula I.7 wherein $R^1$ is Y-7B, $R^4$ is H and $R^5$ is H.
Table 259. Formula I.7 wherein $R^1$ is Y-8A, $R^4$ is H and $R^5$ is H.
Table 260. Formula I.7 wherein $R^1$ is Y-8B, $R^4$ is H and $R^5$ is H.
Table 261. Formula I.7 wherein $R^1$ is Y-1A, $R^4$ is $CH_3$ and $R^5$ is H.
Table 262. Formula I.7 wherein $R^1$ is Y-1B, $R^4$ is $CH_3$ and $R^5$ is H.
Table 263. Formula I.7 wherein $R^1$ is Y-2A, $R^4$ is $CH_3$ and $R^5$ is H.
Table 264. Formula I.7 wherein $R^1$ is Y-2B, $R^4$ is $CH_3$ and $R^5$ is H.
Table 265. Formula I.7 wherein $R^1$ is Y-3A, $R^4$ is $CH_3$ and $R^5$ is H.
Table 266. Formula I.7 wherein $R^1$ is Y-3B, $R^4$ is $CH_3$ and $R^5$ is H.
Table 267. Formula I.7 wherein $R^1$ is Y-3C, $R^4$ is $CH_3$ and $R^5$ is H.
Table 268. Formula I.7 wherein $R^1$ is Y-3D, $R^4$ is $CH_3$ and $R^5$ is H.
Table 269. Formula I.7 wherein $R^1$ is Y-4A, $R^4$ is $CH_3$ and $R^5$ is H.
Table 270. Formula I.7 wherein $R^1$ is Y-4B, $R^4$ is $CH_3$ and $R^5$ is H.
Table 271. Formula I.7 wherein $R^1$ is Y-4C, $R^4$ is $CH_3$ and $R^5$ is H.
Table 272. Formula I.7 wherein $R^1$ is Y-4D, $R^4$ is $CH_3$ and $R^5$ is H.
Table 273. Formula I.7 wherein $R^1$ is Y-5A, $R^4$ is $CH_3$ and $R^5$ is H.
Table 274. Formula I.7 wherein $R^1$ is Y-5B, $R^4$ is $CH_3$ and $R^5$ is H.
Table 275. Formula I.7 wherein $R^1$ is Y-6A, $R^4$ is $CH_3$ and $R^5$ is H.
Table 276. Formula I.7 wherein $R^1$ is Y-6B, $R^4$ is $CH_3$ and $R^5$ is H.
Table 277. Formula I.7 wherein $R^1$ is Y-7A, $R^4$ is $CH_3$ and $R^5$ is H.
Table 278. Formula I.7 wherein $R^1$ is Y-7B, $R^4$ is $CH_3$ and $R^5$ is H.
Table 279. Formula I.7 wherein $R^1$ is Y-8A, $R^4$ is $CH_3$ and $R^5$ is H.
Table 280. Formula I.7 wherein $R^1$ is Y-8B, $R^4$ is $CH_3$ and $R^5$ is H.
Table 281. Formula I.7 wherein $R^1$ is Y-1A, $R^4$ is $CH_3$ and $R^5$ is $CH_3$.
Table 282. Formula I.7 wherein $R^1$ is Y-1B, $R^4$ is $CH_3$ and $R^5$ is $CH_3$.
Table 283. Formula I.7 wherein $R^1$ is Y-2A, $R^4$ is $CH_3$ and $R^5$ is $CH_3$.
Table 284. Formula I.7 wherein $R^1$ is Y-2B, $R^4$ is $CH_3$ and $R^5$ is $CH_3$.
Table 285. Formula I.7 wherein $R^1$ is Y-3A, $R^4$ is $CH_3$ and $R^5$ is $CH_3$.
Table 286. Formula I.7 wherein $R^1$ is Y-3B, $R^4$ is $CH_3$ and $R^5$ is $CH_3$.
Table 287. Formula I.7 wherein $R^1$ is Y-3C, $R^4$ is $CH_3$ and $R^5$ is $CH_3$.
Table 288. Formula I.7 wherein $R^1$ is Y-3D, $R^4$ is $CH_3$ and $R^5$ is $CH_3$.
Table 289. Formula I.7 wherein $R^1$ is Y-4A, $R^4$ is $CH_3$ and $R^5$ is $CH_3$.
Table 290. Formula I.7 wherein $R^1$ is Y-4B, $R^4$ is $CH_3$ and $R^5$ is $CH_3$.
Table 291. Formula I.7 wherein $R^1$ is Y-4C, $R^4$ is $CH_3$ and $R^5$ is $CH_3$.
Table 292. Formula I.7 wherein $R^1$ is Y-4D, $R^4$ is $CH_3$ and $R^5$ is $CH_3$.
Table 293. Formula I.7 wherein $R^1$ is Y-5A, $R^4$ is $CH_3$ and $R^5$ is $CH_3$.
Table 294. Formula I.7 wherein $R^1$ is Y-5B, $R^4$ is $CH_3$ and $R^5$ is $CH_3$.
Table 295. Formula I.7 wherein $R^1$ is Y-6A, $R^4$ is $CH_3$ and $R^5$ is $CH_3$.
Table 296. Formula I.7 wherein $R^1$ is Y-6B, $R^4$ is $CH_3$ and $R^5$ is $CH_3$.
Table 297. Formula I.7 wherein $R^1$ is Y-7A, $R^4$ is $CH_3$ and $R^5$ is $CH_3$.
Table 298. Formula I.7 wherein $R^1$ is Y-7B, $R^4$ is $CH_3$ and $R^5$ is $CH_3$.
Table 299. Formula I.7 wherein $R^1$ is Y-8A, $R^4$ is $CH_3$ and $R^5$ is $CH_3$.
Table 300. Formula I.7 wherein $R^1$ is Y-8B, $R^4$ is $CH_3$ and $R^5$ is $CH_3$.
Table 301. Formula I.8 wherein $R^1$ is Y-1A, $R^4$ is H and $R^5$ is H.
Table 302. Formula I.8 wherein $R^1$ is Y-1B, $R^4$ is H and $R^5$ is H.
Table 303. Formula I.8 wherein $R^1$ is Y-2A, $R^4$ is H and $R^5$ is H.
Table 304. Formula I.8 wherein $R^1$ is Y-2B, $R^4$ is H and $R^5$ is H.
Table 305. Formula I.8 wherein $R^1$ is Y-3A, $R^4$ is H and $R^5$ is H.
Table 306. Formula I.8 wherein $R^1$ is Y-3B, $R^4$ is H and $R^5$ is H.
Table 307. Formula I.8 wherein $R^1$ is Y-3C, $R^4$ is H and $R^5$ is H.
Table 308. Formula I.8 wherein $R^1$ is Y-3D, $R^4$ is H and $R^5$ is H.
Table 309. Formula I.8 wherein $R^1$ is Y-4A, $R^4$ is H and $R^5$ is H.

Table 310. Formula I.8 wherein $R^1$ is Y-4B, $R^4$ is H and $R^5$ is H.
Table 311. Formula I.8 wherein $R^1$ is Y-4C, $R^4$ is H and $R^5$ is H.
Table 312. Formula I.8 wherein $R^1$ is Y-4D, $R^4$ is H and $R^5$ is H.
Table 313. Formula I.8 wherein $R^1$ is Y-5A, $R^4$ is H and $R^5$ is H.
Table 314. Formula I.8 wherein $R^1$ is Y-5B, $R^4$ is H and $R^5$ is H.
Table 315. Formula I.8 wherein $R^1$ is Y-6A, $R^4$ is H and $R^5$ is H.
Table 316. Formula I.8 wherein $R^1$ is Y-6B, $R^4$ is H and $R^5$ is H.
Table 317. Formula I.8 wherein $R^1$ is Y-7A, $R^4$ is H and $R^5$ is H.
Table 318. Formula I.8 wherein $R^1$ is Y-7B, $R^4$ is H and $R^5$ is H.
Table 319. Formula I.8 wherein $R^1$ is Y-8A, $R^4$ is H and $R^5$ is H.
Table 320. Formula I.8 wherein $R^1$ is Y-8B, $R^4$ is H and $R^5$ is H.
Table 321. Formula I.8 wherein $R^1$ is Y-1A, $R^4$ is $CH_3$ and $R^5$ is H.
Table 322. Formula I.8 wherein $R^1$ is Y-1B, $R^4$ is $CH_3$ and $R^5$ is H.
Table 323. Formula I.8 wherein $R^1$ is Y-2A, $R^4$ is $CH_3$ and $R^5$ is H.
Table 324. Formula I.8 wherein $R^1$ is Y-2B, $R^4$ is $CH_3$ and $R^5$ is H.
Table 325. Formula I.8 wherein $R^1$ is Y-3A, $R^4$ is $CH_3$ and $R^5$ is H.
Table 326. Formula I.8 wherein $R^1$ is Y-3B, $R^4$ is $CH_3$ and $R^5$ is H.
Table 327. Formula I.8 wherein $R^1$ is Y-3C, $R^4$ is $CH_3$ and $R^5$ is H.
Table 328. Formula I.8 wherein $R^1$ is Y-3D, $R^4$ is $CH_3$ and $R^5$ is H.
Table 329. Formula I.8 wherein $R^1$ is Y-4A, $R^4$ is $CH_3$ and $R^5$ is H.
Table 330. Formula I.8 wherein $R^1$ is Y-4B, $R^4$ is $CH_3$ and $R^5$ is H.
Table 331. Formula I.8 wherein $R^1$ is Y-4C, $R^4$ is $CH_3$ and $R^5$ is H.
Table 332. Formula I.8 wherein $R^1$ is Y-4D, $R^4$ is $CH_3$ and $R^5$ is H.
Table 333. Formula I.8 wherein $R^1$ is Y-5A, $R^4$ is $CH_3$ and $R^5$ is H.
Table 334. Formula I.8 wherein $R^1$ is Y-5B, $R^4$ is $CH_3$ and $R^5$ is H.
Table 335. Formula I.8 wherein $R^1$ is Y-6A, $R^4$ is $CH_3$ and $R^5$ is H.
Table 336. Formula I.8 wherein $R^1$ is Y-6B, $R^4$ is $CH_3$ and $R^5$ is H.
Table 337. Formula I.8 wherein $R^1$ is Y-7A, $R^4$ is $CH_3$ and $R^5$ is H.
Table 338. Formula I.8 wherein $R^1$ is Y-7B, $R^4$ is $CH_3$ and $R^5$ is H.
Table 339. Formula I.8 wherein $R^1$ is Y-8A, $R^4$ is $CH_3$ and $R^5$ is H.
Table 340. Formula I.8 wherein $R^1$ is Y-8B, $R^4$ is $CH_3$ and $R^5$ is H.
Table 341. Formula I.8 wherein $R^1$ is Y-1A, $R^4$ is $CH_3$ and $R^5$ is $CH_3$.
Table 342. Formula I.8 wherein $R^1$ is Y-1B, $R^4$ is $CH_3$ and $R^5$ is $CH_3$.
Table 343. Formula I.8 wherein $R^1$ is Y-2A, $R^4$ is $CH_3$ and $R^5$ is $CH_3$.
Table 344. Formula I.8 wherein $R^1$ is Y-2B, $R^4$ is $CH_3$ and $R^5$ is $CH_3$.
Table 345. Formula I.8 wherein $R^1$ is Y-3A, $R^4$ is $CH_3$ and $R^5$ is $CH_3$.
Table 346. Formula I.8 wherein $R^1$ is Y-3B, $R^4$ is $CH_3$ and $R^5$ is $CH_3$.
Table 347. Formula I.8 wherein $R^1$ is Y-3C, $R^4$ is $CH_3$ and $R^5$ is $CH_3$.
Table 348. Formula I.8 wherein $R^1$ is Y-3D, $R^4$ is $CH_3$ and $R^5$ is $CH_3$.
Table 349. Formula I.8 wherein $R^1$ is Y-4A, $R^4$ is $CH_3$ and $R^5$ is $CH_3$.
Table 350. Formula I.8 wherein $R^1$ is Y-4B, $R^4$ is $CH_3$ and $R^5$ is $CH_3$.
Table 351. Formula I.8 wherein $R^1$ is Y-4C, $R^4$ is $CH_3$ and $R^5$ is $CH_3$.
Table 352. Formula I.8 wherein $R^1$ is Y-4D, $R^4$ is $CH_3$ and $R^5$ is $CH_3$.
Table 353. Formula I.8 wherein $R^1$ is Y-5A, $R^4$ is $CH_3$ and $R^5$ is $CH_3$.
Table 354. Formula I.8 wherein $R^1$ is Y-5B, $R^4$ is $CH_3$ and $R^5$ is $CH_3$.
Table 355. Formula I.8 wherein $R^1$ is Y-6A, $R^4$ is $CH_3$ and $R^5$ is $CH_3$.
Table 356. Formula I.8 wherein $R^1$ is Y-6B, $R^4$ is $CH_3$ and $R^5$ is $CH_3$.
Table 357. Formula I.8 wherein $R^1$ is Y-7A, $R^4$ is $CH_3$ and $R^5$ is $CH_3$.
Table 358. Formula I.8 wherein $R^1$ is Y-7B, $R^4$ is $CH_3$ and $R^5$ is $CH_3$.
Table 359. Formula I.8 wherein $R^1$ is Y-8A, $R^4$ is $CH_3$ and $R^5$ is $CH_3$.
Table 360. Formula I.8 wherein $R^1$ is Y-8B, $R^4$ is $CH_3$ and $R^5$ is $CH_3$.
Table 361. Formula I.13 wherein $R^1$ is Y-1A, $R^2$ is H, $R^9$ is H and $R^{10}$ is H.
Table 362. Formula I.13 wherein $R^1$ is Y-1A, $R^2$ is H, $R^9$ is $CH_3$ and, $R^{10}$ is H.
Table 363. Formula I.13 wherein $R^1$ is Y-1A, $R^2$ is H, $R^9$ is $CH_3$ and $R^{10}$ is $CH_3$.
Table 364. Formula I.13 wherein $R^1$ is Y-1B, $R^2$ is H, $R^9$ is H and $R^{10}$ is H.
Table 365. Formula I.13 wherein $R^1$ is Y-1B, $R^2$ is H, $R^9$ is $CH_3$ and $R^{10}$ is H.
Table 366. Formula I.13 wherein $R^1$ is Y-1B, $R^2$ is H, $R^9$ is $CH_3$ and $R^{10}$ is $CH_3$.
Table 367. Formula I.13 wherein $R^1$ is Y-2A, $R^2$ is H, $R^9$ is H and $R^{10}$ is H.
Table 368. Formula I.13 wherein $R^1$ is Y-2A, $R^2$ is H, $R^9$ is $CH_3$ and $R^{10}$ is H.
Table 369. Formula I.13 wherein $R^1$ is Y-2A, $R^2$ is H, $R^9$ is $CH_3$ and $R^{10}$ is $CH_3$.
Table 370. Formula I.13 wherein $R^1$ is Y-2B, $R^2$ is H, $R^9$ is H and $R^{10}$ is H.
Table 371. Formula I.13 wherein $R^1$ is Y-2B, $R^2$ is H, $R^9$ is $CH_3$ and $R^{10}$ is H.
Table 372. Formula I.13 wherein $R^1$ is Y-2B, $R^2$ is H, $R^9$ is $CH_3$ and $R^{10}$ is $CH_3$.
Table 373. Formula I.13 wherein $R^1$ is Y-3A, $R^2$ is H, $R^9$ is H and $R^{10}$ is H.
Table 374. Formula I.13 wherein $R^1$ is Y-3A, $R^2$ is H, $R^9$ is $CH_3$ and $R^{10}$ is H.
Table 375. Formula I.13 wherein $R^1$ is Y-3A, $R^2$ is H, $R^9$ is $CH_3$ and $R^{10}$ is $CH_3$.

Table 376. Formula I.13 wherein $R^1$ is Y-3B, $R^2$ is H, $R^9$ is H and $R^{10}$ is H.
Table 377. Formula I.13 wherein $R^1$ is Y-3B, $R^2$ is H, $R^9$ is $CH_3$ and $R^{10}$ is H.
Table 378. Formula I.13 wherein $R^1$ is Y-3B, $R^2$ is H, $R^9$ is $CH_3$ and $R^{10}$ is $CH_3$.
Table 379. Formula I.13 wherein $R^1$ is Y-3C, $R^2$ is H, $R^9$ is H and $R^{10}$ is H.
Table 380. Formula I.13 wherein $R^1$ is Y-3C, $R^2$ is H, $R^9$ is $CH_3$ and $R^{10}$ is H.
Table 381. Formula I.13 wherein $R^1$ is Y-3C, $R^2$ is H, $R^9$ is $CH_3$ and $R^{10}$ is $CH_3$.
Table 382. Formula I.13 wherein $R^1$ is Y-3D, $R^2$ is H, $R^9$ is H and $R^{10}$ is H.
Table 383. Formula I.13 wherein $R^1$ is Y-3D, $R^2$ is H, $R^9$ is $CH_3$ and $R^{10}$ is H.
Table 384. Formula I.13 wherein $R^1$ is Y-3D, $R^2$ is H, $R^9$ is $CH_3$ and $R^{10}$ is $CH_3$.
Table 385. Formula I.13 wherein $R^1$ is Y-4A, $R^2$ is H, $R^9$ is H and $R^{10}$ is H.
Table 386. Formula I.13 wherein $R^1$ is Y-4A, $R^2$ is H, $R^9$ is $CH_3$ and $R^{10}$ is H.
Table 387. Formula I.13 wherein $R^1$ is Y-4A, $R^2$ is H, $R^9$ is $CH_3$ and $R^{10}$ is $CH_3$.
Table 388. Formula I.13 wherein $R^1$ is Y-4B, $R^2$ is H, $R^9$ is H and $R^{10}$ is H.
Table 389. Formula I.13 wherein $R^1$ is Y-4B, $R^2$ is H, $R^9$ is $CH_3$ and $R^{10}$ is H.
Table 390. Formula I.13 wherein $R^1$ is Y-4B, $R^2$ is H, $R^9$ is $CH_3$ and $R^{10}$ is $CH_3$.
Table 391. Formula I.13 wherein $R^1$ is Y-4C, $R^2$ is H, $R^9$ is H and $R^{10}$ is H.
Table 392. Formula I.13 wherein $R^1$ is Y-4C, $R^2$ is H, $R^9$ is $CH_3$ and $R^{10}$ is H.
Table 393. Formula I.13 wherein $R^1$ is Y-4C, $R^2$ is H, $R^9$ is $CH_3$ and $R^{10}$ is $CH_3$.
Table 394. Formula I.13 wherein $R^1$ is Y-4D, $R^2$ is H, $R^9$ is H and $R^{10}$ is H.
Table 395. Formula I.13 wherein $R^1$ is Y-4D, $R^2$ is H, $R^9$ is $CH_3$ and $R^{10}$ is H.
Table 396. Formula I.13 wherein $R^1$ is Y-4D, $R^2$ is H, $R^9$ is $CH_3$ and $R^{10}$ is $CH_3$.
Table 397. Formula I.13 wherein $R^1$ is Y-5A, $R^2$ is H, $R^9$ is H and $R^{10}$ is H.
Table 398. Formula I.13 wherein $R^1$ is Y-5A, $R^2$ is H, $R^9$ is $CH_3$ and $R^{10}$ is H.
Table 399. Formula I.13 wherein $R^1$ is Y-5A, $R^2$ is H, $R^9$ is $CH_3$ and $R^{10}$ is $CH_3$.
Table 400. Formula I.13 wherein $R^1$ is Y-5B, $R^2$ is H, $R^9$ is H and $R^{10}$ is H.
Table 401. Formula I.13 wherein $R^1$ is Y-5B, $R^2$ is H, $R^9$ is $CH_3$ and $R^{10}$ is H.
Table 402. Formula I.13 wherein $R^1$ is Y-5B, $R^2$ is H, $R^9$ is $CH_3$ and $R^{10}$ is $CH_3$.
Table 403. Formula I.13 wherein $R^1$ is Y-6A, $R^2$ is H, $R^9$ is H and $R^{10}$ is H.
Table 404. Formula I.13 wherein $R^1$ is Y-6A, $R^2$ is H, $R^9$ is $CH_3$ and $R^{10}$ is H.
Table 405. Formula I.13 wherein $R^1$ is Y-6A, $R^2$ is H, $R^9$ is $CH_3$ and $R^{10}$ is $CH_3$.
Table 406. Formula I.13 wherein $R^1$ is Y-6B, $R^2$ is H, $R^9$ is H and $R^{10}$ is H.
Table 407. Formula I.13 wherein $R^1$ is Y-6B, $R^2$ is H, $R^9$ is $CH_3$ and $R^{10}$ is H.
Table 408. Formula I.13 wherein $R^1$ is Y-6B, $R^2$ is H, $R^9$ is $CH_3$ and $R^{10}$ is $CH_3$.
Table 409. Formula I.13 wherein $R^1$ is Y-7A, $R^2$ is H, $R^9$ is H and $R^{10}$ is H.
Table 410. Formula I.13 wherein $R^1$ is Y-7A, $R^2$ is H, $R^9$ is $CH_3$ and $R^{10}$ is H.
Table 411. Formula I.13 wherein $R^1$ is Y-7A, $R^2$ is H, $R^9$ is $CH_3$ and $R^{10}$ is $CH_3$.
Table 412. Formula I.13 wherein $R^1$ is Y-7B, $R^2$ is H, $R^9$ is H and $R^{10}$ is H.
Table 413. Formula I.13 wherein $R^1$ is Y-7B, $R^2$ is H, $R^9$ is $CH_3$ and $R^{10}$ is H.
Table 414. Formula I.13 wherein $R^1$ is Y-7B, $R^2$ is H, $R^9$ is $CH_3$ and $R^{10}$ is $CH_3$.
Table 415. Formula I.13 wherein $R^1$ is Y-8A, $R^2$ is H, $R^9$ is H and $R^{10}$ is H.
Table 416. Formula I.13 wherein $R^1$ is Y-8A, $R^2$ is H, $R^9$ is $CH_3$ and $R^{10}$ is H.
Table 417. Formula I.13 wherein $R^1$ is Y-8A, $R^2$ is H, $R^9$ is $CH_3$ and $R^{10}$ is $CH_3$.
Table 418. Formula I.13 wherein $R^1$ is Y-8B, $R^2$ is H, $R^9$ is H and $R^{10}$ is H.
Table 419. Formula I.13 wherein $R^1$ is Y-8B, $R^2$ is H, $R^9$ is $CH_3$ and $R^{10}$ is H.
Table 420. Formula I.13 wherein $R^1$ is Y-8B, $R^2$ is H, $R^9$ is $CH_3$ and $R^{10}$ is $CH_3$.
Table 421. Formula I.13 wherein $R^1$ is Y-1A, $R^2$ is $CH_3$, $R^9$ is H and $R^{10}$ is H.
Table 422. Formula I.13 wherein $R^1$ is Y-1A, $R^2$ is $CH_3$, $R^9$ is $CH_3$ and $R^{10}$ is H.
Table 423. Formula I.13 wherein $R^1$ is Y-1A, $R^2$ is $CH_3$, $R^9$ is $CH_3$ and $R^{10}$ is $CH_3$.
Table 424. Formula I.13 wherein $R^1$ is Y-1B, $R^2$ is $CH_3$, $R^9$ is H and $R^{10}$ is H.
Table 425. Formula I.13 wherein $R^1$ is Y-1B, $R^2$ is $CH_3$, $R^9$ is $CH_3$ and $R^{10}$ is H.
Table 426. Formula I.13 wherein $R^1$ is Y-1B, $R^2$ is $CH_3$, $R^9$ is $CH_3$ and $R^{10}$ is $CH_3$.
Table 427. Formula I.13 wherein $R^1$ is Y-2A, $R^2$ is $CH_3$, $R^9$ is H and $R^{10}$ is H.
Table 428. Formula I.13 wherein $R^1$ is Y-2A, $R^2$ is $CH_3$, $R^9$ is $CH_3$ and $R^{10}$ is H.
Table 429. Formula I.13 wherein $R^1$ is Y-2A, $R^2$ is $CH_3$, $R^9$ is $CH_3$ and $R^{10}$ is $CH_3$.
Table 430. Formula I.13 wherein $R^1$ is Y-2B, $R^2$ is $CH_3$, $R^9$ is H and $R^{10}$ is H.
Table 431. Formula I.13 wherein $R^1$ is Y-2B, $R^2$ is $CH_3$, $R^9$ is $CH_3$ and $R^{10}$ is H.
Table 432. Formula I.13 wherein $R^1$ is Y-2B, $R^2$ is $CH_3$, $R^9$ is $CH_3$ and $R^{10}$ is $CH_3$.
Table 433. Formula I.13 wherein $R^1$ is Y-3A, $R^2$ is $CH_3$, $R^9$ is H and $R^{10}$ is H.
Table 434. Formula I.13 wherein $R^1$ is Y-3A, $R^2$ is $CH_3$, $R^9$ is $CH_3$ and $R^{10}$ is H.
Table 435. Formula I.13 wherein $R^1$ is Y-3A, $R^2$ is $CH_3$, $R^9$ is $CH_3$ and $R^{10}$ is $CH_3$.
Table 436. Formula I.13 wherein $R^1$ is Y-3B, $R^2$ is $CH_3$, $R^9$ is H and $R^{10}$ is H.
Table 437. Formula I.13 wherein $R^1$ is Y-3B, $R^2$ is $CH_3$, $R^9$ is $CH_3$ and $R^{10}$ is H.
Table 438. Formula I.13 wherein $R^1$ is Y-3B, $R^2$ is $CH_3$, $R^9$ is $CH_3$ and $R^{10}$ is $CH_3$.
Table 439. Formula I.13 wherein $R^1$ is Y-3C, $R^2$ is $CH_3$, $R^9$ is H and $R^{10}$ is H.
Table 440. Formula I.13 wherein $R^1$ is Y-3C, $R^2$ is $CH_3$, $R^9$ is $CH_3$ and $R^{10}$ is H.
Table 441. Formula I.13 wherein $R^1$ is Y-3C, $R^2$ is $CH_3$, $R^9$ is $CH_3$ and $R^{10}$ is $CH_3$.

Table 442. Formula I.13 wherein $R^1$ is Y-3D, $R^2$ is $CH_3$, $R^9$ is H and $R^{10}$ is H.
Table 443. Formula I.13 wherein $R^1$ is Y-3D, $R^2$ is $CH_3$, $R^9$ is $CH_3$ and $R^{10}$ is H.
Table 444. Formula I.13 wherein $R^1$ is Y-3D, $R^2$ is $CH_3$, $R^9$ is $CH_3$ and $R^{10}$ is $CH_3$.
Table 445. Formula I.13 wherein $R^1$ is Y-4A, $R^2$ is $CH_3$, $R^9$ is H and $R^{10}$ is H.
Table 446. Formula I.13 wherein $R^1$ is Y-4A, $R^2$ is $CH_3$, $R^9$ is $CH_3$ and $R^{10}$ is H.
Table 447. Formula I.13 wherein $R^1$ is Y-4A, $R^2$ is $CH_3$, $R^9$ is $CH_3$ and $R^{10}$ is $CH_3$.
Table 448. Formula I.13 wherein $R^1$ is Y-4B, $R^2$ is $CH_3$, $R^9$ is H and $R^{10}$ is H.
Table 449. Formula I.13 wherein $R^1$ is Y-4B, $R^2$ is $CH_3$, $R^9$ is $CH_3$ and $R^{10}$ is H.
Table 450. Formula I.13 wherein $R^1$ is Y-4B, $R^2$ is $CH_3$, $R^9$ is $CH_3$ and $R^{10}$ is $CH_3$.
Table 451. Formula I.13 wherein $R^1$ is Y-4C, $R^2$ is $CH_3$, $R^9$ is H and $R^{10}$ is H.
Table 452. Formula I.13 wherein $R^1$ is Y-4C, $R^2$ is $CH_3$, $R^9$ is $CH_3$ and $R^{10}$ is H.
Table 453. Formula I.13 wherein $R^1$ is Y-4C, $R^2$ is $CH_3$, $R^9$ is $CH_3$ and $R^{10}$ is $CH_3$.
Table 454. Formula I.13 wherein $R^1$ is Y-4D, $R^2$ is $CH_3$, $R^9$ is H and $R^{10}$ is H.
Table 455. Formula I.13 wherein $R^1$ is Y-4D, $R^2$ is $CH_3$, $R^9$ is $CH_3$ and $R^{10}$ is H.
Table 456. Formula I.13 wherein $R^1$ is Y-4D, $R^2$ is $CH_3$, $R^9$ is $CH_3$ and $R^{10}$ is $CH_3$.
Table 457. Formula I.13 wherein $R^1$ is Y-5A, $R^2$ is $CH_3$, $R^9$ is H and $R^{10}$ is H.
Table 458. Formula I.13 wherein $R^1$ is Y-5A, $R^2$ is $CH_3$, $R^9$ is $CH_3$ and $R^{10}$ is H.
Table 459. Formula I.13 wherein $R^1$ is Y-5A, $R^2$ is $CH_3$, $R^9$ is $CH_3$ and $R^{10}$ is $CH_3$.
Table 460. Formula I.13 wherein $R^1$ is Y-5B, $R^2$ is $CH_3$, $R^9$ is H and $R^{10}$ is H.
Table 461. Formula I.13 wherein $R^1$ is Y-5B, $R^2$ is $CH_3$, $R^9$ is $CH_3$ and $R^{10}$ is H.
Table 462. Formula I.13 wherein $R^1$ is Y-5B, $R^2$ is $CH_3$, $R^9$ is $CH_3$ and $R^{10}$ is $CH_3$.
Table 463. Formula I.13 wherein $R^1$ is Y-6A, $R^2$ is $CH_3$, $R^9$ is H and $R^{10}$ is H.
Table 464. Formula I.13 wherein $R^1$ is Y-6A, $R^2$ is $CH_3$, $R^9$ is $CH_3$ and $R^{10}$ is H.
Table 465. Formula I.13 wherein $R^1$ is Y-6A, $R^2$ is $CH_3$, $R^9$ is $CH_3$ and $R^{10}$ is $CH_3$.
Table 466. Formula I.13 wherein $R^1$ is Y-6B, $R^2$ is $CH_3$, $R^9$ is H and $R^{10}$ is H.
Table 467. Formula I.13 wherein $R^1$ is Y-6B, $R^2$ is $CH_3$, $R^9$ is $CH_3$ and $R^{10}$ is H.
Table 468. Formula I.13 wherein $R^1$ is Y-6B, $R^2$ is $CH_3$, $R^9$ is $CH_3$ and $R^{10}$ is $CH_3$.
Table 469. Formula I.13 wherein $R^1$ is Y-7A, $R^2$ is $CH_3$, $R^9$ is H and $R^{10}$ is H.
Table 470. Formula I.13 wherein $R^1$ is Y-7A, $R^2$ is $CH_3$, $R^9$ is $CH_3$ and $R^{10}$ is H.
Table 471. Formula I.13 wherein $R^1$ is Y-7A, $R^2$ is $CH_3$, $R^9$ is $CH_3$ and $R^{10}$ is $CH_3$.
Table 472. Formula I.13 wherein $R^1$ is Y-7B, $R^2$ is $CH_3$, $R^9$ is H and $R^{10}$ is H.
Table 473. Formula I.13 wherein $R^1$ is Y-7B, $R^2$ is $CH_3$, $R^9$ is $CH_3$ and $R^{10}$ is H.
Table 474. Formula I.13 wherein $R^1$ is Y-7B, $R^2$ is $CH_3$, $R^9$ is $CH_3$ and $R^{10}$ is $CH_3$.
Table 475. Formula I.13 wherein $R^1$ is Y-8A, $R^2$ is $CH_3$, $R^9$ is H and $R^{10}$ is H.
Table 476. Formula I.13 wherein $R^1$ is Y-8A, $R^2$ is $CH_3$, $R^9$ is $CH_3$ and $R^{10}$ is H.
Table 477. Formula I.13 wherein $R^1$ is Y-8A, $R^2$ is $CH_3$, $R^9$ is $CH_3$ and $R^{10}$ is $CH_3$.
Table 478. Formula I.13 wherein $R^1$ is Y-8B, $R^2$ is $CH_3$, $R^9$ is H and $R^{10}$ is H.
Table 479. Formula I.13 wherein $R^1$ is Y-8B, $R^2$ is $CH_3$, $R^9$ is $CH_3$ and $R^{10}$ is H.
Table 480. Formula I.13 wherein $R^1$ is Y-8B, $R^2$ is $CH_3$, $R^9$ is $CH_3$ and $R^{10}$ is $CH_3$.
Table 481. Formula I.13 wherein $R^1$ is Y-1A, $R^2$ is $C_2H_5$, $R^9$ is H and $R^{10}$ is H.
Table 482. Formula I.13 wherein $R^1$ is Y-1A, $R^2$ is $C_2H_5$, $R^9$ is $CH_3$ and $R^{10}$ is H.
Table 483. Formula I.13 wherein $R^1$ is Y-1A, $R^2$ is $C_2H_5$, $R^9$ is $CH_3$ and $R^{10}$ is $CH_3$.
Table 484. Formula I.13 wherein $R^1$ is Y-1B, $R^2$ is $C_2H_5$, $R^9$ is H and $R^{10}$ is H.
Table 485. Formula I.13 wherein $R^1$ is Y-1B, $R^2$ is $C_2H_5$, $R^9$ is $CH_3$ and $R^{10}$ is H.
Table 486. Formula I.13 wherein $R^1$ is Y-1B, $R^2$ is $C_2H_5$, $R^9$ is $CH_3$ and $R^{10}$ is $CH_3$.
Table 487. Formula I.13 wherein $R^1$ is Y-2A, $R^2$ is $C_2H_5$, $R^9$ is H and $R^{10}$ is H.
Table 488. Formula I.13 wherein $R^1$ is Y-2A, $R^2$ is $C_2H_5$, $R^9$ is $CH_3$ and $R^{10}$ is H.
Table 489. Formula I.13 wherein $R^1$ is Y-2A, $R^2$ is $C_2H_5$, $R^9$ is $CH_3$ and $R^{10}$ is $CH_3$.
Table 490. Formula I.13 wherein $R^1$ is Y-2B, $R^2$ is $C_2H_5$, $R^9$ is H and $R^{10}$ is H.
Table 491. Formula I.13 wherein $R^1$ is Y-2B, $R^2$ is $C_2H_5$, $R^9$ is $CH_3$ and $R^{10}$ is H.
Table 492. Formula I.13 wherein $R^1$ is Y-2B, $R^2$ is $C_2H_5$, $R^9$ is $CH_3$ and $R^{10}$ is $CH_3$.
Table 493. Formula I.13 wherein $R^1$ is Y-3A, $R^2$ is $C_2H_5$, $R^9$ is H and $R^{10}$ is H.
Table 494. Formula I.13 wherein $R^1$ is Y-3A, $R^2$ is $C_2H_5$, $R^9$ is $CH_3$ and $R^{10}$ is H.
Table 495. Formula I.13 wherein $R^1$ is Y-3A, $R^2$ is $C_2H_5$, $R^9$ is $CH_3$ and $R^{10}$ is $CH_3$.
Table 496. Formula I.13 wherein $R^1$ is Y-3B, $R^2$ is $C_2H_5$, $R^9$ is H and $R^{10}$ is H.
Table 497. Formula I.13 wherein $R^1$ is Y-3B, $R^2$ is $C_2H_5$, $R^9$ is $CH_3$ and $R^{10}$ is H.
Table 498. Formula I.13 wherein $R^1$ is Y-3B, $R^2$ is $C_2H_5$, $R^9$ is $CH_3$ and $R^{10}$ is $CH_3$.
Table 499. Formula I.13 wherein $R^1$ is Y-3C, $R^2$ is $C_2H_5$, $R^9$ is H and $R^{10}$ is H.
Table 500. Formula I.13 wherein $R^1$ is Y-3C, $R^2$ is $C_2H_5$, $R^9$ is $CH_3$ and $R^{10}$ is H.
Table 501. Formula I.13 wherein $R^1$ is Y-3C, $R^2$ is $C_2H_5$, $R^9$ is $CH_3$ and $R^{10}$ is $CH_3$.
Table 502. Formula I.13 wherein $R^1$ is Y-3D, $R^2$ is $C_2H_5$, $R^9$ is H and $R^{10}$ is H.
Table 503. Formula I.13 wherein $R^1$ is Y-3D, $R^2$ is $C_2H_5$, $R^9$ is $CH_3$ and $R^{10}$ is H.
Table 504. Formula I.13 wherein $R^1$ is Y-3D, $R^2$ is $C_2H_5$, $R^9$ is $CH_3$ and $R^{10}$ is $CH_3$.
Table 505. Formula I.13 wherein $R^1$ is Y-4A, $R^2$ is $C_2H_5$, $R^9$ is H and $R^{10}$ is H.
Table 506. Formula I.13 wherein $R^1$ is Y-4A, $R^2$ is $C_2H_5$, $R^9$ is $CH_3$ and $R^{10}$ is H.
Table 507. Formula I.13 wherein $R^1$ is Y-4A, $R^2$ is $C_2H_5$, $R^9$ is $CH_3$ and $R^{10}$ is $CH_3$.

Table 508. Formula I.13 wherein $R^1$ is Y-4B, $R^2$ is $C_2H_5$, $R^9$ is H and $R^{10}$ is H.
Table 509. Formula I.13 wherein $R^1$ is Y-4B, $R^2$ is $C_2H_5$, $R^9$ is $CH_3$ and $R^{10}$ is H.
Table 510. Formula I.13 wherein $R^1$ is Y-4B, $R^2$ is $C_2H_5$, $R^9$ is $CH_3$ and $R^{10}$ is $CH_3$.
Table 511. Formula I.13 wherein $R^1$ is Y-4C, $R^2$ is $C_2H_5$, $R^9$ is H and $R^{10}$ is H.
Table 512. Formula I.13 wherein $R^1$ is Y-4C, $R^2$ is $C_2H_5$, $R^9$ is $CH_3$ and $R^{10}$ is H.
Table 513. Formula I.13 wherein $R^1$ is Y-4C, $R^2$ is $C_2H_5$, $R^9$ is $CH_3$ and $R^{10}$ is $CH_3$.
Table 514. Formula I.13 wherein $R^1$ is Y-4D, $R^2$ is $C_2H_5$, $R^9$ is H and $R^{10}$ is H.
Table 515. Formula I.13 wherein $R^1$ is Y-4D, $R^2$ is $C_2H_5$, $R^9$ is $CH_3$ and $R^{10}$ is H.
Table 516. Formula I.13 wherein $R^1$ is Y-4D, $R^2$ is $C_2H_5$, $R^9$ is $CH_3$ and $R^{10}$ is $CH_3$.
Table 517. Formula I.13 wherein $R^1$ is Y-5A, $R^2$ is $C_2H_5$, $R^9$ is H and $R^{10}$ is H.
Table 518. Formula I.13 wherein $R^1$ is Y-5A, $R^2$ is $C_2H_5$, $R^9$ is $CH_3$ and $R^{10}$ is H.
Table 519. Formula I.13 wherein $R^1$ is Y-5A, $R^2$ is $C_2H_5$, $R^9$ is $CH_3$ and $R^{10}$ is $CH_3$.
Table 520. Formula I.13 wherein $R^1$ is Y-5B, $R^2$ is $C_2H_5$, $R^9$ is H and $R^{10}$ is H.
Table 521. Formula I.13 wherein $R^1$ is Y-5B, $R^2$ is $C_2H_5$, $R^9$ is $CH_3$ and $R^{10}$ is H.
Table 522. Formula I.13 wherein $R^1$ is Y-5B, $R^2$ is $C_2H_5$, $R^9$ is $CH_3$ and $R^{10}$ is $CH_3$.
Table 523. Formula I.13 wherein $R^1$ is Y-6A, $R^2$ is $C_2H_5$, $R^9$ is H and $R^{10}$ is H.
Table 524. Formula I.13 wherein $R^1$ is Y-6A, $R^2$ is $C_2H_5$, $R^9$ is $CH_3$ and $R^{10}$ is H.
Table 525. Formula I.13 wherein $R^1$ is Y-6A, $R^2$ is $C_2H_5$, $R^9$ is $CH_3$ and $R^{10}$ is $CH_3$.
Table 526. Formula I.13 wherein $R^1$ is Y-6B, $R^2$ is $C_2H_5$, $R^9$ is H and $R^{10}$ is H.
Table 527. Formula I.13 wherein $R^1$ is Y-6B, $R^2$ is $C_2H_5$, $R^9$ is $CH_3$ and $R^{10}$ is H.
Table 528. Formula I.13 wherein $R^1$ is Y-6B, $R^2$ is $C_2H_5$, $R^9$ is $CH_3$ and $R^{10}$ is $CH_3$.
Table 529. Formula I.13 wherein $R^1$ is Y-7A, $R^2$ is $C_2H_5$, $R^9$ is H and $R^{10}$ is H.
Table 530. Formula I.13 wherein $R^1$ is Y-7A, $R^2$ is $C_2H_5$, $R^9$ is $CH_3$ and $R^{10}$ is H.
Table 531. Formula I.13 wherein $R^1$ is Y-7A, $R^2$ is $C_2H_5$, $R^9$ is $CH_3$ and $R^{10}$ is $CH_3$.
Table 532. Formula I.13 wherein $R^1$ is Y-7B, $R^2$ is $C_2H_5$, $R^9$ is H and $R^{10}$ is H.
Table 533. Formula I.13 wherein $R^1$ is Y-7B, $R^2$ is $C_2H_5$, $R^9$ is $CH_3$ and $R^{10}$ is H.
Table 534. Formula I.13 wherein $R^1$ is Y-7B, $R^2$ is $C_2H_5$, $R^9$ is $CH_3$ and $R^{10}$ is $CH_3$.
Table 535. Formula I.13 wherein $R^1$ is Y-8A, $R^2$ is $C_2H_5$, $R^9$ is H and $R^{10}$ is H.
Table 536. Formula I.13 wherein $R^1$ is Y-8A, $R^2$ is $C_2H_5$, $R^9$ is $CH_3$ and $R^{10}$ is H.
Table 537. Formula I.13 wherein $R^1$ is Y-8A, $R^2$ is $C_2H_5$, $R^9$ is $CH_3$ and $R^{10}$ is $CH_3$.
Table 538. Formula I.13 wherein $R^1$ is Y-8B, $R^2$ is $C_2H_5$, $R^9$ is H and $R^{10}$ is H.
Table 539. Formula I.13 wherein $R^1$ is Y-8B, $R^2$ is $C_2H_5$, $R^9$ is $CH_3$ and $R^{10}$ is H.
Table 540. Formula I.13 wherein $R^1$ is Y-8B, $R^2$ is $C_2H_5$, $R^9$ is $CH_3$ and $R^{10}$ is $CH_3$.
Table 541. Formula I.13 wherein $R^1$ is Y-1A, $R^2$ is $c$-$C_3H_5$, $R^9$ is H and $R^{10}$ is H.
Table 542. Formula I.13 wherein $R^1$ is Y-1A, $R^2$ is $c$-$C_3H_5$, $R^9$ is $CH_3$ and $R^{10}$ is H.
Table 543. Formula I.13 wherein $R^1$ is Y-1A, $R^2$ is $c$-$C_3H_5$, $R^9$ is $CH_3$ and $R^{10}$ is $CH_3$.
Table 544. Formula I.13 wherein $R^1$ is Y-1B, $R^2$ is $c$-$C_3H_5$, $R^9$ is H and $R^{10}$ is H.
Table 545. Formula I.13 wherein $R^1$ is Y-1B, $R^2$ is $c$-$C_3H_5$, $R^9$ is $CH_3$, $R^{10}$ is H.
Table 546. Formula I.13 wherein $R^1$ is Y-1B, $R^2$ is $c$-$C_3H_5$, $R^9$ is $CH_3$ and $R^{10}$ is $CH_3$.
Table 547. Formula I.13 wherein $R^1$ is Y-2A, $R^2$ is $c$-$C_3H_5$, $R^9$ is H and $R^{10}$ is H.
Table 548. Formula I.13 wherein $R^1$ is Y-2A, $R^2$ is $c$-$C_3H_5$, $R^9$ is $CH_3$ and $R^{10}$ is H.
Table 549. Formula I.13 wherein $R^1$ is Y-2A, $R^2$ is $c$-$C_3H_5$, $R^9$ is $CH_3$ and $R^{10}$ is $CH_3$.
Table 550. Formula I.13 wherein $R^1$ is Y-2B, $R^2$ is $c$-$C_3H_5$, $R^9$ is H and $R^{10}$ is H.
Table 551. Formula I.13 wherein $R^1$ is Y-2B, $R^2$ is $c$-$C_3H_5$, $R^9$ is $CH_3$ and $R^{10}$ is H.
Table 552. Formula I.13 wherein $R^1$ is Y-2B, $R^2$ is $c$-$C_3H_5$, $R^9$ is $CH_3$ and $R^{10}$ is $CH_3$.
Table 553. Formula I.13 wherein $R^1$ is Y-3A, $R^2$ is $c$-$C_3H_5$, $R^9$ is H and $R^{10}$ is H.
Table 554. Formula I.13 wherein $R^1$ is Y-3A, $R^2$ is $c$-$C_3H_5$, $R^9$ is $CH_3$ and $R^{10}$ is H.
Table 555. Formula I.13 wherein $R^1$ is Y-3A, $R^2$ is $c$-$C_3H_5$, $R^9$ is $CH_3$ and $R^{10}$ is $CH_3$.
Table 556. Formula I.13 wherein $R^1$ is Y-3B, $R^2$ is $c$-$C_3H_5$, $R^9$ is H and $R^{10}$ is H.
Table 557. Formula I.13 wherein $R^1$ is Y-3B, $R^2$ is $c$-$C_3H_5$, $R^9$ is $CH_3$ and $R^{10}$ is H.
Table 558. Formula I.13 wherein $R^1$ is Y-3B, $R^2$ is $c$-$C_3H_5$, $R^9$ is $CH_3$ and $R^{10}$ is $CH_3$.
Table 559. Formula I.13 wherein $R^1$ is Y-3C, $R^2$ is $c$-$C_3H_5$, $R^9$ is H and $R^{10}$ is H.
Table 560. Formula I.13 wherein $R^1$ is Y-3C, $R^2$ is $c$-$C_3H_5$, $R^9$ is $CH_3$ and $R^{10}$ is H.
Table 561. Formula I.13 wherein $R^1$ is Y-3C, $R^2$ is $c$-$C_3H_5$, $R^9$ is $CH_3$ and $R^{10}$ is $CH_3$.
Table 562. Formula I.13 wherein $R^1$ is Y-3D, $R^2$ is $c$-$C_3H_5$, $R^9$ is H and $R^{10}$ is H.
Table 563. Formula I.13 wherein $R^1$ is Y-3D, $R^2$ is $c$-$C_3H_5$, $R^9$ is $CH_3$ and $R^{10}$ is H.
Table 564. Formula I.13 wherein $R^1$ is Y-3D, $R^2$ is $c$-$C_3H_5$, $R^9$ is $CH_3$ and $R^{10}$ is $CH_3$.
Table 565. Formula I.13 wherein $R^1$ is Y-4A, $R^2$ is $c$-$C_3H_5$, $R^9$ is H and $R^{10}$ is H.
Table 566. Formula I.13 wherein $R^1$ is Y-4A, $R^2$ is $c$-$C_3H_5$, $R^9$ is $CH_3$ and $R^{10}$ is H.
Table 567. Formula I.13 wherein $R^1$ is Y-4A, $R^2$ is $c$-$C_3H_5$, $R^9$ is $CH_3$ and $R^{10}$ is $CH_3$.
Table 568. Formula I.13 wherein $R^1$ is Y-4B, $R^2$ is $c$-$C_3H_5$, $R^9$ is H and $R^{10}$ is H.
Table 569. Formula I.13 wherein $R^1$ is Y-4B, $R^2$ is $c$-$C_3H_5$, $R^9$ is $CH_3$ and $R^{10}$ is H.
Table 570. Formula I.13 wherein $R^1$ is Y-4B, $R^2$ is $c$-$C_3H_5$, $R^9$ is $CH_3$ and $R^{10}$ is $CH_3$.
Table 571. Formula I.13 wherein $R^1$ is Y-4C, $R^2$ is $c$-$C_3H_5$, $R^9$ is H and $R^{10}$ is H.
Table 572. Formula I.13 wherein $R^1$ is Y-4C, $R^2$ is $c$-$C_3H_5$, $R^9$ is $CH_3$ and $R^{10}$ is H.
Table 573. Formula I.13 wherein $R^1$ is Y-4C, $R^2$ is $c$-$C_3H_5$, $R^9$ is $CH_3$ and $R^{10}$ is $CH_3$.

Table 574. Formula I.13 wherein $R^1$ is Y-4D, $R^2$ is c-$C_3H_5$, $R^9$ is H and $R^{10}$ is H.
Table 575. Formula I.13 wherein $R^1$ is Y-4D, $R^2$ is c-$C_3H_5$, $R^9$ is $CH_3$ and $R^{10}$ is H.
Table 576. Formula I.13 wherein $R^1$ is Y-4D, $R^2$ is c-$C_3H_5$, $R^9$ is $CH_3$ and $R^{10}$ is $CH_3$.
Table 577. Formula I.13 wherein $R^1$ is Y-5A, $R^2$ is c-$C_3H_5$, $R^9$ is H and $R^{10}$ is H.
Table 578. Formula I.13 wherein $R^1$ is Y-5A, $R^2$ is c-$C_3H_5$, $R^9$ is $CH_3$ and $R^{10}$ is H.
Table 579. Formula I.13 wherein $R^1$ is Y-5A, $R^2$ is c-$C_3H_5$, $R^9$ is $CH_3$ and $R^{10}$ is $CH_3$.
Table 580. Formula I.13 wherein $R^1$ is Y-5B, $R^2$ is c-$C_3H_5$, $R^9$ is H and $R^{10}$ is H.
Table 581. Formula I.13 wherein $R^1$ is Y-5B, $R^2$ is c-$C_3H_5$, $R^9$ is $CH_3$ and $R^{10}$ is H.
Table 582. Formula I.13 wherein $R^1$ is Y-5B, $R^2$ is c-$C_3H_5$, $R^9$ is $CH_3$ and $R^{10}$ is $CH_3$.
Table 583. Formula I.13 wherein $R^1$ is Y-6A, $R^2$ is c-$C_3H_5$, $R^9$ is H and $R^{10}$ is H.
Table 584. Formula I.13 wherein $R^1$ is Y-6A, $R^2$ is c-$C_3H_5$, $R^9$ is $CH_3$ and $R^{10}$ is H.
Table 585. Formula I.13 wherein $R^1$ is Y-6A, $R^2$ is c-$C_3H_5$, $R^9$ is $CH_3$ and $R^{10}$ is $CH_3$.
Table 586. Formula I.13 wherein $R^1$ is Y-6B, $R^2$ is c-$C_3H_5$, $R^9$ is H and $R^{10}$ is H.
Table 587. Formula I.13 wherein $R^1$ is Y-6B, $R^2$ is c-$C_3H_5$, $R^9$ is $CH_3$ and $R^{10}$ is H.
Table 588. Formula I.13 wherein $R^1$ is Y-6B, $R^2$ is c-$C_3H_5$, $R^9$ is $CH_3$ and $R^{10}$ is $CH_3$.
Table 589. Formula I.13 wherein $R^1$ is Y-7A, $R^2$ is c-$C_3H_5$, $R^9$ is H and $R^{10}$ is H.
Table 590. Formula I.13 wherein $R^1$ is Y-7A, $R^2$ is c-$C_3H_5$, $R^9$ is $CH_3$ and $R^{10}$ is H.
Table 591. Formula I.13 wherein $R^1$ is Y-7A, $R^2$ is c-$C_3H_5$, $R^9$ is $CH_3$ and $R^{10}$ is $CH_3$.
Table 592. Formula I.13 wherein $R^1$ is Y-7B, $R^2$ is c-$C_3H_5$, $R^9$ is H and $R^{10}$ is H.
Table 593. Formula I.13 wherein $R^1$ is Y-7B, $R^2$ is c-$C_3H_5$, $R^9$ is $CH_3$ and $R^{10}$ is H.
Table 594. Formula I.13 wherein $R^1$ is Y-7B, $R^2$ is c-$C_3H_5$, $R^9$ is $CH_3$ and $R^{10}$ is $CH_3$.
Table 595. Formula I.13 wherein $R^1$ is Y-8A, $R^2$ is c-$C_3H_5$, $R^9$ is H and $R^{10}$ is H.
Table 596. Formula I.13 wherein $R^1$ is Y-8A, $R^2$ is c-$C_3H_5$, $R^9$ is $CH_3$ and $R^{10}$ is H.
Table 597. Formula I.13 wherein $R^1$ is Y-8A, $R^2$ is c-$C_3H_5$, $R^9$ is $CH_3$ and $R^{10}$ is $CH_3$.
Table 598. Formula I.13 wherein $R^1$ is Y-8B, $R^2$ is c-$C_3H_5$, $R^9$ is H and $R^{10}$ is H.
Table 599. Formula I.13 wherein $R^1$ is Y-8B, $R^2$ is c-$C_3H_5$, $R^9$ is $CH_3$ and $R^{10}$ is H.
Table 600. Formula I.13 wherein $R^1$ is Y-8B, $R^2$ is c-$C_3H_5$, $R^9$ is $CH_3$ and $R^{10}$ is $CH_3$.
Table 601. Formula I.14 wherein $R^1$ is Y-1A, $R^2$ is H, $R^9$ is H and $R^{10}$ is H.
Table 602. Formula I.14 wherein $R^1$ is Y-1A, $R^2$ is H, $R^9$ is $CH_3$ and, $R^{10}$ is H.
Table 603. Formula I.14 wherein $R^1$ is Y-1A, $R^2$ is H, $R^9$ is $CH_3$ and $R^{10}$ is $CH_3$.
Table 604. Formula I.14 wherein $R^1$ is Y-1B, $R^2$ is H, $R^9$ is H and $R^{10}$ is H.
Table 605. Formula I.14 wherein $R^1$ is Y-1B, $R^2$ is H, $R^9$ is $CH_3$ and $R^{10}$ is H.
Table 606. Formula I.14 wherein $R^1$ is Y-1B, $R^2$ is H, $R^9$ is $CH_3$ and $R^{10}$ is $CH_3$.
Table 607. Formula I.14 wherein $R^1$ is Y-2A, $R^2$ is H, $R^9$ is H and $R^{10}$ is H.
Table 608. Formula I.14 wherein $R^1$ is Y-2A, $R^2$ is H, $R^9$ is $CH_3$ and $R^{10}$ is H.
Table 609. Formula I.14 wherein $R^1$ is Y-2A, $R^2$ is H, $R^9$ is $CH_3$ and $R^{10}$ is $CH_3$.
Table 610. Formula I.14 wherein $R^1$ is Y-2B, $R^2$ is H, $R^9$ is H and $R^{10}$ is H.
Table 611. Formula I.14 wherein $R^1$ is Y-2B, $R^2$ is H, $R^9$ is $CH_3$ and $R^{10}$ is H.
Table 612. Formula I.14 wherein $R^1$ is Y-2B, $R^2$ is H, $R^9$ is $CH_3$ and $R^{10}$ is $CH_3$.
Table 613. Formula I.14 wherein $R^1$ is Y-3A, $R^2$ is H, $R^9$ is H and $R^{10}$ is H.
Table 614. Formula I.14 wherein $R^1$ is Y-3A, $R^2$ is H, $R^9$ is $CH_3$ and $R^{10}$ is H.
Table 615. Formula I.14 wherein $R^1$ is Y-3A, $R^2$ is H, $R^9$ is $CH_3$ and $R^{10}$ is $CH_3$.
Table 616. Formula I.14 wherein $R^1$ is Y-3B, $R^2$ is H, $R^9$ is H and $R^{10}$ is H.
Table 617. Formula I.14 wherein $R^1$ is Y-3B, $R^2$ is H, $R^9$ is $CH_3$ and $R^{10}$ is H.
Table 618. Formula I.14 wherein $R^1$ is Y-3B, $R^2$ is H, $R^9$ is $CH_3$ and $R^{10}$ is $CH_3$.
Table 619. Formula I.14 wherein $R^1$ is Y-3C, $R^2$ is H, $R^9$ is H and $R^{10}$ is H.
Table 620. Formula I.14 wherein $R^1$ is Y-3C, $R^2$ is H, $R^9$ is $CH_3$ and $R^{10}$ is H.
Table 621. Formula I.14 wherein $R^1$ is Y-3C, $R^2$ is H, $R^9$ is $CH_3$ and $R^{10}$ is $CH_3$.
Table 622. Formula I.14 wherein $R^1$ is Y-3D, $R^2$ is H, $R^9$ is H and $R^{10}$ is H.
Table 623. Formula I.14 wherein $R^1$ is Y-3D, $R^2$ is H, $R^9$ is $CH_3$ and $R^{10}$ is H.
Table 624. Formula I.14 wherein $R^1$ is Y-3D, $R^2$ is H, $R^9$ is $CH_3$ and $R^{10}$ is $CH_3$.
Table 625. Formula I.14 wherein $R^1$ is Y-4A, $R^2$ is H, $R^9$ is H and $R^{10}$ is H.
Table 626. Formula I.14 wherein $R^1$ is Y-4A, $R^2$ is H, $R^9$ is $CH_3$ and $R^{10}$ is H.
Table 627. Formula I.14 wherein $R^1$ is Y-4A, $R^2$ is H, $R^9$ is $CH_3$ and $R^{10}$ is $CH_3$.
Table 628. Formula I.14 wherein $R^1$ is Y-4B, $R^2$ is H, $R^9$ is H and $R^{10}$ is H.
Table 629. Formula I.14 wherein $R^1$ is Y-4B, $R^2$ is H, $R^9$ is $CH_3$ and $R^{10}$ is H.
Table 630. Formula I.14 wherein $R^1$ is Y-4B, $R^2$ is H, $R^9$ is $CH_3$ and $R^{10}$ is $CH_3$.
Table 631. Formula I.14 wherein $R^1$ is Y-4C, $R^2$ is H, $R^9$ is H and $R^{10}$ is H.
Table 632. Formula I.14 wherein $R^1$ is Y-4C, $R^2$ is H, $R^9$ is $CH_3$ and $R^{10}$ is H.
Table 633. Formula I.14 wherein $R^1$ is Y-4C, $R^2$ is H, $R^9$ is $CH_3$ and $R^{10}$ is $CH_3$.
Table 634. Formula I.14 wherein $R^1$ is Y-4D, $R^2$ is H, $R^9$ is H and $R^{10}$ is H.
Table 635. Formula I.14 wherein $R^1$ is Y-4D, $R^2$ is H, $R^9$ is $CH_3$ and $R^{10}$ is H.
Table 636. Formula I.14 wherein $R^1$ is Y-4D, $R^2$ is H, $R^9$ is $CH_3$ and $R^{10}$ is $CH_3$.
Table 637. Formula I.14 wherein $R^1$ is Y-5A, $R^2$ is H, $R^9$ is H and $R^{10}$ is H.
Table 638. Formula I.14 wherein $R^1$ is Y-5A, $R^2$ is H, $R^9$ is $CH_3$ and $R^{10}$ is H.
Table 639. Formula I.14 wherein $R^1$ is Y-5A, $R^2$ is H, $R^9$ is $CH_3$ and $R^{10}$ is $CH_3$.

Table 640. Formula I.14 wherein $R^1$ is Y-5B, $R^2$ is H, $R^9$ is H and $R^{10}$ is H.
Table 641. Formula I.14 wherein $R^1$ is Y-5B, $R^2$ is H, $R^9$ is $CH_3$ and $R^{10}$ is H.
Table 642. Formula I.14 wherein $R^1$ is Y-5B, $R^2$ is H, $R^9$ is $CH_3$ and $R^{10}$ is $CH_3$.
Table 643. Formula I.14 wherein $R^1$ is Y-6A, $R^2$ is H, $R^9$ is H and $R^{10}$ is H.
Table 644. Formula I.14 wherein $R^1$ is Y-6A, $R^2$ is H, $R^9$ is $CH_3$ and $R^{10}$ is H.
Table 645. Formula I.14 wherein $R^1$ is Y-6A, $R^2$ is H, $R^9$ is $CH_3$ and $R^{10}$ is $CH_3$.
Table 646. Formula I.14 wherein $R^1$ is Y-6B, $R^2$ is H, $R^9$ is H and $R^{10}$ is H.
Table 647. Formula I.14 wherein $R^1$ is Y-6B, $R^2$ is H, $R^9$ is $CH_3$ and $R^{10}$ is H.
Table 648. Formula I.14 wherein $R^1$ is Y-6B, $R^2$ is H, $R^9$ is $CH_3$ and $R^{10}$ is $CH_3$.
Table 649. Formula I.14 wherein $R^1$ is Y-7A, $R^2$ is H, $R^9$ is H and $R^{10}$ is H.
Table 650. Formula I.14 wherein $R^1$ is Y-7A, $R^2$ is H, $R^9$ is $CH_3$ and $R^{10}$ is H.
Table 651. Formula I.14 wherein $R^1$ is Y-7A, $R^2$ is H, $R^9$ is $CH_3$ and $R^{10}$ is $CH_3$.
Table 652. Formula I.14 wherein $R^1$ is Y-7B, $R^2$ is H, $R^9$ is H and $R^{10}$ is H.
Table 653. Formula I.14 wherein $R^1$ is Y-7B, $R^2$ is H, $R^9$ is $CH_3$ and $R^{10}$ is H.
Table 654. Formula I.14 wherein $R^1$ is Y-7B, $R^2$ is H, $R^9$ is $CH_3$ and $R^{10}$ is $CH_3$.
Table 655. Formula I.14 wherein $R^1$ is Y-8A, $R^2$ is H, $R^9$ is H and $R^{10}$ is H.
Table 656. Formula I.14 wherein $R^1$ is Y-8A, $R^2$ is H, $R^9$ is $CH_3$ and $R^{10}$ is H.
Table 657. Formula I.14 wherein $R^1$ is Y-8A, $R^2$ is H, $R^9$ is $CH_3$ and $R^{10}$ is $CH_3$.
Table 658. Formula I.14 wherein $R^1$ is Y-8B, $R^2$ is H, $R^9$ is H and $R^{10}$ is H.
Table 659. Formula I.14 wherein $R^1$ is Y-8B, $R^2$ is H, $R^9$ is $CH_3$ and $R^{10}$ is H.
Table 660. Formula I.14 wherein $R^1$ is Y-8B, $R^2$ is H, $R^9$ is $CH_3$ and $R^{10}$ is $CH_3$.
Table 661. Formula I.14 wherein $R^1$ is Y-1A, $R^2$ is $CH_3$, $R^9$ is H and $R^{10}$ is H.
Table 662. Formula I.14 wherein $R^1$ is Y-1A, $R^2$ is $CH_3$, $R^9$ is $CH_3$ and $R^{10}$ is H.
Table 663. Formula I.14 wherein $R^1$ is Y-1A, $R^2$ is $CH_3$, $R^9$ is $CH_3$ and $R^{10}$ is $CH_3$.
Table 664. Formula I.14 wherein $R^1$ is Y-1B, $R^2$ is $CH_3$, $R^9$ is H and $R^{10}$ is H.
Table 665. Formula I.14 wherein $R^1$ is Y-1B, $R^2$ is $CH_3$, $R^9$ is $CH_3$ and $R^{10}$ is H.
Table 666. Formula I.14 wherein $R^1$ is Y-1B, $R^2$ is $CH_3$, $R^9$ is $CH_3$ and $R^{10}$ is $CH_3$.
Table 667. Formula I.14 wherein $R^1$ is Y-2A, $R^2$ is $CH_3$, $R^9$ is H and $R^{10}$ is H.
Table 668. Formula I.14 wherein $R^1$ is Y-2A, $R^2$ is $CH_3$, $R^9$ is $CH_3$ and $R^{10}$ is H.
Table 669. Formula I.14 wherein $R^1$ is Y-2A, $R^2$ is $CH_3$, $R^9$ is $CH_3$ and $R^{10}$ is $CH_3$.
Table 670. Formula I.14 wherein $R^1$ is Y-2B, $R^2$ is $CH_3$, $R^9$ is H and $R^{10}$ is H.
Table 671. Formula I.14 wherein $R^1$ is Y-2B, $R^2$ is $CH_3$, $R^9$ is $CH_3$ and $R^{10}$ is H.
Table 672. Formula I.14 wherein $R^1$ is Y-2B, $R^2$ is $CH_3$, $R^9$ is $CH_3$ and $R^{10}$ is $CH_3$.
Table 673. Formula I.14 wherein $R^1$ is Y-3A, $R^2$ is $CH_3$, $R^9$ is H and $R^{10}$ is H.
Table 674. Formula I.14 wherein $R^1$ is Y-3A, $R^2$ is $CH_3$, $R^9$ is $CH_3$ and $R^{10}$ is H.
Table 675. Formula I.14 wherein $R^1$ is Y-3A, $R^2$ is $CH_3$, $R^9$ is $CH_3$ and $R^{10}$ is $CH_3$.
Table 676. Formula I.14 wherein $R^1$ is Y-3B, $R^2$ is $CH_3$, $R^9$ is H and $R^{10}$ is H.
Table 677. Formula I.14 wherein $R^1$ is Y-3B, $R^2$ is $CH_3$, $R^9$ is $CH_3$ and $R^{10}$ is H.
Table 678. Formula I.14 wherein $R^1$ is Y-3B, $R^2$ is $CH_3$, $R^9$ is $CH_3$ and $R^{10}$ is $CH_3$.
Table 679. Formula I.14 wherein $R^1$ is Y-3C, $R^2$ is $CH_3$, $R^9$ is H and $R^{10}$ is H.
Table 680. Formula I.14 wherein $R^1$ is Y-3C, $R^2$ is $CH_3$, $R^9$ is $CH_3$ and $R^{10}$ is H.
Table 681. Formula I.14 wherein $R^1$ is Y-3C, $R^2$ is $CH_3$, $R^9$ is $CH_3$ and $R^{10}$ is $CH_3$.
Table 682. Formula I.14 wherein $R^1$ is Y-3D, $R^2$ is $CH_3$, $R^9$ is H and $R^{10}$ is H.
Table 683. Formula I.14 wherein $R^1$ is Y-3D, $R^2$ is $CH_3$, $R^9$ is $CH_3$ and $R^{10}$ is H.
Table 684. Formula I.14 wherein $R^1$ is Y-3D, $R^2$ is $CH_3$, $R^9$ is $CH_3$ and $R^{10}$ is $CH_3$.
Table 685. Formula I.14 wherein $R^1$ is Y-4A, $R^2$ is $CH_3$, $R^9$ is H and $R^{10}$ is H.
Table 686. Formula I.14 wherein $R^1$ is Y-4A, $R^2$ is $CH_3$, $R^9$ is $CH_3$ and $R^{10}$ is H.
Table 687. Formula I.14 wherein $R^1$ is Y-4A, $R^2$ is $CH_3$, $R^9$ is $CH_3$ and $R^{10}$ is $CH_3$.
Table 688. Formula I.14 wherein $R^1$ is Y-4B, $R^2$ is $CH_3$, $R^9$ is H and $R^{10}$ is H.
Table 689. Formula I.14 wherein $R^1$ is Y-4B, $R^2$ is $CH_3$, $R^9$ is $CH_3$ and $R^{10}$ is H.
Table 690. Formula I.14 wherein $R^1$ is Y-4B, $R^2$ is $CH_3$, $R^9$ is $CH_3$ and $R^{10}$ is $CH_3$.
Table 691. Formula I.14 wherein $R^1$ is Y-4C, $R^2$ is $CH_3$, $R^9$ is H and $R^{10}$ is H.
Table 692. Formula I.14 wherein $R^1$ is Y-4C, $R^2$ is $CH_3$, $R^9$ is $CH_3$ and $R^{10}$ is H.
Table 693. Formula I.14 wherein $R^1$ is Y-4C, $R^2$ is $CH_3$, $R^9$ is $CH_3$ and $R^{10}$ is $CH_3$.
Table 694. Formula I.14 wherein $R^1$ is Y-4D, $R^2$ is $CH_3$, $R^9$ is H and $R^{10}$ is H.
Table 695. Formula I.14 wherein $R^1$ is Y-4D, $R^2$ is $CH_3$, $R^9$ is $CH_3$ and $R^{10}$ is H.
Table 696. Formula I.14 wherein $R^1$ is Y-4D, $R^2$ is $CH_3$, $R^9$ is $CH_3$ and $R^{10}$ is $CH_3$.
Table 697. Formula I.14 wherein $R^1$ is Y-5A, $R^2$ is $CH_3$, $R^9$ is H and $R^{10}$ is H.
Table 698. Formula I.14 wherein $R^1$ is Y-5A, $R^2$ is $CH_3$, $R^9$ is $CH_3$ and $R^{10}$ is H.
Table 699. Formula I.14 wherein $R^1$ is Y-5A, $R^2$ is $CH_3$, $R^9$ is $CH_3$ and $R^{10}$ is $CH_3$.
Table 700. Formula I.14 wherein $R^1$ is Y-5B, $R^2$ is $CH_3$, $R^9$ is H and $R^{10}$ is H.
Table 701. Formula I.14 wherein $R^1$ is Y-5B, $R^2$ is $CH_3$, $R^9$ is $CH_3$ and $R^{10}$ is H.
Table 702. Formula I.14 wherein $R^1$ is Y-5B, $R^2$ is $CH_3$, $R^9$ is $CH_3$ and $R^{10}$ is $CH_3$.
Table 703. Formula I.14 wherein $R^1$ is Y-6A, $R^2$ is $CH_3$, $R^9$ is H and $R^{10}$ is H.
Table 704. Formula I.14 wherein $R^1$ is Y-6A, $R^2$ is $CH_3$, $R^9$ is $CH_3$ and $R^{10}$ is H.
Table 705. Formula I.14 wherein $R^1$ is Y-6A, $R^2$ is $CH_3$, $R^9$ is $CH_3$ and $R^{10}$ is $CH_3$.

Table 706. Formula I.14 wherein $R^1$ is Y-6B, $R^2$ is $CH_3$, $R^9$ is H and $R^{10}$ is H.
Table 707. Formula I.14 wherein $R^1$ is Y-6B, $R^2$ is $CH_3$, $R^9$ is $CH_3$ and $R^{10}$ is H.
Table 708. Formula I.14 wherein $R^1$ is Y-6B, $R^2$ is $CH_3$, $R^9$ is $CH_3$ and $R^{10}$ is $CH_3$.
Table 709. Formula I.14 wherein $R^1$ is Y-7A, $R^2$ is $CH_3$, $R^9$ is H and $R^{10}$ is H.
Table 710. Formula I.14 wherein $R^1$ is Y-7A, $R^2$ is $CH_3$, $R^9$ is $CH_3$ and $R^{10}$ is H.
Table 711. Formula I.14 wherein $R^1$ is Y-7A, $R^2$ is $CH_3$, $R^9$ is $CH_3$ and $R^{10}$ is $CH_3$.
Table 712. Formula I.14 wherein $R^1$ is Y-7B, $R^2$ is $CH_3$, $R^9$ is H and $R^{10}$ is H.
Table 713. Formula I.14 wherein $R^1$ is Y-7B, $R^2$ is $CH_3$, $R^9$ is $CH_3$ and $R^{10}$ is H.
Table 714. Formula I.14 wherein $R^1$ is Y-7B, $R^2$ is $CH_3$, $R^9$ is $CH_3$ and $R^{10}$ is $CH_3$.
Table 715. Formula I.14 wherein $R^1$ is Y-8A, $R^2$ is $CH_3$, $R^9$ is H and $R^{10}$ is H.
Table 716. Formula I.14 wherein $R^1$ is Y-8A, $R^2$ is $CH_3$, $R^9$ is $CH_3$ and $R^{10}$ is H.
Table 717. Formula I.14 wherein $R^1$ is Y-8A, $R^2$ is $CH_3$, $R^9$ is $CH_3$ and $R^{10}$ is $CH_3$.
Table 718. Formula I.14 wherein $R^1$ is Y-8B, $R^2$ is $CH_3$, $R^9$ is H and $R^{10}$ is H.
Table 719. Formula I.14 wherein $R^1$ is Y-8B, $R^2$ is $CH_3$, $R^9$ is $CH_3$ and $R^{10}$ is H.
Table 720. Formula I.14 wherein $R^1$ is Y-8B, $R^2$ is $CH_3$, $R^9$ is $CH_3$ and $R^{10}$ is $CH_3$.
Table 721. Formula I.14 wherein $R^1$ is Y-1A, $R^2$ is $C_2H_5$, $R^9$ is H and $R^{10}$ is H.
Table 722. Formula I.14 wherein $R^1$ is Y-1A, $R^2$ is $C_2H_5$, $R^9$ is $CH_3$ and $R^{10}$ is H.
Table 723. Formula I.14 wherein $R^1$ is Y-1A, $R^2$ is $C_2H_5$, $R^9$ is $CH_3$ and $R^{10}$ is $CH_3$.
Table 724. Formula I.14 wherein $R^1$ is Y-1B, $R^2$ is $C_2H_5$, $R^9$ is H and $R^{10}$ is H.
Table 725. Formula I.14 wherein $R^1$ is Y-1B, $R^2$ is $C_2H_5$, $R^9$ is $CH_3$ and $R^{10}$ is H.
Table 726. Formula I.14 wherein $R^1$ is Y-1B, $R^2$ is $C_2H_5$, $R^9$ is $CH_3$ and $R^{10}$ is $CH_3$.
Table 727. Formula I.14 wherein $R^1$ is Y-2A, $R^2$ is $C_2H_5$, $R^9$ is H and $R^{10}$ is H.
Table 728. Formula I.14 wherein $R^1$ is Y-2A, $R^2$ is $C_2H_5$, $R^9$ is $CH_3$ and $R^{10}$ is H.
Table 729. Formula I.14 wherein $R^1$ is Y-2A, $R^2$ is $C_2H_5$, $R^9$ is $CH_3$ and $R^{10}$ is $CH_3$.
Table 730. Formula I.14 wherein $R^1$ is Y-2B, $R^2$ is $C_2H_5$, $R^9$ is H and $R^{10}$ is H.
Table 731. Formula I.14 wherein $R^1$ is Y-2B, $R^2$ is $C_2H_5$, $R^9$ is $CH_3$ and $R^{10}$ is H.
Table 732. Formula I.14 wherein $R^1$ is Y-2B, $R^2$ is $C_2H_5$, $R^9$ is $CH_3$ and $R^{10}$ is $CH_3$.
Table 733. Formula I.14 wherein $R^1$ is Y-3A, $R^2$ is $C_2H_5$, $R^9$ is H and $R^{10}$ is H.
Table 734. Formula I.14 wherein $R^1$ is Y-3A, $R^2$ is $C_2H_5$, $R^9$ is $CH_3$ and $R^{10}$ is H.
Table 735. Formula I.14 wherein $R^1$ is Y-3A, $R^2$ is $C_2H_5$, $R^9$ is $CH_3$ and $R^{10}$ is $CH_3$.
Table 736. Formula I.14 wherein $R^1$ is Y-3B, $R^2$ is $C_2H_5$, $R^9$ is H and $R^{10}$ is H.
Table 737. Formula I.14 wherein $R^1$ is Y-3B, $R^2$ is $C_2H_5$, $R^9$ is $CH_3$ and $R^{10}$ is H.
Table 738. Formula I.14 wherein $R^1$ is Y-3B, $R^2$ is $C_2H_5$, $R^9$ is $CH_3$ and $R^{10}$ is $CH_3$.
Table 739. Formula I.14 wherein $R^1$ is Y-3C, $R^2$ is $C_2H_5$, $R^9$ is H and $R^{10}$ is H.
Table 740. Formula I.14 wherein $R^1$ is Y-3C, $R^2$ is $C_2H_5$, $R^9$ is $CH_3$ and $R^{10}$ is H.
Table 741. Formula I.14 wherein $R^1$ is Y-3C, $R^2$ is $C_2H_5$, $R^9$ is $CH_3$ and $R^{10}$ is $CH_3$.
Table 742. Formula I.14 wherein $R^1$ is Y-3D, $R^2$ is $C_2H_5$, $R^9$ is H and $R^{10}$ is H.
Table 743. Formula I.14 wherein $R^1$ is Y-3D, $R^2$ is $C_2H_5$, $R^9$ is $CH_3$ and $R^{10}$ is H.
Table 744. Formula I.14 wherein $R^1$ is Y-3D, $R^2$ is $C_2H_5$, $R^9$ is $CH_3$ and $R^{10}$ is $CH_3$.
Table 745. Formula I.14 wherein $R^1$ is Y-4A, $R^2$ is $C_2H_5$, $R^9$ is H and $R^{10}$ is H.
Table 746. Formula I.14 wherein $R^1$ is Y-4A, $R^2$ is $C_2H_5$, $R^9$ is $CH_3$ and $R^{10}$ is H.
Table 747. Formula I.14 wherein $R^1$ is Y-4A, $R^2$ is $C_2H_5$, $R^9$ is $CH_3$ and $R^{10}$ is $CH_3$.
Table 748. Formula I.14 wherein $R^1$ is Y-4B, $R^2$ is $C_2H_5$, $R^9$ is H and $R^{10}$ is H.
Table 749. Formula I.14 wherein $R^1$ is Y-4B, $R^2$ is $C_2H_5$, $R^9$ is $CH_3$ and $R^{10}$ is H.
Table 750. Formula I.14 wherein $R^1$ is Y-4B, $R^2$ is $C_2H_5$, $R^9$ is $CH_3$ and $R^{10}$ is $CH_3$.
Table 751. Formula I.14 wherein $R^1$ is Y-4C, $R^2$ is $C_2H_5$, $R^9$ is H and $R^{10}$ is H.
Table 752. Formula I.14 wherein $R^1$ is Y-4C, $R^2$ is $C_2H_5$, $R^9$ is $CH_3$ and $R^{10}$ is H.
Table 753. Formula I.14 wherein $R^1$ is Y-4C, $R^2$ is $C_2H_5$, $R^9$ is $CH_3$ and $R^{10}$ is $CH_3$.
Table 754. Formula I.14 wherein $R^1$ is Y-4D, $R^2$ is $C_2H_5$, $R^9$ is H and $R^{10}$ is H.
Table 755. Formula I.14 wherein $R^1$ is Y-4D, $R^2$ is $C_2H_5$, $R^9$ is $CH_3$ and $R^{10}$ is H.
Table 756. Formula I.14 wherein $R^1$ is Y-4D, $R^2$ is $C_2H_5$, $R^9$ is $CH_3$ and $R^{10}$ is $CH_3$.
Table 757. Formula I.14 wherein $R^1$ is Y-5A, $R^2$ is $C_2H_5$, $R^9$ is H and $R^{10}$ is H.
Table 758. Formula I.14 wherein $R^1$ is Y-5A, $R^2$ is $C_2H_5$, $R^9$ is $CH_3$ and $R^{10}$ is H.
Table 759. Formula I.14 wherein $R^1$ is Y-5A, $R^2$ is $C_2H_5$, $R^9$ is $CH_3$ and $R^{10}$ is $CH_3$.
Table 760. Formula I.14 wherein $R^1$ is Y-5B, $R^2$ is $C_2H_5$, $R^9$ is H and $R^{10}$ is H.
Table 761. Formula I.14 wherein $R^1$ is Y-5B, $R^2$ is $C_2H_5$, $R^9$ is $CH_3$ and $R^{10}$ is H.
Table 762. Formula I.14 wherein $R^1$ is Y-5B, $R^2$ is $C_2H_5$, $R^9$ is $CH_3$ and $R^{10}$ is $CH_3$.
Table 763. Formula I.14 wherein $R^1$ is Y-6A, $R^2$ is $C_2H_5$, $R^9$ is H and $R^{10}$ is H.
Table 764. Formula I.14 wherein $R^1$ is Y-6A, $R^2$ is $C_2H_5$, $R^9$ is $CH_3$ and $R^{10}$ is H.
Table 765. Formula I.14 wherein $R^1$ is Y-6A, $R^2$ is $C_2H_5$, $R^9$ is $CH_3$ and $R^{10}$ is $CH_3$.
Table 766. Formula I.14 wherein $R^1$ is Y-6B, $R^2$ is $C_2H_5$, $R^9$ is H and $R^{10}$ is H.
Table 767. Formula I.14 wherein $R^1$ is Y-6B, $R^2$ is $C_2H_5$, $R^9$ is $CH_3$ and $R^{10}$ is H.
Table 768. Formula I.14 wherein $R^1$ is Y-6B, $R^2$ is $C_2H_5$, $R^9$ is $CH_3$ and $R^{10}$ is $CH_3$.
Table 769. Formula I.14 wherein $R^1$ is Y-7A, $R^2$ is $C_2H_5$, $R^9$ is H and $R^{10}$ is H.
Table 770. Formula I.14 wherein $R^1$ is Y-7A, $R^2$ is $C_2H_5$, $R^9$ is $CH_3$ and $R^{10}$ is H.
Table 771. Formula I.14 wherein $R^1$ is Y-7A, $R^2$ is $C_2H_5$, $R^9$ is $CH_3$ and $R^{10}$ is $CH_3$.

Table 772. Formula I.14 wherein $R^1$ is Y-7B, $R^2$ is $C_2H_5$, $R^9$ is H and $R^{10}$ is H.
Table 773. Formula I.14 wherein $R^1$ is Y-7B, $R^2$ is $C_2H_5$, $R^9$ is $CH_3$ and $R^{10}$ is H.
Table 774. Formula I.14 wherein $R^1$ is Y-7B, $R^2$ is $C_2H_5$, $R^9$ is $CH_3$ and $R^{10}$ is $CH_3$.
Table 775. Formula I.14 wherein $R^1$ is Y-8A, $R^2$ is $C_2H_5$, $R^9$ is H and $R^{10}$ is H.
Table 776. Formula I.14 wherein $R^1$ is Y-8A, $R^2$ is $C_2H_5$, $R^9$ is $CH_3$ and $R^{10}$ is H.
Table 777. Formula I.14 wherein $R^1$ is Y-8A, $R^2$ is $C_2H_5$, $R^9$ is $CH_3$ and $R^{10}$ is $CH_3$.
Table 778. Formula I.14 wherein $R^1$ is Y-8B, $R^2$ is $C_2H_5$, $R^9$ is H and $R^{10}$ is H.
Table 779. Formula I.14 wherein $R^1$ is Y-8B, $R^2$ is $C_2H_5$, $R^9$ is $CH_3$ and $R^{10}$ is H.
Table 780. Formula I.14 wherein $R^1$ is Y-8B, $R^2$ is $C_2H_5$, $R^9$ is $CH_3$ and $R^{10}$ is $CH_3$.
Table 781. Formula I.14 wherein $R^1$ is Y-1A, $R^2$ is c-$C_3H_5$, $R^9$ is H and $R^{10}$ is H.
Table 782. Formula I.14 wherein $R^1$ is Y-1A, $R^2$ is c-$C_3H_5$, $R^9$ is $CH_3$ and $R^{10}$ is H.
Table 783. Formula I.14 wherein $R^1$ is Y-1A, $R^2$ is c-$C_3H_5$, $R^9$ is $CH_3$ and $R^{10}$ is $CH_3$.
Table 784. Formula I.14 wherein $R^1$ is Y-1B, $R^2$ is c-$C_3H_5$, $R^9$ is H and $R^{10}$ is H.
Table 785. Formula I.14 wherein $R^1$ is Y-1B, $R^2$ is c-$C_3H_5$, $R^9$ is $CH_3$, $R^{10}$ is H.
Table 786. Formula I.14 wherein $R^1$ is Y-1B, $R^2$ is c-$C_3H_5$, $R^9$ is $CH_3$ and $R^{10}$ is $CH_3$.
Table 787. Formula I.14 wherein $R^1$ is Y-2A, $R^2$ is c-$C_3H_5$, $R^9$ is H and $R^{10}$ is H.
Table 788. Formula I.14 wherein $R^1$ is Y-2A, $R^2$ is c-$C_3H_5$, $R^9$ is $CH_3$ and $R^{10}$ is H.
Table 789. Formula I.14 wherein $R^1$ is Y-2A, $R^2$ is c-$C_3H_5$, $R^9$ is $CH_3$ and $R^{10}$ is $CH_3$.
Table 790. Formula I.14 wherein $R^1$ is Y-2B, $R^2$ is c-$C_3H_5$, $R^9$ is H and $R^{10}$ is H.
Table 791. Formula I.14 wherein $R^1$ is Y-2B, $R^2$ is c-$C_3H_5$, $R^9$ is $CH_3$ and $R^{10}$ is H.
Table 792. Formula I.14 wherein $R^1$ is Y-2B, $R^2$ is c-$C_3H_5$, $R^9$ is $CH_3$ and $R^{10}$ is $CH_3$.
Table 793. Formula I.14 wherein $R^1$ is Y-3A, $R^2$ is c-$C_3H_5$, $R^9$ is H and $R^{10}$ is H.
Table 794. Formula I.14 wherein $R^1$ is Y-3A, $R^2$ is c-$C_3H_5$, $R^9$ is $CH_3$ and $R^{10}$ is H.
Table 795. Formula I.14 wherein $R^1$ is Y-3A, $R^2$ is c-$C_3H_5$, $R^9$ is $CH_3$ and $R^{10}$ is $CH_3$.
Table 796. Formula I.14 wherein $R^1$ is Y-3B, $R^2$ is c-$C_3H_5$, $R^9$ is H and $R^{10}$ is H.
Table 797. Formula I.14 wherein $R^1$ is Y-3B, $R^2$ is c-$C_3H_5$, $R^9$ is $CH_3$ and $R^{10}$ is H.
Table 798. Formula I.14 wherein $R^1$ is Y-3B, $R^2$ is c-$C_3H_5$, $R^9$ is $CH_3$ and $R^{10}$ is $CH_3$.
Table 799. Formula I.14 wherein $R^1$ is Y-3C, $R^2$ is c-$C_3H_5$, $R^9$ is H and $R^{10}$ is H.
Table 800. Formula I.14 wherein $R^1$ is Y-3C, $R^2$ is c-$C_3H_5$, $R^9$ is $CH_3$ and $R^{10}$ is H.
Table 801. Formula I.14 wherein $R^1$ is Y-3C, $R^2$ is c-$C_3H_5$, $R^9$ is $CH_3$ and $R^{10}$ is $CH_3$.
Table 802. Formula I.14 wherein $R^1$ is Y-3D, $R^2$ is c-$C_3H_5$, $R^9$ is H and $R^{10}$ is H.
Table 803. Formula I.14 wherein $R^1$ is Y-3D, $R^2$ is c-$C_3H_5$, $R^9$ is $CH_3$ and $R^{10}$ is H.
Table 804. Formula I.14 wherein $R^1$ is Y-3D, $R^2$ is c-$C_3H_5$, $R^9$ is $CH_3$ and $R^{10}$ is $CH_3$.
Table 805. Formula I.14 wherein $R^1$ is Y-4A, $R^2$ is c-$C_3H_5$, $R^9$ is H and $R^{10}$ is H.
Table 806. Formula I.14 wherein $R^1$ is Y-4A, $R^2$ is c-$C_3H_5$, $R^9$ is $CH_3$ and $R^{10}$ is H.
Table 807. Formula I.14 wherein $R^1$ is Y-4A, $R^2$ is c-$C_3H_5$, $R^9$ is $CH_3$ and $R^{10}$ is $CH_3$.
Table 808. Formula I.14 wherein $R^1$ is Y-4B, $R^2$ is c-$C_3H_5$, $R^9$ is H and $R^{10}$ is H.
Table 809. Formula I.14 wherein $R^1$ is Y-4B, $R^2$ is c-$C_3H_5$, $R^9$ is $CH_3$ and $R^{10}$ is H.
Table 810. Formula I.14 wherein $R^1$ is Y-4B, $R^2$ is c-$C_3H_5$, $R^9$ is $CH_3$ and $R^{10}$ is $CH_3$.
Table 811. Formula I.14 wherein $R^1$ is Y-4C, $R^2$ is c-$C_3H_5$, $R^9$ is H and $R^{10}$ is H.
Table 812. Formula I.14 wherein $R^1$ is Y-4C, $R^2$ is c-$C_3H_5$, $R^9$ is $CH_3$ and $R^{10}$ is H.
Table 813. Formula I.14 wherein $R^1$ is Y-4C, $R^2$ is c-$C_3H_5$, $R^9$ is $CH_3$ and $R^{10}$ is $CH_3$.
Table 814. Formula I.14 wherein $R^1$ is Y-4D, $R^2$ is c-$C_3H_5$, $R^9$ is H and $R^{10}$ is H.
Table 815. Formula I.14 wherein $R^1$ is Y-4D, $R^2$ is c-$C_3H_5$, $R^9$ is $CH_3$ and $R^{10}$ is H.
Table 816. Formula I.14 wherein $R^1$ is Y-4D, $R^2$ is c-$C_3H_5$, $R^9$ is $CH_3$ and $R^{10}$ is $CH_3$.
Table 817. Formula I.14 wherein $R^1$ is Y-5A, $R^2$ is c-$C_3H_5$, $R^9$ is H and $R^{10}$ is H.
Table 818. Formula I.14 wherein $R^1$ is Y-5A, $R^2$ is c-$C_3H_5$, $R^9$ is $CH_3$ and $R^{10}$ is H.
Table 819. Formula I.14 wherein $R^1$ is Y-5A, $R^2$ is c-$C_3H_5$, $R^9$ is $CH_3$ and $R^{10}$ is $CH_3$.
Table 820. Formula I.14 wherein $R^1$ is Y-5B, $R^2$ is c-$C_3H_5$, $R^9$ is H and $R^{10}$ is H.
Table 821. Formula I.14 wherein $R^1$ is Y-5B, $R^2$ is c-$C_3H_5$, $R^9$ is $CH_3$ and $R^{10}$ is H.
Table 822. Formula I.14 wherein $R^1$ is Y-5B, $R^2$ is c-$C_3H_5$, $R^9$ is $CH_3$ and $R^{10}$ is $CH_3$.
Table 823. Formula I.14 wherein $R^1$ is Y-6A, $R^2$ is c-$C_3H_5$, $R^9$ is H and $R^{10}$ is H.
Table 824. Formula I.14 wherein $R^1$ is Y-6A, $R^2$ is c-$C_3H_5$, $R^9$ is $CH_3$ and $R^{10}$ is H.
Table 825. Formula I.14 wherein $R^1$ is Y-6A, $R^2$ is c-$C_3H_5$, $R^9$ is $CH_3$ and $R^{10}$ is $CH_3$.
Table 826. Formula I.14 wherein $R^1$ is Y-6B, $R^2$ is c-$C_3H_5$, $R^9$ is H and $R^{10}$ is H.
Table 827. Formula I.14 wherein $R^1$ is Y-6B, $R^2$ is c-$C_3H_5$, $R^9$ is $CH_3$ and $R^{10}$ is H.
Table 828. Formula I.14 wherein $R^1$ is Y-6B, $R^2$ is c-$C_3H_5$, $R^9$ is $CH_3$ and $R^{10}$ is $CH_3$.
Table 829. Formula I.14 wherein $R^1$ is Y-7A, $R^2$ is c-$C_3H_5$, $R^9$ is H and $R^{10}$ is H.
Table 830. Formula I.14 wherein $R^1$ is Y-7A, $R^2$ is c-$C_3H_5$, $R^9$ is $CH_3$ and $R^{10}$ is H.
Table 831. Formula I.14 wherein $R^1$ is Y-7A, $R^2$ is c-$C_3H_5$, $R^9$ is $CH_3$ and $R^{10}$ is $CH_3$.
Table 832. Formula I.14 wherein $R^1$ is Y-7B, $R^2$ is c-$C_3H_5$, $R^9$ is H and $R^{10}$ is H.
Table 833. Formula I.14 wherein $R^1$ is Y-7B, $R^2$ is c-$C_3H_5$, $R^9$ is $CH_3$ and $R^{10}$ is H.
Table 834. Formula I.14 wherein $R^1$ is Y-7B, $R^2$ is c-$C_3H_5$, $R^9$ is $CH_3$ and $R^{10}$ is $CH_3$.
Table 835. Formula I.14 wherein $R^1$ is Y-8A, $R^2$ is c-$C_3H_5$, $R^9$ is H and $R^{10}$ is H.
Table 836. Formula I.14 wherein $R^1$ is Y-8A, $R^2$ is c-$C_3H_5$, $R^9$ is $CH_3$ and $R^{10}$ is H.
Table 837. Formula I.14 wherein $R^1$ is Y-8A, $R^2$ is c-$C_3H_5$, $R^9$ is $CH_3$ and $R^{10}$ is $CH_3$.

Table 838. Formula I.14 wherein $R^1$ is Y-8B, $R^2$ is c-$C_3H_5$, $R^9$ is H and $R^{10}$ is H.
Table 839. Formula I.14 wherein $R^1$ is Y-8B, $R^2$ is c-$C_3H_5$, $R^9$ is $CH_3$ and $R^{10}$ is H.
Table 840. Formula I.14 wherein $R^1$ is Y-8B, $R^2$ is c-$C_3H_5$, $R^9$ is $CH_3$ and $R^{10}$ is $CH_3$.
Table 841. Formula I.17 wherein $R^1$ is Y-1A, $R^2$ is H, $R^9$ is H and $R^{10}$ is H.
Table 842. Formula I.17 wherein $R^1$ is Y-1A, $R^2$ is H, $R^9$ is $CH_3$ and, $R^{10}$ is H.
Table 843. Formula I.17 wherein $R^1$ is Y-1A, $R^2$ is H, $R^9$ is $CH_3$ and $R^{10}$ is $CH_3$.
Table 844. Formula I.17 wherein $R^1$ is Y-1B, $R^2$ is H, $R^9$ is H and $R^{10}$ is H.
Table 845. Formula I.17 wherein $R^1$ is Y-1B, $R^2$ is H, $R^9$ is $CH_3$ and $R^{10}$ is H.
Table 846. Formula I.17 wherein $R^1$ is Y-1B, $R^2$ is H, $R^9$ is $CH_3$ and $R^{10}$ is $CH_3$.
Table 847. Formula I.17 wherein $R^1$ is Y-2A, $R^2$ is H, $R^9$ is H and $R^{10}$ is H.
Table 848. Formula I.17 wherein $R^1$ is Y-2A, $R^2$ is H, $R^9$ is $CH_3$ and $R^{10}$ is H.
Table 849. Formula I.17 wherein $R^1$ is Y-2A, $R^2$ is H, $R^9$ is $CH_3$ and $R^{10}$ is $CH_3$.
Table 850. Formula I.17 wherein $R^1$ is Y-2B, $R^2$ is H, $R^9$ is H and $R^{10}$ is H.
Table 851. Formula I.17 wherein $R^1$ is Y-2B, $R^2$ is H, $R^9$ is $CH_3$ and $R^{10}$ is H.
Table 852. Formula I.17 wherein $R^1$ is Y-2B, $R^2$ is H, $R^9$ is $CH_3$ and $R^{10}$ is $CH_3$.
Table 853. Formula I.17 wherein $R^1$ is Y-3A, $R^2$ is H, $R^9$ is H and $R^{10}$ is H.
Table 854. Formula I.17 wherein $R^1$ is Y-3A, $R^2$ is H, $R^9$ is $CH_3$ and $R^{10}$ is H.
Table 855. Formula I.17 wherein $R^1$ is Y-3A, $R^2$ is H, $R^9$ is $CH_3$ and $R^{10}$ is $CH_3$.
Table 856. Formula I.17 wherein $R^1$ is Y-3B, $R^2$ is H, $R^9$ is H and $R^{10}$ is H.
Table 857. Formula I.17 wherein $R^1$ is Y-3B, $R^2$ is H, $R^9$ is $CH_3$ and $R^{10}$ is H.
Table 858. Formula I.17 wherein $R^1$ is Y-3B, $R^2$ is H, $R^9$ is $CH_3$ and $R^{10}$ is $CH_3$.
Table 859. Formula I.17 wherein $R^1$ is Y-3C, $R^2$ is H, $R^9$ is H and $R^{10}$ is H.
Table 860. Formula I.17 wherein $R^1$ is Y-3C, $R^2$ is H, $R^9$ is $CH_3$ and $R^{10}$ is H.
Table 861. Formula I.17 wherein $R^1$ is Y-3C, $R^2$ is H, $R^9$ is $CH_3$ and $R^{10}$ is $CH_3$.
Table 862. Formula I.17 wherein $R^1$ is Y-3D, $R^2$ is H, $R^9$ is H and $R^{10}$ is H.
Table 863. Formula I.17 wherein $R^1$ is Y-3D, $R^2$ is H, $R^9$ is $CH_3$ and $R^{10}$ is H.
Table 864. Formula I.17 wherein $R^1$ is Y-3D, $R^2$ is H, $R^9$ is $CH_3$ and $R^{10}$ is $CH_3$.
Table 865. Formula I.17 wherein $R^1$ is Y-4A, $R^2$ is H, $R^9$ is H and $R^{10}$ is H.
Table 866. Formula I.17 wherein $R^1$ is Y-4A, $R^2$ is H, $R^9$ is $CH_3$ and $R^{10}$ is H.
Table 867. Formula I.17 wherein $R^1$ is Y-4A, $R^2$ is H, $R^9$ is $CH_3$ and $R^{10}$ is $CH_3$.
Table 868. Formula I.17 wherein $R^1$ is Y-4B, $R^2$ is H, $R^9$ is H and $R^{10}$ is H.
Table 869. Formula I.17 wherein $R^1$ is Y-4B, $R^2$ is H, $R^9$ is $CH_3$ and $R^{10}$ is H.
Table 870. Formula I.17 wherein $R^1$ is Y-4B, $R^2$ is H, $R^9$ is $CH_3$ and $R^{10}$ is $CH_3$.
Table 871. Formula I.17 wherein $R^1$ is Y-4C, $R^2$ is H, $R^9$ is H and $R^{10}$ is H.
Table 872. Formula I.17 wherein $R^1$ is Y-4C, $R^2$ is H, $R^9$ is $CH_3$ and $R^{10}$ is H.
Table 873. Formula I.17 wherein $R^1$ is Y-4C, $R^2$ is H, $R^9$ is $CH_3$ and $R^{10}$ is $CH_3$.
Table 874. Formula I.17 wherein $R^1$ is Y-4D, $R^2$ is H, $R^9$ is H and $R^{10}$ is H.
Table 875. Formula I.17 wherein $R^1$ is Y-4D, $R^2$ is H, $R^9$ is $CH_3$ and $R^{10}$ is H.
Table 876. Formula I.17 wherein $R^1$ is Y-4D, $R^2$ is H, $R^9$ is $CH_3$ and $R^{10}$ is $CH_3$.
Table 877. Formula I.17 wherein $R^1$ is Y-5A, $R^2$ is H, $R^9$ is H and $R^{10}$ is H.
Table 878. Formula I.17 wherein $R^1$ is Y-5A, $R^2$ is H, $R^9$ is $CH_3$ and $R^{10}$ is H.
Table 879. Formula I.17 wherein $R^1$ is Y-5A, $R^2$ is H, $R^9$ is $CH_3$ and $R^{10}$ is $CH_3$.
Table 880. Formula I.17 wherein $R^1$ is Y-5B, $R^2$ is H, $R^9$ is H and $R^{10}$ is H.
Table 881. Formula I.17 wherein $R^1$ is Y-5B, $R^2$ is H, $R^9$ is $CH_3$ and $R^{10}$ is H.
Table 882. Formula I.17 wherein $R^1$ is Y-5B, $R^2$ is H, $R^9$ is $CH_3$ and $R^{10}$ is $CH_3$.
Table 883. Formula I.17 wherein $R^1$ is Y-6A, $R^2$ is H, $R^9$ is H and $R^{10}$ is H.
Table 884. Formula I.17 wherein $R^1$ is Y-6A, $R^2$ is H, $R^9$ is $CH_3$ and $R^{10}$ is H.
Table 885. Formula I.17 wherein $R^1$ is Y-6A, $R^2$ is H, $R^9$ is $CH_3$ and $R^{10}$ is $CH_3$.
Table 886. Formula I.17 wherein $R^1$ is Y-6B, $R^2$ is H, $R^9$ is H and $R^{10}$ is H.
Table 887. Formula I.17 wherein $R^1$ is Y-6B, $R^2$ is H, $R^9$ is $CH_3$ and $R^{10}$ is H.
Table 888. Formula I.17 wherein $R^1$ is Y-6B, $R^2$ is H, $R^9$ is $CH_3$ and $R^{10}$ is $CH_3$.
Table 889. Formula I.17 wherein $R^1$ is Y-7A, $R^2$ is H, $R^9$ is H and $R^{10}$ is H.
Table 890. Formula I.17 wherein $R^1$ is Y-7A, $R^2$ is H, $R^9$ is $CH_3$ and $R^{10}$ is H.
Table 891. Formula I.17 wherein $R^1$ is Y-7A, $R^2$ is H, $R^9$ is $CH_3$ and $R^{10}$ is $CH_3$.
Table 892. Formula I.17 wherein $R^1$ is Y-7B, $R^2$ is H, $R^9$ is H and $R^{10}$ is H.
Table 893. Formula I.17 wherein $R^1$ is Y-7B, $R^2$ is H, $R^9$ is $CH_3$ and $R^{10}$ is H.
Table 894. Formula I.17 wherein $R^1$ is Y-7B, $R^2$ is H, $R^9$ is $CH_3$ and $R^{10}$ is $CH_3$.
Table 895. Formula I.17 wherein $R^1$ is Y-8A, $R^2$ is H, $R^9$ is H and $R^{10}$ is H.
Table 896. Formula I.17 wherein $R^1$ is Y-8A, $R^2$ is H, $R^9$ is $CH_3$ and $R^{10}$ is H.
Table 897. Formula I.17 wherein $R^1$ is Y-8A, $R^2$ is H, $R^9$ is $CH_3$ and $R^{10}$ is $CH_3$.
Table 898. Formula I.17 wherein $R^1$ is Y-8B, $R^2$ is H, $R^9$ is H and $R^{10}$ is H.
Table 899. Formula I.17 wherein $R^1$ is Y-8B, $R^2$ is H, $R^9$ is $CH_3$ and $R^{10}$ is H.
Table 900. Formula I.17 wherein $R^1$ is Y-8B, $R^2$ is H, $R^9$ is $CH_3$ and $R^{10}$ is $CH_3$.
Table 901. Formula I.17 wherein $R^1$ is Y-1A, $R^2$ is $CH_3$, $R^9$ is H and $R^{10}$ is H.
Table 902. Formula I.17 wherein $R^1$ is Y-1A, $R^2$ is $CH_3$, $R^9$ is $CH_3$ and $R^{10}$ is H.
Table 903. Formula I.17 wherein $R^1$ is Y-1A, $R^2$ is $CH_3$, $R^9$ is $CH_3$ and $R^{10}$ is $CH_3$.

Table 904. Formula I.17 wherein $R^1$ is Y-1B, $R^2$ is $CH_3$, $R^9$ is H and $R^{10}$ is H.
Table 905. Formula I.17 wherein $R^1$ is Y-1B, $R^2$ is $CH_3$, $R^9$ is $CH_3$ and $R^{10}$ is H.
Table 906. Formula I.17 wherein $R^1$ is Y-1B, $R^2$ is $CH_3$, $R^9$ is $CH_3$ and $R^{10}$ is $CH_3$.
Table 907. Formula I.17 wherein $R^1$ is Y-2A, $R^2$ is $CH_3$, $R^9$ is H and $R^{10}$ is H.
Table 908. Formula I.17 wherein $R^1$ is Y-2A, $R^2$ is $CH_3$, $R^9$ is $CH_3$ and $R^{10}$ is H.
Table 909. Formula I.17 wherein $R^1$ is Y-2A, $R^2$ is $CH_3$, $R^9$ is $CH_3$ and $R^{10}$ is $CH_3$.
Table 910. Formula I.17 wherein $R^1$ is Y-2B, $R^2$ is $CH_3$, $R^9$ is H and $R^{10}$ is H.
Table 911. Formula I.17 wherein $R^1$ is Y-2B, $R^2$ is $CH_3$, $R^9$ is $CH_3$ and $R^{10}$ is H.
Table 912. Formula I.17 wherein $R^1$ is Y-2B, $R^2$ is $CH_3$, $R^9$ is $CH_3$ and $R^{10}$ is $CH_3$.
Table 913. Formula I.17 wherein $R^1$ is Y-3A, $R^2$ is $CH_3$, $R^9$ is H and $R^{10}$ is H.
Table 914. Formula I.17 wherein $R^1$ is Y-3A, $R^2$ is $CH_3$, $R^9$ is $CH_3$ and $R^{10}$ is H.
Table 915. Formula I.17 wherein $R^1$ is Y-3A, $R^2$ is $CH_3$, $R^9$ is $CH_3$ and $R^{10}$ is $CH_3$.
Table 916. Formula I.17 wherein $R^1$ is Y-3B, $R^2$ is $CH_3$, $R^9$ is H and $R^{10}$ is H.
Table 917. Formula I.17 wherein $R^1$ is Y-3B, $R^2$ is $CH_3$, $R^9$ is $CH_3$ and $R^{10}$ is H.
Table 918. Formula I.17 wherein $R^1$ is Y-3B, $R^2$ is $CH_3$, $R^9$ is $CH_3$ and $R^{10}$ is $CH_3$.
Table 919. Formula I.17 wherein $R^1$ is Y-3C, $R^2$ is $CH_3$, $R^9$ is H and $R^{10}$ is H.
Table 920. Formula I.17 wherein $R^1$ is Y-3C, $R^2$ is $CH_3$, $R^9$ is $CH_3$ and $R^{10}$ is H.
Table 921. Formula I.17 wherein $R^1$ is Y-3C, $R^2$ is $CH_3$, $R^9$ is $CH_3$ and $R^{10}$ is $CH_3$.
Table 922. Formula I.17 wherein $R^1$ is Y-3D, $R^2$ is $CH_3$, $R^9$ is H and $R^{10}$ is H.
Table 923. Formula I.17 wherein $R^1$ is Y-3D, $R^2$ is $CH_3$, $R^9$ is $CH_3$ and $R^{10}$ is H.
Table 924. Formula I.17 wherein $R^1$ is Y-3D, $R^2$ is $CH_3$, $R^9$ is $CH_3$ and $R^{10}$ is $CH_3$.
Table 925. Formula I.17 wherein $R^1$ is Y-4A, $R^2$ is $CH_3$, $R^9$ is H and $R^{10}$ is H.
Table 926. Formula I.17 wherein $R^1$ is Y-4A, $R^2$ is $CH_3$, $R^9$ is $CH_3$ and $R^{10}$ is H.
Table 927. Formula I.17 wherein $R^1$ is Y-4A, $R^2$ is $CH_3$, $R^9$ is $CH_3$ and $R^{10}$ is $CH_3$.
Table 928. Formula I.17 wherein $R^1$ is Y-4B, $R^2$ is $CH_3$, $R^9$ is H and $R^{10}$ is H.
Table 929. Formula I.17 wherein $R^1$ is Y-4B, $R^2$ is $CH_3$, $R^9$ is $CH_3$ and $R^{10}$ is H.
Table 930. Formula I.17 wherein $R^1$ is Y-4B, $R^2$ is $CH_3$, $R^9$ is $CH_3$ and $R^{10}$ is $CH_3$.
Table 931. Formula I.17 wherein $R^1$ is Y-4C, $R^2$ is $CH_3$, $R^9$ is H and $R^{10}$ is H.
Table 932. Formula I.17 wherein $R^1$ is Y-4C, $R^2$ is $CH_3$, $R^9$ is $CH_3$ and $R^{10}$ is H.
Table 933. Formula I.17 wherein $R^1$ is Y-4C, $R^2$ is $CH_3$, $R^9$ is $CH_3$ and $R^{10}$ is $CH_3$.
Table 934. Formula I.17 wherein $R^1$ is Y-4D, $R^2$ is $CH_3$, $R^9$ is H and $R^{10}$ is H.
Table 935. Formula I.17 wherein $R^1$ is Y-4D, $R^2$ is $CH_3$, $R^9$ is $CH_3$ and $R^{10}$ is H.
Table 936. Formula I.17 wherein $R^1$ is Y-4D, $R^2$ is $CH_3$, $R^9$ is $CH_3$ and $R^{10}$ is $CH_3$.
Table 937. Formula I.17 wherein $R^1$ is Y-5A, $R^2$ is $CH_3$, $R^9$ is H and $R^{10}$ is H.
Table 938. Formula I.17 wherein $R^1$ is Y-5A, $R^2$ is $CH_3$, $R^9$ is $CH_3$ and $R^{10}$ is H.
Table 939. Formula I.17 wherein $R^1$ is Y-5A, $R^2$ is $CH_3$, $R^9$ is $CH_3$ and $R^{10}$ is $CH_3$.
Table 940. Formula I.17 wherein $R^1$ is Y-5B, $R^2$ is $CH_3$, $R^9$ is H and $R^{10}$ is H.
Table 941. Formula I.17 wherein $R^1$ is Y-5B, $R^2$ is $CH_3$, $R^9$ is $CH_3$ and $R^{10}$ is H.
Table 942. Formula I.17 wherein $R^1$ is Y-5B, $R^2$ is $CH_3$, $R^9$ is $CH_3$ and $R^{10}$ is $CH_3$.
Table 943. Formula I.17 wherein $R^1$ is Y-6A, $R^2$ is $CH_3$, $R^9$ is H and $R^{10}$ is H.
Table 944. Formula I.17 wherein $R^1$ is Y-6A, $R^2$ is $CH_3$, $R^9$ is $CH_3$ and $R^{10}$ is H.
Table 945. Formula I.17 wherein $R^1$ is Y-6A, $R^2$ is $CH_3$, $R^9$ is $CH_3$ and $R^{10}$ is $CH_3$.
Table 946. Formula I.17 wherein $R^1$ is Y-6B, $R^2$ is $CH_3$, $R^9$ is H and $R^{10}$ is H.
Table 947. Formula I.17 wherein $R^1$ is Y-6B, $R^2$ is $CH_3$, $R^9$ is $CH_3$ and $R^{10}$ is H.
Table 948. Formula I.17 wherein $R^1$ is Y-6B, $R^2$ is $CH_3$, $R^9$ is $CH_3$ and $R^{10}$ is $CH_3$.
Table 949. Formula I.17 wherein $R^1$ is Y-7A, $R^2$ is $CH_3$, $R^9$ is H and $R^{10}$ is H.
Table 950. Formula I.17 wherein $R^1$ is Y-7A, $R^2$ is $CH_3$, $R^9$ is $CH_3$ and $R^{10}$ is H.
Table 951. Formula I.17 wherein $R^1$ is Y-7A, $R^2$ is $CH_3$, $R^9$ is $CH_3$ and $R^{10}$ is $CH_3$.
Table 952. Formula I.17 wherein $R^1$ is Y-7B, $R^2$ is $CH_3$, $R^9$ is H and $R^{10}$ is H.
Table 953. Formula I.17 wherein $R^1$ is Y-7B, $R^2$ is $CH_3$, $R^9$ is $CH_3$ and $R^{10}$ is H.
Table 954. Formula I.17 wherein $R^1$ is Y-7B, $R^2$ is $CH_3$, $R^9$ is $CH_3$ and $R^{10}$ is $CH_3$.
Table 955. Formula I.17 wherein $R^1$ is Y-8A, $R^2$ is $CH_3$, $R^9$ is H and $R^{10}$ is H.
Table 956. Formula I.17 wherein $R^1$ is Y-8A, $R^2$ is $CH_3$, $R^9$ is $CH_3$ and $R^{10}$ is H.
Table 957. Formula I.17 wherein $R^1$ is Y-8A, $R^2$ is $CH_3$, $R^9$ is $CH_3$ and $R^{10}$ is $CH_3$.
Table 958. Formula I.17 wherein $R^1$ is Y-8B, $R^2$ is $CH_3$, $R^9$ is H and $R^{10}$ is H.
Table 959. Formula I.17 wherein $R^1$ is Y-8B, $R^2$ is $CH_3$, $R^9$ is $CH_3$ and $R^{10}$ is H.
Table 960. Formula I.17 wherein $R^1$ is Y-8B, $R^2$ is $CH_3$, $R^9$ is $CH_3$ and $R^{10}$ is $CH_3$.
Table 961. Formula I.17 wherein $R^1$ is Y-1A, $R^2$ is $C_2H_5$, $R^9$ is H and $R^{10}$ is H.
Table 962. Formula I.17 wherein $R^1$ is Y-1A, $R^2$ is $C_2H_5$, $R^9$ is $CH_3$ and $R^{10}$ is H.
Table 963. Formula I.17 wherein $R^1$ is Y-1A, $R^2$ is $C_2H_5$, $R^9$ is $CH_3$ and $R^{10}$ is $CH_3$.
Table 964. Formula I.17 wherein $R^1$ is Y-1B, $R^2$ is $C_2H_5$, $R^9$ is H and $R^{10}$ is H.
Table 965. Formula I.17 wherein $R^1$ is Y-1B, $R^2$ is $C_2H_5$, $R^9$ is $CH_3$ and $R^{10}$ is H.
Table 966. Formula I.17 wherein $R^1$ is Y-1B, $R^2$ is $C_2H_5$, $R^9$ is $CH_3$ and $R^{10}$ is $CH_3$.
Table 967. Formula I.17 wherein $R^1$ is Y-2A, $R^2$ is $C_2H_5$, $R^9$ is H and $R^{10}$ is H.
Table 968. Formula I.17 wherein $R^1$ is Y-2A, $R^2$ is $C_2H_5$, $R^9$ is $CH_3$ and $R^{10}$ is H.
Table 969. Formula I.17 wherein $R^1$ is Y-2A, $R^2$ is $C_2H_5$, $R^9$ is $CH_3$ and $R^{10}$ is $CH_3$.

Table 970. Formula I.17 wherein $R^1$ is Y-2B, $R^2$ is $C_2H_5$, $R^9$ is H and $R^{10}$ is H.
Table 971. Formula I.17 wherein $R^1$ is Y-2B, $R^2$ is $C_2H_5$, $R^9$ is $CH_3$ and $R^{10}$ is H.
Table 972. Formula I.17 wherein $R^1$ is Y-2B, $R^2$ is $C_2H_5$, $R^9$ is $CH_3$ and $R^{10}$ is $CH_3$.
Table 973. Formula I.17 wherein $R^1$ is Y-3A, $R^2$ is $C_2H_5$, $R^9$ is H and $R^{10}$ is H.
Table 974. Formula I.17 wherein $R^1$ is Y-3A, $R^2$ is $C_2H_5$, $R^9$ is $CH_3$ and $R^{10}$ is H.
Table 975. Formula I.17 wherein $R^1$ is Y-3A, $R^2$ is $C_2H_5$, $R^9$ is $CH_3$ and $R^{10}$ is $CH_3$.
Table 976. Formula I.17 wherein $R^1$ is Y-3B, $R^2$ is $C_2H_5$, $R^9$ is H and $R^{10}$ is H.
Table 977. Formula I.17 wherein $R^1$ is Y-3B, $R^2$ is $C_2H_5$, $R^9$ is $CH_3$ and $R^{10}$ is H.
Table 978. Formula I.17 wherein $R^1$ is Y-3B, $R^2$ is $C_2H_5$, $R^9$ is $CH_3$ and $R^{10}$ is $CH_3$.
Table 979. Formula I.17 wherein $R^1$ is Y-3C, $R^2$ is $C_2H_5$, $R^9$ is H and $R^{10}$ is H.
Table 980. Formula I.17 wherein $R^1$ is Y-3C, $R^2$ is $C_2H_5$, $R^9$ is $CH_3$ and $R^{10}$ is H.
Table 981. Formula I.17 wherein $R^1$ is Y-3C, $R^2$ is $C_2H_5$, $R^9$ is $CH_3$ and $R^{10}$ is $CH_3$.
Table 982. Formula I.17 wherein $R^1$ is Y-3D, $R^2$ is $C_2H_5$, $R^9$ is H and $R^{10}$ is H.
Table 983. Formula I.17 wherein $R^1$ is Y-3D, $R^2$ is $C_2H_5$, $R^9$ is $CH_3$ and $R^{10}$ is H.
Table 984. Formula I.17 wherein $R^1$ is Y-3D, $R^2$ is $C_2H_5$, $R^9$ is $CH_3$ and $R^{10}$ is $CH_3$.
Table 985. Formula I.17 wherein $R^1$ is Y-4A, $R^2$ is $C_2H_5$, $R^9$ is H and $R^{10}$ is H.
Table 986. Formula I.17 wherein $R^1$ is Y-4A, $R^2$ is $C_2H_5$, $R^9$ is $CH_3$ and $R^{10}$ is H.
Table 987. Formula I.17 wherein $R^1$ is Y-4A, $R^2$ is $C_2H_5$, $R^9$ is $CH_3$ and $R^{10}$ is $CH_3$.
Table 988. Formula I.17 wherein $R^1$ is Y-4B, $R^2$ is $C_2H_5$, $R^9$ is H and $R^{10}$ is H.
Table 989. Formula I.17 wherein $R^1$ is Y-4B, $R^2$ is $C_2H_5$, $R^9$ is $CH_3$ and $R^{10}$ is H.
Table 990. Formula I.17 wherein $R^1$ is Y-4B, $R^2$ is $C_2H_5$, $R^9$ is $CH_3$ and $R^{10}$ is $CH_3$.
Table 991. Formula I.17 wherein $R^1$ is Y-4C, $R^2$ is $C_2H_5$, $R^9$ is H and $R^{10}$ is H.
Table 992. Formula I.17 wherein $R^1$ is Y-4C, $R^2$ is $C_2H_5$, $R^9$ is $CH_3$ and $R^{10}$ is H.
Table 993. Formula I.17 wherein $R^1$ is Y-4C, $R^2$ is $C_2H_5$, $R^9$ is $CH_3$ and $R^{10}$ is $CH_3$.
Table 994. Formula I.17 wherein $R^1$ is Y-4D, $R^2$ is $C_2H_5$, $R^9$ is H and $R^{10}$ is H.
Table 995. Formula I.17 wherein $R^1$ is Y-4D, $R^2$ is $C_2H_5$, $R^9$ is $CH_3$ and $R^{10}$ is H.
Table 996. Formula I.17 wherein $R^1$ is Y-4D, $R^2$ is $C_2H_5$, $R^9$ is $CH_3$ and $R^{10}$ is $CH_3$.
Table 997. Formula I.17 wherein $R^1$ is Y-5A, $R^2$ is $C_2H_5$, $R^9$ is H and $R^{10}$ is H.
Table 998. Formula I.17 wherein $R^1$ is Y-5A, $R^2$ is $C_2H_5$, $R^9$ is $CH_3$ and $R^{10}$ is H.
Table 999. Formula I.17 wherein $R^1$ is Y-5A, $R^2$ is $C_2H_5$, $R^9$ is $CH_3$ and $R^{10}$ is $CH_3$.
Table 1000. Formula I.17 wherein $R^1$ is Y-5B, $R^2$ is $C_2H_5$, $R^9$ is H and $R^{10}$ is H.
Table 1001. Formula I.17 wherein $R^1$ is Y-5B, $R^2$ is $C_2H_5$, $R^9$ is $CH_3$ and $R^{10}$ is H.
Table 1002. Formula I.17 wherein $R^1$ is Y-5B, $R^2$ is $C_2H_5$, $R^9$ is $CH_3$ and $R^{10}$ is $CH_3$.
Table 1003. Formula I.17 wherein $R^1$ is Y-6A, $R^2$ is $C_2H_5$, $R^9$ is H and $R^{10}$ is H.
Table 1004. Formula I.17 wherein $R^1$ is Y-6A, $R^2$ is $C_2H_5$, $R^9$ is $CH_3$ and $R^{10}$ is H.
Table 1005. Formula I.17 wherein $R^1$ is Y-6A, $R^2$ is $C_2H_5$, $R^9$ is $CH_3$ and $R^{10}$ is $CH_3$.
Table 1006. Formula I.17 wherein $R^1$ is Y-6B, $R^2$ is $C_2H_5$, $R^9$ is H and $R^{10}$ is H.
Table 1007. Formula I.17 wherein $R^1$ is Y-6B, $R^2$ is $C_2H_5$, $R^9$ is $CH_3$ and $R^{10}$ is H.
Table 1008. Formula I.17 wherein $R^1$ is Y-6B, $R^2$ is $C_2H_5$, $R^9$ is $CH_3$ and $R^{10}$ is $CH_3$.
Table 1009. Formula I.17 wherein $R^1$ is Y-7A, $R^2$ is $C_2H_5$, $R^9$ is H and $R^{10}$ is H.
Table 1010. Formula I.17 wherein $R^1$ is Y-7A, $R^2$ is $C_2H_5$, $R^9$ is $CH_3$ and $R^{10}$ is H.
Table 1011. Formula I.17 wherein $R^1$ is Y-7A, $R^2$ is $C_2H_5$, $R^9$ is $CH_3$ and $R^{10}$ is $CH_3$.
Table 1012. Formula I.17 wherein $R^1$ is Y-7B, $R^2$ is $C_2H_5$, $R^9$ is H and $R^{10}$ is H.
Table 1013. Formula I.17 wherein $R^1$ is Y-7B, $R^2$ is $C_2H_5$, $R^9$ is $CH_3$ and $R^{10}$ is H.
Table 1014. Formula I.17 wherein $R^1$ is Y-7B, $R^2$ is $C_2H_5$, $R^9$ is $CH_3$ and $R^{10}$ is $CH_3$.
Table 1015. Formula I.17 wherein $R^1$ is Y-8A, $R^2$ is $C_2H_5$, $R^9$ is H and $R^{10}$ is H.
Table 1016. Formula I.17 wherein $R^1$ is Y-8A, $R^2$ is $C_2H_5$, $R^9$ is $CH_3$ and $R^{10}$ is H.
Table 1017. Formula I.17 wherein $R^1$ is Y-8A, $R^2$ is $C_2H_5$, $R^9$ is $CH_3$ and $R^{10}$ is $CH_3$.
Table 1018. Formula I.17 wherein $R^1$ is Y-8B, $R^2$ is $C_2H_5$, $R^9$ is H and $R^{10}$ is H.
Table 1019. Formula I.17 wherein $R^1$ is Y-8B, $R^2$ is $C_2H_5$, $R^9$ is $CH_3$ and $R^{10}$ is H.
Table 1020. Formula I.17 wherein $R^1$ is Y-8B, $R^2$ is $C_2H_5$, $R^9$ is $CH_3$ and $R^{10}$ is $CH_3$.
Table 1021. Formula I.17 wherein $R^1$ is Y-1A, $R^2$ is $c$-$C_3H_5$, $R^9$ is H and $R^{10}$ is H.
Table 1022. Formula I.17 wherein $R^1$ is Y-1A, $R^2$ is $c$-$C_3H_5$, $R^9$ is $CH_3$ and $R^{10}$ is H.
Table 1023. Formula I.17 wherein $R^1$ is Y-1A, $R^2$ is $c$-$C_3H_5$, $R^9$ is $CH_3$ and $R^{10}$ is $CH_3$.
Table 1024. Formula I.17 wherein $R^1$ is Y-1B, $R^2$ is $c$-$C_3H_5$, $R^9$ is H and $R^{10}$ is H.
Table 1025. Formula I.17 wherein $R^1$ is Y-1B, $R^2$ is $c$-$C_3H_5$, $R^9$ is $CH_3$, $R^{10}$ is H.
Table 1026. Formula I.17 wherein $R^1$ is Y-1B, $R^2$ is $c$-$C_3H_5$, $R^9$ is $CH_3$ and $R^{10}$ is $CH_3$.
Table 1027. Formula I.17 wherein $R^1$ is Y-2A, $R^2$ is $c$-$C_3H_5$, $R^9$ is H and $R^{10}$ is H.
Table 1028. Formula I.17 wherein $R^1$ is Y-2A, $R^2$ is $c$-$C_3H_5$, $R^9$ is $CH_3$ and $R^{10}$ is H.
Table 1029. Formula I.17 wherein $R^1$ is Y-2A, $R^2$ is $c$-$C_3H_5$, $R^9$ is $CH_3$ and $R^{10}$ is $CH_3$.
Table 1030. Formula I.17 wherein $R^1$ is Y-2B, $R^2$ is $c$-$C_3H_5$, $R^9$ is H and $R^{10}$ is H.
Table 1031. Formula I.17 wherein $R^1$ is Y-2B, $R^2$ is $c$-$C_3H_5$, $R^9$ is $CH_3$ and $R^{10}$ is H.
Table 1032. Formula I.17 wherein $R^1$ is Y-2B, $R^2$ is $c$-$C_3H_5$, $R^9$ is $CH_3$ and $R^{10}$ is $CH_3$.
Table 1033. Formula I.17 wherein $R^1$ is Y-3A, $R^2$ is $c$-$C_3H_5$, $R^9$ is H and $R^{10}$ is H.
Table 1034. Formula I.17 wherein $R^1$ is Y-3A, $R^2$ is $c$-$C_3H_5$, $R^9$ is $CH_3$ and $R^{10}$ is H.
Table 1035. Formula I.17 wherein $R^1$ is Y-3A, $R^2$ is $c$-$C_3H_5$, $R^9$ is $CH_3$ and $R^{10}$ is $CH_3$.

Table 1036. Formula I.17 wherein $R^1$ is Y-3B, $R^2$ is c-$C_3H_5$, $R^9$ is H and $R^{10}$ is H.
Table 1037. Formula I.17 wherein $R^1$ is Y-3B, $R^2$ is c-$C_3H_5$, $R^9$ is $CH_3$ and $R^{10}$ is H.
Table 1038. Formula I.17 wherein $R^1$ is Y-3B, $R^2$ is c-$C_3H_5$, $R^9$ is $CH_3$ and $R^{10}$ is $CH_3$.
Table 1039. Formula I.17 wherein $R^1$ is Y-3C, $R^2$ is c-$C_3H_5$, $R^9$ is H and $R^{10}$ is H.
Table 1040. Formula I.17 wherein $R^1$ is Y-3C, $R^2$ is c-$C_3H_5$, $R^9$ is $CH_3$ and $R^{10}$ is H.
Table 1041. Formula I.17 wherein $R^1$ is Y-3C, $R^2$ is c-$C_3H_5$, $R^9$ is $CH_3$ and $R^{10}$ is $CH_3$.
Table 1042. Formula I.17 wherein $R^1$ is Y-3D, $R^2$ is c-$C_3H_5$, $R^9$ is H and $R^{10}$ is H.
Table 1043. Formula I.17 wherein $R^1$ is Y-3D, $R^2$ is c-$C_3H_5$, $R^9$ is $CH_3$ and $R^{10}$ is H.
Table 1044. Formula I.17 wherein $R^1$ is Y-3D, $R^2$ is c-$C_3H_5$, $R^9$ is $CH_3$ and $R^{10}$ is $CH_3$.
Table 1045. Formula I.17 wherein $R^1$ is Y-4A, $R^2$ is c-$C_3H_5$, $R^9$ is H and $R^{10}$ is H.
Table 1046. Formula I.17 wherein $R^1$ is Y-4A, $R^2$ is c-$C_3H_5$, $R^9$ is $CH_3$ and $R^{10}$ is H.
Table 1047. Formula I.17 wherein $R^1$ is Y-4A, $R^2$ is c-$C_3H_5$, $R^9$ is $CH_3$ and $R^{10}$ is $CH_3$.
Table 1048. Formula I.17 wherein $R^1$ is Y-4B, $R^2$ is c-$C_3H_5$, $R^9$ is H and $R^{10}$ is H.
Table 1049. Formula I.17 wherein $R^1$ is Y-4B, $R^2$ is c-$C_3H_5$, $R^9$ is $CH_3$ and $R^{10}$ is H.
Table 1050. Formula I.17 wherein $R^1$ is Y-4B, $R^2$ is c-$C_3H_5$, $R^9$ is $CH_3$ and $R^{10}$ is $CH_3$.
Table 1051. Formula I.17 wherein $R^1$ is Y-4C, $R^2$ is c-$C_3H_5$, $R^9$ is H and $R^{10}$ is H.
Table 1052. Formula I.17 wherein $R^1$ is Y-4C, $R^2$ is c-$C_3H_5$, $R^9$ is $CH_3$ and $R^{10}$ is H.
Table 1053. Formula I.17 wherein $R^1$ is Y-4C, $R^2$ is c-$C_3H_5$, $R^9$ is $CH_3$ and $R^{10}$ is $CH_3$.
Table 1054. Formula I.17 wherein $R^1$ is Y-4D, $R^2$ is c-$C_3H_5$, $R^9$ is H and $R^{10}$ is H.
Table 1055. Formula I.17 wherein $R^1$ is Y-4D, $R^2$ is c-$C_3H_5$, $R^9$ is $CH_3$ and $R^{10}$ is H.
Table 1056. Formula I.17 wherein $R^1$ is Y-4D, $R^2$ is c-$C_3H_5$, $R^9$ is $CH_3$ and $R^{10}$ is $CH_3$.
Table 1057. Formula I.17 wherein $R^1$ is Y-5A, $R^2$ is c-$C_3H_5$, $R^9$ is H and $R^{10}$ is H.
Table 1058. Formula I.17 wherein $R^1$ is Y-5A, $R^2$ is c-$C_3H_5$, $R^9$ is $CH_3$ and $R^{10}$ is H.
Table 1059. Formula I.17 wherein $R^1$ is Y-5A, $R^2$ is c-$C_3H_5$, $R^9$ is $CH_3$ and $R^{10}$ is $CH_3$.
Table 1060. Formula I.17 wherein $R^1$ is Y-5B, $R^2$ is c-$C_3H_5$, $R^9$ is H and $R^{10}$ is H.
Table 1061. Formula I.17 wherein $R^1$ is Y-5B, $R^2$ is c-$C_3H_5$, $R^9$ is $CH_3$ and $R^{10}$ is H.
Table 1062. Formula I.17 wherein $R^1$ is Y-5B, $R^2$ is c-$C_3H_5$, $R^9$ is $CH_3$ and $R^{10}$ is $CH_3$.
Table 1063. Formula I.17 wherein $R^1$ is Y-6A, $R^2$ is c-$C_3H_5$, $R^9$ is H and $R^{10}$ is H.
Table 1064. Formula I.17 wherein $R^1$ is Y-6A, $R^2$ is c-$C_3H_5$, $R^9$ is $CH_3$ and $R^{10}$ is H.
Table 1065. Formula I.17 wherein $R^1$ is Y-6A, $R^2$ is c-$C_3H_5$, $R^9$ is $CH_3$ and $R^{10}$ is $CH_3$.
Table 1066. Formula I.17 wherein $R^1$ is Y-6B, $R^2$ is c-$C_3H_5$, $R^9$ is H and $R^{10}$ is H.
Table 1067. Formula I.17 wherein $R^1$ is Y-6B, $R^2$ is c-$C_3H_5$, $R^9$ is $CH_3$ and $R^{10}$ is H.
Table 1068. Formula I.17 wherein $R^1$ is Y-6B, $R^2$ is c-$C_3H_5$, $R^9$ is $CH_3$ and $R^{10}$ is $CH_3$.
Table 1069. Formula I.17 wherein $R^1$ is Y-7A, $R^2$ is c-$C_3H_5$, $R^9$ is H and $R^{10}$ is H.
Table 1070. Formula I.17 wherein $R^1$ is Y-7A, $R^2$ is c-$C_3H_5$, $R^9$ is $CH_3$ and $R^{10}$ is H.
Table 1071. Formula I.17 wherein $R^1$ is Y-7A, $R^2$ is c-$C_3H_5$, $R^9$ is $CH_3$ and $R^{10}$ is $CH_3$.
Table 1072. Formula I.17 wherein $R^1$ is Y-7B, $R^2$ is c-$C_3H_5$, $R^9$ is H and $R^{10}$ is H.
Table 1073. Formula I.17 wherein $R^1$ is Y-7B, $R^2$ is c-$C_3H_5$, $R^9$ is $CH_3$ and $R^{10}$ is H.
Table 1074. Formula I.17 wherein $R^1$ is Y-7B, $R^2$ is c-$C_3H_5$, $R^9$ is $CH_3$ and $R^{10}$ is $CH_3$.
Table 1075. Formula I.17 wherein $R^1$ is Y-8A, $R^2$ is c-$C_3H_5$, $R^9$ is H and $R^{10}$ is H.
Table 1076. Formula I.17 wherein $R^1$ is Y-8A, $R^2$ is c-$C_3H_5$, $R^9$ is $CH_3$ and $R^{10}$ is H.
Table 1077. Formula I.17 wherein $R^1$ is Y-8A, $R^2$ is c-$C_3H_5$, $R^9$ is $CH_3$ and $R^{10}$ is $CH_3$.
Table 1078. Formula I.17 wherein $R^1$ is Y-8B, $R^2$ is c-$C_3H_5$, $R^9$ is H and $R^{10}$ is H.
Table 1079. Formula I.17 wherein $R^1$ is Y-8B, $R^2$ is c-$C_3H_5$, $R^9$ is $CH_3$ and $R^{10}$ is H.
Table 1080. Formula I.17 wherein $R^1$ is Y-8B, $R^2$ is c-$C_3H_5$, $R^9$ is $CH_3$ and $R^{10}$ is $CH_3$.
Table 1081. Formula I.18 wherein $R^1$ is Y-1A, $R^2$ is H, $R^9$ is H and $R^{10}$ is H.
Table 1082. Formula I.18 wherein $R^1$ is Y-1A, $R^2$ is H, $R^9$ is $CH_3$ and, $R^{10}$ is H.
Table 1083. Formula I.18 wherein $R^1$ is Y-1A, $R^2$ is H, $R^9$ is $CH_3$ and $R^{10}$ is $CH_3$.
Table 1084. Formula I.18 wherein $R^1$ is Y-1B, $R^2$ is H, $R^9$ is H and $R^{10}$ is H.
Table 1085. Formula I.18 wherein $R^1$ is Y-1B, $R^2$ is H, $R^9$ is $CH_3$ and $R^{10}$ is H.
Table 1086. Formula I.18 wherein $R^1$ is Y-1B, $R^2$ is H, $R^9$ is $CH_3$ and $R^{10}$ is $CH_3$.
Table 1087. Formula I.18 wherein $R^1$ is Y-2A, $R^2$ is H, $R^9$ is H and $R^{10}$ is H.
Table 1088. Formula I.18 wherein $R^1$ is Y-2A, $R^2$ is H, $R^9$ is $CH_3$ and $R^{10}$ is H.
Table 1089. Formula I.18 wherein $R^1$ is Y-2A, $R^2$ is H, $R^9$ is $CH_3$ and $R^{10}$ is $CH_3$.
Table 1090. Formula I.18 wherein $R^1$ is Y-2B, $R^2$ is H, $R^9$ is H and $R^{10}$ is H.
Table 1091. Formula I.18 wherein $R^1$ is Y-2B, $R^2$ is H, $R^9$ is $CH_3$ and $R^{10}$ is H.
Table 1092. Formula I.18 wherein $R^1$ is Y-2B, $R^2$ is H, $R^9$ is $CH_3$ and $R^{10}$ is $CH_3$.
Table 1093. Formula I.18 wherein $R^1$ is Y-3A, $R^2$ is H, $R^9$ is H and $R^{10}$ is H.
Table 1094. Formula I.18 wherein $R^1$ is Y-3A, $R^2$ is H, $R^9$ is $CH_3$ and $R^{10}$ is H.
Table 1095. Formula I.18 wherein $R^1$ is Y-3A, $R^2$ is H, $R^9$ is $CH_3$ and $R^{10}$ is $CH_3$.
Table 1096. Formula I.18 wherein $R^1$ is Y-3B, $R^2$ is H, $R^9$ is H and $R^{10}$ is H.
Table 1097. Formula I.18 wherein $R^1$ is Y-3B, $R^2$ is H, $R^9$ is $CH_3$ and $R^{10}$ is H.
Table 1098. Formula I.18 wherein $R^1$ is Y-3B, $R^2$ is H, $R^9$ is $CH_3$ and $R^{10}$ is $CH_3$.
Table 1099. Formula I.18 wherein $R^1$ is Y-3C, $R^2$ is H, $R^9$ is H and $R^{10}$ is H.
Table 1100. Formula I.18 wherein $R^1$ is Y-3C, $R^2$ is H, $R^9$ is $CH_3$ and $R^{10}$ is H.
Table 1101. Formula I.18 wherein $R^1$ is Y-3C, $R^2$ is H, $R^9$ is $CH_3$ and $R^{10}$ is $CH_3$.

Table 1102. Formula I.18 wherein $R^1$ is Y-3D, $R^2$ is H, $R^9$ is H and $R^{10}$ is H.
Table 1103. Formula I.18 wherein $R^1$ is Y-3D, $R^2$ is H, $R^9$ is $CH_3$ and $R^{10}$ is H.
Table 1104. Formula I.18 wherein $R^1$ is Y-3D, $R^2$ is H, $R^9$ is $CH_3$ and $R^{10}$ is $CH_3$.
Table 1105. Formula I.18 wherein $R^1$ is Y-4A, $R^2$ is H, $R^9$ is H and $R^{10}$ is H.
Table 1106. Formula I.18 wherein $R^1$ is Y-4A, $R^2$ is H, $R^9$ is $CH_3$ and $R^{10}$ is H.
Table 1107. Formula I.18 wherein $R^1$ is Y-4A, $R^2$ is H, $R^9$ is $CH_3$ and $R^{10}$ is $CH_3$.
Table 1108. Formula I.18 wherein $R^1$ is Y-4B, $R^2$ is H, $R^9$ is H and $R^{10}$ is H.
Table 1109. Formula I.18 wherein $R^1$ is Y-4B, $R^2$ is H, $R^9$ is $CH_3$ and $R^{10}$ is H.
Table 1110. Formula I.18 wherein $R^1$ is Y-4B, $R^2$ is H, $R^9$ is $CH_3$ and $R^{10}$ is $CH_3$.
Table 1111. Formula I.18 wherein $R^1$ is Y-4C, $R^2$ is H, $R^9$ is H and $R^{10}$ is H.
Table 1112. Formula I.18 wherein $R^1$ is Y-4C, $R^2$ is H, $R^9$ is $CH_3$ and $R^{10}$ is H.
Table 1113. Formula I.18 wherein $R^1$ is Y-4C, $R^2$ is H, $R^9$ is $CH_3$ and $R^{10}$ is $CH_3$.
Table 1114. Formula I.18 wherein $R^1$ is Y-4D, $R^2$ is H, $R^9$ is H and $R^{10}$ is H.
Table 1115. Formula I.18 wherein $R^1$ is Y-4D, $R^2$ is H, $R^9$ is $CH_3$ and $R^{10}$ is H.
Table 1116. Formula I.18 wherein $R^1$ is Y-4D, $R^2$ is H, $R^9$ is $CH_3$ and $R^{10}$ is $CH_3$.
Table 1117. Formula I.18 wherein $R^1$ is Y-5A, $R^2$ is H, $R^9$ is H and $R^{10}$ is H.
Table 1118. Formula I.18 wherein $R^1$ is Y-5A, $R^2$ is H, $R^9$ is $CH_3$ and $R^{10}$ is H.
Table 1119. Formula I.18 wherein $R^1$ is Y-5A, $R^2$ is H, $R^9$ is $CH_3$ and $R^{10}$ is $CH_3$.
Table 1120. Formula I.18 wherein $R^1$ is Y-5B, $R^2$ is H, $R^9$ is H and $R^{10}$ is H.
Table 1121. Formula I.18 wherein $R^1$ is Y-5B, $R^2$ is H, $R^9$ is $CH_3$ and $R^{10}$ is H.
Table 1122. Formula I.18 wherein $R^1$ is Y-5B, $R^2$ is H, $R^9$ is $CH_3$ and $R^{10}$ is $CH_3$.
Table 1123. Formula I.18 wherein $R^1$ is Y-6A, $R^2$ is H, $R^9$ is H and $R^{10}$ is H.
Table 1124. Formula I.18 wherein $R^1$ is Y-6A, $R^2$ is H, $R^9$ is $CH_3$ and $R^{10}$ is H.
Table 1125. Formula I.18 wherein $R^1$ is Y-6A, $R^2$ is H, $R^9$ is $CH_3$ and $R^{10}$ is $CH_3$.
Table 1126. Formula I.18 wherein $R^1$ is Y-6B, $R^2$ is H, $R^9$ is H and $R^{10}$ is H.
Table 1127. Formula I.18 wherein $R^1$ is Y-6B, $R^2$ is H, $R^9$ is $CH_3$ and $R^{10}$ is H.
Table 1128. Formula I.18 wherein $R^1$ is Y-6B, $R^2$ is H, $R^9$ is $CH_3$ and $R^{10}$ is $CH_3$.
Table 1129. Formula I.18 wherein $R^1$ is Y-7A, $R^2$ is H, $R^9$ is H and $R^{10}$ is H.
Table 1130. Formula I.18 wherein $R^1$ is Y-7A, $R^2$ is H, $R^9$ is $CH_3$ and $R^{10}$ is H.
Table 1131. Formula I.18 wherein $R^1$ is Y-7A, $R^2$ is H, $R^9$ is $CH_3$ and $R^{10}$ is $CH_3$.
Table 1132. Formula I.18 wherein $R^1$ is Y-7B, $R^2$ is H, $R^9$ is H and $R^{10}$ is H.
Table 1133. Formula I.18 wherein $R^1$ is Y-7B, $R^2$ is H, $R^9$ is $CH_3$ and $R^{10}$ is H.
Table 1134. Formula I.18 wherein $R^1$ is Y-7B, $R^2$ is H, $R^9$ is $CH_3$ and $R^{10}$ is $CH_3$.
Table 1135. Formula I.18 wherein $R^1$ is Y-8A, $R^2$ is H, $R^9$ is H and $R^{10}$ is H.
Table 1136. Formula I.18 wherein $R^1$ is Y-8A, $R^2$ is H, $R^9$ is $CH_3$ and $R^{10}$ is H.
Table 1137. Formula I.18 wherein $R^1$ is Y-8A, $R^2$ is H, $R^9$ is $CH_3$ and $R^{10}$ is $CH_3$.
Table 1138. Formula I.18 wherein $R^1$ is Y-8B, $R^2$ is H, $R^9$ is H and $R^{10}$ is H.
Table 1139. Formula I.18 wherein $R^1$ is Y-8B, $R^2$ is H, $R^9$ is $CH_3$ and $R^{10}$ is H.
Table 1140. Formula I.18 wherein $R^1$ is Y-8B, $R^2$ is H, $R^9$ is $CH_3$ and $R^{10}$ is $CH_3$.
Table 1141. Formula I.18 wherein $R^1$ is Y-1A, $R^2$ is $CH_3$, $R^9$ is H and $R^{10}$ is H.
Table 1142. Formula I.18 wherein $R^1$ is Y-1A, $R^2$ is $CH_3$, $R^9$ is $CH_3$ and $R^{10}$ is H.
Table 1143. Formula I.18 wherein $R^1$ is Y-1A, $R^2$ is $CH_3$, $R^9$ is $CH_3$ and $R^{10}$ is $CH_3$.
Table 1144. Formula I.18 wherein $R^1$ is Y-1B, $R^2$ is $CH_3$, $R^9$ is H and $R^{10}$ is H.
Table 1145. Formula I.18 wherein $R^1$ is Y-1B, $R^2$ is $CH_3$, $R^9$ is $CH_3$ and $R^{10}$ is H.
Table 1146. Formula I.18 wherein $R^1$ is Y-1B, $R^2$ is $CH_3$, $R^9$ is $CH_3$ and $R^{10}$ is $CH_3$.
Table 1147. Formula I.18 wherein $R^1$ is Y-2A, $R^2$ is $CH_3$, $R^9$ is H and $R^{10}$ is H.
Table 1148. Formula I.18 wherein $R^1$ is Y-2A, $R^2$ is $CH_3$, $R^9$ is $CH_3$ and $R^{10}$ is H.
Table 1149. Formula I.18 wherein $R^1$ is Y-2A, $R^2$ is $CH_3$, $R^9$ is $CH_3$ and $R^{10}$ is $CH_3$.
Table 1150. Formula I.18 wherein $R^1$ is Y-2B, $R^2$ is $CH_3$, $R^9$ is H and $R^{10}$ is H.
Table 1151. Formula I.18 wherein $R^1$ is Y-2B, $R^2$ is $CH_3$, $R^9$ is $CH_3$ and $R^{10}$ is H.
Table 1152. Formula I.18 wherein $R^1$ is Y-2B, $R^2$ is $CH_3$, $R^9$ is $CH_3$ and $R^{10}$ is $CH_3$.
Table 1153. Formula I.18 wherein $R^1$ is Y-3A, $R^2$ is $CH_3$, $R^9$ is H and $R^{10}$ is H.
Table 1154. Formula I.18 wherein $R^1$ is Y-3A, $R^2$ is $CH_3$, $R^9$ is $CH_3$ and $R^{10}$ is H.
Table 1155. Formula I.18 wherein $R^1$ is Y-3A, $R^2$ is $CH_3$, $R^9$ is $CH_3$ and $R^{10}$ is $CH_3$.
Table 1156. Formula I.18 wherein $R^1$ is Y-3B, $R^2$ is $CH_3$, $R^9$ is H and $R^{10}$ is H.
Table 1157. Formula I.18 wherein $R^1$ is Y-3B, $R^2$ is $CH_3$, $R^9$ is $CH_3$ and $R^{10}$ is H.
Table 1158. Formula I.18 wherein $R^1$ is Y-3B, $R^2$ is $CH_3$, $R^9$ is $CH_3$ and $R^{10}$ is $CH_3$.
Table 1159. Formula I.18 wherein $R^1$ is Y-3C, $R^2$ is $CH_3$, $R^9$ is H and $R^{10}$ is H.
Table 1160. Formula I.18 wherein $R^1$ is Y-3C, $R^2$ is $CH_3$, $R^9$ is $CH_3$ and $R^{10}$ is H.
Table 1161. Formula I.18 wherein $R^1$ is Y-3C, $R^2$ is $CH_3$, $R^9$ is $CH_3$ and $R^{10}$ is $CH_3$.
Table 1162. Formula I.18 wherein $R^1$ is Y-3D, $R^2$ is $CH_3$, $R^9$ is H and $R^{10}$ is H.
Table 1163. Formula I.18 wherein $R^1$ is Y-3D, $R^2$ is $CH_3$, $R^9$ is $CH_3$ and $R^{10}$ is H.
Table 1164. Formula I.18 wherein $R^1$ is Y-3D, $R^2$ is $CH_3$, $R^9$ is $CH_3$ and $R^{10}$ is $CH_3$.
Table 1165. Formula I.18 wherein $R^1$ is Y-4A, $R^2$ is $CH_3$, $R^9$ is H and $R^{10}$ is H.
Table 1166. Formula I.18 wherein $R^1$ is Y-4A, $R^2$ is $CH_3$, $R^9$ is $CH_3$ and $R^{10}$ is H.
Table 1167. Formula I.18 wherein $R^1$ is Y-4A, $R^2$ is $CH_3$, $R^9$ is $CH_3$ and $R^{10}$ is $CH_3$.

Table 1168. Formula I.18 wherein $R^1$ is Y-4B, $R^2$ is $CH_3$, $R^9$ is H and $R^{10}$ is H.
Table 1169. Formula I.18 wherein $R^1$ is Y-4B, $R^2$ is $CH_3$, $R^9$ is $CH_3$ and $R^{10}$ is H.
Table 1170. Formula I.18 wherein $R^1$ is Y-4B, $R^2$ is $CH_3$, $R^9$ is $CH_3$ and $R^{10}$ is $CH_3$.
Table 1171. Formula I.18 wherein $R^1$ is Y-4C, $R^2$ is $CH_3$, $R^9$ is H and $R^{10}$ is H.
Table 1172. Formula I.18 wherein $R^1$ is Y-4C, $R^2$ is $CH_3$, $R^9$ is $CH_3$ and $R^{10}$ is H.
Table 1173. Formula I.18 wherein $R^1$ is Y-4C, $R^2$ is $CH_3$, $R^9$ is $CH_3$ and $R^{10}$ is $CH_3$.
Table 1174. Formula I.18 wherein $R^1$ is Y-4D, $R^2$ is $CH_3$, $R^9$ is H and $R^{10}$ is H.
Table 1175. Formula I.18 wherein $R^1$ is Y-4D, $R^2$ is $CH_3$, $R^9$ is $CH_3$ and $R^{10}$ is H.
Table 1176. Formula I.18 wherein $R^1$ is Y-4D, $R^2$ is $CH_3$, $R^9$ is $CH_3$ and $R^{10}$ is $CH_3$.
Table 1177. Formula I.18 wherein $R^1$ is Y-5A, $R^2$ is $CH_3$, $R^9$ is H and $R^{10}$ is H.
Table 1178. Formula I.18 wherein $R^1$ is Y-5A, $R^2$ is $CH_3$, $R^9$ is $CH_3$ and $R^{10}$ is H.
Table 1179. Formula I.18 wherein $R^1$ is Y-5A, $R^2$ is $CH_3$, $R^9$ is $CH_3$ and $R^{10}$ is $CH_3$.
Table 1180. Formula I.18 wherein $R^1$ is Y-5B, $R^2$ is $CH_3$, $R^9$ is H and $R^{10}$ is H.
Table 1181. Formula I.18 wherein $R^1$ is Y-5B, $R^2$ is $CH_3$, $R^9$ is $CH_3$ and $R^{10}$ is H.
Table 1182. Formula I.18 wherein $R^1$ is Y-5B, $R^2$ is $CH_3$, $R^9$ is $CH_3$ and $R^{10}$ is $CH_3$.
Table 1183. Formula I.18 wherein $R^1$ is Y-6A, $R^2$ is $CH_3$, $R^9$ is H and $R^{10}$ is H.
Table 1184. Formula I.18 wherein $R^1$ is Y-6A, $R^2$ is $CH_3$, $R^9$ is $CH_3$ and $R^{10}$ is H.
Table 1185. Formula I.18 wherein $R^1$ is Y-6A, $R^2$ is $CH_3$, $R^9$ is $CH_3$ and $R^{10}$ is $CH_3$.
Table 1186. Formula I.18 wherein $R^1$ is Y-6B, $R^2$ is $CH_3$, $R^9$ is H and $R^{10}$ is H.
Table 1187. Formula I.18 wherein $R^1$ is Y-6B, $R^2$ is $CH_3$, $R^9$ is $CH_3$ and $R^{10}$ is H.
Table 1188. Formula I.18 wherein $R^1$ is Y-6B, $R^2$ is $CH_3$, $R^9$ is $CH_3$ and $R^{10}$ is $CH_3$.
Table 1189. Formula I.18 wherein $R^1$ is Y-7A, $R^2$ is $CH_3$, $R^9$ is H and $R^{10}$ is H.
Table 1190. Formula I.18 wherein $R^1$ is Y-7A, $R^2$ is $CH_3$, $R^9$ is $CH_3$ and $R^{10}$ is H.
Table 1191. Formula I.18 wherein $R^1$ is Y-7A, $R^2$ is $CH_3$, $R^9$ is $CH_3$ and $R^{10}$ is $CH_3$.
Table 1192. Formula I.18 wherein $R^1$ is Y-7B, $R^2$ is $CH_3$, $R^9$ is H and $R^{10}$ is H.
Table 1193. Formula I.18 wherein $R^1$ is Y-7B, $R^2$ is $CH_3$, $R^9$ is $CH_3$ and $R^{10}$ is H.
Table 1194. Formula I.18 wherein $R^1$ is Y-7B, $R^2$ is $CH_3$, $R^9$ is $CH_3$ and $R^{10}$ is $CH_3$.
Table 1195. Formula I.18 wherein $R^1$ is Y-8A, $R^2$ is $CH_3$, $R^9$ is H and $R^{10}$ is H.
Table 1196. Formula I.18 wherein $R^1$ is Y-8A, $R^2$ is $CH_3$, $R^9$ is $CH_3$ and $R^{10}$ is H.
Table 1197. Formula I.18 wherein $R^1$ is Y-8A, $R^2$ is $CH_3$, $R^9$ is $CH_3$ and $R^{10}$ is $CH_3$.
Table 1198. Formula I.18 wherein $R^1$ is Y-8B, $R^2$ is $CH_3$, $R^9$ is H and $R^{10}$ is H.
Table 1199. Formula I.18 wherein $R^1$ is Y-8B, $R^2$ is $CH_3$, $R^9$ is $CH_3$ and $R^{10}$ is H.
Table 1200. Formula I.18 wherein $R^1$ is Y-8B, $R^2$ is $CH_3$, $R^9$ is $CH_3$ and $R^{10}$ is $CH_3$.
Table 1201. Formula I.18 wherein $R^1$ is Y-1A, $R^2$ is $C_2H_5$, $R^9$ is H and $R^{10}$ is H.
Table 1202. Formula I.18 wherein $R^1$ is Y-1A, $R^2$ is $C_2H_5$, $R^9$ is $CH_3$ and $R^{10}$ is H.
Table 1203. Formula I.18 wherein $R^1$ is Y-1A, $R^2$ is $C_2H_5$, $R^9$ is $CH_3$ and $R^{10}$ is $CH_3$.
Table 1204. Formula I.18 wherein $R^1$ is Y-1B, $R^2$ is $C_2H_5$, $R^9$ is H and $R^{10}$ is H.
Table 1205. Formula I.18 wherein $R^1$ is Y-1B, $R^2$ is $C_2H_5$, $R^9$ is $CH_3$ and $R^{10}$ is H.
Table 1206. Formula I.18 wherein $R^1$ is Y-1B, $R^2$ is $C_2H_5$, $R^9$ is $CH_3$ and $R^{10}$ is $CH_3$.
Table 1207. Formula I.18 wherein $R^1$ is Y-2A, $R^2$ is $C_2H_5$, $R^9$ is H and $R^{10}$ is H.
Table 1208. Formula I.18 wherein $R^1$ is Y-2A, $R^2$ is $C_2H_5$, $R^9$ is $CH_3$ and $R^{10}$ is H.
Table 1209. Formula I.18 wherein $R^1$ is Y-2A, $R^2$ is $C_2H_5$, $R^9$ is $CH_3$ and $R^{10}$ is $CH_3$.
Table 1210. Formula I.18 wherein $R^1$ is Y-2B, $R^2$ is $C_2H_5$, $R^9$ is H and $R^{10}$ is H.
Table 1211. Formula I.18 wherein $R^1$ is Y-2B, $R^2$ is $C_2H_5$, $R^9$ is $CH_3$ and $R^{10}$ is H.
Table 1212. Formula I.18 wherein $R^1$ is Y-2B, $R^2$ is $C_2H_5$, $R^9$ is $CH_3$ and $R^{10}$ is $CH_3$.
Table 1213. Formula I.18 wherein $R^1$ is Y-3A, $R^2$ is $C_2H_5$, $R^9$ is H and $R^{10}$ is H.
Table 1214. Formula I.18 wherein $R^1$ is Y-3A, $R^2$ is $C_2H_5$, $R^9$ is $CH_3$ and $R^{10}$ is H.
Table 1215. Formula I.18 wherein $R^1$ is Y-3A, $R^2$ is $C_2H_5$, $R^9$ is $CH_3$ and $R^{10}$ is $CH_3$.
Table 1216. Formula I.18 wherein $R^1$ is Y-3B, $R^2$ is $C_2H_5$, $R^9$ is H and $R^{10}$ is H.
Table 1217. Formula I.18 wherein $R^1$ is Y-3B, $R^2$ is $C_2H_5$, $R^9$ is $CH_3$ and $R^{10}$ is H.
Table 1218. Formula I.18 wherein $R^1$ is Y-3B, $R^2$ is $C_2H_5$, $R^9$ is $CH_3$ and $R^{10}$ is $CH_3$.
Table 1219. Formula I.18 wherein $R^1$ is Y-3C, $R^2$ is $C_2H_5$, $R^9$ is H and $R^{10}$ is H.
Table 1220. Formula I.18 wherein $R^1$ is Y-3C, $R^2$ is $C_2H_5$, $R^9$ is $CH_3$ and $R^{10}$ is H.
Table 1221. Formula I.18 wherein $R^1$ is Y-3C, $R^2$ is $C_2H_5$, $R^9$ is $CH_3$ and $R^{10}$ is $CH_3$.
Table 1222. Formula I.18 wherein $R^1$ is Y-3D, $R^2$ is $C_2H_5$, $R^9$ is H and $R^{10}$ is H.
Table 1223. Formula I.18 wherein $R^1$ is Y-3D, $R^2$ is $C_2H_5$, $R^9$ is $CH_3$ and $R^{10}$ is H.
Table 1224. Formula I.18 wherein $R^1$ is Y-3D, $R^2$ is $C_2H_5$, $R^9$ is $CH_3$ and $R^{10}$ is $CH_3$.
Table 1225. Formula I.18 wherein $R^1$ is Y-4A, $R^2$ is $C_2H_5$, $R^9$ is H and $R^{10}$ is H.
Table 1226. Formula I.18 wherein $R^1$ is Y-4A, $R^2$ is $C_2H_5$, $R^9$ is $CH_3$ and $R^{10}$ is H.
Table 1227. Formula I.18 wherein $R^1$ is Y-4A, $R^2$ is $C_2H_5$, $R^9$ is $CH_3$ and $R^{10}$ is $CH_3$.
Table 1228. Formula I.18 wherein $R^1$ is Y-4B, $R^2$ is $C_2H_5$, $R^9$ is H and $R^{10}$ is H.
Table 1229. Formula I.18 wherein $R^1$ is Y-4B, $R^2$ is $C_2H_5$, $R^9$ is $CH_3$ and $R^{10}$ is H.
Table 1230. Formula I.18 wherein $R^1$ is Y-4B, $R^2$ is $C_2H_5$, $R^9$ is $CH_3$ and $R^{10}$ is $CH_3$.
Table 1231. Formula I.18 wherein $R^1$ is Y-4C, $R^2$ is $C_2H_5$, $R^9$ is H and $R^{10}$ is H.
Table 1232. Formula I.18 wherein $R^1$ is Y-4C, $R^2$ is $C_2H_5$, $R^9$ is $CH_3$ and $R^{10}$ is H.
Table 1233. Formula I.18 wherein $R^1$ is Y-4C, $R^2$ is $C_2H_5$, $R^9$ is $CH_3$ and $R^{10}$ is $CH_3$.

Table 1234. Formula I.18 wherein $R^1$ is Y-4D, $R^2$ is $C_2H_5$, $R^9$ is H and $R^{10}$ is H.
Table 1235. Formula I.18 wherein $R^1$ is Y-4D, $R^2$ is $C_2H_5$, $R^9$ is $CH_3$ and $R^{10}$ is H.
Table 1236. Formula I.18 wherein $R^1$ is Y-4D, $R^2$ is $C_2H_5$, $R^9$ is $CH_3$ and $R^{10}$ is $CH_3$.
Table 1237. Formula I.18 wherein $R^1$ is Y-5A, $R^2$ is $C_2H_5$, $R^9$ is H and $R^{10}$ is H.
Table 1238. Formula I.18 wherein $R^1$ is Y-5A, $R^2$ is $C_2H_5$, $R^9$ is $CH_3$ and $R^{10}$ is H.
Table 1239. Formula I.18 wherein $R^1$ is Y-5A, $R^2$ is $C_2H_5$, $R^9$ is $CH_3$ and $R^{10}$ is $CH_3$.
Table 1240. Formula I.18 wherein $R^1$ is Y-5B, $R^2$ is $C_2H_5$, $R^9$ is H and $R^{10}$ is H.
Table 1241. Formula I.18 wherein $R^1$ is Y-5B, $R^2$ is $C_2H_5$, $R^9$ is $CH_3$ and $R^{10}$ is H.
Table 1242. Formula I.18 wherein $R^1$ is Y-5B, $R^2$ is $C_2H_5$, $R^9$ is $CH_3$ and $R^{10}$ is $CH_3$.
Table 1243. Formula I.18 wherein $R^1$ is Y-6A, $R^2$ is $C_2H_5$, $R^9$ is H and $R^{10}$ is H.
Table 1244. Formula I.18 wherein $R^1$ is Y-6A, $R^2$ is $C_2H_5$, $R^9$ is $CH_3$ and $R^{10}$ is H.
Table 1245. Formula I.18 wherein $R^1$ is Y-6A, $R^2$ is $C_2H_5$, $R^9$ is $CH_3$ and $R^{10}$ is $CH_3$.
Table 1246. Formula I.18 wherein $R^1$ is Y-6B, $R^2$ is $C_2H_5$, $R^9$ is H and $R^{10}$ is H.
Table 1247. Formula I.18 wherein $R^1$ is Y-6B, $R^2$ is $C_2H_5$, $R^9$ is $CH_3$ and $R^{10}$ is H.
Table 1248. Formula I.18 wherein $R^1$ is Y-6B, $R^2$ is $C_2H_5$, $R^9$ is $CH_3$ and $R^{10}$ is $CH_3$.
Table 1249. Formula I.18 wherein $R^1$ is Y-7A, $R^2$ is $C_2H_5$, $R^9$ is H and $R^{10}$ is H.
Table 1250. Formula I.18 wherein $R^1$ is Y-7A, $R^2$ is $C_2H_5$, $R^9$ is $CH_3$ and $R^{10}$ is H.
Table 1251. Formula I.18 wherein $R^1$ is Y-7A, $R^2$ is $C_2H_5$, $R^9$ is $CH_3$ and $R^{10}$ is $CH_3$.
Table 1252. Formula I.18 wherein $R^1$ is Y-7B, $R^2$ is $C_2H_5$, $R^9$ is H and $R^{10}$ is H.
Table 1253. Formula I.18 wherein $R^1$ is Y-7B, $R^2$ is $C_2H_5$, $R^9$ is $CH_3$ and $R^{10}$ is H.
Table 1254. Formula I.18 wherein $R^1$ is Y-7B, $R^2$ is $C_2H_5$, $R^9$ is $CH_3$ and $R^{10}$ is $CH_3$.
Table 1255. Formula I.18 wherein $R^1$ is Y-8A, $R^2$ is $C_2H_5$, $R^9$ is H and $R^{10}$ is H.
Table 1256. Formula I.18 wherein $R^1$ is Y-8A, $R^2$ is $C_2H_5$, $R^9$ is $CH_3$ and $R^{10}$ is H.
Table 1257. Formula I.18 wherein $R^1$ is Y-8A, $R^2$ is $C_2H_5$, $R^9$ is $CH_3$ and $R^{10}$ is $CH_3$.
Table 1258. Formula I.18 wherein $R^1$ is Y-8B, $R^2$ is $C_2H_5$, $R^9$ is H and $R^{10}$ is H.
Table 1259. Formula I.18 wherein $R^1$ is Y-8B, $R^2$ is $C_2H_5$, $R^9$ is $CH_3$ and $R^{10}$ is H.
Table 1260. Formula I.18 wherein $R^1$ is Y-8B, $R^2$ is $C_2H_5$, $R^9$ is $CH_3$ and $R^{10}$ is $CH_3$.
Table 1261. Formula I.18 wherein $R^1$ is Y-1A, $R^2$ is c-$C_3H_5$, $R^9$ is H and $R^{10}$ is H.
Table 1262. Formula I.18 wherein $R^1$ is Y-1A, $R^2$ is c-$C_3H_5$, $R^9$ is $CH_3$ and $R^{10}$ is H.
Table 1263. Formula I.18 wherein $R^1$ is Y-1A, $R^2$ is c-$C_3H_5$, $R^9$ is $CH_3$ and $R^{10}$ is $CH_3$.
Table 1264. Formula I.18 wherein $R^1$ is Y-1B, $R^2$ is c-$C_3H_5$, $R^9$ is H and $R^{10}$ is H.
Table 1265. Formula I.18 wherein $R^1$ is Y-1B, $R^2$ is c-$C_3H_5$, $R^9$ is $CH_3$, $R^{10}$ is H.
Table 1266. Formula I.18 wherein $R^1$ is Y-1B, $R^2$ is c-$C_3H_5$, $R^9$ is $CH_3$ and $R^{10}$ is $CH_3$.
Table 1267. Formula I.18 wherein $R^1$ is Y-2A, $R^2$ is c-$C_3H_5$, $R^9$ is H and $R^{10}$ is H.
Table 1268. Formula I.18 wherein $R^1$ is Y-2A, $R^2$ is c-$C_3H_5$, $R^9$ is $CH_3$ and $R^{10}$ is H.
Table 1269. Formula I.18 wherein $R^1$ is Y-2A, $R^2$ is c-$C_3H_5$, $R^9$ is $CH_3$ and $R^{10}$ is $CH_3$.
Table 1270. Formula I.18 wherein $R^1$ is Y-2B, $R^2$ is c-$C_3H_5$, $R^9$ is H and $R^{10}$ is H.
Table 1271. Formula I.18 wherein $R^1$ is Y-2B, $R^2$ is c-$C_3H_5$, $R^9$ is $CH_3$ and $R^{10}$ is H.
Table 1272. Formula I.18 wherein $R^1$ is Y-2B, $R^2$ is c-$C_3H_5$, $R^9$ is $CH_3$ and $R^{10}$ is $CH_3$.
Table 1273. Formula I.18 wherein $R^1$ is Y-3A, $R^2$ is c-$C_3H_5$, $R^9$ is H and $R^{10}$ is H.
Table 1274. Formula I.18 wherein $R^1$ is Y-3A, $R^2$ is c-$C_3H_5$, $R^9$ is $CH_3$ and $R^{10}$ is H.
Table 1275. Formula I.18 wherein $R^1$ is Y-3A, $R^2$ is c-$C_3H_5$, $R^9$ is $CH_3$ and $R^{10}$ is $CH_3$.
Table 1276. Formula I.18 wherein $R^1$ is Y-3B, $R^2$ is c-$C_3H_5$, $R^9$ is H and $R^{10}$ is H.
Table 1277. Formula I.18 wherein $R^1$ is Y-3B, $R^2$ is c-$C_3H_5$, $R^9$ is $CH_3$ and $R^{10}$ is H.
Table 1278. Formula I.18 wherein $R^1$ is Y-3B, $R^2$ is c-$C_3H_5$, $R^9$ is $CH_3$ and $R^{10}$ is $CH_3$.
Table 1279. Formula I.18 wherein $R^1$ is Y-3C, $R^2$ is c-$C_3H_5$, $R^9$ is H and $R^{10}$ is H.
Table 1280. Formula I.18 wherein $R^1$ is Y-3C, $R^2$ is c-$C_3H_5$, $R^9$ is $CH_3$ and $R^{10}$ is H.
Table 1281. Formula I.18 wherein $R^1$ is Y-3C, $R^2$ is c-$C_3H_5$, $R^9$ is $CH_3$ and $R^{10}$ is $CH_3$.
Table 1282. Formula I.18 wherein $R^1$ is Y-3D, $R^2$ is c-$C_3H_5$, $R^9$ is H and $R^{10}$ is H.
Table 1283. Formula I.18 wherein $R^1$ is Y-3D, $R^2$ is c-$C_3H_5$, $R^9$ is $CH_3$ and $R^{10}$ is H.
Table 1284. Formula I.18 wherein $R^1$ is Y-3D, $R^2$ is c-$C_3H_5$, $R^9$ is $CH_3$ and $R^{10}$ is $CH_3$.
Table 1285. Formula I.18 wherein $R^1$ is Y-4A, $R^2$ is c-$C_3H_5$, $R^9$ is H and $R^{10}$ is H.
Table 1286. Formula I.18 wherein $R^1$ is Y-4A, $R^2$ is c-$C_3H_5$, $R^9$ is $CH_3$ and $R^{10}$ is H.
Table 1287. Formula I.18 wherein $R^1$ is Y-4A, $R^2$ is c-$C_3H_5$, $R^9$ is $CH_3$ and $R^{10}$ is $CH_3$.
Table 1288. Formula I.18 wherein $R^1$ is Y-4B, $R^2$ is c-$C_3H_5$, $R^9$ is H and $R^{10}$ is H.
Table 1289. Formula I.18 wherein $R^1$ is Y-4B, $R^2$ is c-$C_3H_5$, $R^9$ is $CH_3$ and $R^{10}$ is H.
Table 1290. Formula I.18 wherein $R^1$ is Y-4B, $R^2$ is c-$C_3H_5$, $R^9$ is $CH_3$ and $R^{10}$ is $CH_3$.
Table 1291. Formula I.18 wherein $R^1$ is Y-4C, $R^2$ is c-$C_3H_5$, $R^9$ is H and $R^{10}$ is H.
Table 1292. Formula I.18 wherein $R^1$ is Y-4C, $R^2$ is c-$C_3H_5$, $R^9$ is $CH_3$ and $R^{10}$ is H.
Table 1293. Formula I.18 wherein $R^1$ is Y-4C, $R^2$ is c-$C_3H_5$, $R^9$ is $CH_3$ and $R^{10}$ is $CH_3$.
Table 1294. Formula I.18 wherein $R^1$ is Y-4D, $R^2$ is c-$C_3H_5$, $R^9$ is H and $R^{10}$ is H.
Table 1295. Formula I.18 wherein $R^1$ is Y-4D, $R^2$ is c-$C_3H_5$, $R^9$ is $CH_3$ and $R^{10}$ is H.
Table 1296. Formula I.18 wherein $R^1$ is Y-4D, $R^2$ is c-$C_3H_5$, $R^9$ is $CH_3$ and $R^{10}$ is $CH_3$.
Table 1297. Formula I.18 wherein $R^1$ is Y-5A, $R^2$ is c-$C_3H_5$, $R^9$ is H and $R^{10}$ is H.
Table 1298. Formula I.18 wherein $R^1$ is Y-5A, $R^2$ is c-$C_3H_5$, $R^9$ is $CH_3$ and $R^{10}$ is H.
Table 1299. Formula I.18 wherein $R^1$ is Y-5A, $R^2$ is c-$C_3H_5$, $R^9$ is $CH_3$ and $R^{10}$ is $CH_3$.

Table 1300. Formula I.18 wherein $R^1$ is Y-5B, $R^2$ is c-$C_3H_5$, $R^9$ is H and $R^{10}$ is H.
Table 1301. Formula I.18 wherein $R^1$ is Y-5B, $R^2$ is c-$C_3H_5$, $R^9$ is $CH_3$ and $R^{10}$ is H.
Table 1302. Formula I.18 wherein $R^1$ is Y-5B, $R^2$ is c-$C_3H_5$, $R^9$ is $CH_3$ and $R^{10}$ is $CH_3$.
Table 1303. Formula I.18 wherein $R^1$ is Y-6A, $R^2$ is c-$C_3H_5$, $R^9$ is H and $R^{10}$ is H.
Table 1304. Formula I.18 wherein $R^1$ is Y-6A, $R^2$ is c-$C_3H_5$, $R^9$ is $CH_3$ and $R^{10}$ is H.
Table 1305. Formula I.18 wherein $R^1$ is Y-6A, $R^2$ is c-$C_3H_5$, $R^9$ is $CH_3$ and $R^{10}$ is $CH_3$.
Table 1306. Formula I.18 wherein $R^1$ is Y-6B, $R^2$ is c-$C_3H_5$, $R^9$ is H and $R^{10}$ is H.
Table 1307. Formula I.18 wherein $R^1$ is Y-6B, $R^2$ is c-$C_3H_5$, $R^9$ is $CH_3$ and $R^{10}$ is H.
Table 1308. Formula I.18 wherein $R^1$ is Y-6B, $R^2$ is c-$C_3H_5$, $R^9$ is $CH_3$ and $R^{10}$ is $CH_3$.
Table 1309. Formula I.18 wherein $R^1$ is Y-7A, $R^2$ is c-$C_3H_5$, $R^9$ is H and $R^{10}$ is H.
Table 1310. Formula I.18 wherein $R^1$ is Y-7A, $R^2$ is c-$C_3H_5$, $R^9$ is $CH_3$ and $R^{10}$ is H.
Table 1311. Formula I.18 wherein $R^1$ is Y-7A, $R^2$ is c-$C_3H_5$, $R^9$ is $CH_3$ and $R^{10}$ is $CH_3$.
Table 1312. Formula I.18 wherein $R^1$ is Y-7B, $R^2$ is c-$C_3H_5$, $R^9$ is H and $R^{10}$ is H.
Table 1313. Formula I.18 wherein $R^1$ is Y-7B, $R^2$ is c-$C_3H_5$, $R^9$ is $CH_3$ and $R^{10}$ is H.
Table 1314. Formula I.18 wherein $R^1$ is Y-7B, $R^2$ is c-$C_3H_5$, $R^9$ is $CH_3$ and $R^{10}$ is $CH_3$.
Table 1315. Formula I.18 wherein $R^1$ is Y-8A, $R^2$ is c-$C_3H_5$, $R^9$ is H and $R^{10}$ is H.
Table 1316. Formula I.18 wherein $R^1$ is Y-8A, $R^2$ is c-$C_3H_5$, $R^9$ is $CH_3$ and $R^{10}$ is H.
Table 1317. Formula I.18 wherein $R^1$ is Y-8A, $R^2$ is c-$C_3H_5$, $R^9$ is $CH_3$ and $R^{10}$ is $CH_3$.
Table 1318. Formula I.18 wherein $R^1$ is Y-8B, $R^2$ is c-$C_3H_5$, $R^9$ is H and $R^{10}$ is H.
Table 1319. Formula I.18 wherein $R^1$ is Y-8B, $R^2$ is c-$C_3H_5$, $R^9$ is $CH_3$ and $R^{10}$ is H.
Table 1320. Formula I.18 wherein $R^1$ is Y-8B, $R^2$ is c-$C_3H_5$, $R^9$ is $CH_3$ and $R^{10}$ is $CH_3$.
Table 1321. Formula I.19 wherein $R^1$ is Y-1A, $R^2$ is H, $R^9$ is H and $R^{10}$ is H.
Table 1322. Formula I.19 wherein $R^1$ is Y-1A, $R^2$ is H, $R^9$ is $CH_3$ and, $R^{10}$ is H.
Table 1323. Formula I.19 wherein $R^1$ is Y-1A, $R^2$ is H, $R^9$ is $CH_3$ and $R^{10}$ is $CH_3$.
Table 1324. Formula I.19 wherein $R^1$ is Y-1B, $R^2$ is H, $R^9$ is H and $R^{10}$ is H.
Table 1325. Formula I.19 wherein $R^1$ is Y-1B, $R^2$ is H, $R^9$ is $CH_3$ and $R^{10}$ is H.
Table 1326. Formula I.19 wherein $R^1$ is Y-1B, $R^2$ is H, $R^9$ is $CH_3$ and $R^{10}$ is $CH_3$.
Table 1327. Formula I.19 wherein $R^1$ is Y-2A, $R^2$ is H, $R^9$ is H and $R^{10}$ is H.
Table 1328. Formula I.19 wherein $R^1$ is Y-2A, $R^2$ is H, $R^9$ is $CH_3$ and $R^{10}$ is H.
Table 1329. Formula I.19 wherein $R^1$ is Y-2A, $R^2$ is H, $R^9$ is $CH_3$ and $R^{10}$ is $CH_3$.
Table 1330. Formula I.19 wherein $R^1$ is Y-2B, $R^2$ is H, $R^9$ is H and $R^{10}$ is H.
Table 1331. Formula I.19 wherein $R^1$ is Y-2B, $R^2$ is H, $R^9$ is $CH_3$ and $R^{10}$ is H.
Table 1332. Formula I.19 wherein $R^1$ is Y-2B, $R^2$ is H, $R^9$ is $CH_3$ and $R^{10}$ is $CH_3$.
Table 1333. Formula I.19 wherein $R^1$ is Y-3A, $R^2$ is H, $R^9$ is H and $R^{10}$ is H.
Table 1334. Formula I.19 wherein $R^1$ is Y-3A, $R^2$ is H, $R^9$ is $CH_3$ and $R^{10}$ is H.
Table 1335. Formula I.19 wherein $R^1$ is Y-3A, $R^2$ is H, $R^9$ is $CH_3$ and $R^{10}$ is $CH_3$.
Table 1336. Formula I.19 wherein $R^1$ is Y-3B, $R^2$ is H, $R^9$ is H and $R^{10}$ is H.
Table 1337. Formula I.19 wherein $R^1$ is Y-3B, $R^2$ is H, $R^9$ is $CH_3$ and $R^{10}$ is H.
Table 1338. Formula I.19 wherein $R^1$ is Y-3B, $R^2$ is H, $R^9$ is $CH_3$ and $R^{10}$ is $CH_3$.
Table 1339. Formula I.19 wherein $R^1$ is Y-3C, $R^2$ is H, $R^9$ is H and $R^{10}$ is H.
Table 1340. Formula I.19 wherein $R^1$ is Y-3C, $R^2$ is H, $R^9$ is $CH_3$ and $R^{10}$ is H.
Table 1341. Formula I.19 wherein $R^1$ is Y-3C, $R^2$ is H, $R^9$ is $CH_3$ and $R^{10}$ is $CH_3$.
Table 1342. Formula I.19 wherein $R^1$ is Y-3D, $R^2$ is H, $R^9$ is H and $R^{10}$ is H.
Table 1343. Formula I.19 wherein $R^1$ is Y-3D, $R^2$ is H, $R^9$ is $CH_3$ and $R^{10}$ is H.
Table 1344. Formula I.19 wherein $R^1$ is Y-3D, $R^2$ is H, $R^9$ is $CH_3$ and $R^{10}$ is $CH_3$.
Table 1345. Formula I.19 wherein $R^1$ is Y-4A, $R^2$ is H, $R^9$ is H and $R^{10}$ is H.
Table 1346. Formula I.19 wherein $R^1$ is Y-4A, $R^2$ is H, $R^9$ is $CH_3$ and $R^{10}$ is H.
Table 1347. Formula I.19 wherein $R^1$ is Y-4A, $R^2$ is H, $R^9$ is $CH_3$ and $R^{10}$ is $CH_3$.
Table 1348. Formula I.19 wherein $R^1$ is Y-4B, $R^2$ is H, $R^9$ is H and $R^{10}$ is H.
Table 1349. Formula I.19 wherein $R^1$ is Y-4B, $R^2$ is H, $R^9$ is $CH_3$ and $R^{10}$ is H.
Table 1350. Formula I.19 wherein $R^1$ is Y-4B, $R^2$ is H, $R^9$ is $CH_3$ and $R^{10}$ is $CH_3$.
Table 1351. Formula I.19 wherein $R^1$ is Y-4C, $R^2$ is H, $R^9$ is H and $R^{10}$ is H.
Table 1352. Formula I.19 wherein $R^1$ is Y-4C, $R^2$ is H, $R^9$ is $CH_3$ and $R^{10}$ is H.
Table 1353. Formula I.19 wherein $R^1$ is Y-4C, $R^2$ is H, $R^9$ is $CH_3$ and $R^{10}$ is $CH_3$.
Table 1354. Formula I.19 wherein $R^1$ is Y-4D, $R^2$ is H, $R^9$ is H and $R^{10}$ is H.
Table 1355. Formula I.19 wherein $R^1$ is Y-4D, $R^2$ is H, $R^9$ is $CH_3$ and $R^{10}$ is H.
Table 1356. Formula I.19 wherein $R^1$ is Y-4D, $R^2$ is H, $R^9$ is $CH_3$ and $R^{10}$ is $CH_3$.
Table 1357. Formula I.19 wherein $R^1$ is Y-5A, $R^2$ is H, $R^9$ is H and $R^{10}$ is H.
Table 1358. Formula I.19 wherein $R^1$ is Y-5A, $R^2$ is H, $R^9$ is $CH_3$ and $R^{10}$ is H.
Table 1359. Formula I.19 wherein $R^1$ is Y-5A, $R^2$ is H, $R^9$ is $CH_3$ and $R^{10}$ is $CH_3$.
Table 1360. Formula I.19 wherein $R^1$ is Y-5B, $R^2$ is H, $R^9$ is H and $R^{10}$ is H.
Table 1361. Formula I.19 wherein $R^1$ is Y-5B, $R^2$ is H, $R^9$ is $CH_3$ and $R^{10}$ is H.
Table 1362. Formula I.19 wherein $R^1$ is Y-5B, $R^2$ is H, $R^9$ is $CH_3$ and $R^{10}$ is $CH_3$.
Table 1363. Formula I.19 wherein $R^1$ is Y-6A, $R^2$ is H, $R^9$ is H and $R^{10}$ is H.
Table 1364. Formula I.19 wherein $R^1$ is Y-6A, $R^2$ is H, $R^9$ is $CH_3$ and $R^{10}$ is H.
Table 1365. Formula I.19 wherein $R^1$ is Y-6A, $R^2$ is H, $R^9$ is $CH_3$ and $R^{10}$ is $CH_3$.

Table 1366. Formula I.19 wherein $R^1$ is Y-6B, $R^2$ is H, $R^9$ is H and $R^{10}$ is H.
Table 1367. Formula I.19 wherein $R^1$ is Y-6B, $R^2$ is H, $R^9$ is $CH_3$ and $R^{10}$ is H.
Table 1368. Formula I.19 wherein $R^1$ is Y-6B, $R^2$ is H, $R^9$ is $CH_3$ and $R^{10}$ is $CH_3$.
Table 1369. Formula I.19 wherein $R^1$ is Y-7A, $R^2$ is H, $R^9$ is H and $R^{10}$ is H.
Table 1370. Formula I.19 wherein $R^1$ is Y-7A, $R^2$ is H, $R^9$ is $CH_3$ and $R^{10}$ is H.
Table 1371. Formula I.19 wherein $R^1$ is Y-7A, $R^2$ is H, $R^9$ is $CH_3$ and $R^{10}$ is $CH_3$.
Table 1372. Formula I.19 wherein $R^1$ is Y-7B, $R^2$ is H, $R^9$ is H and $R^{10}$ is H.
Table 1373. Formula I.19 wherein $R^1$ is Y-7B, $R^2$ is H, $R^9$ is $CH_3$ and $R^{10}$ is H.
Table 1374. Formula I.19 wherein $R^1$ is Y-7B, $R^2$ is H, $R^9$ is $CH_3$ and $R^{10}$ is $CH_3$.
Table 1375. Formula I.19 wherein $R^1$ is Y-8A, $R^2$ is H, $R^9$ is H and $R^{10}$ is H.
Table 1376. Formula I.19 wherein $R^1$ is Y-8A, $R^2$ is H, $R^9$ is $CH_3$ and $R^{10}$ is H.
Table 1377. Formula I.19 wherein $R^1$ is Y-8A, $R^2$ is H, $R^9$ is $CH_3$ and $R^{10}$ is $CH_3$.
Table 1378. Formula I.19 wherein $R^1$ is Y-8B, $R^2$ is H, $R^9$ is H and $R^{10}$ is H.
Table 1379. Formula I.19 wherein $R^1$ is Y-8B, $R^2$ is H, $R^9$ is $CH_3$ and $R^{10}$ is H.
Table 1380. Formula I.19 wherein $R^1$ is Y-8B, $R^2$ is H, $R^9$ is $CH_3$ and $R^{10}$ is $CH_3$.
Table 1381. Formula I.19 wherein $R^1$ is Y-1A, $R^2$ is $CH_3$, $R^9$ is H and $R^{10}$ is H.
Table 1382. Formula I.19 wherein $R^1$ is Y-1A, $R^2$ is $CH_3$, $R^9$ is $CH_3$ and $R^{10}$ is H.
Table 1383. Formula I.19 wherein $R^1$ is Y-1A, $R^2$ is $CH_3$, $R^9$ is $CH_3$ and $R^{10}$ is $CH_3$.
Table 1384. Formula I.19 wherein $R^1$ is Y-1B, $R^2$ is $CH_3$, $R^9$ is H and $R^{10}$ is H.
Table 1385. Formula I.19 wherein $R^1$ is Y-1B, $R^2$ is $CH_3$, $R^9$ is $CH_3$ and $R^{10}$ is H.
Table 1386. Formula I.19 wherein $R^1$ is Y-1B, $R^2$ is $CH_3$, $R^9$ is $CH_3$ and $R^{10}$ is $CH_3$.
Table 1387. Formula I.19 wherein $R^1$ is Y-2A, $R^2$ is $CH_3$, $R^9$ is H and $R^{10}$ is H.
Table 1388. Formula I.19 wherein $R^1$ is Y-2A, $R^2$ is $CH_3$, $R^9$ is $CH_3$ and $R^{10}$ is H.
Table 1389. Formula I.19 wherein $R^1$ is Y-2A, $R^2$ is $CH_3$, $R^9$ is $CH_3$ and $R^{10}$ is $CH_3$.
Table 1390. Formula I.19 wherein $R^1$ is Y-2B, $R^2$ is $CH_3$, $R^9$ is H and $R^{10}$ is H.
Table 1391. Formula I.19 wherein $R^1$ is Y-2B, $R^2$ is $CH_3$, $R^9$ is $CH_3$ and $R^{10}$ is H.
Table 1392. Formula I.19 wherein $R^1$ is Y-2B, $R^2$ is $CH_3$, $R^9$ is $CH_3$ and $R^{10}$ is $CH_3$.
Table 1393. Formula I.19 wherein $R^1$ is Y-3A, $R^2$ is $CH_3$, $R^9$ is H and $R^{10}$ is H.
Table 1394. Formula I.19 wherein $R^1$ is Y-3A, $R^2$ is $CH_3$, $R^9$ is $CH_3$ and $R^{10}$ is H.
Table 1395. Formula I.19 wherein $R^1$ is Y-3A, $R^2$ is $CH_3$, $R^9$ is $CH_3$ and $R^{10}$ is $CH_3$.
Table 1396. Formula I.19 wherein $R^1$ is Y-3B, $R^2$ is $CH_3$, $R^9$ is H and $R^{10}$ is H.
Table 1397. Formula I.19 wherein $R^1$ is Y-3B, $R^2$ is $CH_3$, $R^9$ is $CH_3$ and $R^{10}$ is H.
Table 1398. Formula I.19 wherein $R^1$ is Y-3B, $R^2$ is $CH_3$, $R^9$ is $CH_3$ and $R^{10}$ is $CH_3$.
Table 1399. Formula I.19 wherein $R^1$ is Y-3C, $R^2$ is $CH_3$, $R^9$ is H and $R^{10}$ is H.
Table 1400. Formula I.19 wherein $R^1$ is Y-3C, $R^2$ is $CH_3$, $R^9$ is $CH_3$ and $R^{10}$ is H.
Table 1401. Formula I.19 wherein $R^1$ is Y-3C, $R^2$ is $CH_3$, $R^9$ is $CH_3$ and $R^{10}$ is $CH_3$.
Table 1402. Formula I.19 wherein $R^1$ is Y-3D, $R^2$ is $CH_3$, $R^9$ is H and $R^{10}$ is H.
Table 1403. Formula I.19 wherein $R^1$ is Y-3D, $R^2$ is $CH_3$, $R^9$ is $CH_3$ and $R^{10}$ is H.
Table 1404. Formula I.19 wherein $R^1$ is Y-3D, $R^2$ is $CH_3$, $R^9$ is $CH_3$ and $R^{10}$ is $CH_3$.
Table 1405. Formula I.19 wherein $R^1$ is Y-4A, $R^2$ is $CH_3$, $R^9$ is H and $R^{10}$ is H.
Table 1406. Formula I.19 wherein $R^1$ is Y-4A, $R^2$ is $CH_3$, $R^9$ is $CH_3$ and $R^{10}$ is H.
Table 1407. Formula I.19 wherein $R^1$ is Y-4A, $R^2$ is $CH_3$, $R^9$ is $CH_3$ and $R^{10}$ is $CH_3$.
Table 1408. Formula I.19 wherein $R^1$ is Y-4B, $R^2$ is $CH_3$, $R^9$ is H and $R^{10}$ is H.
Table 1409. Formula I.19 wherein $R^1$ is Y-4B, $R^2$ is $CH_3$, $R^9$ is $CH_3$ and $R^{10}$ is H.
Table 1410. Formula I.19 wherein $R^1$ is Y-4B, $R^2$ is $CH_3$, $R^9$ is $CH_3$ and $R^{10}$ is $CH_3$.
Table 1411. Formula I.19 wherein $R^1$ is Y-4C, $R^2$ is $CH_3$, $R^9$ is H and $R^{10}$ is H.
Table 1412. Formula I.19 wherein $R^1$ is Y-4C, $R^2$ is $CH_3$, $R^9$ is $CH_3$ and $R^{10}$ is H.
Table 1413. Formula I.19 wherein $R^1$ is Y-4C, $R^2$ is $CH_3$, $R^9$ is $CH_3$ and $R^{10}$ is $CH_3$.
Table 1414. Formula I.19 wherein $R^1$ is Y-4D, $R^2$ is $CH_3$, $R^9$ is H and $R^{10}$ is H.
Table 1415. Formula I.19 wherein $R^1$ is Y-4D, $R^2$ is $CH_3$, $R^9$ is $CH_3$ and $R^{10}$ is H.
Table 1416. Formula I.19 wherein $R^1$ is Y-4D, $R^2$ is $CH_3$, $R^9$ is $CH_3$ and $R^{10}$ is $CH_3$.
Table 1417. Formula I.19 wherein $R^1$ is Y-5A, $R^2$ is $CH_3$, $R^9$ is H and $R^{10}$ is H.
Table 1418. Formula I.19 wherein $R^1$ is Y-5A, $R^2$ is $CH_3$, $R^9$ is $CH_3$ and $R^{10}$ is H.
Table 1419. Formula I.19 wherein $R^1$ is Y-5A, $R^2$ is $CH_3$, $R^9$ is $CH_3$ and $R^{10}$ is $CH_3$.
Table 1420. Formula I.19 wherein $R^1$ is Y-5B, $R^2$ is $CH_3$, $R^9$ is H and $R^{10}$ is H.
Table 1421. Formula I.19 wherein $R^1$ is Y-5B, $R^2$ is $CH_3$, $R^9$ is $CH_3$ and $R^{10}$ is H.
Table 1422. Formula I.19 wherein $R^1$ is Y-5B, $R^2$ is $CH_3$, $R^9$ is $CH_3$ and $R^{10}$ is $CH_3$.
Table 1423. Formula I.19 wherein $R^1$ is Y-6A, $R^2$ is $CH_3$, $R^9$ is H and $R^{10}$ is H.
Table 1424. Formula I.19 wherein $R^1$ is Y-6A, $R^2$ is $CH_3$, $R^9$ is $CH_3$ and $R^{10}$ is H.
Table 1425. Formula I.19 wherein $R^1$ is Y-6A, $R^2$ is $CH_3$, $R^9$ is $CH_3$ and $R^{10}$ is $CH_3$.
Table 1426. Formula I.19 wherein $R^1$ is Y-6B, $R^2$ is $CH_3$, $R^9$ is H and $R^{10}$ is H.
Table 1427. Formula I.19 wherein $R^1$ is Y-6B, $R^2$ is $CH_3$, $R^9$ is $CH_3$ and $R^{10}$ is H.
Table 1428. Formula I.19 wherein $R^1$ is Y-6B, $R^2$ is $CH_3$, $R^9$ is $CH_3$ and $R^{10}$ is $CH_3$.
Table 1429. Formula I.19 wherein $R^1$ is Y-7A, $R^2$ is $CH_3$, $R^9$ is H and $R^{10}$ is H.
Table 1430. Formula I.19 wherein $R^1$ is Y-7A, $R^2$ is $CH_3$, $R^9$ is $CH_3$ and $R^{10}$ is H.
Table 1431. Formula I.19 wherein $R^1$ is Y-7A, $R^2$ is $CH_3$, $R^9$ is $CH_3$ and $R^{10}$ is $CH_3$.

Table 1432. Formula I.19 wherein $R^1$ is Y-7B, $R^2$ is $CH_3$, $R^9$ is H and $R^{10}$ is H.
Table 1433. Formula I.19 wherein $R^1$ is Y-7B, $R^2$ is $CH_3$, $R^9$ is $CH_3$ and $R^{10}$ is H.
Table 1434. Formula I.19 wherein $R^1$ is Y-7B, $R^2$ is $CH_3$, $R^9$ is $CH_3$ and $R^{10}$ is $CH_3$.
Table 1435. Formula I.19 wherein $R^1$ is Y-8A, $R^2$ is $CH_3$, $R^9$ is H and $R^{10}$ is H.
Table 1436. Formula I.19 wherein $R^1$ is Y-8A, $R^2$ is $CH_3$, $R^9$ is $CH_3$ and $R^{10}$ is H.
Table 1437. Formula I.19 wherein $R^1$ is Y-8A, $R^2$ is $CH_3$, $R^9$ is $CH_3$ and $R^{10}$ is $CH_3$.
Table 1438. Formula I.19 wherein $R^1$ is Y-8B, $R^2$ is $CH_3$, $R^9$ is H and $R^{10}$ is H.
Table 1439. Formula I.19 wherein $R^1$ is Y-8B, $R^2$ is $CH_3$, $R^9$ is $CH_3$ and $R^{10}$ is H.
Table 1440. Formula I.19 wherein $R^1$ is Y-8B, $R^2$ is $CH_3$, $R^9$ is $CH_3$ and $R^{10}$ is $CH_3$.
Table 1441. Formula I.19 wherein $R^1$ is Y-1A, $R^2$ is $C_2H_5$, $R^9$ is H and $R^{10}$ is H.
Table 1442. Formula I.19 wherein $R^1$ is Y-1A, $R^2$ is $C_2H_5$, $R^9$ is $CH_3$ and $R^{10}$ is H.
Table 1443. Formula I.19 wherein $R^1$ is Y-1A, $R^2$ is $C_2H_5$, $R^9$ is $CH_3$ and $R^{10}$ is $CH_3$.
Table 1444. Formula I.19 wherein $R^1$ is Y-1B, $R^2$ is $C_2H_5$, $R^9$ is H and $R^{10}$ is H.
Table 1445. Formula I.19 wherein $R^1$ is Y-1B, $R^2$ is $C_2H_5$, $R^9$ is $CH_3$ and $R^{10}$ is H.
Table 1446. Formula I.19 wherein $R^1$ is Y-1B, $R^2$ is $C_2H_5$, $R^9$ is $CH_3$ and $R^{10}$ is $CH_3$.
Table 1447. Formula I.19 wherein $R^1$ is Y-2A, $R^2$ is $C_2H_5$, $R^9$ is H and $R^{10}$ is H.
Table 1448. Formula I.19 wherein $R^1$ is Y-2A, $R^2$ is $C_2H_5$, $R^9$ is $CH_3$ and $R^{10}$ is H.
Table 1449. Formula I.19 wherein $R^1$ is Y-2A, $R^2$ is $C_2H_5$, $R^9$ is $CH_3$ and $R^{10}$ is $CH_3$.
Table 1450. Formula I.19 wherein $R^1$ is Y-2B, $R^2$ is $C_2H_5$, $R^9$ is H and $R^{10}$ is H.
Table 1451. Formula I.19 wherein $R^1$ is Y-2B, $R^2$ is $C_2H_5$, $R^9$ is $CH_3$ and $R^{10}$ is H.
Table 1452. Formula I.19 wherein $R^1$ is Y-2B, $R^2$ is $C_2H_5$, $R^9$ is $CH_3$ and $R^{10}$ is $CH_3$.
Table 1453. Formula I.19 wherein $R^1$ is Y-3A, $R^2$ is $C_2H_5$, $R^9$ is H and $R^{10}$ is H.
Table 1454. Formula I.19 wherein $R^1$ is Y-3A, $R^2$ is $C_2H_5$, $R^9$ is $CH_3$ and $R^{10}$ is H.
Table 1455. Formula I.19 wherein $R^1$ is Y-3A, $R^2$ is $C_2H_5$, $R^9$ is $CH_3$ and $R^{10}$ is $CH_3$.
Table 1456. Formula I.19 wherein $R^1$ is Y-3B, $R^2$ is $C_2H_5$, $R^9$ is H and $R^{10}$ is H.
Table 1457. Formula I.19 wherein $R^1$ is Y-3B, $R^2$ is $C_2H_5$, $R^9$ is $CH_3$ and $R^{10}$ is H.
Table 1458. Formula I.19 wherein $R^1$ is Y-3B, $R^2$ is $C_2H_5$, $R^9$ is $CH_3$ and $R^{10}$ is $CH_3$.
Table 1459. Formula I.19 wherein $R^1$ is Y-3C, $R^2$ is $C_2H_5$, $R^9$ is H and $R^{10}$ is H.
Table 1460. Formula I.19 wherein $R^1$ is Y-3C, $R^2$ is $C_2H_5$, $R^9$ is $CH_3$ and $R^{10}$ is H.
Table 1461. Formula I.19 wherein $R^1$ is Y-3C, $R^2$ is $C_2H_5$, $R^9$ is $CH_3$ and $R^{10}$ is $CH_3$.
Table 1462. Formula I.19 wherein $R^1$ is Y-3D, $R^2$ is $C_2H_5$, $R^9$ is H and $R^{10}$ is H.
Table 1463. Formula I.19 wherein $R^1$ is Y-3D, $R^2$ is $C_2H_5$, $R^9$ is $CH_3$ and $R^{10}$ is H.
Table 1464. Formula I.19 wherein $R^1$ is Y-3D, $R^2$ is $C_2H_5$, $R^9$ is $CH_3$ and $R^{10}$ is $CH_3$.
Table 1465. Formula I.19 wherein $R^1$ is Y-4A, $R^2$ is $C_2H_5$, $R^9$ is H and $R^{10}$ is H.
Table 1466. Formula I.19 wherein $R^1$ is Y-4A, $R^2$ is $C_2H_5$, $R^9$ is $CH_3$ and $R^{10}$ is H.
Table 1467. Formula I.19 wherein $R^1$ is Y-4A, $R^2$ is $C_2H_5$, $R^9$ is $CH_3$ and $R^{10}$ is $CH_3$.
Table 1468. Formula I.19 wherein $R^1$ is Y-4B, $R^2$ is $C_2H_5$, $R^9$ is H and $R^{10}$ is H.
Table 1469. Formula I.19 wherein $R^1$ is Y-4B, $R^2$ is $C_2H_5$, $R^9$ is $CH_3$ and $R^{10}$ is H.
Table 1470. Formula I.19 wherein $R^1$ is Y-4B, $R^2$ is $C_2H_5$, $R^9$ is $CH_3$ and $R^{10}$ is $CH_3$.
Table 1471. Formula I.19 wherein $R^1$ is Y-4C, $R^2$ is $C_2H_5$, $R^9$ is H and $R^{10}$ is H.
Table 1472. Formula I.19 wherein $R^1$ is Y-4C, $R^2$ is $C_2H_5$, $R^9$ is $CH_3$ and $R^{10}$ is H.
Table 1473. Formula I.19 wherein $R^1$ is Y-4C, $R^2$ is $C_2H_5$, $R^9$ is $CH_3$ and $R^{10}$ is $CH_3$.
Table 1474. Formula I.19 wherein $R^1$ is Y-4D, $R^2$ is $C_2H_5$, $R^9$ is H and $R^{10}$ is H.
Table 1475. Formula I.19 wherein $R^1$ is Y-4D, $R^2$ is $C_2H_5$, $R^9$ is $CH_3$ and $R^{10}$ is H.
Table 1476. Formula I.19 wherein $R^1$ is Y-4D, $R^2$ is $C_2H_5$, $R^9$ is $CH_3$ and $R^{10}$ is $CH_3$.
Table 1477. Formula I.19 wherein $R^1$ is Y-5A, $R^2$ is $C_2H_5$, $R^9$ is H and $R^{10}$ is H.
Table 1478. Formula I.19 wherein $R^1$ is Y-5A, $R^2$ is $C_2H_5$, $R^9$ is $CH_3$ and $R^{10}$ is H.
Table 1479. Formula I.19 wherein $R^1$ is Y-5A, $R^2$ is $C_2H_5$, $R^9$ is $CH_3$ and $R^{10}$ is $CH_3$.
Table 1480. Formula I.19 wherein $R^1$ is Y-5B, $R^2$ is $C_2H_5$, $R^9$ is H and $R^{10}$ is H.
Table 1481. Formula I.19 wherein $R^1$ is Y-5B, $R^2$ is $C_2H_5$, $R^9$ is $CH_3$ and $R^{10}$ is H.
Table 1482. Formula I.19 wherein $R^1$ is Y-5B, $R^2$ is $C_2H_5$, $R^9$ is $CH_3$ and $R^{10}$ is $CH_3$.
Table 1483. Formula I.19 wherein $R^1$ is Y-6A, $R^2$ is $C_2H_5$, $R^9$ is H and $R^{10}$ is H.
Table 1484. Formula I.19 wherein $R^1$ is Y-6A, $R^2$ is $C_2H_5$, $R^9$ is $CH_3$ and $R^{10}$ is H.
Table 1485. Formula I.19 wherein $R^1$ is Y-6A, $R^2$ is $C_2H_5$, $R^9$ is $CH_3$ and $R^{10}$ is $CH_3$.
Table 1486. Formula I.19 wherein $R^1$ is Y-6B, $R^2$ is $C_2H_5$, $R^9$ is H and $R^{10}$ is H.
Table 1487. Formula I.19 wherein $R^1$ is Y-6B, $R^2$ is $C_2H_5$, $R^9$ is $CH_3$ and $R^{10}$ is H.
Table 1488. Formula I.19 wherein $R^1$ is Y-6B, $R^2$ is $C_2H_5$, $R^9$ is $CH_3$ and $R^{10}$ is $CH_3$.
Table 1489. Formula I.19 wherein $R^1$ is Y-7A, $R^2$ is $C_2H_5$, $R^9$ is H and $R^{10}$ is H.
Table 1490. Formula I.19 wherein $R^1$ is Y-7A, $R^2$ is $C_2H_5$, $R^9$ is $CH_3$ and $R^{10}$ is H.
Table 1491. Formula I.19 wherein $R^1$ is Y-7A, $R^2$ is $C_2H_5$, $R^9$ is $CH_3$ and $R^{10}$ is $CH_3$.
Table 1492. Formula I.19 wherein $R^1$ is Y-7B, $R^2$ is $C_2H_5$, $R^9$ is H and $R^{10}$ is H.
Table 1493. Formula I.19 wherein $R^1$ is Y-7B, $R^2$ is $C_2H_5$, $R^9$ is $CH_3$ and $R^{10}$ is H.
Table 1494. Formula I.19 wherein $R^1$ is Y-7B, $R^2$ is $C_2H_5$, $R^9$ is $CH_3$ and $R^{10}$ is $CH_3$.
Table 1495. Formula I.19 wherein $R^1$ is Y-8A, $R^2$ is $C_2H_5$, $R^9$ is H and $R^{10}$ is H.
Table 1496. Formula I.19 wherein $R^1$ is Y-8A, $R^2$ is $C_2H_5$, $R^9$ is $CH_3$ and $R^{10}$ is H.
Table 1497. Formula I.19 wherein $R^1$ is Y-8A, $R^2$ is $C_2H_5$, $R^9$ is $CH_3$ and $R^{10}$ is $CH_3$.

Table 1498. Formula I.19 wherein R¹ is Y-8B, R² is C₂H₅, R⁹ is H and R¹⁰ is H.
Table 1499. Formula I.19 wherein R¹ is Y-8B, R² is C₂H₅, R⁹ is CH₃ and R¹⁰ is H.
Table 1500. Formula I.19 wherein R¹ is Y-8B, R² is C₂H₅, R⁹ is CH₃ and R¹⁰ is CH₃.
Table 1501. Formula I.19 wherein R¹ is Y-1A, R² is c-C₃H₅, R⁹ is H and R¹⁰ is H.
Table 1502. Formula I.19 wherein R¹ is Y-1A, R² is c-C₃H₅, R⁹ is CH₃ and R¹⁰ is H.
Table 1503. Formula I.19 wherein R¹ is Y-1A, R² is c-C₃H₅, R⁹ is CH₃ and R¹⁰ is CH₃.
Table 1504. Formula I.19 wherein R¹ is Y-1B, R² is c-C₃H₅, R⁹ is H and R¹⁰ is H.
Table 1505. Formula I.19 wherein R¹ is Y-1B, R² is c-C₃H₅, R⁹ is CH₃, R¹⁰ is H.
Table 1506. Formula I.19 wherein R¹ is Y-1B, R² is c-C₃H₅, R⁹ is CH₃ and R¹⁰ is CH₃.
Table 1507. Formula I.19 wherein R¹ is Y-2A, R² is c-C₃H₅, R⁹ is H and R¹⁰ is H.
Table 1508. Formula I.19 wherein R¹ is Y-2A, R² is c-C₃H₅, R⁹ is CH₃ and R¹⁰ is H.
Table 1509. Formula I.19 wherein R¹ is Y-2A, R² is c-C₃H₅, R⁹ is CH₃ and R¹⁰ is CH₃.
Table 1510. Formula I.19 wherein R¹ is Y-2B, R² is c-C₃H₅, R⁹ is H and R¹⁰ is H.
Table 1511. Formula I.19 wherein R¹ is Y-2B, R² is c-C₃H₅, R⁹ is CH₃ and R¹⁰ is H.
Table 1512. Formula I.19 wherein R¹ is Y-2B, R² is c-C₃H₅, R⁹ is CH₃ and R¹⁰ is CH₃.
Table 1513. Formula I.19 wherein R¹ is Y-3A, R² is c-C₃H₅, R⁹ is H and R¹⁰ is H.
Table 1514. Formula I.19 wherein R¹ is Y-3A, R² is c-C₃H₅, R⁹ is CH₃ and R¹⁰ is H.
Table 1515. Formula I.19 wherein R¹ is Y-3A, R² is c-C₃H₅, R⁹ is CH₃ and R¹⁰ is CH₃.
Table 1516. Formula I.19 wherein R¹ is Y-3B, R² is c-C₃H₅, R⁹ is H and R¹⁰ is H.
Table 1517. Formula I.19 wherein R¹ is Y-3B, R² is c-C₃H₅, R⁹ is CH₃ and R¹⁰ is H.
Table 1518. Formula I.19 wherein R¹ is Y-3B, R² is c-C₃H₅, R⁹ is CH₃ and R¹⁰ is CH₃.
Table 1519. Formula I.19 wherein R¹ is Y-3C, R² is c-C₃H₅, R⁹ is H and R¹⁰ is H.
Table 1520. Formula I.19 wherein R¹ is Y-3C, R² is c-C₃H₅, R⁹ is CH₃ and R¹⁰ is H.
Table 1521. Formula I.19 wherein R¹ is Y-3C, R² is c-C₃H₅, R⁹ is CH₃ and R¹⁰ is CH₃.
Table 1522. Formula I.19 wherein R¹ is Y-3D, R² is c-C₃H₅, R⁹ is H and R¹⁰ is H.
Table 1523. Formula I.19 wherein R¹ is Y-3D, R² is c-C₃H₅, R⁹ is CH₃ and R¹⁰ is H.
Table 1524. Formula I.19 wherein R¹ is Y-3D, R² is c-C₃H₅, R⁹ is CH₃ and R¹⁰ is CH₃.
Table 1525. Formula I.19 wherein R¹ is Y-4A, R² is c-C₃H₅, R⁹ is H and R¹⁰ is H.
Table 1526. Formula I.19 wherein R¹ is Y-4A, R² is c-C₃H₅, R⁹ is CH₃ and R¹⁰ is H.
Table 1527. Formula I.19 wherein R¹ is Y-4A, R² is c-C₃H₅, R⁹ is CH₃ and R¹⁰ is CH₃.
Table 1528. Formula I.19 wherein R¹ is Y-4B, R² is c-C₃H₅, R⁹ is H and R¹⁰ is H.
Table 1529. Formula I.19 wherein R¹ is Y-4B, R² is c-C₃H₅, R⁹ is CH₃ and R¹⁰ is H.
Table 1530. Formula I.19 wherein R¹ is Y-4B, R² is c-C₃H₅, R⁹ is CH₃ and R¹⁰ is CH₃.
Table 1531. Formula I.19 wherein R¹ is Y-4C, R² is c-C₃H₅, R⁹ is H and R¹⁰ is H.
Table 1532. Formula I.19 wherein R¹ is Y-4C, R² is c-C₃H₅, R⁹ is CH₃ and R¹⁰ is H.
Table 1533. Formula I.19 wherein R¹ is Y-4C, R² is c-C₃H₅, R⁹ is CH₃ and R¹⁰ is CH₃.
Table 1534. Formula I.19 wherein R¹ is Y-4D, R² is c-C₃H₅, R⁹ is H and R¹⁰ is H.
Table 1535. Formula I.19 wherein R¹ is Y-4D, R² is c-C₃H₅, R⁹ is CH₃ and R¹⁰ is H.
Table 1536. Formula I.19 wherein R¹ is Y-4D, R² is c-C₃H₅, R⁹ is CH₃ and R¹⁰ is CH₃.
Table 1537. Formula I.19 wherein R¹ is Y-5A, R² is c-C₃H₅, R⁹ is H and R¹⁰ is H.
Table 1538. Formula I.19 wherein R¹ is Y-5A, R² is c-C₃H₅, R⁹ is CH₃ and R¹⁰ is H.
Table 1539. Formula I.19 wherein R¹ is Y-5A, R² is c-C₃H₅, R⁹ is CH₃ and R¹⁰ is CH₃.
Table 1540. Formula I.19 wherein R¹ is Y-5B, R² is c-C₃H₅, R⁹ is H and R¹⁰ is H.
Table 1541. Formula I.19 wherein R¹ is Y-5B, R² is c-C₃H₅, R⁹ is CH₃ and R¹⁰ is H.
Table 1542. Formula I.19 wherein R¹ is Y-5B, R² is c-C₃H₅, R⁹ is CH₃ and R¹⁰ is CH₃.
Table 1543. Formula I.19 wherein R¹ is Y-6A, R² is c-C₃H₅, R⁹ is H and R¹⁰ is H.
Table 1544. Formula I.19 wherein R¹ is Y-6A, R² is c-C₃H₅, R⁹ is CH₃ and R¹⁰ is H.
Table 1545. Formula I.19 wherein R¹ is Y-6A, R² is c-C₃H₅, R⁹ is CH₃ and R¹⁰ is CH₃.
Table 1546. Formula I.19 wherein R¹ is Y-6B, R² is c-C₃H₅, R⁹ is H and R¹⁰ is H.
Table 1547. Formula I.19 wherein R¹ is Y-6B, R² is c-C₃H₅, R⁹ is CH₃ and R¹⁰ is H.
Table 1548. Formula I.19 wherein R¹ is Y-6B, R² is c-C₃H₅, R⁹ is CH₃ and R¹⁰ is CH₃.
Table 1549. Formula I.19 wherein R¹ is Y-7A, R² is c-C₃H₅, R⁹ is H and R¹⁰ is H.
Table 1550. Formula I.19 wherein R¹ is Y-7A, R² is c-C₃H₅, R⁹ is CH₃ and R¹⁰ is H.
Table 1551. Formula I.19 wherein R¹ is Y-7A, R² is c-C₃H₅, R⁹ is CH₃ and R¹⁰ is CH₃.
Table 1552. Formula I.19 wherein R¹ is Y-7B, R² is c-C₃H₅, R⁹ is H and R¹⁰ is H.
Table 1553. Formula I.19 wherein R¹ is Y-7B, R² is c-C₃H₅, R⁹ is CH₃ and R¹⁰ is H.
Table 1554. Formula I.19 wherein R¹ is Y-7B, R² is c-C₃H₅, R⁹ is CH₃ and R¹⁰ is CH₃.
Table 1555. Formula I.19 wherein R¹ is Y-8A, R² is c-C₃H₅, R⁹ is H and R¹⁰ is H.
Table 1556. Formula I.19 wherein R¹ is Y-8A, R² is c-C₃H₅, R⁹ is CH₃ and R¹⁰ is H.
Table 1557. Formula I.19 wherein R¹ is Y-8A, R² is c-C₃H₅, R⁹ is CH₃ and R¹⁰ is CH₃.
Table 1558. Formula I.19 wherein R¹ is Y-8B, R² is c-C₃H₅, R⁹ is H and R¹⁰ is H.
Table 1559. Formula I.19 wherein R¹ is Y-8B, R² is c-C₃H₅, R⁹ is CH₃ and R¹⁰ is H.
Table 1560. Formula I.19 wherein R¹ is Y-8B, R² is c-C₃H₅, R⁹ is CH₃ and R¹⁰ is CH₃.
Table 1561. Formula I.20 wherein R¹ is Y-1A, R² is H, R⁹ is H and R¹⁰ is H.
Table 1562. Formula I.20 wherein R¹ is Y-1A, R² is H, R⁹ is CH₃ and, R¹⁰ is H.
Table 1563. Formula I.20 wherein R¹ is Y-1A, R² is H, R⁹ is CH₃ and R¹⁰ is CH₃.

Table 1564. Formula I.20 wherein $R^1$ is Y-1B, $R^2$ is H, $R^9$ is H and $R^{10}$ is H.
Table 1565. Formula I.20 wherein $R^1$ is Y-1B, $R^2$ is H, $R^9$ is $CH_3$ and $R^{10}$ is H.
Table 1566. Formula I.20 wherein $R^1$ is Y-1B, $R^2$ is H, $R^9$ is $CH_3$ and $R^{10}$ is $CH_3$.
Table 1567. Formula I.20 wherein $R^1$ is Y-2A, $R^2$ is H, $R^9$ is H and $R^{10}$ is H.
Table 1568. Formula I.20 wherein $R^1$ is Y-2A, $R^2$ is H, $R^9$ is $CH_3$ and $R^{10}$ is H.
Table 1569. Formula I.20 wherein $R^1$ is Y-2A, $R^2$ is H, $R^9$ is $CH_3$ and $R^{10}$ is $CH_3$.
Table 1570. Formula I.20 wherein $R^1$ is Y-2B, $R^2$ is H, $R^9$ is H and $R^{10}$ is H.
Table 1571. Formula I.20 wherein $R^1$ is Y-2B, $R^2$ is H, $R^9$ is $CH_3$ and $R^{10}$ is H.
Table 1572. Formula I.20 wherein $R^1$ is Y-2B, $R^2$ is H, $R^9$ is $CH_3$ and $R^{10}$ is $CH_3$.
Table 1573. Formula I.20 wherein $R^1$ is Y-3A, $R^2$ is H, $R^9$ is H and $R^{10}$ is H.
Table 1574. Formula I.20 wherein $R^1$ is Y-3A, $R^2$ is H, $R^9$ is $CH_3$ and $R^{10}$ is H.
Table 1575. Formula I.20 wherein $R^1$ is Y-3A, $R^2$ is H, $R^9$ is $CH_3$ and $R^{10}$ is $CH_3$.
Table 1576. Formula I.20 wherein $R^1$ is Y-3B, $R^2$ is H, $R^9$ is H and $R^{10}$ is H.
Table 1577. Formula I.20 wherein $R^1$ is Y-3B, $R^2$ is H, $R^9$ is $CH_3$ and $R^{10}$ is H.
Table 1578. Formula I.20 wherein $R^1$ is Y-3B, $R^2$ is H, $R^9$ is $CH_3$ and $R^{10}$ is $CH_3$.
Table 1579. Formula I.20 wherein $R^1$ is Y-3C, $R^2$ is H, $R^9$ is H and $R^{10}$ is H.
Table 1580. Formula I.20 wherein $R^1$ is Y-3C, $R^2$ is H, $R^9$ is $CH_3$ and $R^{10}$ is H.
Table 1581. Formula I.20 wherein $R^1$ is Y-3C, $R^2$ is H, $R^9$ is $CH_3$ and $R^{10}$ is $CH_3$.
Table 1582. Formula I.20 wherein $R^1$ is Y-3D, $R^2$ is H, $R^9$ is H and $R^{10}$ is H.
Table 1583. Formula I.20 wherein $R^1$ is Y-3D, $R^2$ is H, $R^9$ is $CH_3$ and $R^{10}$ is H.
Table 1584. Formula I.20 wherein $R^1$ is Y-3D, $R^2$ is H, $R^9$ is $CH_3$ and $R^{10}$ is $CH_3$.
Table 1585. Formula I.20 wherein $R^1$ is Y-4A, $R^2$ is H, $R^9$ is H and $R^{10}$ is H.
Table 1586. Formula I.20 wherein $R^1$ is Y-4A, $R^2$ is H, $R^9$ is $CH_3$ and $R^{10}$ is H.
Table 1587. Formula I.20 wherein $R^1$ is Y-4A, $R^2$ is H, $R^9$ is $CH_3$ and $R^{10}$ is $CH_3$.
Table 1588. Formula I.20 wherein $R^1$ is Y-4B, $R^2$ is H, $R^9$ is H and $R^{10}$ is H.
Table 1589. Formula I.20 wherein $R^1$ is Y-4B, $R^2$ is H, $R^9$ is $CH_3$ and $R^{10}$ is H.
Table 1590. Formula I.20 wherein $R^1$ is Y-4B, $R^2$ is H, $R^9$ is $CH_3$ and $R^{10}$ is $CH_3$.
Table 1591. Formula I.20 wherein $R^1$ is Y-4C, $R^2$ is H, $R^9$ is H and $R^{10}$ is H.
Table 1592. Formula I.20 wherein $R^1$ is Y-4C, $R^2$ is H, $R^9$ is $CH_3$ and $R^{10}$ is H.
Table 1593. Formula I.20 wherein $R^1$ is Y-4C, $R^2$ is H, $R^9$ is $CH_3$ and $R^{10}$ is $CH_3$.
Table 1594. Formula I.20 wherein $R^1$ is Y-4D, $R^2$ is H, $R^9$ is H and $R^{10}$ is H.
Table 1595. Formula I.20 wherein $R^1$ is Y-4D, $R^2$ is H, $R^9$ is $CH_3$ and $R^{10}$ is H.
Table 1596. Formula I.20 wherein $R^1$ is Y-4D, $R^2$ is H, $R^9$ is $CH_3$ and $R^{10}$ is $CH_3$.
Table 1597. Formula I.20 wherein $R^1$ is Y-5A, $R^2$ is H, $R^9$ is H and $R^{10}$ is H.
Table 1598. Formula I.20 wherein $R^1$ is Y-5A, $R^2$ is H, $R^9$ is $CH_3$ and $R^{10}$ is H.
Table 1599. Formula I.20 wherein $R^1$ is Y-5A, $R^2$ is H, $R^9$ is $CH_3$ and $R^{10}$ is $CH_3$.
Table 1600. Formula I.20 wherein $R^1$ is Y-5B, $R^2$ is H, $R^9$ is H and $R^{10}$ is H.
Table 1601. Formula I.20 wherein $R^1$ is Y-5B, $R^2$ is H, $R^9$ is $CH_3$ and $R^{10}$ is H.
Table 1602. Formula I.20 wherein $R^1$ is Y-5B, $R^2$ is H, $R^9$ is $CH_3$ and $R^{10}$ is $CH_3$.
Table 1603. Formula I.20 wherein $R^1$ is Y-6A, $R^2$ is H, $R^9$ is H and $R^{10}$ is H.
Table 1604. Formula I.20 wherein $R^1$ is Y-6A, $R^2$ is H, $R^9$ is $CH_3$ and $R^{10}$ is H.
Table 1605. Formula I.20 wherein $R^1$ is Y-6A, $R^2$ is H, $R^9$ is $CH_3$ and $R^{10}$ is $CH_3$.
Table 1606. Formula I.20 wherein $R^1$ is Y-6B, $R^2$ is H, $R^9$ is H and $R^{10}$ is H.
Table 1607. Formula I.20 wherein $R^1$ is Y-6B, $R^2$ is H, $R^9$ is $CH_3$ and $R^{10}$ is H.
Table 1608. Formula I.20 wherein $R^1$ is Y-6B, $R^2$ is H, $R^9$ is $CH_3$ and $R^{10}$ is $CH_3$.
Table 1609. Formula I.20 wherein $R^1$ is Y-7A, $R^2$ is H, $R^9$ is H and $R^{10}$ is H.
Table 1610. Formula I.20 wherein $R^1$ is Y-7A, $R^2$ is H, $R^9$ is $CH_3$ and $R^{10}$ is H.
Table 1611. Formula I.20 wherein $R^1$ is Y-7A, $R^2$ is H, $R^9$ is $CH_3$ and $R^{10}$ is $CH_3$.
Table 1612. Formula I.20 wherein $R^1$ is Y-7B, $R^2$ is H, $R^9$ is H and $R^{10}$ is H.
Table 1613. Formula I.20 wherein $R^1$ is Y-7B, $R^2$ is H, $R^9$ is $CH_3$ and $R^{10}$ is H.
Table 1614. Formula I.20 wherein $R^1$ is Y-7B, $R^2$ is H, $R^9$ is $CH_3$ and $R^{10}$ is $CH_3$.
Table 1615. Formula I.20 wherein $R^1$ is Y-8A, $R^2$ is H, $R^9$ is H and $R^{10}$ is H.
Table 1616. Formula I.20 wherein $R^1$ is Y-8A, $R^2$ is H, $R^9$ is $CH_3$ and $R^{10}$ is H.
Table 1617. Formula I.20 wherein $R^1$ is Y-8A, $R^2$ is H, $R^9$ is $CH_3$ and $R^{10}$ is $CH_3$.
Table 1618. Formula I.20 wherein $R^1$ is Y-8B, $R^2$ is H, $R^9$ is H and $R^{10}$ is H.
Table 1619. Formula I.20 wherein $R^1$ is Y-8B, $R^2$ is H, $R^9$ is $CH_3$ and $R^{10}$ is H.
Table 1620. Formula I.20 wherein $R^1$ is Y-8B, $R^2$ is H, $R^9$ is $CH_3$ and $R^{10}$ is $CH_3$.
Table 1621. Formula I.20 wherein $R^1$ is Y-1A, $R^2$ is $CH_3$, $R^9$ is H and $R^{10}$ is H.
Table 1622. Formula I.20 wherein $R^1$ is Y-1A, $R^2$ is $CH_3$, $R^9$ is $CH_3$ and $R^{10}$ is H.
Table 1623. Formula I.20 wherein $R^1$ is Y-1A, $R^2$ is $CH_3$, $R^9$ is $CH_3$ and $R^{10}$ is $CH_3$.
Table 1624. Formula I.20 wherein $R^1$ is Y-1B, $R^2$ is $CH_3$, $R^9$ is H and $R^{10}$ is H.
Table 1625. Formula I.20 wherein $R^1$ is Y-1B, $R^2$ is $CH_3$, $R^9$ is $CH_3$ and $R^{10}$ is H.
Table 1626. Formula I.20 wherein $R^1$ is Y-1B, $R^2$ is $CH_3$, $R^9$ is $CH_3$ and $R^{10}$ is $CH_3$.
Table 1627. Formula I.20 wherein $R^1$ is Y-2A, $R^2$ is $CH_3$, $R^9$ is H and $R^{10}$ is H.
Table 1628. Formula I.20 wherein $R^1$ is Y-2A, $R^2$ is $CH_3$, $R^9$ is $CH_3$ and $R^{10}$ is H.
Table 1629. Formula I.20 wherein $R^1$ is Y-2A, $R^2$ is $CH_3$, $R^9$ is $CH_3$ and $R^{10}$ is $CH_3$.

Table 1630. Formula I.20 wherein $R^1$ is Y-2B, $R^2$ is $CH_3$, $R^9$ is H and $R^{10}$ is H.
Table 1631. Formula I.20 wherein $R^1$ is Y-2B, $R^2$ is $CH_3$, $R^9$ is $CH_3$ and $R^{10}$ is H.
Table 1632. Formula I.20 wherein $R^1$ is Y-2B, $R^2$ is $CH_3$, $R^9$ is $CH_3$ and $R^{10}$ is $CH_3$.
Table 1633. Formula I.20 wherein $R^1$ is Y-3A, $R^2$ is $CH_3$, $R^9$ is H and $R^{10}$ is H.
Table 1634. Formula I.20 wherein $R^1$ is Y-3A, $R^2$ is $CH_3$, $R^9$ is $CH_3$ and $R^{10}$ is H.
Table 1635. Formula I.20 wherein $R^1$ is Y-3A, $R^2$ is $CH_3$, $R^9$ is $CH_3$ and $R^{10}$ is $CH_3$.
Table 1636. Formula I.20 wherein $R^1$ is Y-3B, $R^2$ is $CH_3$, $R^9$ is H and $R^{10}$ is H.
Table 1637. Formula I.20 wherein $R^1$ is Y-3B, $R^2$ is $CH_3$, $R^9$ is $CH_3$ and $R^{10}$ is H.
Table 1638. Formula I.20 wherein $R^1$ is Y-3B, $R^2$ is $CH_3$, $R^9$ is $CH_3$ and $R^{10}$ is $CH_3$.
Table 1639. Formula I.20 wherein $R^1$ is Y-3C, $R^2$ is $CH_3$, $R^9$ is H and $R^{10}$ is H.
Table 1640. Formula I.20 wherein $R^1$ is Y-3C, $R^2$ is $CH_3$, $R^9$ is $CH_3$ and $R^{10}$ is H.
Table 1641. Formula I.20 wherein $R^1$ is Y-3C, $R^2$ is $CH_3$, $R^9$ is $CH_3$ and $R^{10}$ is $CH_3$.
Table 1642. Formula I.20 wherein $R^1$ is Y-3D, $R^2$ is $CH_3$, $R^9$ is H and $R^{10}$ is H.
Table 1643. Formula I.20 wherein $R^1$ is Y-3D, $R^2$ is $CH_3$, $R^9$ is $CH_3$ and $R^{10}$ is H.
Table 1644. Formula I.20 wherein $R^1$ is Y-3D, $R^2$ is $CH_3$, $R^9$ is $CH_3$ and $R^{10}$ is $CH_3$.
Table 1645. Formula I.20 wherein $R^1$ is Y-4A, $R^2$ is $CH_3$, $R^9$ is H and $R^{10}$ is H.
Table 1646. Formula I.20 wherein $R^1$ is Y-4A, $R^2$ is $CH_3$, $R^9$ is $CH_3$ and $R^{10}$ is H.
Table 1647. Formula I.20 wherein $R^1$ is Y-4A, $R^2$ is $CH_3$, $R^9$ is $CH_3$ and $R^{10}$ is $CH_3$.
Table 1648. Formula I.20 wherein $R^1$ is Y-4B, $R^2$ is $CH_3$, $R^9$ is H and $R^{10}$ is H.
Table 1649. Formula I.20 wherein $R^1$ is Y-4B, $R^2$ is $CH_3$, $R^9$ is $CH_3$ and $R^{10}$ is H.
Table 1650. Formula I.20 wherein $R^1$ is Y-4B, $R^2$ is $CH_3$, $R^9$ is $CH_3$ and $R^{10}$ is $CH_3$.
Table 1651. Formula I.20 wherein $R^1$ is Y-4C, $R^2$ is $CH_3$, $R^9$ is H and $R^{10}$ is H.
Table 1652. Formula I.20 wherein $R^1$ is Y-4C, $R^2$ is $CH_3$, $R^9$ is $CH_3$ and $R^{10}$ is H.
Table 1653. Formula I.20 wherein $R^1$ is Y-4C, $R^2$ is $CH_3$, $R^9$ is $CH_3$ and $R^{10}$ is $CH_3$.
Table 1654. Formula I.20 wherein $R^1$ is Y-4D, $R^2$ is $CH_3$, $R^9$ is H and $R^{10}$ is H.
Table 1655. Formula I.20 wherein $R^1$ is Y-4D, $R^2$ is $CH_3$, $R^9$ is $CH_3$ and $R^{10}$ is H.
Table 1656. Formula I.20 wherein $R^1$ is Y-4D, $R^2$ is $CH_3$, $R^9$ is $CH_3$ and $R^{10}$ is $CH_3$.
Table 1657. Formula I.20 wherein $R^1$ is Y-5A, $R^2$ is $CH_3$, $R^9$ is H and $R^{10}$ is H.
Table 1658. Formula I.20 wherein $R^1$ is Y-5A, $R^2$ is $CH_3$, $R^9$ is $CH_3$ and $R^{10}$ is H.
Table 1659. Formula I.20 wherein $R^1$ is Y-5A, $R^2$ is $CH_3$, $R^9$ is $CH_3$ and $R^{10}$ is $CH_3$.
Table 1660. Formula I.20 wherein $R^1$ is Y-5B, $R^2$ is $CH_3$, $R^9$ is H and $R^{10}$ is H.
Table 1661. Formula I.20 wherein $R^1$ is Y-5B, $R^2$ is $CH_3$, $R^9$ is $CH_3$ and $R^{10}$ is H.
Table 1662. Formula I.20 wherein $R^1$ is Y-5B, $R^2$ is $CH_3$, $R^9$ is $CH_3$ and $R^{10}$ is $CH_3$.
Table 1663. Formula I.20 wherein $R^1$ is Y-6A, $R^2$ is $CH_3$, $R^9$ is H and $R^{10}$ is H.
Table 1664. Formula I.20 wherein $R^1$ is Y-6A, $R^2$ is $CH_3$, $R^9$ is $CH_3$ and $R^{10}$ is H.
Table 1665. Formula I.20 wherein $R^1$ is Y-6A, $R^2$ is $CH_3$, $R^9$ is $CH_3$ and $R^{10}$ is $CH_3$.
Table 1666. Formula I.20 wherein $R^1$ is Y-6B, $R^2$ is $CH_3$, $R^9$ is H and $R^{10}$ is H.
Table 1667. Formula I.20 wherein $R^1$ is Y-6B, $R^2$ is $CH_3$, $R^9$ is $CH_3$ and $R^{10}$ is H.
Table 1668. Formula I.20 wherein $R^1$ is Y-6B, $R^2$ is $CH_3$, $R^9$ is $CH_3$ and $R^{10}$ is $CH_3$.
Table 1669. Formula I.20 wherein $R^1$ is Y-7A, $R^2$ is $CH_3$, $R^9$ is H and $R^{10}$ is H.
Table 1670. Formula I.20 wherein $R^1$ is Y-7A, $R^2$ is $CH_3$, $R^9$ is $CH_3$ and $R^{10}$ is H.
Table 1671. Formula I.20 wherein $R^1$ is Y-7A, $R^2$ is $CH_3$, $R^9$ is $CH_3$ and $R^{10}$ is $CH_3$.
Table 1672. Formula I.20 wherein $R^1$ is Y-7B, $R^2$ is $CH_3$, $R^9$ is H and $R^{10}$ is H.
Table 1673. Formula I.20 wherein $R^1$ is Y-7B, $R^2$ is $CH_3$, $R^9$ is $CH_3$ and $R^{10}$ is H.
Table 1674. Formula I.20 wherein $R^1$ is Y-7B, $R^2$ is $CH_3$, $R^9$ is $CH_3$ and $R^{10}$ is $CH_3$.
Table 1675. Formula I.20 wherein $R^1$ is Y-8A, $R^2$ is $CH_3$, $R^9$ is H and $R^{10}$ is H.
Table 1676. Formula I.20 wherein $R^1$ is Y-8A, $R^2$ is $CH_3$, $R^9$ is $CH_3$ and $R^{10}$ is H.
Table 1677. Formula I.20 wherein $R^1$ is Y-8A, $R^2$ is $CH_3$, $R^9$ is $CH_3$ and $R^{10}$ is $CH_3$.
Table 1678. Formula I.20 wherein $R^1$ is Y-8B, $R^2$ is $CH_3$, $R^9$ is H and $R^{10}$ is H.
Table 1679. Formula I.20 wherein $R^1$ is Y-8B, $R^2$ is $CH_3$, $R^9$ is $CH_3$ and $R^{10}$ is H.
Table 1680. Formula I.20 wherein $R^1$ is Y-8B, $R^2$ is $CH_3$, $R^9$ is $CH_3$ and $R^{10}$ is $CH_3$.
Table 1681. Formula I.20 wherein $R^1$ is Y-1A, $R^2$ is $C_2H_5$, $R^9$ is H and $R^{10}$ is H.
Table 1682. Formula I.20 wherein $R^1$ is Y-1A, $R^2$ is $C_2H_5$, $R^9$ is $CH_3$ and $R^{10}$ is H.
Table 1683. Formula I.20 wherein $R^1$ is Y-1A, $R^2$ is $C_2H_5$, $R^9$ is $CH_3$ and $R^{10}$ is $CH_3$.
Table 1684. Formula I.20 wherein $R^1$ is Y-1B, $R^2$ is $C_2H_5$, $R^9$ is H and $R^{10}$ is H.
Table 1685. Formula I.20 wherein $R^1$ is Y-1B, $R^2$ is $C_2H_5$, $R^9$ is $CH_3$ and $R^{10}$ is H.
Table 1686. Formula I.20 wherein $R^1$ is Y-1B, $R^2$ is $C_2H_5$, $R^9$ is $CH_3$ and $R^{10}$ is $CH_3$.
Table 1687. Formula I.20 wherein $R^1$ is Y-2A, $R^2$ is $C_2H_5$, $R^9$ is H and $R^{10}$ is H.
Table 1688. Formula I.20 wherein $R^1$ is Y-2A, $R^2$ is $C_2H_5$, $R^9$ is $CH_3$ and $R^{10}$ is H.
Table 1689. Formula I.20 wherein $R^1$ is Y-2A, $R^2$ is $C_2H_5$, $R^9$ is $CH_3$ and $R^{10}$ is $CH_3$.
Table 1690. Formula I.20 wherein $R^1$ is Y-2B, $R^2$ is $C_2H_5$, $R^9$ is H and $R^{10}$ is H.
Table 1691. Formula I.20 wherein $R^1$ is Y-2B, $R^2$ is $C_2H_5$, $R^9$ is $CH_3$ and $R^{10}$ is H.
Table 1692. Formula I.20 wherein $R^1$ is Y-2B, $R^2$ is $C_2H_5$, $R^9$ is $CH_3$ and $R^{10}$ is $CH_3$.
Table 1693. Formula I.20 wherein $R^1$ is Y-3A, $R^2$ is $C_2H_5$, $R^9$ is H and $R^{10}$ is H.
Table 1694. Formula I.20 wherein $R^1$ is Y-3A, $R^2$ is $C_2H_5$, $R^9$ is $CH_3$ and $R^{10}$ is H.
Table 1695. Formula I.20 wherein $R^1$ is Y-3A, $R^2$ is $C_2H_5$, $R^9$ is $CH_3$ and $R^{10}$ is $CH_3$.

Table 1696. Formula I.20 wherein R$^1$ is Y-3B, R$^2$ is C$_2$H$_5$, R$^9$ is H and R$^{10}$ is H.
Table 1697. Formula I.20 wherein R$^1$ is Y-3B, R$^2$ is C$_2$H$_5$, R$^9$ is CH$_3$ and R$^{10}$ is H.
Table 1698. Formula I.20 wherein R$^1$ is Y-3B, R$^2$ is C$_2$H$_5$, R$^9$ is CH$_3$ and R$^{10}$ is CH$_3$.
Table 1699. Formula I.20 wherein R$^1$ is Y-3C, R$^2$ is C$_2$H$_5$, R$^9$ is H and R$^{10}$ is H.
Table 1700. Formula I.20 wherein R$^1$ is Y-3C, R$^2$ is C$_2$H$_5$, R$^9$ is CH$_3$ and R$^{10}$ is H.
Table 1701. Formula I.20 wherein R$^1$ is Y-3C, R$^2$ is C$_2$H$_5$, R$^9$ is CH$_3$ and R$^{10}$ is CH$_3$.
Table 1702. Formula I.20 wherein R$^1$ is Y-3D, R$^2$ is C$_2$H$_5$, R$^9$ is H and R$^{10}$ is H.
Table 1703. Formula I.20 wherein R$^1$ is Y-3D, R$^2$ is C$_2$H$_5$, R$^9$ is CH$_3$ and R$^{10}$ is H.
Table 1704. Formula I.20 wherein R$^1$ is Y-3D, R$^2$ is C$_2$H$_5$, R$^9$ is CH$_3$ and R$^{10}$ is CH$_3$.
Table 1705. Formula I.20 wherein R$^1$ is Y-4A, R$^2$ is C$_2$H$_5$, R$^9$ is H and R$^{10}$ is H.
Table 1706. Formula I.20 wherein R$^1$ is Y-4A, R$^2$ is C$_2$H$_5$, R$^9$ is CH$_3$ and R$^{10}$ is H.
Table 1707. Formula I.20 wherein R$^1$ is Y-4A, R$^2$ is C$_2$H$_5$, R$^9$ is CH$_3$ and R$^{10}$ is CH$_3$.
Table 1708. Formula I.20 wherein R$^1$ is Y-4B, R$^2$ is C$_2$H$_5$, R$^9$ is H and R$^{10}$ is H.
Table 1709. Formula I.20 wherein R$^1$ is Y-4B, R$^2$ is C$_2$H$_5$, R$^9$ is CH$_3$ and R$^{10}$ is H.
Table 1710. Formula I.20 wherein R$^1$ is Y-4B, R$^2$ is C$_2$H$_5$, R$^9$ is CH$_3$ and R$^{10}$ is CH$_3$.
Table 1711. Formula I.20 wherein R$^1$ is Y-4C, R$^2$ is C$_2$H$_5$, R$^9$ is H and R$^{10}$ is H.
Table 1712. Formula I.20 wherein R$^1$ is Y-4C, R$^2$ is C$_2$H$_5$, R$^9$ is CH$_3$ and R$^{10}$ is H.
Table 1713. Formula I.20 wherein R$^1$ is Y-4C, R$^2$ is C$_2$H$_5$, R$^9$ is CH$_3$ and R$^{10}$ is CH$_3$.
Table 1714. Formula I.20 wherein R$^1$ is Y-4D, R$^2$ is C$_2$H$_5$, R$^9$ is H and R$^{10}$ is H.
Table 1715. Formula I.20 wherein R$^1$ is Y-4D, R$^2$ is C$_2$H$_5$, R$^9$ is CH$_3$ and R$^{10}$ is H.
Table 1716. Formula I.20 wherein R$^1$ is Y-4D, R$^2$ is C$_2$H$_5$, R$^9$ is CH$_3$ and R$^{10}$ is CH$_3$.
Table 1717. Formula I.20 wherein R$^1$ is Y-5A, R$^2$ is C$_2$H$_5$, R$^9$ is H and R$^{10}$ is H.
Table 1718. Formula I.20 wherein R$^1$ is Y-5A, R$^2$ is C$_2$H$_5$, R$^9$ is CH$_3$ and R$^{10}$ is H.
Table 1719. Formula I.20 wherein R$^1$ is Y-5A, R$^2$ is C$_2$H$_5$, R$^9$ is CH$_3$ and R$^{10}$ is CH$_3$.
Table 1720. Formula I.20 wherein R$^1$ is Y-5B, R$^2$ is C$_2$H$_5$, R$^9$ is H and R$^{10}$ is H.
Table 1721. Formula I.20 wherein R$^1$ is Y-5B, R$^2$ is C$_2$H$_5$, R$^9$ is CH$_3$ and R$^{10}$ is H.
Table 1722. Formula I.20 wherein R$^1$ is Y-5B, R$^2$ is C$_2$H$_5$, R$^9$ is CH$_3$ and R$^{10}$ is CH$_3$.
Table 1723. Formula I.20 wherein R$^1$ is Y-6A, R$^2$ is C$_2$H$_5$, R$^9$ is H and R$^{10}$ is H.
Table 1724. Formula I.20 wherein R$^1$ is Y-6A, R$^2$ is C$_2$H$_5$, R$^9$ is CH$_3$ and R$^{10}$ is H.
Table 1725. Formula I.20 wherein R$^1$ is Y-6A, R$^2$ is C$_2$H$_5$, R$^9$ is CH$_3$ and R$^{10}$ is CH$_3$.
Table 1726. Formula I.20 wherein R$^1$ is Y-6B, R$^2$ is C$_2$H$_5$, R$^9$ is H and R$^{10}$ is H.
Table 1727. Formula I.20 wherein R$^1$ is Y-6B, R$^2$ is C$_2$H$_5$, R$^9$ is CH$_3$ and R$^{10}$ is H.
Table 1728. Formula I.20 wherein R$^1$ is Y-6B, R$^2$ is C$_2$H$_5$, R$^9$ is CH$_3$ and R$^{10}$ is CH$_3$.
Table 1729. Formula I.20 wherein R$^1$ is Y-7A, R$^2$ is C$_2$H$_5$, R$^9$ is H and R$^{10}$ is H.
Table 1730. Formula I.20 wherein R$^1$ is Y-7A, R$^2$ is C$_2$H$_5$, R$^9$ is CH$_3$ and R$^{10}$ is H.
Table 1731. Formula I.20 wherein R$^1$ is Y-7A, R$^2$ is C$_2$H$_5$, R$^9$ is CH$_3$ and R$^{10}$ is CH$_3$.
Table 1732. Formula I.20 wherein R$^1$ is Y-7B, R$^2$ is C$_2$H$_5$, R$^9$ is H and R$^{10}$ is H.
Table 1733. Formula I.20 wherein R$^1$ is Y-7B, R$^2$ is C$_2$H$_5$, R$^9$ is CH$_3$ and R$^{10}$ is H.
Table 1734. Formula I.20 wherein R$^1$ is Y-7B, R$^2$ is C$_2$H$_5$, R$^9$ is CH$_3$ and R$^{10}$ is CH$_3$.
Table 1735. Formula I.20 wherein R$^1$ is Y-8A, R$^2$ is C$_2$H$_5$, R$^9$ is H and R$^{10}$ is H.
Table 1736. Formula I.20 wherein R$^1$ is Y-8A, R$^2$ is C$_2$H$_5$, R$^9$ is CH$_3$ and R$^{10}$ is H.
Table 1737. Formula I.20 wherein R$^1$ is Y-8A, R$^2$ is C$_2$H$_5$, R$^9$ is CH$_3$ and R$^{10}$ is CH$_3$.
Table 1738. Formula I.20 wherein R$^1$ is Y-8B, R$^2$ is C$_2$H$_5$, R$^9$ is H and R$^{10}$ is H.
Table 1739. Formula I.20 wherein R$^1$ is Y-8B, R$^2$ is C$_2$H$_5$, R$^9$ is CH$_3$ and R$^{10}$ is H.
Table 1740. Formula I.20 wherein R$^1$ is Y-8B, R$^2$ is C$_2$H$_5$, R$^9$ is CH$_3$ and R$^{10}$ is CH$_3$.
Table 1741. Formula I.20 wherein R$^1$ is Y-1A, R$^2$ is c-C$_3$H$_5$, R$^9$ is H and R$^{10}$ is H.
Table 1742. Formula I.20 wherein R$^1$ is Y-1A, R$^2$ is c-C$_3$H$_5$, R$^9$ is CH$_3$ and R$^{10}$ is H.
Table 1743. Formula I.20 wherein R$^1$ is Y-1A, R$^2$ is c-C$_3$H$_5$, R$^9$ is CH$_3$ and R$^{10}$ is CH$_3$.
Table 1744. Formula I.20 wherein R$^1$ is Y-1B, R$^2$ is c-C$_3$H$_5$, R$^9$ is H and R$^{10}$ is H.
Table 1745. Formula I.20 wherein R$^1$ is Y-1B, R$^2$ is c-C$_3$H$_5$, R$^9$ is CH$_3$, R$^{10}$ is H.
Table 1746. Formula I.20 wherein R$^1$ is Y-1B, R$^2$ is c-C$_3$H$_5$, R$^9$ is CH$_3$ and R$^{10}$ is CH$_3$.
Table 1747. Formula I.20 wherein R$^1$ is Y-2A, R$^2$ is c-C$_3$H$_5$, R$^9$ is H and R$^{10}$ is H.
Table 1748. Formula I.20 wherein R$^1$ is Y-2A, R$^2$ is c-C$_3$H$_5$, R$^9$ is CH$_3$ and R$^{10}$ is H.
Table 1749. Formula I.20 wherein R$^1$ is Y-2A, R$^2$ is c-C$_3$H$_5$, R$^9$ is CH$_3$ and R$^{10}$ is CH$_3$.
Table 1750. Formula I.20 wherein R$^1$ is Y-2B, R$^2$ is c-C$_3$H$_5$, R$^9$ is H and R$^{10}$ is H.
Table 1751. Formula I.20 wherein R$^1$ is Y-2B, R$^2$ is c-C$_3$H$_5$, R$^9$ is CH$_3$ and R$^{10}$ is H.
Table 1752. Formula I.20 wherein R$^1$ is Y-2B, R$^2$ is c-C$_3$H$_5$, R$^9$ is CH$_3$ and R$^{10}$ is CH$_3$.
Table 1753. Formula I.20 wherein R$^1$ is Y-3A, R$^2$ is c-C$_3$H$_5$, R$^9$ is H and R$^{10}$ is H.
Table 1754. Formula I.20 wherein R$^1$ is Y-3A, R$^2$ is c-C$_3$H$_5$, R$^9$ is CH$_3$ and R$^{10}$ is H.
Table 1755. Formula I.20 wherein R$^1$ is Y-3A, R$^2$ is c-C$_3$H$_5$, R$^9$ is CH$_3$ and R$^{10}$ is CH$_3$.
Table 1756. Formula I.20 wherein R$^1$ is Y-3B, R$^2$ is c-C$_3$H$_5$, R$^9$ is H and R$^{10}$ is H.
Table 1757. Formula I.20 wherein R$^1$ is Y-3B, R$^2$ is c-C$_3$H$_5$, R$^9$ is CH$_3$ and R$^{10}$ is H.
Table 1758. Formula I.20 wherein R$^1$ is Y-3B, R$^2$ is c-C$_3$H$_5$, R$^9$ is CH$_3$ and R$^{10}$ is CH$_3$.
Table 1759. Formula I.20 wherein R$^1$ is Y-3C, R$^2$ is c-C$_3$H$_5$, R$^9$ is H and R$^{10}$ is H.
Table 1760. Formula I.20 wherein R$^1$ is Y-3C, R$^2$ is c-C$_3$H$_5$, R$^9$ is CH$_3$ and R$^{10}$ is H.
Table 1761. Formula I.20 wherein R$^1$ is Y-3C, R$^2$ is c-C$_3$H$_5$, R$^9$ is CH$_3$ and R$^{10}$ is CH$_3$.

Table 1762. Formula I.20 wherein $R^1$ is Y-3D, $R^2$ is c-$C_3H_5$, $R^9$ is H and $R^{10}$ is H.
Table 1763. Formula I.20 wherein $R^1$ is Y-3D, $R^2$ is c-$C_3H_5$, $R^9$ is $CH_3$ and $R^{10}$ is H.
Table 1764. Formula I.20 wherein $R^1$ is Y-3D, $R^2$ is c-$C_3H_5$, $R^9$ is $CH_3$ and $R^{10}$ is $CH_3$.
Table 1765. Formula I.20 wherein $R^1$ is Y-4A, $R^2$ is c-$C_3H_5$, $R^9$ is H and $R^{10}$ is H.
Table 1766. Formula I.20 wherein $R^1$ is Y-4A, $R^2$ is c-$C_3H_5$, $R^9$ is $CH_3$ and $R^{10}$ is H.
Table 1767. Formula I.20 wherein $R^1$ is Y-4A, $R^2$ is c-$C_3H_5$, $R^9$ is $CH_3$ and $R^{10}$ is $CH_3$.
Table 1768. Formula I.20 wherein $R^1$ is Y-4B, $R^2$ is c-$C_3H_5$, $R^9$ is H and $R^{10}$ is H.
Table 1769. Formula I.20 wherein $R^1$ is Y-4B, $R^2$ is c-$C_3H_5$, $R^9$ is $CH_3$ and $R^{10}$ is H.
Table 1770. Formula I.20 wherein $R^1$ is Y-4B, $R^2$ is c-$C_3H_5$, $R^9$ is $CH_3$ and $R^{10}$ is $CH_3$.
Table 1771. Formula I.20 wherein $R^1$ is Y-4C, $R^2$ is c-$C_3H_5$, $R^9$ is H and $R^{10}$ is H.
Table 1772. Formula I.20 wherein $R^1$ is Y-4C, $R^2$ is c-$C_3H_5$, $R^9$ is $CH_3$ and $R^{10}$ is H.
Table 1773. Formula I.20 wherein $R^1$ is Y-4C, $R^2$ is c-$C_3H_5$, $R^9$ is $CH_3$ and $R^{10}$ is $CH_3$.
Table 1774. Formula I.20 wherein $R^1$ is Y-4D, $R^2$ is c-$C_3H_5$, $R^9$ is H and $R^{10}$ is H.
Table 1775. Formula I.20 wherein $R^1$ is Y-4D, $R^2$ is c-$C_3H_5$, $R^9$ is $CH_3$ and $R^{10}$ is H.
Table 1776. Formula I.20 wherein $R^1$ is Y-4D, $R^2$ is c-$C_3H_5$, $R^9$ is $CH_3$ and $R^{10}$ is $CH_3$.
Table 1777. Formula I.20 wherein $R^1$ is Y-5A, $R^2$ is c-$C_3H_5$, $R^9$ is H and $R^{10}$ is H.
Table 1778. Formula I.20 wherein $R^1$ is Y-5A, $R^2$ is c-$C_3H_5$, $R^9$ is $CH_3$ and $R^{10}$ is H.
Table 1779. Formula I.20 wherein $R^1$ is Y-5A, $R^2$ is c-$C_3H_5$, $R^9$ is $CH_3$ and $R^{10}$ is $CH_3$.
Table 1780. Formula I.20 wherein $R^1$ is Y-5B, $R^2$ is c-$C_3H_5$, $R^9$ is H and $R^{10}$ is H.
Table 1781. Formula I.20 wherein $R^1$ is Y-5B, $R^2$ is c-$C_3H_5$, $R^9$ is $CH_3$ and $R^{10}$ is H.
Table 1782. Formula I.20 wherein $R^1$ is Y-5B, $R^2$ is c-$C_3H_5$, $R^9$ is $CH_3$ and $R^{10}$ is $CH_3$.
Table 1783. Formula I.20 wherein $R^1$ is Y-6A, $R^2$ is c-$C_3H_5$, $R^9$ is H and $R^{10}$ is H.
Table 1784. Formula I.20 wherein $R^1$ is Y-6A, $R^2$ is c-$C_3H_5$, $R^9$ is $CH_3$ and $R^{10}$ is H.
Table 1785. Formula I.20 wherein $R^1$ is Y-6A, $R^2$ is c-$C_3H_5$, $R^9$ is $CH_3$ and $R^{10}$ is $CH_3$.
Table 1786. Formula I.20 wherein $R^1$ is Y-6B, $R^2$ is c-$C_3H_5$, $R^9$ is H and $R^{10}$ is H.
Table 1787. Formula I.20 wherein $R^1$ is Y-6B, $R^2$ is c-$C_3H_5$, $R^9$ is $CH_3$ and $R^{10}$ is H.
Table 1788. Formula I.20 wherein $R^1$ is Y-6B, $R^2$ is c-$C_3H_5$, $R^9$ is $CH_3$ and $R^{10}$ is $CH_3$.
Table 1789. Formula I.20 wherein $R^1$ is Y-7A, $R^2$ is c-$C_3H_5$, $R^9$ is H and $R^{10}$ is H.
Table 1790. Formula I.20 wherein $R^1$ is Y-7A, $R^2$ is c-$C_3H_5$, $R^9$ is $CH_3$ and $R^{10}$ is H.
Table 1791. Formula I.20 wherein $R^1$ is Y-7A, $R^2$ is c-$C_3H_5$, $R^9$ is $CH_3$ and $R^{10}$ is $CH_3$.
Table 1792. Formula I.20 wherein $R^1$ is Y-7B, $R^2$ is c-$C_3H_5$, $R^9$ is H and $R^{10}$ is H.
Table 1793. Formula I.20 wherein $R^1$ is Y-7B, $R^2$ is c-$C_3H_5$, $R^9$ is $CH_3$ and $R^{10}$ is H.
Table 1794. Formula I.20 wherein $R^1$ is Y-7B, $R^2$ is c-$C_3H_5$, $R^9$ is $CH_3$ and $R^{10}$ is $CH_3$.
Table 1795. Formula I.20 wherein $R^1$ is Y-8A, $R^2$ is c-$C_3H_5$, $R^9$ is H and $R^{10}$ is H.
Table 1796. Formula I.20 wherein $R^1$ is Y-8A, $R^2$ is c-$C_3H_5$, $R^9$ is $CH_3$ and $R^{10}$ is H.
Table 1797. Formula I.20 wherein $R^1$ is Y-8A, $R^2$ is c-$C_3H_5$, $R^9$ is $CH_3$ and $R^{10}$ is $CH_3$.
Table 1798. Formula I.20 wherein $R^1$ is Y-8B, $R^2$ is c-$C_3H_5$, $R^9$ is H and $R^{10}$ is H.
Table 1799. Formula I.20 wherein $R^1$ is Y-8B, $R^2$ is c-$C_3H_5$, $R^9$ is $CH_3$ and $R^{10}$ is H.
Table 1800. Formula I.20 wherein $R^1$ is Y-8B, $R^2$ is c-$C_3H_5$, $R^9$ is $CH_3$ and $R^{10}$ is $CH_3$.
Table 1801. Formula I.25 wherein $R^1$ is Y-1A and $R^2$ is H.
Table 1802. Formula I.25 wherein $R^1$ is Y-1B and $R^2$ is H.
Table 1803. Formula I.25 wherein $R^1$ is Y-2A and $R^2$ is H.
Table 1804. Formula I.25 wherein $R^1$ is Y-2B and $R^2$ is H.
Table 1805. Formula I.25 wherein $R^1$ is Y-3A and $R^2$ is H.
Table 1806. Formula I.25 wherein $R^1$ is Y-3B and $R^2$ is H.
Table 1807. Formula I.25 wherein $R^1$ is Y-3C and $R^2$ is H.
Table 1808. Formula I.25 wherein $R^1$ is Y-3D and $R^2$ is H.
Table 1809. Formula I.25 wherein $R^1$ is Y-4A and $R^2$ is H.
Table 1810. Formula I.25 wherein $R^1$ is Y-4B and $R^2$ is H.
Table 1811. Formula I.25 wherein $R^1$ is Y-4C and $R^2$ is H.
Table 1812. Formula I.25 wherein $R^1$ is Y-4D and $R^2$ is H.
Table 1813. Formula I.25 wherein $R^1$ is Y-5A and $R^2$ is H.
Table 1814. Formula I.25 wherein $R^1$ is Y-5B and $R^2$ is H.
Table 1815. Formula I.25 wherein $R^1$ is Y-6A and $R^2$ is H.
Table 1816. Formula I.25 wherein $R^1$ is Y-6B and $R^2$ is H.
Table 1817. Formula I.25 wherein $R^1$ is Y-7A and $R^2$ is H.
Table 1818. Formula I.25 wherein $R^1$ is Y-7B and $R^2$ is H.
Table 1819. Formula I.25 wherein $R^1$ is Y-8A and $R^2$ is H.
Table 1820. Formula I.25 wherein $R^1$ is Y-8B and $R^2$ is H.
Table 1821. Formula I.25 wherein $R^1$ is Y-1A and $R^2$ is $CH_3$.
Table 1822. Formula I.25 wherein $R^1$ is Y-1B and $R^2$ is $CH_3$.
Table 1823. Formula I.25 wherein $R^1$ is Y-2A and $R^2$ is $CH_3$.
Table 1824. Formula I.25 wherein $R^1$ is Y-2B and $R^2$ is $CH_3$.
Table 1825. Formula I.25 wherein $R^1$ is Y-3A and $R^2$ is $CH_3$.
Table 1826. Formula I.25 wherein $R^1$ is Y-3B and $R^2$ is $CH_3$.
Table 1827. Formula I.25 wherein $R^1$ is Y-3C and $R^2$ is $CH_3$.
Table 1828. Formula I.25 wherein $R^1$ is Y-3D and $R^2$ is $CH_3$.
Table 1829. Formula I.25 wherein $R^1$ is Y-4A and $R^2$ is $CH_3$.
Table 1830. Formula I.25 wherein $R^1$ is Y-4B and $R^2$ is $CH_3$.
Table 1831. Formula I.25 wherein $R^1$ is Y-4C and $R^2$ is $CH_3$.
Table 1832. Formula I.25 wherein $R^1$ is Y-4D and $R^2$ is $CH_3$.
Table 1833. Formula I.25 wherein $R^1$ is Y-5A and $R^2$ is $CH_3$.
Table 1834. Formula I.25 wherein $R^1$ is Y-5B and $R^2$ is $CH_3$.
Table 1835. Formula I.25 wherein $R^1$ is Y-6A and $R^2$ is $CH_3$.
Table 1836. Formula I.25 wherein $R^1$ is Y-6B and $R^2$ is $CH_3$.
Table 1837. Formula I.25 wherein $R^1$ is Y-7A and $R^2$ is $CH_3$.
Table 1838. Formula I.25 wherein $R^1$ is Y-7B and $R^2$ is $CH_3$.
Table 1839. Formula I.25 wherein $R^1$ is Y-8A and $R^2$ is $CH_3$.
Table 1840. Formula I.25 wherein $R^1$ is Y-8B and $R^2$ is $CH_3$.
Table 1841. Formula I.25 wherein $R^1$ is Y-1A and $R^2$ is c-$C_3H_5$.
Table 1842. Formula I.25 wherein $R^1$ is Y-1B and $R^2$ is c-$C_3H_5$.
Table 1843. Formula I.25 wherein $R^1$ is Y-2A and $R^2$ is c-$C_3H_5$.
Table 1844. Formula I.25 wherein $R^1$ is Y-2B and $R^2$ is c-$C_3H_5$.
Table 1845. Formula I.25 wherein $R^1$ is Y-3A and $R^2$ is c-$C_3H_5$.
Table 1846. Formula I.25 wherein $R^1$ is Y-3B and $R^2$ is c-$C_3H_5$.
Table 1847. Formula I.25 wherein $R^1$ is Y-3C and $R^2$ is c-$C_3H_5$.

Table 1848. Formula I.25 wherein $R^1$ is Y-3D and $R^2$ is c-$C_3H_5$.
Table 1849. Formula I.25 wherein $R^1$ is Y-4A and $R^2$ is c-$C_3H_5$.
Table 1850. Formula I.25 wherein $R^1$ is Y-4B and $R^2$ is c-$C_3H_5$.
Table 1851. Formula I.25 wherein $R^1$ is Y-4C and $R^2$ is c-$C_3H_5$.
Table 1852. Formula I.25 wherein $R^1$ is Y-4D and $R^2$ is c-$C_3H_5$.
Table 1853. Formula I.25 wherein $R^1$ is Y-5A and $R^2$ is c-$C_3H_5$.
Table 1854. Formula I.25 wherein $R^1$ is Y-5B and $R^2$ is c-$C_3H_5$.
Table 1855. Formula I.25 wherein $R^1$ is Y-6A and $R^2$ is c-$C_3H_5$.
Table 1856. Formula I.25 wherein $R^1$ is Y-6B and $R^2$ is c-$C_3H_5$.
Table 1857. Formula I.25 wherein $R^1$ is Y-7A and $R^2$ is c-$C_3H_5$.
Table 1858. Formula I.25 wherein $R^1$ is Y-7B and $R^2$ is c-$C_3H_5$.
Table 1859. Formula I.25 wherein $R^1$ is Y-8A and $R^2$ is c-$C_3H_5$.
Table 1860. Formula I.25 wherein $R^1$ is Y-8B and $R^2$ is c-$C_3H_5$.
Table 1861. Formula I.26 wherein $R^1$ is Y-1A and $R^2$ is H.
Table 1862. Formula I.26 wherein $R^1$ is Y-1B and $R^2$ is H.
Table 1863. Formula I.26 wherein $R^1$ is Y-2A and $R^2$ is H.
Table 1864. Formula I.26 wherein $R^1$ is Y-2B and $R^2$ is H.
Table 1865. Formula I.26 wherein $R^1$ is Y-3A and $R^2$ is H.
Table 1866. Formula I.26 wherein $R^1$ is Y-3B and $R^2$ is H.
Table 1867. Formula I.26 wherein $R^1$ is Y-3C and $R^2$ is H.
Table 1868. Formula I.26 wherein $R^1$ is Y-3D and $R^2$ is H.
Table 1869. Formula I.26 wherein $R^1$ is Y-4A and $R^2$ is H.
Table 1870. Formula I.26 wherein $R^1$ is Y-4B and $R^2$ is H.
Table 1871. Formula I.26 wherein $R^1$ is Y-4C and $R^2$ is H.
Table 1872. Formula I.26 wherein $R^1$ is Y-4D and $R^2$ is H.
Table 1873. Formula I.26 wherein $R^1$ is Y-5A and $R^2$ is H.
Table 1874. Formula I.26 wherein $R^1$ is Y-5B and $R^2$ is H.
Table 1875. Formula I.26 wherein $R^1$ is Y-6A and $R^2$ is H.
Table 1876. Formula I.26 wherein $R^1$ is Y-6B and $R^2$ is H.
Table 1877. Formula I.26 wherein $R^1$ is Y-7A and $R^2$ is H.
Table 1878. Formula I.26 wherein $R^1$ is Y-7B and $R^2$ is H.
Table 1879. Formula I.26 wherein $R^1$ is Y-8A and $R^2$ is H.
Table 1880. Formula I.26 wherein $R^1$ is Y-8B and $R^2$ is H.
Table 1881. Formula I.26 wherein $R^1$ is Y-1A and $R^2$ is $CH_3$.
Table 1882. Formula I.26 wherein $R^1$ is Y-1B and $R^2$ is $CH_3$.
Table 1883. Formula I.26 wherein $R^1$ is Y-2A and $R^2$ is $CH_3$.
Table 1884. Formula I.26 wherein $R^1$ is Y-2B and $R^2$ is $CH_3$.
Table 1885. Formula I.26 wherein $R^1$ is Y-3A and $R^2$ is $CH_3$.
Table 1886. Formula I.26 wherein $R^1$ is Y-3B and $R^2$ is $CH_3$.
Table 1887. Formula I.26 wherein $R^1$ is Y-3C and $R^2$ is $CH_3$.
Table 1888. Formula I.26 wherein $R^1$ is Y-3D and $R^2$ is $CH_3$.
Table 1889. Formula I.26 wherein $R^1$ is Y-4A and $R^2$ is $CH_3$.
Table 1890. Formula I.26 wherein $R^1$ is Y-4B and $R^2$ is $CH_3$.
Table 1891. Formula I.26 wherein $R^1$ is Y-4C and $R^2$ is $CH_3$.
Table 1892. Formula I.26 wherein $R^1$ is Y-4D and $R^2$ is $CH_3$.
Table 1893. Formula I.26 wherein $R^1$ is Y-5A and $R^2$ is $CH_3$.
Table 1894. Formula I.26 wherein $R^1$ is Y-5B and $R^2$ is $CH_3$.
Table 1895. Formula I.26 wherein $R^1$ is Y-6A and $R^2$ is $CH_3$.
Table 1896. Formula I.26 wherein $R^1$ is Y-6B and $R^2$ is $CH_3$.
Table 1897. Formula I.26 wherein $R^1$ is Y-7A and $R^2$ is $CH_3$.
Table 1898. Formula I.26 wherein $R^1$ is Y-7B and $R^2$ is $CH_3$.
Table 1899. Formula I.26 wherein $R^1$ is Y-8A and $R^2$ is $CH_3$.
Table 1900. Formula I.26 wherein $R^1$ is Y-8B and $R^2$ is $CH_3$.
Table 1901. Formula I.26 wherein $R^1$ is Y-1A and $R^2$ is c-$C_3H_5$.
Table 1902. Formula I.26 wherein $R^1$ is Y-1B and $R^2$ is c-$C_3H_5$.
Table 1903. Formula I.26 wherein $R^1$ is Y-2A and $R^2$ is c-$C_3H_5$.
Table 1904. Formula I.26 wherein $R^1$ is Y-2B and $R^2$ is c-$C_3H_5$.
Table 1905. Formula I.26 wherein $R^1$ is Y-3A and $R^2$ is c-$C_3H_5$.
Table 1906. Formula I.26 wherein $R^1$ is Y-3B and $R^2$ is c-$C_3H_5$.
Table 1907. Formula I.26 wherein $R^1$ is Y-3C and $R^2$ is c-$C_3H_5$.
Table 1908. Formula I.26 wherein $R^1$ is Y-3D and $R^2$ is c-$C_3H_5$.
Table 1909. Formula I.26 wherein $R^1$ is Y-4A and $R^2$ is c-$C_3H_5$.
Table 1910. Formula I.26 wherein $R^1$ is Y-4B and $R^2$ is c-$C_3H_5$.
Table 1911. Formula I.26 wherein $R^1$ is Y-4C and $R^2$ is c-$C_3H_5$.
Table 1912. Formula I.26 wherein $R^1$ is Y-4D and $R^2$ is c-$C_3H_5$.
Table 1913. Formula I.26 wherein $R^1$ is Y-5A and $R^2$ is c-$C_3H_5$.
Table 1914. Formula I.26 wherein $R^1$ is Y-5B and $R^2$ is c-$C_3H_5$.
Table 1915. Formula I.26 wherein $R^1$ is Y-6A and $R^2$ is c-$C_3H_5$.
Table 1916. Formula I.26 wherein $R^1$ is Y-6B and $R^2$ is c-$C_3H_5$.
Table 1917. Formula I.26 wherein $R^1$ is Y-7A and $R^2$ is c-$C_3H_5$.
Table 1918. Formula I.26 wherein $R^1$ is Y-7B and $R^2$ is c-$C_3H_5$.
Table 1919. Formula I.26 wherein $R^1$ is Y-8A and $R^2$ is c-$C_3H_5$.
Table 1920. Formula I.26 wherein $R^1$ is Y-8B and $R^2$ is c-$C_3H_5$.
Table 1921. Formula I.29 wherein $R^1$ is Y-1A and $R^2$ is H.
Table 1922. Formula I.29 wherein $R^1$ is Y-1B and $R^2$ is H.
Table 1923. Formula I.29 wherein $R^1$ is Y-2A and $R^2$ is H.
Table 1924. Formula I.29 wherein $R^1$ is Y-2B and $R^2$ is H.
Table 1925. Formula I.29 wherein $R^1$ is Y-3A and $R^2$ is H.
Table 1926. Formula I.29 wherein $R^1$ is Y-3B and $R^2$ is H.
Table 1927. Formula I.29 wherein $R^1$ is Y-3C and $R^2$ is H.
Table 1928. Formula I.29 wherein $R^1$ is Y-3D and $R^2$ is H.
Table 1929. Formula I.29 wherein $R^1$ is Y-4A and $R^2$ is H.
Table 1930. Formula I.29 wherein $R^1$ is Y-4B and $R^2$ is H.
Table 1931. Formula I.29 wherein $R^1$ is Y-4C and $R^2$ is H.
Table 1932. Formula I.29 wherein $R^1$ is Y-4D and $R^2$ is H.
Table 1933. Formula I.29 wherein $R^1$ is Y-5A and $R^2$ is H.
Table 1934. Formula I.29 wherein $R^1$ is Y-5B and $R^2$ is H.
Table 1935. Formula I.29 wherein $R^1$ is Y-6A and $R^2$ is H.
Table 1936. Formula I.29 wherein $R^1$ is Y-6B and $R^2$ is H.
Table 1937. Formula I.29 wherein $R^1$ is Y-7A and $R^2$ is H.
Table 1938. Formula I.29 wherein $R^1$ is Y-7B and $R^2$ is H.
Table 1939. Formula I.29 wherein $R^1$ is Y-8A and $R^2$ is H.
Table 1940. Formula I.29 wherein $R^1$ is Y-8B and $R^2$ is H.
Table 1941. Formula I.29 wherein $R^1$ is Y-1A and $R^2$ is $CH_3$.
Table 1942. Formula I.29 wherein $R^1$ is Y-1B and $R^2$ is $CH_3$.
Table 1943. Formula I.29 wherein $R^1$ is Y-2A and $R^2$ is $CH_3$.
Table 1944. Formula I.29 wherein $R^1$ is Y-2B and $R^2$ is $CH_3$.
Table 1945. Formula I.29 wherein $R^1$ is Y-3A and $R^2$ is $CH_3$.
Table 1946. Formula I.29 wherein $R^1$ is Y-3B and $R^2$ is $CH_3$.
Table 1947. Formula I.29 wherein $R^1$ is Y-3C and $R^2$ is $CH_3$.

Table 1948. Formula I.29 wherein R$^1$ is Y-3D and R$^2$ is CH$_3$.
Table 1949. Formula I.29 wherein R$^1$ is Y-4A and R$^2$ is CH$_3$.
Table 1950. Formula I.29 wherein R$^1$ is Y-4B and R$^2$ is CH$_3$.
Table 1951. Formula I.29 wherein R$^1$ is Y-4C and R$^2$ is CH$_3$.
Table 1952. Formula I.29 wherein R$^1$ is Y-4D and R$^2$ is CH$_3$.
Table 1953. Formula I.29 wherein R$^1$ is Y-5A and R$^2$ is CH$_3$.
Table 1954. Formula I.29 wherein R$^1$ is Y-5B and R$^2$ is CH$_3$.
Table 1955. Formula I.29 wherein R$^1$ is Y-6A and R$^2$ is CH$_3$.
Table 1956. Formula I.29 wherein R$^1$ is Y-6B and R$^2$ is CH$_3$.
Table 1957. Formula I.29 wherein R$^1$ is Y-7A and R$^2$ is CH$_3$.
Table 1958. Formula I.29 wherein R$^1$ is Y-7B and R$^2$ is CH$_3$.
Table 1959. Formula I.29 wherein R$^1$ is Y-8A and R$^2$ is CH$_3$.
Table 1960. Formula I.29 wherein R$^1$ is Y-8B and R$^2$ is CH$_3$.
Table 1961. Formula I.29 wherein R$^1$ is Y-1A and R$^2$ is c-C$_3$H$_5$.
Table 1962. Formula I.29 wherein R$^1$ is Y-1B and R$^2$ is c-C$_3$H$_5$.
Table 1963. Formula I.29 wherein R$^1$ is Y-2A and R$^2$ is c-C$_3$H$_5$.
Table 1964. Formula I.29 wherein R$^1$ is Y-2B and R$^2$ is c-C$_3$H$_5$.
Table 1965. Formula I.29 wherein R$^1$ is Y-3A and R$^2$ is c-C$_3$H$_5$.
Table 1966. Formula I.29 wherein R$^1$ is Y-3B and R$^2$ is c-C$_3$H$_5$.
Table 1967. Formula I.29 wherein R$^1$ is Y-3C and R$^2$ is c-C$_3$H$_5$.
Table 1968. Formula I.29 wherein R$^1$ is Y-3D and R$^2$ is c-C$_3$H$_5$.
Table 1969. Formula I.29 wherein R$^1$ is Y-4A and R$^2$ is c-C$_3$H$_5$.
Table 1970. Formula I.29 wherein R$^1$ is Y-4B and R$^2$ is c-C$_3$H$_5$.
Table 1971. Formula I.29 wherein R$^1$ is Y-4C and R$^2$ is c-C$_3$H$_5$.
Table 1972. Formula I.29 wherein R$^1$ is Y-4D and R$^2$ is c-C$_3$H$_5$.
Table 1973. Formula I.29 wherein R$^1$ is Y-5A and R$^2$ is c-C$_3$H$_5$.
Table 1974. Formula I.29 wherein R$^1$ is Y-5B and R$^2$ is c-C$_3$H$_5$.
Table 1975. Formula I.29 wherein R$^1$ is Y-6A and R$^2$ is c-C$_3$H$_5$.
Table 1976. Formula I.29 wherein R$^1$ is Y-6B and R$^2$ is c-C$_3$H$_5$.
Table 1977. Formula I.29 wherein R$^1$ is Y-7A and R$^2$ is c-C$_3$H$_5$.
Table 1978. Formula I.29 wherein R$^1$ is Y-7B and R$^2$ is c-C$_3$H$_5$.
Table 1979. Formula I.29 wherein R$^1$ is Y-8A and R$^2$ is c-C$_3$H$_5$.
Table 1980. Formula I.29 wherein R$^1$ is Y-8B and R$^2$ is c-C$_3$H$_5$.
Table 1981. Formula I.30 wherein R$^1$ is Y-1A and R$^2$ is H.
Table 1982. Formula I.30 wherein R$^1$ is Y-1B and R$^2$ is H.
Table 1983. Formula I.30 wherein R$^1$ is Y-2A and R$^2$ is H.
Table 1984. Formula I.30 wherein R$^1$ is Y-2B and R$^2$ is H.
Table 1985. Formula I.30 wherein R$^1$ is Y-3A and R$^2$ is H.
Table 1986. Formula I.30 wherein R$^1$ is Y-3B and R$^2$ is H.
Table 1987. Formula I.30 wherein R$^1$ is Y-3C and R$^2$ is H.
Table 1988. Formula I.30 wherein R$^1$ is Y-3D and R$^2$ is H.
Table 1989. Formula I.30 wherein R$^1$ is Y-4A and R$^2$ is H.
Table 1990. Formula I.30 wherein R$^1$ is Y-4B and R$^2$ is H.
Table 1991. Formula I.30 wherein R$^1$ is Y-4C and R$^2$ is H.
Table 1992. Formula I.30 wherein R$^1$ is Y-4D and R$^2$ is H.
Table 1993. Formula I.30 wherein R$^1$ is Y-5A and R$^2$ is H.
Table 1994. Formula I.30 wherein R$^1$ is Y-5B and R$^2$ is H.
Table 1995. Formula I.30 wherein R$^1$ is Y-6A and R$^2$ is H.
Table 1996. Formula I.30 wherein R$^1$ is Y-6B and R$^2$ is H.
Table 1997. Formula I.30 wherein R$^1$ is Y-7A and R$^2$ is H.
Table 1998. Formula I.30 wherein R$^1$ is Y-7B and R$^2$ is H.
Table 1999. Formula I.30 wherein R$^1$ is Y-8A and R$^2$ is H.
Table 2000. Formula I.30 wherein R$^1$ is Y-8B and R$^2$ is H.
Table 2001. Formula I.30 wherein R$^1$ is Y-1A and R$^2$ is CH$_3$.
Table 2002. Formula I.30 wherein R$^1$ is Y-1B and R$^2$ is CH$_3$.
Table 2003. Formula I.30 wherein R$^1$ is Y-2A and R$^2$ is CH$_3$.
Table 2004. Formula I.30 wherein R$^1$ is Y-2B and R$^2$ is CH$_3$.
Table 2005. Formula I.30 wherein R$^1$ is Y-3A and R$^2$ is CH$_3$.
Table 2006. Formula I.30 wherein R$^1$ is Y-3B and R$^2$ is CH$_3$.
Table 2007. Formula I.30 wherein R$^1$ is Y-3C and R$^2$ is CH$_3$.
Table 2008. Formula I.30 wherein R$^1$ is Y-3D and R$^2$ is CH$_3$.
Table 2009. Formula I.30 wherein R$^1$ is Y-4A and R$^2$ is CH$_3$.
Table 2010. Formula I.30 wherein R$^1$ is Y-4B and R$^2$ is CH$_3$.
Table 2011. Formula I.30 wherein R$^1$ is Y-4C and R$^2$ is CH$_3$.
Table 2012. Formula I.30 wherein R$^1$ is Y-4D and R$^2$ is CH$_3$.
Table 2013. Formula I.30 wherein R$^1$ is Y-5A and R$^2$ is CH$_3$.
Table 2014. Formula I.30 wherein R$^1$ is Y-5B and R$^2$ is CH$_3$.
Table 2015. Formula I.30 wherein R$^1$ is Y-6A and R$^2$ is CH$_3$.
Table 2016. Formula I.30 wherein R$^1$ is Y-6B and R$^2$ is CH$_3$.
Table 2017. Formula I.30 wherein R$^1$ is Y-7A and R$^2$ is CH$_3$.
Table 2018. Formula I.30 wherein R$^1$ is Y-7B and R$^2$ is CH$_3$.
Table 2019. Formula I.30 wherein R$^1$ is Y-8A and R$^2$ is CH$_3$.
Table 2020. Formula I.30 wherein R$^1$ is Y-8B and R$^2$ is CH$_3$.
Table 2021. Formula I.30 wherein R$^1$ is Y-1A and R$^2$ is c-C$_3$H$_5$.
Table 2022. Formula I.30 wherein R$^1$ is Y-1B and R$^2$ is c-C$_3$H$_5$.
Table 2023. Formula I.30 wherein R$^1$ is Y-2A and R$^2$ is c-C$_3$H$_5$.
Table 2024. Formula I.30 wherein R$^1$ is Y-2B and R$^2$ is c-C$_3$H$_5$.
Table 2025. Formula I.30 wherein R$^1$ is Y-3A and R$^2$ is c-C$_3$H$_5$.
Table 2026. Formula I.30 wherein R$^1$ is Y-3B and R$^2$ is c-C$_3$H$_5$.
Table 2027. Formula I.30 wherein R$^1$ is Y-3C and R$^2$ is c-C$_3$H$_5$.
Table 2028. Formula I.30 wherein R$^1$ is Y-3D and R$^2$ is c-C$_3$H$_5$.
Table 2029. Formula I.30 wherein R$^1$ is Y-4A and R$^2$ is c-C$_3$H$_5$.
Table 2030. Formula I.30 wherein R$^1$ is Y-4B and R$^2$ is c-C$_3$H$_5$.
Table 2031. Formula I.30 wherein R$^1$ is Y-4C and R$^2$ is c-C$_3$H$_5$.
Table 2032. Formula I.30 wherein R$^1$ is Y-4D and R$^2$ is c-C$_3$H$_5$.
Table 2033. Formula I.30 wherein R$^1$ is Y-5A and R$^2$ is c-C$_3$H$_5$.
Table 2034. Formula I.30 wherein R$^1$ is Y-5B and R$^2$ is c-C$_3$H$_5$.
Table 2035. Formula I.30 wherein R$^1$ is Y-6A and R$^2$ is c-C$_3$H$_5$.
Table 2036. Formula I.30 wherein R$^1$ is Y-6B and R$^2$ is c-C$_3$H$_5$.
Table 2037. Formula I.30 wherein R$^1$ is Y-7A and R$^2$ is c-C$_3$H$_5$.
Table 2038. Formula I.30 wherein R$^1$ is Y-7B and R$^2$ is c-C$_3$H$_5$.
Table 2039. Formula I.30 wherein R$^1$ is Y-8A and R$^2$ is c-C$_3$H$_5$.
Table 2040. Formula I.30 wherein R$^1$ is Y-8B and R$^2$ is c-C$_3$H$_5$.
Table 2041. Formula I.31 wherein R$^1$ is Y-1A and R$^2$ is H.

Table 2042. Formula I.31 wherein $R^1$ is Y-1B and $R^2$ is H.
Table 2043. Formula I.31 wherein $R^1$ is Y-2A and $R^2$ is H.
Table 2044. Formula I.31 wherein $R^1$ is Y-2B and $R^2$ is H.
Table 2045. Formula I.31 wherein $R^1$ is Y-3A and $R^2$ is H.
Table 2046. Formula I.31 wherein $R^1$ is Y-3B and $R^2$ is H.
Table 2047. Formula I.31 wherein $R^1$ is Y-3C and $R^2$ is H.
Table 2048. Formula I.31 wherein $R^1$ is Y-3D and $R^2$ is H.
Table 2049. Formula I.31 wherein $R^1$ is Y-4A and $R^2$ is H.
Table 2050. Formula I.31 wherein $R^1$ is Y-4B and $R^2$ is H.
Table 2051. Formula I.31 wherein $R^1$ is Y-4C and $R^2$ is H.
Table 2052. Formula I.31 wherein $R^1$ is Y-4D and $R^2$ is H.
Table 2053. Formula I.31 wherein $R^1$ is Y-5A and $R^2$ is H.
Table 2054. Formula I.31 wherein $R^1$ is Y-5B and $R^2$ is H.
Table 2055. Formula I.31 wherein $R^1$ is Y-6A and $R^2$ is H.
Table 2056. Formula I.31 wherein $R^1$ is Y-6B and $R^2$ is H.
Table 2057. Formula I.31 wherein $R^1$ is Y-7A and $R^2$ is H.
Table 2058. Formula I.31 wherein $R^1$ is Y-7B and $R^2$ is H.
Table 2059. Formula I.31 wherein $R^1$ is Y-8A and $R^2$ is H.
Table 2060. Formula I.31 wherein $R^1$ is Y-8B and $R^2$ is H.
Table 2061. Formula I.31 wherein $R^1$ is Y-1A and $R^2$ is $CH_3$.
Table 2062. Formula I.31 wherein $R^1$ is Y-1B and $R^2$ is $CH_3$.
Table 2063. Formula I.31 wherein $R^1$ is Y-2A and $R^2$ is $CH_3$.
Table 2064. Formula I.31 wherein $R^1$ is Y-2B and $R^2$ is $CH_3$.
Table 2065. Formula I.31 wherein $R^1$ is Y-3A and $R^2$ is $CH_3$.
Table 2066. Formula I.31 wherein $R^1$ is Y-3B and $R^2$ is $CH_3$.
Table 2067. Formula I.31 wherein $R^1$ is Y-3C and $R^2$ is $CH_3$.
Table 2068. Formula I.31 wherein $R^1$ is Y-3D and $R^2$ is $CH_3$.
Table 2069. Formula I.31 wherein $R^1$ is Y-4A and $R^2$ is $CH_3$.
Table 2070. Formula I.31 wherein $R^1$ is Y-4B and $R^2$ is $CH_3$.
Table 2071. Formula I.31 wherein $R^1$ is Y-4C and $R^2$ is $CH_3$.
Table 2072. Formula I.31 wherein $R^1$ is Y-4D and $R^2$ is $CH_3$.
Table 2073. Formula I.31 wherein $R^1$ is Y-5A and $R^2$ is $CH_3$.
Table 2074. Formula I.31 wherein $R^1$ is Y-5B and $R^2$ is $CH_3$.
Table 2075. Formula I.31 wherein $R^1$ is Y-6A and $R^2$ is $CH_3$.
Table 2076. Formula I.31 wherein $R^1$ is Y-6B and $R^2$ is $CH_3$.
Table 2077. Formula I.31 wherein $R^1$ is Y-7A and $R^2$ is $CH_3$.
Table 2078. Formula I.31 wherein $R^1$ is Y-7B and $R^2$ is $CH_3$.
Table 2079. Formula I.31 wherein $R^1$ is Y-8A and $R^2$ is $CH_3$.
Table 2080. Formula I.31 wherein $R^1$ is Y-8B and $R^2$ is $CH_3$.
Table 2081. Formula I.31 wherein $R^1$ is Y-1A and $R^2$ is c-$C_3H_5$.
Table 2082. Formula I.31 wherein $R^1$ is Y-1B and $R^2$ is c-$C_3H_5$.
Table 2083. Formula I.31 wherein $R^1$ is Y-2A and $R^2$ is c-$C_3H_5$.
Table 2084. Formula I.31 wherein $R^1$ is Y-2B and $R^2$ is c-$C_3H_5$.
Table 2085. Formula I.31 wherein $R^1$ is Y-3A and $R^2$ is c-$C_3H_5$.
Table 2086. Formula I.31 wherein $R^1$ is Y-3B and $R^2$ is c-$C_3H_5$.
Table 2087. Formula I.31 wherein $R^1$ is Y-3C and $R^2$ is c-$C_3H_5$.
Table 2088. Formula I.31 wherein $R^1$ is Y-3D and $R^2$ is c-$C_3H_5$.
Table 2089. Formula I.31 wherein $R^1$ is Y-4A and $R^2$ is c-$C_3H_5$.
Table 2090. Formula I.31 wherein $R^1$ is Y-4B and $R^2$ is c-$C_3H_5$.
Table 2091. Formula I.31 wherein $R^1$ is Y-4C and $R^2$ is c-$C_3H_5$.
Table 2092. Formula I.31 wherein $R^1$ is Y-4D and $R^2$ is c-$C_3H_5$.
Table 2093. Formula I.31 wherein $R^1$ is Y-5A and $R^2$ is c-$C_3H_5$.
Table 2094. Formula I.31 wherein $R^1$ is Y-5B and $R^2$ is c-$C_3H_5$.
Table 2095. Formula I.31 wherein $R^1$ is Y-6A and $R^2$ is c-$C_3H_5$.
Table 2096. Formula I.31 wherein $R^1$ is Y-6B and $R^2$ is c-$C_3H_5$.
Table 2097. Formula I.31 wherein $R^1$ is Y-7A and $R^2$ is c-$C_3H_5$.
Table 2098. Formula I.31 wherein $R^1$ is Y-7B and $R^2$ is c-$C_3H_5$.
Table 2099. Formula I.31 wherein $R^1$ is Y-8A and $R^2$ is c-$C_3H_5$.
Table 2100. Formula I.31 wherein $R^1$ is Y-8B and $R^2$ is c-$C_3H_5$.
Table 2101. Formula I.32 wherein $R^1$ is Y-1A and $R^2$ is H.
Table 2102. Formula I.32 wherein $R^1$ is Y-1B and $R^2$ is H.
Table 2103. Formula I.32 wherein $R^1$ is Y-2A and $R^2$ is H.
Table 2104. Formula I.32 wherein $R^1$ is Y-2B and $R^2$ is H.
Table 2105. Formula I.32 wherein $R^1$ is Y-3A and $R^2$ is H.
Table 2106. Formula I.32 wherein $R^1$ is Y-3B and $R^2$ is H.
Table 2107. Formula I.32 wherein $R^1$ is Y-3C and $R^2$ is H.
Table 2108. Formula I.32 wherein $R^1$ is Y-3D and $R^2$ is H.
Table 2109. Formula I.32 wherein $R^1$ is Y-4A and $R^2$ is H.
Table 2110. Formula I.32 wherein $R^1$ is Y-4B and $R^2$ is H.
Table 2111. Formula I.32 wherein $R^1$ is Y-4C and $R^2$ is H.
Table 2112. Formula I.32 wherein $R^1$ is Y-4D and $R^2$ is H.
Table 2113. Formula I.32 wherein $R^1$ is Y-5A and $R^2$ is H.
Table 2114. Formula I.32 wherein $R^1$ is Y-5B and $R^2$ is H.
Table 2115. Formula I.32 wherein $R^1$ is Y-6A and $R^2$ is H.
Table 2116. Formula I.32 wherein $R^1$ is Y-6B and $R^2$ is H.
Table 2117. Formula I.32 wherein $R^1$ is Y-7A and $R^2$ is H.
Table 2118. Formula I.32 wherein $R^1$ is Y-7B and $R^2$ is H.
Table 2119. Formula I.32 wherein $R^1$ is Y-8A and $R^2$ is H.
Table 2120. Formula I.32 wherein $R^1$ is Y-8B and $R^2$ is H.
Table 2121. Formula I.32 wherein $R^1$ is Y-1A and $R^2$ is $CH_3$.
Table 2122. Formula I.32 wherein $R^1$ is Y-1B and $R^2$ is $CH_3$.
Table 2123. Formula I.32 wherein $R^1$ is Y-2A and $R^2$ is $CH_3$.
Table 2124. Formula I.32 wherein $R^1$ is Y-2B and $R^2$ is $CH_3$.
Table 2125. Formula I.32 wherein $R^1$ is Y-3A and $R^2$ is $CH_3$.
Table 2126. Formula I.32 wherein $R^1$ is Y-3B and $R^2$ is $CH_3$.
Table 2127. Formula I.32 wherein $R^1$ is Y-3C and $R^2$ is $CH_3$.
Table 2128. Formula I.32 wherein $R^1$ is Y-3D and $R^2$ is $CH_3$.
Table 2129. Formula I.32 wherein $R^1$ is Y-4A and $R^2$ is $CH_3$.
Table 2130. Formula I.32 wherein $R^1$ is Y-4B and $R^2$ is $CH_3$.
Table 2131. Formula I.32 wherein $R^1$ is Y-4C and $R^2$ is $CH_3$.
Table 2132. Formula I.32 wherein $R^1$ is Y-4D and $R^2$ is $CH_3$.
Table 2133. Formula I.32 wherein $R^1$ is Y-5A and $R^2$ is $CH_3$.
Table 2134. Formula I.32 wherein $R^1$ is Y-5B and $R^2$ is $CH_3$.
Table 2135. Formula I.32 wherein $R^1$ is Y-6A and $R^2$ is $CH_3$.
Table 2136. Formula I.32 wherein $R^1$ is Y-6B and $R^2$ is $CH_3$.
Table 2137. Formula I.32 wherein $R^1$ is Y-7A and $R^2$ is $CH_3$.
Table 2138. Formula I.32 wherein $R^1$ is Y-7B and $R^2$ is $CH_3$.
Table 2139. Formula I.32 wherein $R^1$ is Y-8A and $R^2$ is $CH_3$.
Table 2140. Formula I.32 wherein $R^1$ is Y-8B and $R^2$ is $CH_3$.
Table 2141. Formula I.32 wherein $R^1$ is Y-1A and $R^2$ is c-$C_3H_5$.
Table 2142. Formula I.32 wherein $R^1$ is Y-1B and $R^2$ is c-$C_3H_5$.
Table 2143. Formula I.32 wherein $R^1$ is Y-2A and $R^2$ is c-$C_3H_5$.
Table 2144. Formula I.32 wherein $R^1$ is Y-2B and $R^2$ is c-$C_3H_5$.
Table 2145. Formula I.32 wherein $R^1$ is Y-3A and $R^2$ is c-$C_3H_5$.
Table 2146. Formula I.32 wherein $R^1$ is Y-3B and $R^2$ is c-$C_3H_5$.
Table 2147. Formula I.32 wherein $R^1$ is Y-3C and $R^2$ is c-$C_3H_5$.

Table 2148. Formula I.32 wherein $R^1$ is Y-3D and $R^2$ is c-$C_3H_5$.
Table 2149. Formula I.32 wherein $R^1$ is Y-4A and $R^2$ is c-$C_3H_5$.
Table 2150. Formula I.32 wherein $R^1$ is Y-4B and $R^2$ is c-$C_3H_5$.
Table 2151. Formula I.32 wherein $R^1$ is Y-4C and $R^2$ is c-$C_3H_5$.
Table 2152. Formula I.32 wherein $R^1$ is Y-4D and $R^2$ is c-$C_3H_5$.
Table 2153. Formula I.32 wherein $R^1$ is Y-5A and $R^2$ is c-$C_3H_5$.
Table 2154. Formula I.32 wherein $R^1$ is Y-5B and $R^2$ is c-$C_3H_5$.
Table 2155. Formula I.32 wherein $R^1$ is Y-6A and $R^2$ is c-$C_3H_5$.
Table 2156. Formula I.32 wherein $R^1$ is Y-6B and $R^2$ is c-$C_3H_5$.
Table 2157. Formula I.32 wherein $R^1$ is Y-7A and $R^2$ is c-$C_3H_5$.
Table 2158. Formula I.32 wherein $R^1$ is Y-7B and $R^2$ is c-$C_3H_5$.
Table 2159. Formula I.32 wherein $R^1$ is Y-8A and $R^2$ is c-$C_3H_5$.
Table 2160. Formula I.32 wherein $R^1$ is Y-8B and $R^2$ is c-$C_3H_5$.

TABLE B

| Line | $B^1$ | $B^2$ | $B^3$ | Ar | D |
|---|---|---|---|---|---|
| 1 | CH | CH | CH | $Ar^1$ | $R^{11}$-1 |
| 2 | CH | CH | CH | $Ar^1$ | $R^{11}$-2 |
| 3 | CH | CH | CH | $Ar^1$ | $R^{11}$-3 |
| 4 | CH | CH | CH | $Ar^1$ | $R^{11}$-4 |
| 5 | CH | CH | CH | $Ar^1$ | $R^{11}$-5 |
| 6 | CH | CH | CH | $Ar^1$ | $R^{11}$-6 |
| 7 | CH | CH | CH | $Ar^1$ | $R^{11}$-7 |
| 8 | CH | CH | CH | $Ar^1$ | $R^{11}$-8 |
| 9 | CH | CH | CH | $Ar^1$ | $R^{11}$-9 |
| 10 | CH | CH | CH | $Ar^1$ | $R^{11}$-10 |
| 11 | CH | CH | CH | $Ar^1$ | $R^{11}$-11 |
| 12 | CH | CH | CH | $Ar^1$ | $R^{11}$-12 |
| 13 | CH | CH | CH | $Ar^1$ | $R^{11}$-13 |
| 14 | CH | CH | CH | $Ar^1$ | $R^{11}$-14 |
| 15 | CH | CH | CH | $Ar^1$ | $R^{11}$-15 |
| 16 | CH | CH | CH | $Ar^1$ | $R^{11}$-16 |
| 17 | CH | CH | CH | $Ar^1$ | $R^{11}$-17 |
| 18 | CH | CH | CH | $Ar^1$ | $R^{11}$-18 |
| 19 | CH | CH | CH | $Ar^1$ | $R^{11}$-19 |
| 20 | CH | CH | CH | $Ar^1$ | $R^{11}$-20 |
| 21 | CH | CH | CH | $Ar^1$ | $R^{11}$-21 |
| 22 | CH | CH | CH | $Ar^1$ | $R^{11}$-22 |
| 23 | CH | CH | CH | $Ar^1$ | $R^{11}$-23 |
| 24 | CH | CH | CH | $Ar^1$ | $R^{11}$-24 |
| 25 | CH | CH | CH | $Ar^1$ | $R^{11}$-25 |
| 26 | CH | CH | CH | $Ar^1$ | $R^{11}$-26 |
| 27 | CH | CH | CH | $Ar^1$ | $R^{11}$-27 |
| 28 | CH | CH | CH | $Ar^1$ | $R^{11}$-28 |
| 29 | CH | CH | CH | $Ar^1$ | $R^{11}$-29 |
| 30 | CH | CH | CH | $Ar^1$ | $A^{11}$-1 |
| 31 | CH | CH | CH | $Ar^1$ | $A^{11}$-2 |
| 32 | CH | CH | CH | $Ar^1$ | $A^{11}$-3 |
| 33 | CH | CH | CH | $Ar^2$ | $R^{11}$-1 |
| 34 | CH | CH | CH | $Ar^2$ | $R^{11}$-2 |
| 35 | CH | CH | CH | $Ar^2$ | $R^{11}$-3 |
| 36 | CH | CH | CH | $Ar^2$ | $R^{11}$-4 |
| 37 | CH | CH | CH | $Ar^2$ | $R^{11}$-5 |
| 38 | CH | CH | CH | $Ar^2$ | $R^{11}$-6 |
| 39 | CH | CH | CH | $Ar^2$ | $R^{11}$-7 |
| 40 | CH | CH | CH | $Ar^2$ | $R^{11}$-8 |
| 41 | CH | CH | CH | $Ar^2$ | $R^{11}$-9 |
| 42 | CH | CH | CH | $Ar^2$ | $R^{11}$-10 |
| 43 | CH | CH | CH | $Ar^2$ | $R^{11}$-11 |
| 44 | CH | CH | CH | $Ar^2$ | $R^{11}$-12 |
| 45 | CH | CH | CH | $Ar^2$ | $R^{11}$-13 |
| 46 | CH | CH | CH | $Ar^2$ | $R^{11}$-14 |
| 47 | CH | CH | CH | $Ar^2$ | $R^{11}$-15 |
| 48 | CH | CH | CH | $Ar^2$ | $R^{11}$-16 |
| 49 | CH | CH | CH | $Ar^2$ | $R^{11}$-17 |
| 50 | CH | CH | CH | $Ar^2$ | $R^{11}$-18 |
| 51 | CH | CH | CH | $Ar^2$ | $R^{11}$-19 |
| 52 | CH | CH | CH | $Ar^2$ | $R^{11}$-20 |
| 53 | CH | CH | CH | $Ar^2$ | $R^{11}$-21 |
| 54 | CH | CH | CH | $Ar^2$ | $R^{11}$-22 |
| 55 | CH | CH | CH | $Ar^2$ | $R^{11}$-23 |
| 56 | CH | CH | CH | $Ar^2$ | $R^{11}$-24 |
| 57 | CH | CH | CH | $Ar^2$ | $R^{11}$-25 |
| 58 | CH | CH | CH | $Ar^2$ | $R^{11}$-26 |
| 59 | CH | CH | CH | $Ar^2$ | $R^{11}$-27 |
| 60 | CH | CH | CH | $Ar^2$ | $R^{11}$-28 |
| 61 | CH | CH | CH | $Ar^2$ | $R^{11}$-29 |
| 62 | CH | CH | CH | $Ar^2$ | $A^{11}$-1 |
| 63 | CH | CH | CH | $Ar^2$ | $A^{11}$-2 |
| 64 | CH | CH | CH | $Ar^2$ | $A^{11}$-3 |
| 65 | CH | CH | CH | $Ar^3$ | $R^{11}$-1 |
| 66 | CH | CH | CH | $Ar^3$ | $R^{11}$-2 |
| 67 | CH | CH | CH | $Ar^3$ | $R^{11}$-3 |
| 68 | CH | CH | CH | $Ar^3$ | $R^{11}$-4 |
| 69 | CH | CH | CH | $Ar^3$ | $R^{11}$-5 |
| 70 | CH | CH | CH | $Ar^3$ | $R^{11}$-6 |
| 71 | CH | CH | CH | $Ar^3$ | $R^{11}$-7 |
| 72 | CH | CH | CH | $Ar^3$ | $R^{11}$-8 |
| 73 | CH | CH | CH | $Ar^3$ | $R^{11}$-9 |
| 74 | CH | CH | CH | $Ar^3$ | $R^{11}$-10 |
| 75 | CH | CH | CH | $Ar^3$ | $R^{11}$-11 |
| 76 | CH | CH | CH | $Ar^3$ | $R^{11}$-12 |
| 77 | CH | CH | CH | $Ar^3$ | $R^{11}$-13 |
| 78 | CH | CH | CH | $Ar^3$ | $R^{11}$-14 |
| 79 | CH | CH | CH | $Ar^3$ | $R^{11}$-15 |
| 80 | CH | CH | CH | $Ar^3$ | $R^{11}$-16 |
| 81 | CH | CH | CH | $Ar^3$ | $R^{11}$-17 |
| 82 | CH | CH | CH | $Ar^3$ | $R^{11}$-18 |
| 83 | CH | CH | CH | $Ar^3$ | $R^{11}$-19 |
| 84 | CH | CH | CH | $Ar^3$ | $R^{11}$-20 |
| 85 | CH | CH | CH | $Ar^3$ | $R^{11}$-21 |
| 86 | CH | CH | CH | $Ar^3$ | $R^{11}$-22 |
| 87 | CH | CH | CH | $Ar^3$ | $R^{11}$-23 |
| 88 | CH | CH | CH | $Ar^3$ | $R^{11}$-24 |
| 89 | CH | CH | CH | $Ar^3$ | $R^{11}$-25 |
| 90 | CH | CH | CH | $Ar^3$ | $R^{11}$-26 |
| 91 | CH | CH | CH | $Ar^3$ | $R^{11}$-27 |
| 92 | CH | CH | CH | $Ar^3$ | $R^{11}$-28 |
| 93 | CH | CH | CH | $Ar^3$ | $R^{11}$-29 |
| 94 | CH | CH | CH | $Ar^3$ | $A^{11}$-1 |
| 95 | CH | CH | CH | $Ar^3$ | $A^{11}$-2 |
| 96 | CH | CH | CH | $Ar^3$ | $A^{11}$-3 |
| 97 | CH | CH | CH | $Ar^4$ | $R^{11}$-1 |
| 98 | CH | CH | CH | $Ar^4$ | $R^{11}$-2 |
| 99 | CH | CH | CH | $Ar^4$ | $R^{11}$-3 |
| 100 | CH | CH | CH | $Ar^4$ | $R^{11}$-4 |
| 101 | CH | CH | CH | $Ar^4$ | $R^{11}$-5 |
| 102 | CH | CH | CH | $Ar^4$ | $R^{11}$-6 |
| 103 | CH | CH | CH | $Ar^4$ | $R^{11}$-7 |
| 104 | CH | CH | CH | $Ar^4$ | $R^{11}$-8 |
| 105 | CH | CH | CH | $Ar^4$ | $R^{11}$-9 |
| 106 | CH | CH | CH | $Ar^4$ | $R^{11}$-10 |
| 107 | CH | CH | CH | $Ar^4$ | $R^{11}$-11 |
| 108 | CH | CH | CH | $Ar^4$ | $R^{11}$-12 |
| 109 | CH | CH | CH | $Ar^4$ | $R^{11}$-13 |
| 110 | CH | CH | CH | $Ar^4$ | $R^{11}$-14 |
| 111 | CH | CH | CH | $Ar^4$ | $R^{11}$-15 |
| 112 | CH | CH | CH | $Ar^4$ | $R^{11}$-16 |
| 113 | CH | CH | CH | $Ar^4$ | $R^{11}$-17 |
| 114 | CH | CH | CH | $Ar^4$ | $R^{11}$-18 |
| 115 | CH | CH | CH | $Ar^4$ | $R^{11}$-19 |
| 116 | CH | CH | CH | $Ar^4$ | $R^{11}$-20 |
| 117 | CH | CH | CH | $Ar^4$ | $R^{11}$-21 |
| 118 | CH | CH | CH | $Ar^4$ | $R^{11}$-22 |
| 119 | CH | CH | CH | $Ar^4$ | $R^{11}$-23 |
| 120 | CH | CH | CH | $Ar^4$ | $R^{11}$-24 |
| 121 | CH | CH | CH | $Ar^4$ | $R^{11}$-25 |
| 122 | CH | CH | CH | $Ar^4$ | $R^{11}$-26 |

TABLE B-continued

| Line | B¹ | B² | B³ | Ar | D |
|---|---|---|---|---|---|
| 123 | CH | CH | CH | $Ar^4$ | $R^{11}$-27 |
| 124 | CH | CH | CH | $Ar^4$ | $R^{11}$-28 |
| 125 | CH | CH | CH | $Ar^4$ | $R^{11}$-29 |
| 126 | CH | CH | CH | $Ar^4$ | $A^{11}$-1 |
| 127 | CH | CH | CH | $Ar^4$ | $A^{11}$-2 |
| 128 | CH | CH | CH | $Ar^4$ | $A^{11}$-3 |
| 129 | CH | CH | CH | $Ar^{10}$ | $R^{11}$-1 |
| 130 | CH | CH | CH | $Ar^{10}$ | $R^{11}$-2 |
| 131 | CH | CH | CH | $Ar^{10}$ | $R^{11}$-3 |
| 132 | CH | CH | CH | $Ar^{10}$ | $R^{11}$-4 |
| 133 | CH | CH | CH | $Ar^{10}$ | $R^{11}$-5 |
| 134 | CH | CH | CH | $Ar^{10}$ | $R^{11}$-6 |
| 135 | CH | CH | CH | $Ar^{10}$ | $R^{11}$-7 |
| 136 | CH | CH | CH | $Ar^{10}$ | $R^{11}$-8 |
| 137 | CH | CH | CH | $Ar^{10}$ | $R^{11}$-9 |
| 138 | CH | CH | CH | $Ar^{10}$ | $R^{11}$-10 |
| 139 | CH | CH | CH | $Ar^{10}$ | $R^{11}$-11 |
| 140 | CH | CH | CH | $Ar^{10}$ | $R^{11}$-12 |
| 141 | CH | CH | CH | $Ar^{10}$ | $R^{11}$-13 |
| 142 | CH | CH | CH | $Ar^{10}$ | $R^{11}$-14 |
| 143 | CH | CH | CH | $Ar^{10}$ | $R^{11}$-15 |
| 144 | CH | CH | CH | $Ar^{10}$ | $R^{11}$-16 |
| 145 | CH | CH | CH | $Ar^{10}$ | $R^{11}$-17 |
| 146 | CH | CH | CH | $Ar^{10}$ | $R^{11}$-18 |
| 147 | CH | CH | CH | $Ar^{10}$ | $R^{11}$-19 |
| 148 | CH | CH | CH | $Ar^{10}$ | $R^{11}$-20 |
| 149 | CH | CH | CH | $Ar^{10}$ | $R^{11}$-21 |
| 150 | CH | CH | CH | $Ar^{10}$ | $R^{11}$-22 |
| 151 | CH | CH | CH | $Ar^{10}$ | $R^{11}$-23 |
| 152 | CH | CH | CH | $Ar^{10}$ | $R^{11}$-24 |
| 153 | CH | CH | CH | $Ar^{10}$ | $R^{11}$-25 |
| 154 | CH | CH | CH | $Ar^{10}$ | $R^{11}$-26 |
| 155 | CH | CH | CH | $Ar^{10}$ | $R^{11}$-27 |
| 156 | CH | CH | CH | $Ar^{10}$ | $R^{11}$-28 |
| 157 | CH | CH | CH | $Ar^{10}$ | $R^{11}$-29 |
| 158 | CH | CH | CH | $Ar^{10}$ | $A^{11}$-1 |
| 159 | CH | CH | CH | $Ar^{10}$ | $A^{11}$-2 |
| 160 | CH | CH | CH | $Ar^{10}$ | $A^{11}$-3 |
| 161 | CH | CH | CH | $Ar^{17}$ | $R^{11}$-1 |
| 162 | CH | CH | CH | $Ar^{17}$ | $R^{11}$-2 |
| 163 | CH | CH | CH | $Ar^{17}$ | $R^{11}$-3 |
| 164 | CH | CH | CH | $Ar^{17}$ | $R^{11}$-4 |
| 165 | CH | CH | CH | $Ar^{17}$ | $R^{11}$-5 |
| 166 | CH | CH | CH | $Ar^{17}$ | $R^{11}$-6 |
| 167 | CH | CH | CH | $Ar^{17}$ | $R^{11}$-7 |
| 168 | CH | CH | CH | $Ar^{17}$ | $R^{11}$-8 |
| 169 | CH | CH | CH | $Ar^{17}$ | $R^{11}$-9 |
| 170 | CH | CH | CH | $Ar^{17}$ | $R^{11}$-10 |
| 171 | CH | CH | CH | $Ar^{17}$ | $R^{11}$-11 |
| 172 | CH | CH | CH | $Ar^{17}$ | $R^{11}$-12 |
| 173 | CH | CH | CH | $Ar^{17}$ | $R^{11}$-13 |
| 174 | CH | CH | CH | $Ar^{17}$ | $R^{11}$-14 |
| 175 | CH | CH | CH | $Ar^{17}$ | $R^{11}$-15 |
| 176 | CH | CH | CH | $Ar^{17}$ | $R^{11}$-16 |
| 177 | CH | CH | CH | $Ar^{17}$ | $R^{11}$-17 |
| 178 | CH | CH | CH | $Ar^{17}$ | $R^{11}$-18 |
| 179 | CH | CH | CH | $Ar^{17}$ | $R^{11}$-19 |
| 180 | CH | CH | CH | $Ar^{17}$ | $R^{11}$-20 |
| 181 | CH | CH | CH | $Ar^{17}$ | $R^{11}$-21 |
| 182 | CH | CH | CH | $Ar^{17}$ | $R^{11}$-22 |
| 183 | CH | CH | CH | $Ar^{17}$ | $R^{11}$-23 |
| 184 | CH | CH | CH | $Ar^{17}$ | $R^{11}$-24 |
| 185 | CH | CH | CH | $Ar^{17}$ | $R^{11}$-25 |
| 186 | CH | CH | CH | $Ar^{17}$ | $R^{11}$-26 |
| 187 | CH | CH | CH | $Ar^{17}$ | $R^{11}$-27 |
| 188 | CH | CH | CH | $Ar^{17}$ | $R^{11}$-28 |
| 189 | CH | CH | CH | $Ar^{17}$ | $R^{11}$-29 |
| 190 | CH | CH | CH | $Ar^{17}$ | $A^{11}$-1 |
| 191 | CH | CH | CH | $Ar^{17}$ | $A^{11}$-2 |
| 192 | CH | CH | CH | $Ar^{17}$ | $A^{11}$-3 |
| 193 | CH | CH | CH | $Ar^{18}$ | $R^{11}$-1 |
| 194 | CH | CH | CH | $Ar^{18}$ | $R^{11}$-2 |
| 195 | CH | CH | CH | $Ar^{18}$ | $R^{11}$-3 |
| 196 | CH | CH | CH | $Ar^{18}$ | $R^{11}$-4 |
| 197 | CH | CH | CH | $Ar^{18}$ | $R^{11}$-5 |
| 198 | CH | CH | CH | $Ar^{18}$ | $R^{11}$-6 |
| 199 | CH | CH | CH | $Ar^{18}$ | $R^{11}$-7 |
| 200 | CH | CH | CH | $Ar^{18}$ | $R^{11}$-8 |
| 201 | CH | CH | CH | $Ar^{18}$ | $R^{11}$-9 |
| 202 | CH | CH | CH | $Ar^{18}$ | $R^{11}$-10 |
| 203 | CH | CH | CH | $Ar^{18}$ | $R^{11}$-11 |
| 204 | CH | CH | CH | $Ar^{18}$ | $R^{11}$-12 |
| 205 | CH | CH | CH | $Ar^{18}$ | $R^{11}$-13 |
| 206 | CH | CH | CH | $Ar^{18}$ | $R^{11}$-14 |
| 207 | CH | CH | CH | $Ar^{18}$ | $R^{11}$-15 |
| 208 | CH | CH | CH | $Ar^{18}$ | $R^{11}$-16 |
| 209 | CH | CH | CH | $Ar^{18}$ | $R^{11}$-17 |
| 210 | CH | CH | CH | $Ar^{18}$ | $R^{11}$-18 |
| 211 | CH | CH | CH | $Ar^{18}$ | $R^{11}$-19 |
| 212 | CH | CH | CH | $Ar^{18}$ | $R^{11}$-20 |
| 213 | CH | CH | CH | $Ar^{18}$ | $R^{11}$-21 |
| 214 | CH | CH | CH | $Ar^{18}$ | $R^{11}$-22 |
| 215 | CH | CH | CH | $Ar^{18}$ | $R^{11}$-23 |
| 216 | CH | CH | CH | $Ar^{18}$ | $R^{11}$-24 |
| 217 | CH | CH | CH | $Ar^{18}$ | $R^{11}$-25 |
| 218 | CH | CH | CH | $Ar^{18}$ | $R^{11}$-26 |
| 219 | CH | CH | CH | $Ar^{18}$ | $R^{11}$-27 |
| 220 | CH | CH | CH | $Ar^{18}$ | $R^{11}$-28 |
| 221 | CH | CH | CH | $Ar^{18}$ | $R^{11}$-29 |
| 222 | CH | CH | CH | $Ar^{18}$ | $A^{11}$-1 |
| 223 | CH | CH | CH | $Ar^{18}$ | $A^{11}$-2 |
| 224 | CH | CH | CH | $Ar^{18}$ | $A^{11}$-3 |

As used herein, the term "compound(s) of the present invention" or "compound(s) according to the invention" refers to the compound(s) of formula (I) as defined above, which are also referred to as "compound(s) of formula I" or "compound(s) I" or "formula I compound(s)", and includes their salts, tautomers, stereoisomers, and N-oxides.

The present invention also relates to a mixture of at least one compound of the present invention with at least one mixing partner as defined herein after. Preferred are binary mixtures of one compound of the present invention as component I with one mixing partner as defined herein after as component II. Preferred weight ratios for such binary mixtures are from 5000:1 to 1:5000, preferably from 1000:1 to 1:1000, more preferably from 100:1 to 1:100, particularly preferably from 10:1 to 1:10. In such binary mixtures, components I and II may be used in equal amounts, or an excess of component I, or an excess of component II may be used.

Mixing partners can be selected from pesticides, in particular insecticides, nematicides, and acaricides, fungicides, herbicides, plant growth regulators, fertilizers, and the like. Preferred mixing partners are insecticides, nematicides and fungicides.

The following list M of pesticides, grouped and numbered according the Mode of Action Classification of the Insecticide Resistance Action Committee (IRAC), together with which the compounds of the present invention can be used and with which potential synergistic effects might be produced, is intended to illustrate the possible combinations, but not to impose any limitation:

M.1 Acetylcholine esterase (AChE) inhibitors from the class of: M.1A carbamates, for example aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; or from the class of M.1B organophosphates, for example acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion;

M.2. GABA-gated chloride channel antagonists such as: M.2A cyclodiene organochlorine compounds, as for example endosulfan or chlordane; or M.2B fiproles (phenylpyrazoles), as for example ethiprole, fipronil, flufiprole, pyrafluprole and pyriprole;

M.3 Sodium channel modulators from the class of M.3A pyrethroids, for example acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin and transfluthrin; or M.3B sodium channel modulators such as DDT or methoxychlor;

M.4 Nicotinic acetylcholine receptor agonists (nAChR) from the class of M.4A neonicotinoids, for example acetamiprid, clothianidin, cycloxaprid, dinotefuran, imidacloprid, nitenpyram, thiacloprid and thiamethoxam; or the compounds M.4A.2: (2E-)-1-[(6-Chloropyridin-3-yl)methyl]-N'-nitro-2-pentylidenehydrazinecarboximidamide; or M.4.A.3: 1-[(6-Chloropyridin-3-yl)methyl]-7-methyl-8-nitro-5-propoxy-1,2,3,5,6,7-hexahydroimidazo[1,2-a]pyridine; or from the class M.4B nicotine;

M.5 Nicotinic acetylcholine receptor allosteric activators from the class of spinosyns, for example spinosad or spinetoram;

M.6 Chloride channel activators from the class of avermectins and milbemycins, for example abamectin, emamectin benzoate, ivermectin, lepimectin or milbemectin;

M.7 Juvenile hormone mimics, such as M.7A juvenile hormone analogues as hydroprene, kinoprene and methoprene; or others as M.7B fenoxycarb or M.7C pyriproxyfen;

M.8 miscellaneous non-specific (multi-site) inhibitors, for example M.8A alkyl halides as methyl bromide and other alkyl halides, or M.8B chloropicrin, or M.8C sulfuryl fluoride, or M.8D borax, or M.8E tartar emetic;

M.9 Selective homopteran feeding blockers, for example M.9B pymetrozine, or M.9C flonicamid;

M.10 Mite growth inhibitors, for example M.10A clofentezine, hexythiazox and diflovidazin, or M.10B etoxazole;

M.11 Microbial disruptors of insect midgut membranes, for example Bacillus thuringiensis or Bacillus sphaericus and the insecticdal proteins they produce such as Bacillus thuringiensis subsp. israelensis, Bacillus sphaericus, Bacillus thuringiensis subsp. aizawai, Bacillus thuringiensis subsp. kurstaki and Bacillus thuringiensis subsp. tenebrionis, or the Bt crop proteins: Cry1Ab, Cry1Ac, Cry1Fa, Cry2Ab, mCry3A, Cry3Ab, Cry3Bb and Cry34/35Ab1;

M.12 Inhibitors of mitochondrial ATP synthase, for example M.12A diafenthiuron, or M.12B organotin miticides such as azocyclotin, cyhexatin or fenbutatin oxide, or M.12C propargite, or M.12D tetradifon;

M.13 Uncouplers of oxidative phosphorylation via disruption of the proton gradient, for example chlorfenapyr, DNOC or sulfluramid;

M.14 Nicotinic acetylcholine receptor (nAChR) channel blockers, for example nereistoxin analogues as bensultap, cartap hydrochloride, thiocyclam orthiosultap sodium;

M.15 Inhibitors of the chitin biosynthesis type 0, such as benzoylureas as for example bistrifluron, chlorfluazuron, diflubenzuron, flucycloxuron, flufenoxuron, hexaflumuron, lufenuron, novaluron, noviflumuron, teflubenzuron or triflumuron;

M.16 Inhibitors of the chitin biosynthesis type 1, as for example buprofezin;

M.17 Moulting disruptors, Dipteran, as for example cyromazine;

M.18 Ecdyson receptor agonists such as diacylhydrazines, for example methoxyfenozide, tebufenozide, halofenozide, fufenozide or chromafenozide;

M.19 Octopamin receptor agonists, as for example amitraz;

M.20 Mitochondrial complex III electron transport inhibitors, for example M.20A hydramethylnon, or M.20B acequinocyl, or M.20C fluacrypyrim;

M.21 Mitochondrial complex I electron transport inhibitors, for example M.21A METI acaricides and insecticides such as fenazaquin, fenpyroximate, pyrimidifen, pyridaben, tebufenpyrad or tolfenpyrad, or M.21B rotenone;

M.22 Voltage-dependent sodium channel blockers, for example M.22A indoxacarb, or M.22B metaflumizone, or M.22B.1: 2-[2-(4-Cyanophenyl)-1-[3-(trifluoromethyl)phenyl]-ethylidene]-N-[4-(difluoromethoxy)phenyl]-hydrazinecarboxamide or M.22B.2: N-(3-Chloro-2-methylphenyl)-2-[(4-chlorophenyl)[4-[methyl(methylsulfonyl)amino]phenyl]methylene]-hydrazinecarboxamide;

M.23 Inhibitors of the of acetyl CoA carboxylase, such as Tetronic and Tetramic acid derivatives, for example spirodiclofen, spiromesifen or spirotetramat;

M.24 Mitochondrial complex IV electron transport inhibitors, for example M.24A phosphine such as aluminium phosphide, calcium phosphide, phosphine or zinc phosphide, or M.24B cyanide;

M.25 Mitochondrial complex II electron transport inhibitors, such as beta-ketonitrile derivatives, for example cyenopyrafen or cyflumetofen;

M.28 Ryanodine receptor-modulators from the class of diamides, as for example flubendiamide, chlorantraniliprole (Rynaxypyr®), cyantraniliprole (Cyazypyr®), tetraniliprole, or the phthalamide compounds M.28.1: (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and M.28.2: (S)-3-Chlor-N1-{2-methyl-4-[1,2,2,2-tetrafluor-1-(trifluormethyl)ethyl]phenyl}-N2-(1-methyl-2-methylsulfonylethyl)phthalamid, or the compound M.28.3: 3-bromo-N-{2-bromo-4-chloro-6-[(1-cyclopropylethyl)carbamoyl]phenyl}-1-(3-chlorpyridin-2-yl)-1H-pyrazole-5-carboxamide (proposed ISO name: cyclaniliprole), or the compound M.28.4: methyl-2-[3,5-dibromo-2-({[3-bromo-1-(3-chlorpyridin-2-yl)-1H-pyrazol-5-yl]carbonyl}amino)benzoyl]-1,2-dimethylhydrazinecarboxylate; or a compound selected from M.28.5a) to M.28.5d) and M.28.5h) to M.28.5l): M.28.5a) N-[4,6-dichloro-2-[(diethyl-lambda-4-sulfanylidene)-carbamoyl]-phenyl]-2-(3-chloro-2-pyridyl)-5-(trifluoromethyl)pyrazole-3-carboxamide; M.28.5b) N-[4- chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; M.28.5i) N-[2-(5-Amino-1,3,4-thiadiazol-2-yl]-4-chloro-6-methylphenyl]-3-bromo-1-(3-chloro-2-pyridinyl)-1H-pyrazole-5-carboxamide; M.28.5j) 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; M.28.5k) 3-Bromo-N-[2,4-dichloro-6-(methylcarbamoyl)phenyl]-1-(3,5-dichloro-2-pyridyl)-1H-pyrazole-5-carboxamide; M.28.5l) N-[4-Chloro-2-[[(1,1-dimethylethyl)amino]carbonyl]-6-methylphenyl]-1-(3-chloro-2-pyridinyl)-3-(fluoromethoxy)-1H-pyrazole-5-carboxamide; or M.28.6: cyhalodiamide; or;

M.29. insecticidal active compounds of unknown or uncertain mode of action, as for example afidopyropen, afoxolaner, azadirachtin, amidoflumet, benzoximate, bifenazate, broflanilide, bromopropylate, chinomethionat, cryolite, dicloromezotiaz, dicofol, flufenerim, flometoquin, fluensulfone, fluhexafon, fluopyram, flupyradifurone, fluralaner, metoxadiazone, piperonyl butoxide, pyflubumide, pyridalyl, pyrifluquinazon, sulfoxaflor, tioxazafen, triflumezopyrim, or the compounds M.29.3: 11-(4-chloro-2,6-dimethylphenyl)-12-hydroxy-1,4-dioxa-9-azadispiro[4.2.4.2]-tetradec-11-en-10-one, or the compound M.29.4: 3-(4'-fluoro-2,4-dimethylbiphenyl-3-yl)-4-hydroxy-8-oxa-1-azaspiro[4.5]dec-3-en-2-one, or the compound M.29.5: 1-[2-fluoro-4-methyl-5-[(2,2,2-trifluoroethyl)sulfinyl]phenyl]-3-(trifluoromethyl)-1H-1,2,4-triazole-5-amine, or actives on basis of *Bacillus firmus* (Votivo, I-1582); or a compound selected from the of M.29.6, wherein the compound M.29.6a) to M.29.6k): M.29.6a) (E/Z)—N-[1-[(6-chloro-3-pyridyl)methyl]-2-pyridylidene]-2,2,2-trifluoro-acetamide; M.29.6b) (E/Z)—N-[1-[(6-chloro-5-fluoro-3-pyridyl)methyl]-2-pyridylidene]-2,2,2-trifluoro-acetamide; M.29.6c) (E/Z)-2,2,2-trifluoro-N-[1-[(6-fluoro-3-pyridyl)methyl]-2-pyridylidene]acetamide; M.29.6d) (E/Z)—N-[1-[(6-bromo-3-pyridyl)methyl]-2-pyridylidene]-2,2,2-trifluoro-acetamide; M.29.6e) (E/Z)—N-[1-[1-(6-chloro-3-pyridyl)ethyl]-2-pyridylidene]-2,2,2-trifluoro-acetamide; M.29.6f) (E/Z)—N-[1-[(6-chloro-3-pyridyl)methyl]-2-pyridylidene]-2,2-difluoro-acetamide; M.29.6g) (E/Z)-2-chloro-N-[1-[(6-chloro-3-pyridyl)methyl]-2-pyridylidene]-2,2-difluoro-acetamide; M.29.6h) (E/Z)—N-[1-[(2-chloropyrimidin-5-yl)methyl]-2-pyridylidene]-2,2,2-trifluoro-acetamide; M.29.6i) (E/Z)—N-[1-[(6-chloro-3-pyridyl)methyl]-2-pyridylidene]-2,2,3,3,3-pentafluoro-propanamide.); M.29.6j) N-[1-[(6-chloro-3-pyridyl)methyl]-2-pyridylidene]-2,2,2-trifluoro-thioacetamide; or M.29.6k) N-[1-[(6-chloro-3-pyridyl)methyl]-2-pyridylidene]-2,2,2-trifluoro-N'-isopropyl-acetamidine; or the compounds M.29.8: fluazaindolizine; or the compounds M.29.9.a): 4-[5-(3,5-dichlorophenyl)-5-(trifluoromethyl)-4H-isoxazol-3-yl]-2-methyl-N-(1-oxothietan-3-yl)benzamide; or M.29.9.b): fluxametamide; or M.29.10: 5-[3-[2,6-dichloro-4-(3,3-dichloroallyloxy)phenoxy]propoxy]-1H-pyrazole; or a compound selected from the of M.29.11, wherein the compound M.29.11 b) to M.29.11p): M.29.11.b) 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide; M.29.11.c) 3-(benzoyl-methylamino)-2-fluoro-N-[2-iodo-4-[1,2,2,2-tetrafluoro-1-(trifluoromethyl)ethyl]-6-(trifluoromethyl)phenyl]-benzamide; M.29.11.d) N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; M.29.11.e) N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide; M.29.11.f) 4-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; M.29.11.g) 3-fluoro-N-[2-fluoro-3-[[[2-iodo-4-[1,2,2,2-tetrafluoro-1-(trifluoromethyl)ethyl]-6-(trifluoro-methyl)phenyl]amino]carbonyl]phenyl]-N-methyl-benzamide; M.29.11.h) 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; M.29.11.i) 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide; M.29.11.j) 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide; M.29.11.k) N-[5-[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide; M.29.11.l) N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide; M.29.11.m) N-[5-[[2-bromo-6-chloro-4-[1,2,2,3,3,3-hexafluoro-1-(trifluoromethyl)propyl]phenyl]carbamoyl]-2-cyano-phenyl]-4-cyano-2-methyl-benzamide; M.29.11.n) 4-cyano-N-[2-cyano-5-[[2,6-dichloro-4-[1,2,2,3,3,3-hexafluoro-1-(trifluoromethyl)-propyl]phenyl]carbamoyl]phenyl]-2-methyl-benzamide; M.29.11.o) 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide; M.29.11.p) N-[5-[[2-bromo-6-chloro-4-[1,2,2,2-tetrafluoro-1-(trifluoro-methyl)ethyl]phenyl]carbamoyl]-2-cyano-phenyl]-4-cyano-2-methyl-benzamide; or a compound selected from the of M.29.12, wherein the compound M.29.12a) to M.29.12m): M.29.12.a) 2-(1,3-Dioxan-2-yl)-6-[2-(3-pyridinyl)-5-thiazolyl]-pyridine; M.29.12.b) 2-[6-[2-(5-Fluoro-3-pyridinyl)-5-thiazolyl]-2-pyridinyl]-pyrimidine; M.29.12.c) 2-[6-[2-(3-Pyridinyl)-5-thiazolyl]-2-pyridinyl]-pyrimidine; M.29.12.d) N-Methylsulfonyl-6-[2-(3-pyridyl)thiazol-5-yl]pyridine-2-carboxamide; M.29.12.e) N-Methylsulfonyl-6-[2-(3-pyridyl)thiazol-5-yl]pyridine-2-carboxamide; M.29.12.f) N-Ethyl-N-[4-methyl-2-(3-pyridyl)thiazol-5-yl]-3-methyl-thio-propanamide; M.29.12.g) N-Methyl-N-[4-methyl-2-(3-pyridyl)thiazol-5-yl]-3-methylthio-propanamide; M.29.12.h) N,2-Dimethyl-N-[4-methyl-2-(3-pyridyl)thiazol-5-yl]-3-methylthio-propanamide; M.29.12.i) N-Ethyl-2-methyl-N-[4-methyl-2-(3-pyridyl)thiazol-5-yl]-3-methylthio-propanamide; M.29.12.j) N-[4-Chloro-2-(3-pyridyl)thiazol-5-yl]-N-ethyl-2-methyl-3-methylthio-propanamide; M.29.12.k) N-[4-Chloro-2-(3-pyridyl)thiazol-5-yl]-N,2-dimethyl-3-methylthio-propanamide; M.29.12.l) N-[4-Chloro-2-(3-pyridyl)thiazol-5-yl]-N-methyl-3-methylthio-propanamide; M.29.12.m) N-[4-Chloro-2-(3-pyridyl) thiazol-5-yl]-N-ethyl-3-methylthio-propanamide; or the compounds M.29.14a) 1-[(6-Chloro-3-pyridinyl)methyl]-1,2,3,5,6,7-hexahydro-5-methoxy-7-methyl-8-nitro-imidazo[1,2-a] pyridine; or M.29.14b) 1-[(6-Chloropyridin-3-yl)methyl]-7-methyl-8-nitro-1,2,3,5,6,7-hexahydroimidazo[1,2-a] pyridin-5-ol; or the compounds M.29.16a) 1-isopropyl-N,5-dimethyl-N-pyridazin-4-yl-pyrazole-4-carboxamide; or M.29.16b) 1-(1,2-dimethylpropyl)-N-ethyl-5-methyl-N-pyridazin-4-yl-pyrazole-4-carboxamide; M.29.16c) N,5-dimethyl-N-pyridazin-4-yl-1-(2,2,2-trifluoro-1-methyl-ethyl)pyrazole-4-carboxamide; M.29.16d) 1-[1-(1-cyanocyclopropyl)ethyl]-N-ethyl-5-methyl-N-pyridazin-4-yl-pyrazole-4-carboxamide; M.29.16e) N-ethyl-1-(2-fluoro-1-methyl-propyl)-5-methyl-N-pyridazin-4-yl-pyrazole-4-carboxamide; M.29.16f) 1-(1,2-dimethylpropyl)-N,5-dimethyl-N-pyridazin-4-yl-pyrazole-4-carboxamide; M.29.16g) 1-[1-(1-cyanocyclopropyl)ethyl]-N,5-dimethyl-N-pyridazin-4-yl-pyrazole-4-carboxamide; M.29.16h) N-methyl-1-(2-fluoro-1-methyl-propyl)-5-methyl-N-pyridazin-4-yl-pyrazole-4-carboxamide; M.29.16i) 1-(4,4-difluorocyclohexyl)-N-ethyl-5-methyl-N-pyridazin-4-yl-pyrazole-4-carboxamide; or M.29.16j) 1-(4,4-difluoro-cyclohexyl)-N,5-dimethyl-N-pyridazin-4-yl-pyrazole-4-carboxamide, or M.29.17 a compound selected from the compounds M.29.17a) to M.29.17j): M.29.17a) N-(1-methylethyl)-2-(3-pyridinyl)-2H-indazole-4-carboxamide; M.29.17b) N-cyclopropyl-2-(3-pyridinyl)-2H-indazole-4-carboxamide; M.29.17c) N-cyclohexyl-2-(3-pyridinyl)-2H-indazole-4-carboxamide; M.29.17d) 2-(3-pyridinyl)-N-(2,2,2-trifluoroethyl)-2H-indazole-4-carboxamide; M.29.17e) 2-(3-pyridinyl)-N-[(tetrahydro-2-furanyl)methyl]-2H-indazole-5-carboxamide; M.29.17f) methyl 2-[[2-(3-pyridinyl)-2H-indazol-5-yl]carbonyl]hydrazinecarboxylate; M.29.17g) N-[(2,2-difluorocyclopropyl)methyl]-2-(3-pyridinyl)-2H-indazole-5-carboxamide; M.29.17h) N-(2,2-difluoropropyl)-2-(3-pyridinyl)-2H-indazole-5-carboxamide; M.29.17i) 2-(3-pyridinyl)-N-(2-pyrimidinylmethyl)-2H-indazole-5-carboxamide; M.29.17j) N-[(5-methyl-2-pyrazinyl)methyl]-2-(3-pyridinyl)-2H-indazole-5-carboxamide, or M.29.18 a compound selected from the compounds M.29.18a) to M.29.18d): M.29.18a) N-[3-chloro-1-(3-pyridyl)pyrazol-4-yl]-N-ethyl-3-(3,3,3-trifluoropropylsulfanyl)propanamide; M.29.18b) N-[3-chloro-1-(3-pyridyl) pyrazol-4-yl]-N-ethyl-3-(3,3,3-trifluoropropylsulfinyl) propanamide; M.29.18c) N-[3-chloro-1-(3-pyridyl)pyrazol-4-yl]-3-[(2,2-difluorocyclopropyl)methylsulfanyl]-N-ethyl-propanamide; M.29.18d) N-[3-chloro-1-(3-pyridyl)pyrazol-4-yl]-3-[(2,2-difluorocyclopropyl)methylsulfinyl]-N-ethyl-propanamide; or the compound M.29.19 sarolaner, or the compound M.29.20 lotilaner.

The commercially available compounds of the M listed above may be found in The Pesticide Manual, 16th Edition, C. MacBean, British Crop Protection Council (2013) among other publications. The online Pesticide Manual is updated regularly and is accessible through http://bcpcdata.com/pesticide-manual.html.

Another online data base for pesticides providing the ISO common names is http://www.alanwood.net/pesticides.

The M.4 neonicotinoid cycloxaprid is known from WO2010/069266 and WO2011/069456, the neonicotinoid M.4A.2, sometimes also to be named as guadipyr, is known from WO2013/003977, and the neonicotinoid M.4A.3 (approved as paichongding in China) is known from WO2007/101369. The metaflumizone analogue M.22B.1 is described in CN10171577 and the analogue M.22B.2 in CN102126994. The phthalamides M.28.1 and M.28.2 are both known from WO2007/101540. The anthranilamide M.28.3 is described in WO2005/077934. The hydrazide compound M.28.4 is described in WO2007/043677. The anthranilamides M.28.5a) to M.28.5d) and M.28.5h) are described in WO 2007/006670, WO2013/024009 and WO2013/024010, the anthranilamide M.28.5i) is described in WO2011/085575, M.28.5j) in WO2008/134969, M.28.5k) in US2011/046186 and M.28.5l) in WO2012/034403. The diamide compound M.28.6 can be found in WO2012/034472. The spiroketal-substituted cyclic ketoenol derivative M.29.3 is known from WO2006/089633 and the biphenyl-substituted spirocyclic ketoenol derivative M.29.4 from WO2008/067911. The triazoylphenylsulfide M.29.5 is described in WO2006/043635, and biological control agents on the basis of *Bacillus firmus* are described in WO2009/124707. The compounds M.29.6a) to M.29.6i) listed under M.29.6 are described in WO2012/029672, and M.29.6j) and M.29.6k) in WO2013/129688. The nematicide M.29.8 is known from WO2013/055584. The isoxazoline M.29.9.a) is described in WO2013/050317. The isoxazoline M.29.9.b) is described in WO2014/126208. The pyridalyl-type analogue M.29.10 is known from WO2010/060379. The carboxamides broflanilide and M.29.11.b) to M.29.11.h) are described in WO2010/018714, and the carboxamides M.29.11i) to M.29.11.p) in WO2010/127926. The pyridylthiazoles M.29.12.a) to M.29.12.C) are known from WO2010/006713, M.29.12.d) and M.29.12.e) are known from WO2012/000896, and M.29.12.f) to M.29.12.m) from WO2010/129497. The compounds M.29.14a) and M.29.14b) are known from WO2007/101369. The pyrazoles M.29.16.a) to M.29.16h) are described in WO2010/034737, WO2012/084670, and WO2012/143317, respectively, and the pyrazoles M.29.16i) and M.29.16j) are described in U.S. 61/891,437. The pyridinylindazoles M.29.17a) to M.29.17.j) are described in WO2015/038503. The pyridylpyrazoles M.29.18a) to M.29.18d) are described in US2014/0213448. The isoxazoline M.29.19 is described in WO2014/036056. The isoxazoline M.29.20 is known from WO2014/090918.

The following list of fungicides, in conjunction with which the compounds of the present invention can be used, is intended to illustrate the possible combinations but does not limit them:

A) Respiration inhibitors

Inhibitors of complex III at $Q_o$ site (e. g. strobilurins): azoxystrobin (A.1.1), coumethoxystrobin (A.1.2), coumoxystrobin (A.1.3), dimoxystrobin (A.1.4), enestroburin (A.1.5), fenaminstrobin (A.1.6), fenoxystrobin/flufenoxystrobin (A.1.7), fluoxastrobin (A.1.8), kresoxim-methyl (A.1.9), mandestrobin (A.1.10), metominostrobin (A.1.11), orysastrobin (A.1.12), picoxy.strobin (A.1.13), pyraclostrobin (A.1.14), pyrametostrobin (A.1.15), pyraoxystrobin (A.1.16), trifloxystrobin (A.1.17), 2-(2-(3-(2,6-dichlorophenyl)-1-methyl-allylideneaminooxymethyl)-phenyl)-2-methoxyimino-N-methyl-acetamide (A.1.18), pyribencarb (A.1.19), triclopyricarb/chlorodincarb (A.1.20), famoxadone (A.1.21), fenamidone (A.1.21), methyl-/V-2-[(1,4-dimethyl-5-phenyl-pyrazol-3-yl) oxylmethyl]phenyl]-N-methoxy-carbamate (A.1.22), 1-[3-chloro-2-[[1-(4-chlorophenyl)-1H-pyrazol-3-yl] oxymethyl]phenyl]-4-methyl-tetrazol-5-one (A.1.23), 1-[3-bromo-2-[[1-(4-chlorophenyl)pyrazol-3-yl]oxymethyl]phenyl]-4-methyl-tetrazol-5-one (A.1.24), 1-[2-[[1-(4-chlorophenyl)pyrazol-3-yl]oxymethyl]-3-methyl-phenyl]-4-methyl-tetrazol-5-one (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichloro-phenyl)pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]oxymethyl]phenyl]-4-methyl-tetrazol-5-one (A.1.29), 1-[3-cyclopropyl-2-[[2-methyl-4-(1-methylpyrazol-3-yl)phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyl-tetrazol-5-one (A.1.31), 1-methyl-4-[3-methyl-2-[[2-methyl-4-(1-methylpyrazol-3-yl)phenoxy]methyl]phenyl]tetrazol-5-one (A.1.32), 1-methyl-4-[3-methyl-2-[[1-[3-(trifluoromethyl)phenyl]-ethylideneamino]oxymethyl]phenyl]tetrazol-5-one (A.1.33), (Z,2E)-5-[1-(2,4-dichlorophenyl)pyrazol-3-yl]oxy-2-methoxyimino-N,3-dimethyl-pent-3-enamide (A.1.34), (Z,2E)-5-[1-(4-chlorophenyl)pyrazol-3-yl]oxy-2-methoxyimino-N,3-dimethyl-pent-3-enamide (A.1.35), (Z,2E)-5-[1-(4-chloro-2-fluoro-phenyl)pyrazol-3-yl]oxy-2-methoxyimino-N,3-dimethyl-pent-3-enamide (A.1.36), inhibitors of complex III at Qi site: cyazofamid (A.2.1), amisulbrom (A.2.2), [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate (A.2.3), [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl]2-methylpropanoate (A.2.4), [(3S,6S,7R,8R)-8-benzyl-3-[(3-isobutoxycarbonyloxy-4-meth-oxy-pyridine-2-carbonyl)amino]-6-methyl-4,9-dioxo-1,5-dioxonan-7-yl] 2-methylpropanoate (A.2.5), [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate (A.2.6); (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate (A.2.7), (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate (A.2.8);

inhibitors of complex II (e. g. carboxamides): benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.14), penthiopyrad (A.3.15), sedaxane (A.3.16), tecloftalam (A.3.17), thifluzamide (A.3.18), N-(4'-trifluoromethylthiobiphenyl-2-yl)-3-difluoromethyl-1-methyl-1H-pyrazole-4-carboxamide (A.3.19), N-(2-(1,3,3-trimethyl-butyl)-phenyl)-1,3-dimethyl-5-fluoro-1H-pyrazole-4-carboxamide (A.3.20), 3-(difluoromethyl)-1-methyl-N-(1,1,3-trimethylindan-4-yl)pyrazole-4-carboxamide (A.3.21), 3-(trifluoromethyl)-1-methyl-N-(1,1,3-trimethylindan-4-yl)pyrazole-4-carboxamide (A.3.22), 1,3-dimethyl-N-(1,1,3-trimethylindan-4-yl)pyrazole-4-carboxamide (A.3.23), 3-(trifluoromethyl)-1,5-dimethyl-N-(1,1,3-trimethylindan-4-yl)pyrazole-4-carboxamide (A.3.24), 1,3,5-trimethyl-N-(1,1,3-trimethylindan-4-yl)pyrazole-4-carboxamide (A.3.25), N-(7-fluoro-1,1,3-trimethyl-indan-4-yl)-1,3-dimethyl-pyrazole-4-carboxamide (A.3.26), N-[2-(2,4-dichlorophenyl)-2-methoxy-1-methylethyl]-3-(difluoromethyl)-1-methyl-pyrazole-4-carboxamide (A.3.27);

other respiration inhibitors (e. g. complex I, uncouplers): diflumetorim (A.4.1), (5,8-difluoroquinazolin-4-yl)-{2-[2-fluoro-4-(4-trifluoromethylpyridin-2-yloxy)-phenyl]-ethyl}-amine (A.4.2); nitrophenyl derivates: binapacryl (A.4.3), dinobuton (A.4.4), dinocap (A.4.5), fluazinam (A.4.6); ferimzone (A.4.7); organometal compounds: fentin salts, such as fentin-acetate (A.4.8), fentin chloride (A.4.9) or fentin hydroxide (A.4.10); ametoctradin (A.4.11); and silthiofam (A.4.12);

B) Sterol biosynthesis inhibitors (SBI fungicides)

C14 demethylase inhibitors (DMI fungicides): triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[rel-(2S;3R)-3-(2-chlorophenyl)-2-(2,4-difluorophenyl)-oxiranylmethyl]-5-thiocyanato-1H-[1,2,4]triazolo (B.1.31), 2-[rel-(2S;3R)-3-(2-chlorophenyl)-2-(2,4-difluorophenyl)-oxiranylmethyl]-2H-[1,2,4]triazole-3-thiol (B.1.32), 2-[2-chloro-4-(4-chlorophenoxy)phenyl]-1-(1,2,4-triazol-1-yl)pentan-2-ol (B.1.33), 1-[4-(4-chlorophenoxy)-2-(trifluoromethyl)phenyl]-1-cyclopropyl-2-(1,2,4-triazol-1-yl)ethanol (B.1.34), 2-[4-(4-chloro-phenoxy)-2-(trifluoromethyl)phenyl]-1-(1,2,4-triazol-1-yl)butan-2-ol (B.1.35), 2-[2-chloro-4-(4-chlorophenoxy)phenyl]-1-(1,2,4-triazol-1-yl)butan-2-ol (B.1.36), 2-[4-(4-chlorophenoxy)-2-(trifluoromethyl)phenyl]-3-methyl-1-(1,2,4-triazol-1-yl)butan-2-ol (B.1.37), 2-[4-(4-chlorophenoxy)-2-(trifluoromethyl)phenyl]-1-(1,2,4-triazol-1-yl)propan-2-ol (B.1.38), 2-[2-chloro-4-(4-chlorophenoxy)phenyl]-3-methyl-1-(1,2,4-triazol-1-yl)butan-2-ol (B.1.39), 2-[4-(4-chlorophenoxy)-2-(trifluoromethyl)phenyl]-1-(1,2,4-triazol-1-yl)pentan-2-ol (B.1.40), 2-[4-(4-fluorophenoxy)-2-(trifluoromethyl)phenyl]-1-(1,2,4-triazol-1-yl)propan-2-ol (B.1.41), 2-[2-chloro-4-(4-chlorophenoxy)phenyl]-1-(1,2,4-triazol-1-yl)pent-3-yn-2-ol (B.1.51); imidazoles: imazalil (B.1.42), pefurazoate (B.1.43), prochloraz (B.1.44), triflumizol (B.1.45); pyrimidines, pyridines and piperazines: fenarimol (B.1.46), nuarimol (B.1.47), pyrifenox (B.1.48), triforine (B.1.49), [3-(4-chloro-2-fluoro-phenyl)-5-(2,4-difluorophenyl)isoxazol-4-yl]-(3-pyridyl)methanol (B.1.50);

Delta14-reductase inhibitors: aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), spiroxamine (B.2.8);

Inhibitors of 3-keto reductase: fenhexamid (B.3.1);

C) Nucleic acid synthesis inhibitors phenylamides or acyl amino acid fungicides: benalaxyl (C.1.1), benalaxyl-M (C.1.2), kiralaxyl (C.1.3), metalaxyl (C.1.4), metalaxyl-M (mefenoxam, C.1.5), ofurace (C.1.6), oxadixyl (C.1.7);

others: hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrimidin-4-amine (C.2.6), 5-fluoro-2-(4-fluorophenylmethoxy)pyrimidin-4-amine (C.2.7);

D) Inhibitors of cell division and cytoskeleton tubulin inhibitors, such as benzimidazoles, thiophanates: benomyl (D1.1), carbendazim (D1.2), fuberidazole (D1.3), thiabendazole (D1.4), thiophanate-methyl (D1.5); triazolopyrimidines: 5-chloro-7-(4-methylpiperidin-1-yl)-6-(2,4,6-trifluorophenyl)-[1,2,4]triazolo[1,5-a]pyrimidine (D1.6);

other cell division inhibitors: diethofencarb (D2.1), ethaboxam (D2.2), pencycuron (D2.3), fluopicolide (D2.4), zoxamide (D2.5), metrafenone (D2.6), pyriofenone (D2.7); E) Inhibitors of amino acid and protein synthesis methionine synthesis inhibitors (anilino-pyrimidines): cyprodinil (E.1.1), mepanipyrim (E.1.2), pyrimethanil (E.1.3);

protein synthesis inhibitors: blasticidin-S (E.2.1), kasugamycin (E.2.2), kasugamycin hydrochloride-hydrate (E.2.3), mildiomycin (E.2.4), streptomycin (E.2.5), oxytetracyclin (E.2.6), polyoxine (E.2.7), validamycin A (E.2.8);

F) Signal transduction inhibitors

MAP/histidine kinase inhibitors: fluoroimid (F.1.1), iprodione (F.1.2), procymidone (F.1.3), vinclozolin (F.1.4), fenpiclonil (F.1.5), fludioxonil (F.1.6);

G protein inhibitors: quinoxyfen (F.2.1);

G) Lipid and membrane synthesis inhibitors

Phospholipid biosynthesis inhibitors: edifenphos (G.1.1), iprobenfos (G.1.2), pyrazophos (G.1.3), isoprothiolane (G.1.4);

lipid peroxidation: dicloran (G.2.1), quintozene (G.2.2), tecnazene (G.2.3), tolclofos-methyl (G.2.4), biphenyl (G.2.5), chloroneb (G.2.6), etridiazole (G.2.7);

phospholipid biosynthesis and cell wall deposition: dimethomorph (G.3.1), flumorph (G.3.2), mandipropamid (G.3.3), pyrimorph (G.3.4), benthiavalicarb (G.3.5), iprovalicarb (G.3.6), valifenalate (G.3.7) and N-(1-(1-(4-cyano-phenyl)ethanesulfonyl)-but-2-yl) carbamic acid-(4-fluorophenyl) ester (G.3.8);

compounds affecting cell membrane permeability and fatty acides: propamocarb (G.4.1);

fatty acid amide hydrolase inhibitors: oxathiapiprolin (G.5.1), 2-{3-[2-(1-{[3,5-bis(di-fluoromethyl-1H-pyrazol-1-yl]acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate (G.5.3);

H) Inhibitors with Multi Site Action inorganic active substances: Bordeaux mixture (H.1.1), copper acetate (H.1.2), copper hydroxide (H.1.3), copper oxychloride (H.1.4), basic copper sulfate (H.1.5), sulfur (H.1.6);

thio- and dithiocarbamates: ferbam (H.2.1), mancozeb (H.2.2), maneb (H.2.3), metam (H.2.4), metiram (H.2.5), propineb (H.2.6), thiram (H.2.7), zineb (H.2.8), ziram (H.2.9);

organochlorine compounds (e. g. phthalimides, sulfamides, chloronitriles): anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), tolylfluanid (H.3.11), N-(4-chloro-2-nitro-phenyl)-N-ethyl-4-methyl-benzenesulfonamide (H.3.12);

guanidines and others: guanidine (H.4.1), dodine (H.4.2), dodine free base (H.4.3), guazatine (H.4.4), guazatine-acetate (H.4.5), iminoctadine (H.4.6), iminoctadine-triacetate (H.4.7), iminoctadine-tris(albesilate) (H.4.8), dithianon (H.4.9), 2,6-dimethyl-1H,5H-[1,4]dithiino[2,3-c:5,6-c']dipyrrole-1,3,5,7(2H,6H)-tetraone (H.4.10);

I) Cell wall synthesis inhibitors inhibitors of glucan synthesis: validamycin (1.1.1), polyoxin B (1.1.2);

melanin synthesis inhibitors: pyroquilon (1.2.1), tricyclazole (1.2.2), carpropamid (I.2.3), dicyclomet (I.2.4), fenoxanil (1.2.5);

J) Plant defence inducers acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9);

K) Unknown mode of action bronopol (K.1.1), chinomethionat (K.1.2), cyflufenamid (K.1.3), cymoxanil (K.1.4), dazomet (K.1.5), debacarb (K.1.6), diclomezine (K.1.7), difenzoquat (K.1.8), difenzoquat-methylsulfate (K.1.9), diphenylamin (K.1.10), fenpyrazamine (K.1.11), flumetover (K.1.12), flusulfamide (K.1.13), flutianil (K. 1.14), methasulfocarb (K.1.15), nitrapyrin (K.1.16), nitrothal-isopropyl (K.1.18), oxathiapiprolin (K.1.19), tolprocarb (K.1.20), oxin-copper (K.1.21), proquinazid (K.1.22), tebufloquin (K.1.23), tecloftalam (K.1.24), triazoxide (K.1.25), 2-butoxy-6-iodo-3-propylchromen-4-one (K.1.26), 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone (K.1.27), 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone (K.1.28), 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone (K.1.29), N-(cyclo-propylmethoxyimino-(6-difluoromethoxy-2,3-difluoro-phenyl)-methyl)-2-phenyl acetamide (K.1.30), N'-(4-(4-chloro-3-trifluoromethyl-phenoxy)-2,5-dimethyl-phenyl)-N-ethyl-N-methyl formamidine (K. 1.31), N'-(4-(4-fluoro-3-trifluoromethyl-phenoxy)-2,5-dimethyl-phenyl)-N-ethyl-N-methyl formamidine (K.1.32), N'-(2-methyl-5-trifluoromethyl-4-(3-trimethylsilanyl-prop-oxy)-phenyl)-N-ethyl-N-methyl formamidine (K.1.33), N'-(5-difluoromethyl-2-methyl-4-(3-tri-methylsilanyl-propoxy)-phenyl)-N-ethyl-N-methyl formamidine (K.1.34), methoxy-acetic acid 6-tert-butyl-8-fluoro-2,3-dimethyl-quinolin-4-yl ester (K.1.35), 3-[5-(4-methylphenyl)-2,3-dimethyl-isoxazolidin-3-yl]-pyridine (K.1.36), 3-[5-(4-chloro-phenyl)-2,3-dimethyl-isoxazolidin-3-yl]-pyridine (pyrisoxazole) (K.1.37), N-(6-methoxy-pyridin-3-yl) cyclopropanecarboxylic acid amide (K.1.38), 5-chloro-1-(4,6-dimethoxy-pyrimidin-2-yl)-2-methyl-1H-benzoimidazole (K.1.39), 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate (K.1.40), picarbutrazox (K.1.41), pentyl N-[6-[[(Z)-[(1-methyltetrazol-5-yl)-phenyl-methylene]amino]oxymethyl]-2-pyridyl]carbamate (K.1.42), 2-[2-[(7,8-difluoro-2-methyl-3-quinolyl)oxy]-6-fluoro-phenyl]propan-2-ol (K.1.43), 2-[2-fluoro-6-[(8-fluoro-2-methyl-3-quinolyl)oxy]phen-yl]propan-2-ol (K.1.44), 3-(5-fluoro-3,3,4,4-tetramethyl-3,4-dihydroisoquinolin-1-yl)quinoline (K.1.45), 3-(4,4-difluoro-3,3-dimethyl-3,4-dihydroisoquinolin-1-yl)quinoline (K.1.46), 3-(4,4,5-trifluoro-3,3-dimethyl-3,4-dihydroisoquinolin-1-yl) quinoline (K.1.47), 9-fluoro-2,2-dimethyl-5-(3-quinolyl)-3H-1,4-benzoxazepine (K.1.48).

The fungicides described by common names, their preparation and their activity e.g. against harmful fungi is known (cf.: http://www.alanwood.net/pesticides/); these substances are commercially available.

The fungicides described by IUPAC nomenclature, their preparation and their pesticidal activity is also known (cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 11/028657, WO2012/168188, WO 2007/006670, WO 2011/77514; WO13/047749, WO 10/069882, WO 13/047441, WO 03/16303, WO 09/90181, WO 13/007767, WO 13/010862, WO 13/127704, WO 13/024009, WO 13/024010 and WO 13/047441, WO 13/162072, WO 13/092224, WO 11/135833).

Biopesticides

Suitable mixing partners for the compounds of the present invention also include biopesticides.

Biopesticides have been defined as a form of pesticides based on micro-organisms (bacteria, fungi, viruses, nematodes, etc.) or natural products (compounds, such as metabolites, proteins, or extracts from biological or other natural sources) (U.S. Environmental Protection Agency: http://www.epa.gov/pesticides/biopesticides/). Biopesticides fall into two major classes, microbial and biochemical pesticides:

(1) Microbial pesticides consist of bacteria, fungi or viruses (and often include the metabolites that bacteria and fungi produce). Entomopathogenic nematodes are also classified as microbial pesticides, even though they are multicellular.

(2) Biochemical pesticides are naturally occurring substances or or structurally-similar and functionally identical to a naturally-occurring substance and extracts from biological sources that control pests or provide other crop protection uses as defined below, but have non-toxic mode of actions (such as growth or developmental regulation, attractents, repellents or defence activators (e.g. induced resistance) and are relatively non-toxic to mammals.

Biopesticides for use against crop diseases have already established themselves on a variety of crops. For example, biopesticides already play an important role in controlling downy mildew diseases. Their benefits include: a 0-Day Pre-Harvest Interval, the ability to use under moderate to severe disease pressure, and the ability to use in mixture or in a rotational program with other registered pesticides.

A major growth area for biopesticides is in the area of seed treatments and soil amendments. Biopesticidal seed treatments are e.g. used to control soil borne fungal pathogens that cause seed rots, damping-off, root rot and seedling blights. They can also be used to control internal seed borne fungal pathogens as well as fungal pathogens that are on the surface of the seed. Many biopesticidal products also show capacities to stimulate plant host defenses and other physiological processes that can make treated crops more resistant to a variety of biotic and abiotic stresses or can regulate plant growth. Many biopesticidal products also show capacities to stimulate plant health, plant growth and/or yield enhancing activity.

The following list of biopesticides, in conjunction with which the compounds of the present invention can be used, is intended to illustrate the possible combinations but does not limit them:

L) Biopesticides

L1) Microbial pesticides with fungicidal, bactericidal, viricidal and/or plant defense activator activity: *Ampeiomyces quisqualis, Aspergillus flavus, Aureobasidium pullulans, Bacillus altitudinis, B. amyloliquefaciens, B. megaterium, B. mojavensis, B. mycoides, B. pumilus, B. simplex, B. solisalsi, B. subtilis, B. subtilis* var. *amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea* f. *catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus alvei, Paenibacillus polymyxa, Pantoea vagans, Penicillium bilaiae, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Uloclaadium oudemansii, Verticillium dahlia,* zucchini yellow mosaic virus (avirulent strain);

L2) Biochemical pesticides with fungicidal, bactericidal, viricidal and/or plant defense activator activity: harpin protein, *Reynoutria sachalinensis* extract;

L3) Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. t.* ssp. *israelensis, B. t.* ssp. *galleriae, B. t.* ssp. *kurstaki, B. t.* ssp. *tenebrionis, Beauveria bassiana, B. brongniartii, Burkholderia* spp., *Chromobacterium subtsugae, Cydia pomonella* granulovirus (CpGV), *Cryptophlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, Metarhizium anisopliae* var. *anisopliae, M. anisopliae* var. *acridum, Nomuraea rileyi, Paecilomyces fumosoroseus, P. lilacinus, Paenibacillus popilliae, Pasteuria* spp., *P. nishizawae, P. penetrans, P. ramosa, P. thornea, P. usgae, Pseudomonas fluorescens,*

*Spodoptera littoralis* nucleopolyhedrovirus (SpliNPV), *Steinernema carpocapsae*, *S. feltiae*, *S. kraussei*, *Streptomyces galbus*, *S. microflavus*;

L4) Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, cis-jasmone, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, extract of *Chenopodium* ambrosiodes, Neem oil, Quillay extract;

L5) Microbial pesticides with plant stress reducing, plant growth regulator, plant growth promoting and/or yield enhancing activity: *Azospirillum amazonense*, *A. brasiiense*, *A. lipoferum*, *A. irakense*, *A. haiopraeferens*, *Bradyrhizobium* spp., *B. elkanii*, *B. japonicum*, *B. liaoningense*, *B. lupini*, *Delftia addovorans*, *Glomus intraradices*, *Mesorhizobium* spp., *Rhizobium leguminosarum* bv. *phaseoli*, *R. l.* bv. *trifolii*, *R. l.* bv. *viciae*, *R. tropici*, *Sinorhizobium meliloti*.

The biopesticides from L1) and/or L2) may also have insecticidal, acaricidal, molluscidal, pheromone, nematicidal, plant stress reducing, plant growth regulator, plant growth promoting and/or yield enhancing activity. The biopesticides from L3) and/or L4) may also have fungicidal, bactericidal, viricidal, plant defense activator, plant stress reducing, plant growth regulator, plant growth promoting and/or yield enhancing activity. The biopesticides from L5) may also have fungicidal, bactericidal, viricidal, plant defense activator, insecticidal, acaricidal, molluscidal, pheromone and/or nematicidal activity.

Many of these biopesticides have been deposited under deposition numbers mentioned herein (the prefices such as ATCC or DSM refer to the acronym of the respective culture collection, for details see e. g. here: http://www.wfcc.info/ccinfo/collection/bv acronym/), are referred to in literature, registered and/or are commercially available: mixtures of *Aureobasidium pullulans* DSM 14940 and DSM 14941 isolated in 1989 in Konstanz, Germany (e. g. blastospores in Blossom Protect® from bio-ferm GmbH, Austria), *Azospirillum brasiiense* Sp245 originally isolated in wheat reagion of South Brazil (Passo Fundo) at least prior to 1980 (BR 11005; e. g. GELFIX® Grarmneas from BASF Agricultural Specialties Ltd., Brazil), *A. brasiiense* strains Ab-V5 and Ab-V6 (e. g. in AzoMax from Novozymes BioAg, Produtos papra Agricultura Ltda., Quattro Barras, Brazil or Simbiose-Maiz® from Simbiose-Agro, Brazil; Plant Soil 331, 413-425, 2010), *Bacillus amyloliquefaciens* strain AP-188 (NRRL B-50615 and B-50331; U.S. Pat. No. 8,445,255); *B. amyloliquefaciens* spp. *plantarum* D747 isolated from air in Kikugawa-shi, Japan (US 20130236522 A1; FERM BP-8234; e. g. Double Nickel™ 55 WDG from Certis LLC, USA), *B. amyloliquefaciens* spp. piantarum FZB24 isolated from soil in Brandenburg, Germany (also called SB3615; DSM 96-2; J. Plant Dis. Prot. 105, 181-197, 1998; e. g. Taegro® from Novozyme Biologicals, Inc., USA), *B. amyloliquefaciens* ssp. piantarum FZB42 isolated from soil in Brandenburg, Germany (DSM 23117; J. Plant Dis. Prot. 105, 181-197, 1998; e. g. RhizoVital® 42 from AbiTEP GmbH, Germany), *B. amyloliquefaciens* ssp. *plantarum* MBI600 isolated from faba bean in Sutton Bonington, Nottinghamshire, U.K. at least before 1988 (also called 1430; NRRL B-50595; US 2012/0149571 A1; e. g. Integral® from BASF Corp., USA), *B. amyloliquefaciens* spp. *plantarum* QST-713 isolated from peach orchard in 1995 in California, U.S.A. (NRRL B-21661; e. g. Serenade® MAX from Bayer Crop Science LP, USA), *B. amyloliquefaciens* spp. *plantarum* TJ1000 isolated in 1992 in South Dakoda, U.S.A. (also called 1BE; ATCC BAA-390; CA 2471555 A1; e. g. QuickRoots™ from TJ Technologies, Watertown, SD, USA), *B. firmus* CNCM I-1582, a variant of parental strain EIP-N1 (CNCM I-1556) isolated from soil of central plain area of Israel (WO 2009/126473, U.S. Pat. No. 6,406,690; e. g. Votivo® from Bayer CropScience LP, USA), *B. pumilus* GHA 180 isolated from apple tree rhizosphere in Mexico (IDAC 260707-01; e. g. PRO-MIX® BX from Premier Horticulture, Quebec, Canada), *B. pumilus* INR-7 otherwise referred to as BU—$F_{22}$ and BU—$F_{33}$ isolated at least before 1993 from cucumber infested by *Erwinia tracheiphila* (NRRL B-50185, NRRL B-50153; U.S. Pat. No. 8,445,255), *B. pumilus* QST 2808 was isolated from soil collected in Pohnpei, Federated States of Micronesia, in 1998 (NRRL B-30087; e. g. Sonata® or Ballad® Plus from Bayer Crop Science LP, USA), *B. simplex* ABU 288 (NRRL B-50304; U.S. Pat. No. 8,445,255), *B. subtilis* FB17 also called UD 1022 or UD10-22 isolated from red beet roots in North America (ATCC PTA-11857; System. Appl. Microbiol. 27, 372-379, 2004; US 2010/0260735; WO 2011/109395); *B. thuringiensis* ssp. *aizawai* ABTS-1857 isolated from soil taken from a lawn in Ephraim, Wisconsin, U.S.A., in 1987 (also called ABG-6346; ATCC SD-1372; e. g. XenTari® from BioFa AG, Münsingen, Germany), *B. t.* ssp. *kurstaki* ABTS-351 identical to HD-1 isolated in 1967 from diseased Pink Bollworm black larvae in Brownsville, Texas, U.S.A. (ATCC SD-1275; e. g. Dipel® DF from Valent BioSciences, IL, USA), *B. t.* ssp. *tenebrionis* NB-176-1, a mutant of strain NB-125, a wild type strain isolated in 1982 from a dead pupa of the beetle *Tenebrio molitor*(DSM 5480; EP 585 215 B1; e. g. Novodor® from Valent BioSciences, Switzerland), *Beauveria bassiana* GHA (ATCC 74250; e. g. BotaniGard® 22WGP from Laverlam Int. Corp., USA), *B. bassiana* JW-1 (ATCC 74040; e. g. Naturalis® from CBC (Europe) S.r.l., Italy), *Bradyrhizobium elkanii* strains SEMIA 5019 (also called 29W) isolated in Rio de Janeiro, Brazil and SEMIA 587 isolated in 1967 in the State of Rio Grande do Sul, from an area previously inoculated with a North American isolate, and used in commercial inoculants since 1968 (Appl. Environ. Microbiol. 73(8), 2635, 2007; e. g. GELFIX 5 from BASF Agricultural Specialties Ltd., Brazil), *B. japonicum* 532c isolated from Wisconsin field in U.S.A. (Nitragin 61A152; Can. J. Plant. Sci. 70, 661-666, 1990; e. g. in Rhizoflo®, Histick®, Hicoat® Super from BASF Agricultural Specialties Ltd., Canada), *B. japonicum* E-109 variant of strain USDA 138 (INTA E109, SEMIA 5085; Eur. J. Soil Biol. 45, 28-35, 2009; Biol. Fertil. Soils 47, 81-89, 2011); *B. japonicum* strains deposited at SEMIA known from Appl. Environ. Microbiol. 73(8), 2635, 2007: SEMIA 5079 isolated from soil in Cerrados region, Brazil by Embrapa-Cerrados used in commercial inoculants since 1992 (CPAC 15; e. g. GELFIX 5 or ADHERE 60 from BASF Agricultural Specialties Ltd., Brazil), *B. japonicum* SEMIA 5080 obtained under lab condtions by Embrapa-Cerrados in Brazil and used in commercial inoculants since 1992, being a natural variant of SEMIA 586 (CB1809) originally isolated in U.S.A. (CPAC 7; e. g. GELFIX 5 or ADHERE 60 from BASF Agricultural Specialties Ltd., Brazil); *Burkholderia* sp. A396 isolated from soil in Nikko, Japan, in 2008 (NRRL B-50319; WO 2013/032693; Marrone Bio Innovations, Inc., USA),

*Coniothyrium minitans* CON/M/91-08 isolated from oilseed rape (WO 1996/021358; DSM 9660; e. g. Contans® WG, Intercept® WG from Bayer CropScience AG, Germany), harpin (alpha-beta) protein (Science 257, 85-88, 1992; e. g. Messenger™ or HARP—N-Tek from Plant Health Care pic, U.K.), *Helicoverpa armigera* nucleopolyhedrovirus (HearNPV) (J. Invertebrate Pathol. 107, 112-126, 2011; e. g. Helicovex® from Adermatt Biocontrol, Switzerland; Diplomata® from Koppert, Brazil; Vivus® Max from AgBiTech Pty Ltd., Queensland, Australia), *Helicoverpa zea* single capsid nucleopolyhedrovirus (HzSNPV) (e. g. Gemstar® from Certis LLC, USA), *Helicoverpa zea* nucleopolyhedrovirus ABA-NPV—U (e. g. Heligen® from AgBiTech Pty Ltd., Queensland, Australia), *Heterorhabditis bacteriophora* (e. g. Nemasys® G from BASF Agricultural Specialities Limited, UK), *Isaria fumosorosea* Apopka-97 isolated from mealy bug on gynura in Apopka, Florida, U.S.A. (ATCC 20874; Biocontrol Science Technol. 22(7), 747-761, 2012; e. g. PFR-97™ or PreFeRal® from Certis LLC, USA), *Metarhizium anisopliae* var. *anisopliae* $F_{52}$ also called 275 or V275 isolated from codling moth in Austria (DSM 3884, ATCC 90448; e. g. Met52® Novozymes Biologicals BioAg Group, Canada), *Metschnikowia fructicola* 277 isolated from grapes in the central part of Israel (U.S. Pat. No. 6,994,849; NRRL Y-30752; e. g. formerly Shemer® from Agrogreen, Israel), *Paecilomyces ilacinus* 251 isolated from infected nematode eggs in the Philippines (AGAL 89/030550; WO1991/02051; Crop Protection 27, 352-361, 2008; e. g. BioAct® from Bayer CropScience AG, Germany and MeloCon® from Certis, USA), *Pasteuria nishizawae* Pn1 isolated from a soybean field in the mid-2000s in Illinois, U.S.A. (ATCC SD-5833; Federal Register 76(22), 5808, Feb. 2, 2011; e.g. Clariva™ PN from Syngenta Crop Protection, LLC, USA), *Penicillium bilaiae* (also called *P. bilaii*) strains ATCC 18309 (=ATCC 74319), ATCC 20851 and/or ATCC 22348 (=ATCC 74318) originally isolated from soil in Alberta, Canada (Fertilizer Res. 39, 97-103, 1994; Can. J. Plant Sci. 78(1), 91-102, 1998; U.S. Pat. No. 5,026,417, WO 1995/017806; e. g. Jump Start®, Provide® from Novozymes Biologicals BioAg Group, Canada), *Reynoutria sachalinensis* extract (EP 0307510 B1; e. g. Regalia® SC from Marrone Bioinnovations, Davis, CA, USA or Milsana® from BioFa AG, Germany), *Steinernema carpocapsae* (e. g. Millenium® from BASF Agricultural Specialities Limited, UK), *S. feltiae* (e. g. Nemashield® from BioWorks, Inc., USA; Nemasys® from BASF Agricultural Specialities Limited, UK), *Streptomyces microflavus* NRRL B-50550 (WO 2014/124369; Bayer CropScience, Germany), *T. harzianum* T-22 also called KRL-AG2 (ATCC 20847; BioControl 57, 687-696, 2012; e. g. Plantshield® from BioWorks Inc., USA or SabrEx™ from Advanced Biological Marketing Inc., Van Wert, OH, USA).

According to the invention, the solid material (dry matter) of the biopesticides (with the exception of oils such as Neem oil) are considered as active components (e.g. to be obtained after drying or evaporation of the extraction or suspension medium in case of liquid formulations of the microbial pesticides).

In accordance with the present invention, the weight ratios and percentages used herein for a biological extract such as Quillay extract are based on the total weight of the dry content (solid material) of the respective extract(s).

The total weight ratios of compositions comprising at least one microbial pesticide in the form of viable microbial cells including dormant forms, can be determined using the amount of CFU of the respective microorganism to calculate the total weight of the respective active component with the following equation that $1\times10^{10}$ CFU equals one gram of total weight of the respective active component. Colony forming unit is measure of viable microbial cells, in particular fungal and bacterial cells. In addition, here "CFU" may also be understood as the number of (juvenile) individual nematodes in case of (entomopathogenic) nematode biopesticides, such as *Steinernema feltiae*.

When mixtures comprising microbial pesticides are employed in crop protection, the application rates preferably range from about 1×106 to 5×1015 (or more) CFU/ha, preferably from about 1×108 to about 1×1013 CFU/ha, and even more preferably from about 1×109 to about 1×1012 CFU/ha. In the case of (entomopathogenic) nematodes as microbial pesticides (e. g. *Steinernema feltiae*), the application rates preferably range inform about 1×105 to 1×1012 (or more), more preferably from 1×108 to 1×1011, even more preferably from 5×108 to 1×1010 individuals (e. g. in the form of eggs, juvenile or any other live stages, preferably in an infetive juvenile stage) per ha.

When mixtures comprising microbial pesticides are employed in seed treatment, the application rates with respect to plant propagation material preferably range from about 1×106 to 1×1012 (or more) CFU/seed. Preferably, the concentration is about 1×106 to about 1×109 CFU/seed. In the case of the microbial pesticides II, the application rates with respect to plant propagation material also preferably range from about 1×107 to 1×1014 (or more) CFU per 100 kg of seed, preferably from 1×109 to about 1×1012 CFU per 100 kg of seed.

The invention also relates to agrochemical compositions comprising an auxiliary and at least one compound of the present invention or a mixture thereof.

An agrochemical composition comprises a pesticidally effective amount of a compound of the present invention or a mixture thereof. The term "pesticidally effective amount" is defined below.

The compounds of the present invention or the mixtures thereof can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grube-mann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protec-tive colloids, adhesion agents, thickeners, humectants, repellents, attractants, feeding stimu-lants, compatibilizers, bactericides, anti-freezing agents, anti-foaming agents, colorants, tackifi-ers and binders.

Suitable solvents and liquid carriers are water and organic solvents, such as mineral oil frac-tions of medium to high boiling point, e.g. kerosene, diesel oil; oils of vegetable or animal origin; aliphatic, cyclic and aromatic hydrocarbons, e. g. toluene, paraffin, tetrahydronaphthalene, al-kylated naphthalenes; alcohols, e.g. ethanol, propanol, butanol, benzylalcohol, cyclo¬hexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyhnaphthalenes, sulfosuccinates or sulfosuccinamates. Examples of sulfates are sulfates of fatty acids and oils, of ethoxylated alkylphenols, of alcohols, of ethox-ylated alcohols, or of fatty acid esters. Examples of phosphates are phosphate esters. Exam-pies of carboxylates are alkyl carboxylates, and carboxylated alcohol or alkylphenol eth-oxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Exam-pies of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B—C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compounds of the present invention on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanofer-rate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
I) Water-Soluble Concentrates (SL, LS)

10-60 wt % of a compound I according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.
Ii) Dispersible Concentrates (DC)

5-25 wt % of a compound I according to the invention and 1-10 wt % dispersant (e. g. polyvinylpyrrolidone) are dissolved in up to 100 wt % organic solvent (e.g. cyclohexanone). Dilution with water gives a dispersion.
Iii) Emulsifiable Concentrates (EC)

15-70 wt % of a compound I according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.
Iv) Emulsions (EW, EO, ES)

5-40 wt % of a compound I according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.
V) Suspensions (SC, OD, FS)

In an agitated ball mill, 20-60 wt % of a compound I according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active sub-stance. For FS type composition up to 40 wt % binder (e.g. polyvinylalcohol) is added.

Vi) Water-Dispersible Granules and Water-Soluble Granules (WG, SG)

50-80 wt % of a compound I according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

Vii) Water-Dispersible Powders and Water-Soluble Powders (WP, SP, WS)

50-80 wt % of a compound I according to the invention are ground in a rotor-stator mill with ad-dition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dis-persion or solution of the active substance.

Viii) Gel (GW, GF)

In an agitated ball mill, 5-25 wt % of a compound I according to the invention are comminuted with addition of 3-10 wt % dispersants (e.g. sodium lignosulfonate), 1-5 wt % thickener (e.g. car-boxymethylcellulose) and up to 100 wt % water to give a fine suspension of the active sub-stance. Dilution with water gives a stable suspension of the active substance.

Ix) Microemulsion (ME)

5-20 wt % of a compound I according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

X) Microcapsules (CS)

An oil phase comprising 5-50 wt % of a compound I according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radi-cal initiator results in the formation of poly(meth)acrylate microcapsules. Alternatively, an oil phase comprising 5-50 wt % of a compound I according to the invention, 0-40 wt % water insolu-ble organic solvent (e.g. aromatic hydrocarbon), and an isocyanate monomer (e.g. diphenylme-thene-4,4'-diisocyanatae) are dispersed into an aqueous solution of a pro-tective colloid (e.g. polyvinyl alcohol). The addition of a polyamine (e.g. hexamethylenediamine) results in the for-mation of a polyurea microcapsule. The monomers amount to 1-10 wt %. The wt % relate to the total CS composition.

xi) Dustable Powders (DP, DS)

1-10 wt % of a compound I according to the invention are ground finely and mixed intimately with up to 100 wt % solid carrier, e.g. finely divided kaolin.

Xii) Granules (GR, FG)

0.5-30 wt % of a compound I according to the invention is ground finely and associated with up to 100 wt % solid carrier (e.g. silicate). Granulation is achieved by extrusion, spray-drying or the fluidized bed.

Xiii) Ultra-Low Volume Liquids (UL)

1-50 wt % of a compound I according to the invention are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active sub-stance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage de-vice, a knapsack sprayer, a spray tank, a spray plane, or an irrigation system. Usually, the agrochemical composition is made up with water, buffer, and/or further auxiliaries to the desired application concen-tration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the in-vention such as parts of a kit or parts of a binary or ternary mixture may be mixed by the user himself in a spray tank and further auxiliaries may be added, if appropriate.

In a further embodiment, either individual components of the composition according to the invention or partially premixed components, e. g. components comprising compounds of the present invention and/or mixing partners as defined above, may be mixed by the user in a spray tank and further auxiliaries and additives may be added, if appropriate.

In a further embodiment, either individual components of the composition according to the in-vention or partially premixed components, e. g. components comprising compounds of the present invention and/or mixing partners as defined above, can be applied jointly (e.g. after tank mix) or consecutively.

The compounds of the present invention are suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of a compound of the present invention.

The compounds of the present invention are also suitable for use in combating or controlling animal pests. Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of a compound of the present invention.

The compounds of the present invention are effective through both contact and ingestion. Furthermore, the compounds of the present invention can be applied to any and all developmental stages, such as egg, larva, pupa, and adult.

The compounds of the present invention can be applied as such or in form of compositions comprising them as defined above. Furthermore, the compounds of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active compound to the furrow, and closing the furrow. Foliar application refers to the application of the pesticidally active compound to plant foliage, e.g. through spray equipment. For foliar applications, it can be advantageous to modify the behavior of the pests by use of pheromones in combination with the compounds of the present invention. Suitable pheromones for specific crops and pests are known to a skilled person and publicly available from databases of pheromones and semiochemicals, such as http://www.pherobase.com.

As used herein, the term "contacting" includes both direct contact (applying the compounds/compositions directly on the animal pest or plant—typically to the foliage, stem or roots of the plant) and indirect contact (applying the compounds/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including wild type plants and plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, eucalyptus, flax, lentil, maize, melon, papaya, petunia, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is performed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and LibertyLink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under trade names including WideStrike®, Bollgard®, Agrisure®, Herculex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agri-biotech Applications (ISAAA)" (http://www.isaaa.org/gmapprovaldatabase) and "Center for Environmental Risk Assessment (CERA)" (http://cera-qmc.org/GMCropDatabase).

It has surprisingly been found that the pesticidal activity of the compounds of the present invention may be enhanced by the insecticidal trait of a modified plant. Furthermore, it has been found that the compounds of the present invention are suitable for preventing insects to become resistant to the insecticidal trait or for combating pests, which already have become resistant to the insecticidal trait of a modified plant. Moreover, the compounds of the present invention are suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection compound either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various compounds/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The compounds of the present invention are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a compound of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active compound is carried out by spraying or by dusting the seeds before sowing of the plants and before emergence of the plants.

The present invention also comprises seeds coated with or containing the active compound. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the active compound may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the compounds of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the compounds of the invention are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising a compound of the present invention, or an agriculturally useful salt thereof, as defined herein. The amount of the compound of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The invention also relates to composition comprising seed and a compound of the present invention, or an agriculturally useful salt thereof, as defined herein. The amount of the compound of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The compounds of the present invention may also be used for improving the health of a plant. Therefore, the present invention also relates to a method for improving plant health by treating a plant, plant propagation material and/or the locus where the plant is growing or is to grow with an effective and non-phytotoxic amount of a compound of the present invention.

As used herein "an effective and non-phytotoxic amount" means that the compound is used in a quantity which allows to obtain the desired effect but which does not give rise to any phytotoxic symptom on the treated plant or on the plant grown from the treated propagule or treated soil.

The terms "plant" and "plant propagation material" are defined above.

"Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect"), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The compounds of the invention are also suitable for use against non-crop insect pests. For use against said non-crop pests, compounds of the present invention can be used as bait composition, gel, general insect spray, aerosol, as ultra-low volume application and bed net (impregnated or surface applied). Furthermore, drenching and rodding methods can be used.

As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. http://www.pherobase.com), and are known to those skilled in the art.

For use in bait compositions, the typical content of active ingredient is from 0.001 weight % to 15 weight %, desirably from 0.001 weight % to 5% weight % of active compound.

Formulations of the compounds of the present invention as aerosols (e.g in spray cans), oil sprays or pump sprays are highly suitable for the non-professional user for controlling pests such as flies, fleas, ticks, mosquitos or cockroaches. Aerosol recipes are preferably composed of the active compound, solvents, furthermore auxiliaries such as emulsifiers, perfume oils, if appropriate stabilizers, and, if required, propellants.

The oil spray formulations differ from the aerosol recipes in that no propellants are used.

For use in spray compositions, the content of active ingredient is from 0.001 to 80 weights %, preferably from 0.01 to 50 weight % and most preferably from 0.01 to 15 weight %.

The compounds of the present invention and its respective compositions can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with compounds of the present invention and its respective compositions also comprise treating surfaces of huts and houses, air spraying and impregnation of curtains, tents, clothing items, bed nets, tsetse-fly trap or the like. Insecticidal compositions for application to fibers, fabric, knitgoods, nonwovens, netting material or foils and tarpaulins preferably comprise a mixture including the insecticide, optionally a repellent and at least one binder.

The compounds of the present invention and its compositions can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active compound per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

The compounds of the the present invention are especially suitable for efficiently combating animal pests such as arthropods, gastropods and nematodes including but not limited to:

insects from the order of Lepidoptera, for example Achroia grisella, Acleris spp. such as A. fimbriana, A. gloverana, A. variana; Acrolepiopsis assectella, Acronicta major, Adoxophyes spp. such as A. cyrtosema, A. orana; Aedia leucomelas, Agrotis spp. such as A. exclamationis, A. fucosa, A. ipsiion, A. orthogoma, A. segetum, A. subterranea; Alabama argillacea, Aleurodicus dispersus, Alsophila pometaria, Ampelophaga rubiginosa, Amyeiois transitella, Anacampsis sarcitella, Anagasta kuehniella, Anarsia lineatella, Anisota senatoria, Antheraea pernyi, Anticarsia (=Thermesia) spp. such as A. gemmatalis; Apamea spp., Aproaerema modicella, Archips spp. such as A. argyrospila, A. fuscocupreanus, A. rosana, A. xyloseanus; Argyresthia conjugella, Argyroploce spp., Argyrotaenia spp. such as A. velutinana; Athetis mindara, Austroasca viridigrisea, Autographa gamma, Autographa nigrisigna, Barathra brassicae, Bedellia spp., Bonagota salubricola, Borbo cinnara, Bucculatrix thurberiella, Bupalus piniarius, Busseola spp., Cacoecia spp. such as C. murinana, C. podana; Cactoblastis cactorum, Cadra cautella, Calingo braziliensis, Caloptilis theivora, Capua reticulana, Carposina spp. such as C. niponensis, C. sasakii; Cephus spp., Chaetocnema aridula, Cheimatobia brumata, Chilo spp. such as C. indicus, C. suppressalis, C. partellus; Choreutis pariana, Choristoneura spp. such as C. conflictana, C. fumiferana, C. longicellana, C. murinana, C. occidentalis, C. rosaceana; Chrysodeixis (=Pseudoplusia) spp. such as C. eriosoma, C. includens; Cirphis unipuncta, Clysia ambiguella, Cnaphalocerus spp., Cnaphalocrocis medinalis, Cnephasia spp., Cochylis hospes, Coleophora spp., Colias eurytheme, Conopomorpha spp., Conotrachelus spp., Copitarsia spp., Corcyra cephalonica, Crambus caliginosellus, Crambus teterrellus, Crocidosema (=Epinotia) aporema, Cydalima (=Diaphania) perspectalis, Cydia (=Carpocapsa) spp. such as C. pomonella, C. latiferreana; Dalaca noctuides, Datana integerrima, Dasychira pinicola, Dendrolimus spp. such as D. pini, D. spectabilis, D. sibiricus; Desmia funeralis, Diaphania spp. such as D. nitidalis, D. hyalinata; Diatraea grandiosella, Diatraea saccharalis, Diphthera festiva, Earias spp. such as E. insulana, E. vittella; Ecdytolopha aurantianu, Egira (=Xylomyges) curialis, Elasmopalpus lignosellus, Eldana saccharina, Endopiza viteana, Ennomos subsignaria, Eoreuma loftini, Ephestia spp. such as E. cautella, E. elutella, E. kuehniella; Epinotia aporema, Epiphyas postvittana, Erannis tiliaria, Erionota thrax, Etiella spp., Eulia spp., Eupoecilia ambiguella, Euproctis chrysorrhoea, Euxoa spp., Evetria bouliana, Faronta albilinea, Feltia spp. such as F. subterranean; Galleria mellonella, Gracillaria spp., Grapholita spp. such as G. funebrana, G. molesta, G. inopinata; Halysidota spp., Harrisina americana, Hedylepta spp., Helicoverpa spp. such as H. armigera (=Heliothis armigera), H. zea (=Heliothis zea); Heliothis spp. such as H. assulta, H. subflexa, H. virescens; Hellula spp. such as H. undalis, H. rogatalis; Helocoverpa gelotopoeon, Flemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma salicis, Leucoptera spp. such as L. coffeella, L. scitella; Leuminivora lycinivorella, Lithocolletis blancardella, Lithophane antennata, Llatiia octo (=Amyna axis), Lobesia botrana, Lophocampa spp., Loxagrotis albicosta, Loxostege spp. such as L. sticticalis, L cereralis; Lymantria spp. such as L. dispar, L. monacha; Lyonetia clerkella, Lyonetia prunifoliella, Malacosoma spp. such as M. americanum, M. californicum, M. constrictum, M. neustria; Mamestra spp. such as M. brassicae, M. configurata; Mamstra brassicae, Manduca spp. such as M. quinquemaculata, M. sexta; Marasmia spp, Marmara spp., Maruca testulalis, Megalopyge lanata, Melanchra picta, Melanitis leda, Mods spp. such as M. lapites, M. repanda; Mods latipes, Monochroa fragariae, Mythimna separata, Nemapogon doacella, Neoleudnodes elegantalis, Nepytia spp., Nymphula spp., Oiketicus spp., Omiodes indicata, Omphisa anastomosalis, Operophtera brumata, Orgyia pseudotsugata, Oria spp., Orthaga thyrisalis, Ostrinia spp. such as O. nubilalis; Oulema oryzae, Paleacrita vernata, Panolis fiammea, Parnara spp., Papaipema nebris, Papilio cresphontes, Paramyelois transitella, Paranthrene regalis, Paysandisia archon, Pedinophora spp. such as P. gossypiella; Peridroma sauda, Perileucoptera spp., such as P. coffeella; Phalera bucephala, Phryganidia californica, Phthorimaea spp. such as P. operculella; Phyllocnistis dtrella, Phyllonoryder spp. such as P. blancardella, P. crataegella, P. issikii, P. ringoniella; Pieris spp. such as P. brassicae, P. rapae, P. napi; Pilocrocis tripunctata, Plathypena scabra, Platynota spp. such as P. flavedana, P. idaeusalis, P. stultana; Platyptilia carduidactyla, Plebejus argus, Plodia interpunctella, Plusia spp, Plutella maculipennis, Plutella xylostella, Pontia protodica, Prays spp., Prodenia spp., Proxenus lepigone, Pseudaletia spp. such as P. sequax, P. unipuncta; Pyrausta nubilalis, Rachiplusia nu, Richia albicosta, Rhizobius ventralis, Rhyacionia frustrana, Sabulodes aegrotata, Schizura concinna, Schoenobius spp., Schreckensteinia festaliella, Scirpophaga spp. such as S. incertulas, S. innotata; Scotia segetum, Sesamia spp. such as S. inferens, Seudyra subflava, Sitotroga cerealella, Sparganothis pilleriana, Spilonota lechriaspis, S. ocellana, Spodoptera (=Lamphygma) spp. such as S. cosmoides, S. eridania, S. exigua, S. frugiperda, S. latisfascia, S. littoralis, S. litura, S. omithogalli; Stigmella spp., Stomopteryx subsecivella, Strymon bazochii, Sylepta derogata, Synanthedon spp. such as S. exitiosa, Tecia solanivora, Telehin licus, Thaumatopoea pityocampa, Thaumatotibia (=Cryptophlebia) leucotreta, Thaumetopoea pityocampa, Theda spp., Thresimima ampelophaga, Thyrinteina spp, Tildenia inconspicuella, Tinea spp. such as T. doacella, T. pellionella; Tineola bisselliella, Tortrix spp. such as T. viridana; Trichophaga tapetzella, Trichoplusia spp. such as T. ni; Tuta (=Scrobipalpula) absoluta, Udea spp. such as U. rubigalis, U. rubigalis; Virachola spp., Yponomeuta padella, and Zeiraphera canadensis;

insects from the order of Coleoptera, for example Acalymma vitiatum, Acanthoscehdes obtectus, Adoretus spp., Agelastica alni, Agrilus spp. such as A. anxius, A. planipennis, A. sinuatus; Agriotes spp. such as A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora spp. such as A. glabripennis; Anthonomus spp. such as A. eugenii, A. grandis, A. pomorum; Anthrenus spp.,

*Aphthona euphoridae, Apion* spp., *Apogonia* spp., *Athous haemorrhoidalis, Atomaria* spp. such as *A. linearis; Atiagenus* spp., *Aulacophora femoralis, Blastophagus piniperda, Blitophaga undata, Bruchidius obtectus, Bruchus* spp. such as *B. lentis, B. pisorum, B. rufimanus; Byctiscus betulae, Callidiellum rufipenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C. napi; Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicornis, D. semipunctata, D. virgifera; Diaprepes abbreviates, Dichocrocis* spp., *Dicladispa armigera, Diloboderus abderus, Diocalandra frumenti* (*Diocalandra stigmaticollis*), *Enaphalodes rufulus, Epilachna* spp. such as *E. varivestis, E. vigintioctomaculata; Epitrix* spp. such as *E. hirtipennis, E. similaris; Eutheola humilis, Eutinobothrus brasiliensis, Faustinus cubae, Gibbium psylloides, Gnathocerus cornutus, Hellula undalis, Heteronychus arator, Hyiamorpha elegans, Hylobius abietis, Hylotrupes bajulus, Hypera* spp. such as *H. brunneipennis, H. postica; Hypomeces squamosus, Hypothenemus* spp., *Ips typographus, Lachnosterna consanguinea, Lasioderma serricorne, Latheticus oryzae, Lathridius* spp., *Lema* spp. such as *L. bilineata, L. melanopus; Leptinotarsa* spp. such as *L. decemlineata; Leptispa pygmaea, Limonius californicus, Lissorhoptrus oryzophilus, Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. melolontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae; Phoracantha recurva, Phyllobius pyri, Phyllopertha horticola, Phyllophaga* spp. such as *P. helleri; Phyllotreta* spp. such as *P. chrysocephala, P. nemorum, P. striolata, P. vittula; Phyllopertha horticola, Popillia japonica, Premnotrypes* spp., *Psacothea hilaris, Psylliodes chrysocephala, Prostephanus truncates, Psylliodes* spp., *Ptinus* spp., *Pulga saltona, Rhizopertha dominica, Rhynchophorus* spp. such as *R. billineatus, R. ferrugineus, R. paimarum, R. phoenicis, R. vulneratus; Saperda Candida, Scolytus schevyrewi, Scyphophorus acupunctatus, Sitona lineatus, Sitophilus* spp. such as *S. granaria, S. oryzae, S. zeamais; Sphenophorus* spp. such as *S. levis; Stegobium paniceum, Sternechus* spp. such as *S. subsignatus; Strophomorphus ctenotus, Symphyletes* spp., *Tanymecus* spp., *Tenebrio molitop Tenebrioides mauretanicus, Tribolium* spp. such as *T. castaneum; Trogoderma* spp., *Tychius* spp., *Xylotrechus* spp. such as *X. pyrrhoderus;* and, *Zabrus* spp. such as *Z. tenebrioides;* insects from the order of Diptera for example *Aedes* spp. such as *A. aegypti, A. albopictus, A. vexans; Anastrepha ludens, Anopheles* spp. such as *A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. maceiiaria; Chrysops atlanticus, Chrysops discalis, Chrysops silacea, Cochliomyia* spp. such as *C. hominivorax; Contarinia* spp. such as *C. sorghicola; Cordylobia anthropophaga, Culex* spp. such as *C. nigripalpus, C. pipiens, C. quinquefasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukii, Fannia* spp. such as *F. canicularis; Gastraphilus* spp. such as *G. intestinalis; Geomyza tipunctata, Glossina* spp. such as *G. fuscipes, G. morsitans, G. palpalis, G. tachinoides; Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L trifolii; Lucilia* spp. such as *L. caprina, L. cuprina, L. sericata; Lycoria pectoralis, Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mixtum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis moseiiana, Stomoxys* spp. such as *S. calcitrans; Tabanus* spp. such as *T. atratus, T. bovinus, T. lineola, T. similis; Tannia* spp., *Thecodiplosis japonensis, Tipula oleracea, Tipula paludosa*, and *Wohlfahrtia* spp;

insects from the order of Thysanoptera for example, *Baliothrips biformis, Dichromothrips corbetti, Dichromothrips* ssp., *Echinothrips americanus, Enneothrips flavens, Frankliniella* spp. such as *F. fusca, F. occidentalis, F. tritici; Heliothrips* spp., *Hercinothrips femoralis, Kakothrips* spp., *Microcephalothrips abdominalis, Neohydatothrips samayunkur, Pezothrips kellyanus, Rhipiphorothrips cruentatus, Sciriothrips* spp. such as *S. citri, S. dorsalis, S. perseae; Stenchaetothrips* spp, *Taeniothrips cardamoni, Taeniothrips inconsequens, Thrips* spp. such as *T. imagines, T. hawaiiensis, T. oryzae, T. palmi, T. parvispinus, T. tabaci;* insects from the order of Hemiptera for example, *Acizzia jamatonica, Acrosternum* spp. such as *A. hilare; Acyrthosipon* spp. such as *A. onobrychis, A. pisum; Adelges laricis, Adelges tsugae, Adelphocoris* spp., such as *A. rapidus, A. superbus; Aeneolamia* spp., *Agonoscena* spp., *Aulacorthum solani, Aleurocanthus woglumi, Aleurodes* spp., *Aleurodicus disperses, Aleurolobus barodensis, Aleurothrixus* spp., *Amrasca* spp., *Anasa tristis, Antestiopsis* spp., *Anuraphis cardui, Aonidiella* spp., *Aphanostigma pin, Aphidula nasturtii, Aphis* spp. such as *A. cracdvora, A. fabae, A. forbesi, A. gossypii, A. grossulariae, A. maidiradids, A. pomi, A. sambud, A. schneideri, A. spiraecola; Arboridia apicalis, Arilus critatus, Aspidiella* spp., *Aspidiotus* spp., *Atanus* spp., *Aulacaspis yasumatsui, Aulacorthum solani, Bactericera cockerelli* (*Paratrioza cockerelli*), *Bemisia* spp. such as *B. argentifolii, B. tabaci* (*Aleurodes tabaci*); *Blissus* spp. such as *B. leucopterus; Brachycaudus* spp. such as *B. cardui, B. helichrysi, B. persicae, B. prunicola; Brachycolus* spp., *Brachycorynella asparagi, Brevicoryne brassicae, Cacopsylla* spp. such as *C. fulguralis, C. pyricola* (*Psylla pin*); *Calligypona marginata, Calocoris* spp., *Campylomma livida, Capitophorus horni, Carneocephala fulgida, Cavele-* rius spp., Ceraplastes spp., Ceratovacuna lanigera, Ceroplastes ceriferus, Cerosipha gossypii, Chaetosiphon fragaefolii, Chionaspis tegalensis, Chlorita onukii, Chromaphis juglandicola, Chrysomphalus ficus, Cicadulina mbila, Cimex spp. such as C. hemipterus, C. lectularius; Coccomytilus halli, Coccus spp. such as C. hesperidum, C. pseudomagnoliarum; Corythucha arcuata, Creontiades dilutus, Cryptomyzus ribis, Chrysomphalus aonidum, Cryptomyzus ribis, Ctenarytaina spatulata, Cyrtopeltis notatus, Dalbulus spp., Dasynus piperis, Dialeurodes spp. such as D. citrifolii; Dalbulus maidis, Diaphorina spp. such as D. citri; Diaspis spp. such as D. bromeliae; Dichelops furcatus, Diconocoris hewetti, Doralis spp., Dreyfusia nordmannianae, Dreyfusia piceae, Drosicha spp., Dysaphis spp. such as D. plantaginea, D. pyri, D. radicola; Dysaulacorthum pseudosolani, Dysdercus spp. such as D. cingulatus, D. intermedius; Dysmicoccus spp., Edessa spp., Geocoris spp., Empoasca spp. such as E. fabae, E. solana; Epidiaspis leperii, Eriosoma spp. such as E. lanigerum, E. pyricola; Erythroneura spp., Eurygaster spp. such as E. integriceps; Euscelis bilobatus, Euschistus spp. such as E. heros, E. impictiventris, E. servus; Fiorinia theae, Geococcus coffeae, Glycaspis brimblecombei, Halyomorpha spp. such as H. halys; Heliopeltis spp., Homalodisca vitripennis (=H. coagulata), Horcias nobilellus, Hyalopterus pruni, Hyperomyzus lactucae, Icerya spp. such as I. purchase; Idiocerus spp., Idioscopus spp., Laodelphax striatellus, Lecanium spp., Lecanoideus floccissimus, Lepidosaphes spp. such as L. ulmi; Leptocorisa spp., Leptoglossus phyllopus, Lipaphis erysimi, Lygus spp. such as L. hesperus, L lineolaris, L pratensis; Maconellicoccus hirsutus, Marchalina hellenica, Macropes excavatus, Macrosiphum spp. such as M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella spp., Metopolophium dirhodum, Monellia costalis, Monelliopsis pecanis, Myzocallis coryli, Murgantia spp., Myzus spp. such as M. ascalonicus, M. cerasi, M. nicotianae, M. persicae, M. varians; Nasonovia ribis-nigri, Neotoxoptera formosana, Neomegalotomus spp, Nephotettix spp. such as N. malayanus, N. nigropictus, N. parvus, N. virescens; Nezara spp. such as N. viridula; Nilaparvata lugens, Nysius huttoni, Oebalus spp. such as O. pugnax; Oncometopia spp., Orthezia praeionga, Oxycaraenus hyalinipennis, Parabemisia myricae, Parlatoria spp., Parthenolecanium spp. such as P. corni, P. persicae; Pemphigus spp. such as P. bursarius, P. populivenae; Peregrinus maidis, Perkinsiella saccharicida, Phenacoccus spp. such as P. aceris, P. gossypii; Phloeomyzus passerinii, Phorodon humuli, Phylloxera spp. such as P. devastatrix, Piesma quadrata, Piezodorus spp. such as P. guildinii; Pirmaspis aspidistrae, Pianococcus spp. such as P. citri, P. ficus; Prosapia bicincta, Protopulvinaria pyriformis, Psallus seriatus, Pseudacysta persea, Pseudaulacaspis pentagona, Pseudococcus spp. such as P. comstocki; Psylla spp. such as P. mali; Pteromalus spp., Pulvinaria amygdali, Pyrilla spp., Quadraspidiotus spp., such as Q. perniciosus; Quesada gigas, Rastrococcus spp., Reduvius senilis, Rhizoecus americanus, Rhodnius spp., Rhopalomyzus ascalonicus, Rhopalosiphum spp. such as R. pseudobrassicas, R. insertum, R. maidis, R. padi; Sagatodes spp., Sahlbergella singularis, Saissetia spp., Sappaphis mala, Sappaphis mali, Scaptocoris spp., Scaphoides titanus, Schizaphis graminum, Schizoneura lanuginosa, Scotinophora spp., Selenaspidus articulatus, Sitobion avenae, Sogata spp., Sogatella furcifera, Solubea insularis, Spissistilus festinus (=Stictocephala festina), Stephanitis nashi, Stephanitis pyrioides, Stephanitis takeyai, Tenaiaphara malayensis, Tetraleurodes perseae, Therioaphis maculate, Thyanta spp. such as T. accerra, T. perditor; Tibraca spp., Tomaspis spp., Toxoptera spp. such as T. aurantii; Trialeurodes spp. such as T. abutilonea, T. ricini, T. vaporariorum; Triatoma spp., Trioza spp., Typhlocyba spp., Unaspis spp. such as U. citri, U. yanonensis; and Viteus vitifolii, Insects from the order Hymenoptera for example Acanthomyops interjectus, Athalia rosae, Atta spp. such as A. capiguara, A. cephalotes, A. cephalotes, A. laevigata, A. robusta, A. sexdens, A. texana, Bombus spp., Brachymyrmex spp., Camponotus spp. such as C. floridanus, C. pennsylvanicus, C. modoc; Cardiocondyla nuda, Chalibion sp, Crematogaster spp., Dasymutilla occidentalis, Diprion spp., Dolichovespula maculata, Dorymyrmex spp., Dryocosmus kuriphilus, Formica spp., Hoplocampa spp. such as H. minuta, H. testudinea; Iridomyrmex humilis, Lasius spp. such as L. nigep Linepithema humile, Liometopum spp., Leptocybe invasa, Monomorium spp. such as M. pharaonis, Monomorium, Nylandria fulva, Pachycondyla chinensis, Paratrechina longicornis, Paravespula spp., such as P. germanica, P. pennsylvanica, P. vulgaris; Pheidole spp. such as P. megacephala; Pogonomyrmex spp. such as P. barbatus, P. californicus, Polistes rubiginosa, Prenolepis impairs, Pseudomyrmex gracilis, Schelipron spp., Sirex cyaneus, Solenopsis spp. such as S. geminata, Sjnvicta, S. molesta, S. richteri, S. xyloni, Sphecius speciosus, Sphex spp., Tapinoma spp. such as T. melanocephalum, T. sessile; Tetramorium spp. such as T. caespitum, T. bicarinatum, Vespa spp. such as V. crabro; Vespula spp. such as V. squamosal; Wasmarmia auropunctata, Xylocopa sp;

Insects from the order Orthoptera for example Acheta domesticus, Calliptamus italicus, Chortoicetes terminifera, Ceuthophilus spp., Diastrammena asynamora, Dociostaurus maroccanus, Gryllotalpa spp. such as G. africana, G. gryllotalpa; Gryllus spp., Hieroglyph us daganensis, Kraussaria angulifera, Locusta spp. such as L. migratoria, L. pardalina; Meianopius spp. such as M. bivittatus, M. femurrubrum, M. mexicanus, M. sanguinipes, M. spretus; Nomadacris septemfasciata, Oedaleus senegalensis, Scapteriscus spp., Schistocerca spp. such as S. amencana, S. gregaria, Stemopelmatus spp., Tachycines asynamorus, and Zonozerus variegatus;

Pests from the Class Arachnida for example Acari, e.g. of the families Argasidae, Ixodidae and Sarcoptidae, such as Amblyomma spp. (e.g. A. americanum, A. variegatum, A. maculatum), Argas spp. such as A. persicu), Boophilus spp. such as B. armulatus, B. decoloratus, B. microplus, Dermacentor spp. such as D. silvarum, D. andersoni, D. variabilis, Hyalomma spp. such as H. truncatum, Ixodes spp. such as I. ricinus, I. rubicundus, I. scapularis, I. holocyclus, I. pacificus, Rhipicephalus sanguineus, Ornithodorus spp. such as O. moubata, O. hermsi, O. turicata, Ornithonyssus bacoti, Otobius megnini, Dermanyssus gallinae, Psoroptes spp. such as P. ovis, Rhipicephalus spp. such as R. sanguineus, R. appendiculatus, Rhipicephalus evertsi, Rhizoglyphus spp., Sarcoptes spp. such as S. scabiei; and Family Eriophyidae including Aceria spp. such as A. sheldoni, A. anthocoptes, Acallitus spp., Aculops spp. such as A. lycopersici, A. pelekassk Aculus spp. such as A. schlechtendali; Colomerus vitis, Epitrimerus pyri, Phyllocoptruta oleivora; Eriophytes ribis and Eriophyes spp. such as Eriophyes sheldoni; Family Tarsonemidae including Hemitarsonemus spp., Phytonemus pallidus and Polyphagotarsonemus latus, Stenotarsonemus spp. Steneotarsonemus spinki; Family Tenuipalpidae including Brevipalpus spp. such as B. phoenicis; Family Tetranychidae including Eotetranychus spp., Eutetranychus spp.,

*Oligonychus* spp., *Petrobia latens*, *Tetranychus* spp. such as *T. cinnabarinus*, *T. evansi*, *T. kanzawai*, *T. pacificus*, *T. phaseulus*, *T. telarius* and *T. urticae*; *Bryobia praetiosa*; *Panonychus* spp. such as *P. ulmi*, *P. citri*; *Metatetranychus* spp. and *Oligonychus* spp. such as *O. pratensis*, *O. perseae*, *Vasates lycopersici*; *Raoiella indica*, Family Carpoglyphidae including *Carpoglyphus* spp.; *Penthaleidae* spp. such as *Halotydeus destructor*; Family Demodicidae with species such as *Demodex* spp.; Family Trombicidea including *Trombicula* spp.; Family Macronyssidae including *Ornothonyssus* spp.; Family Pyemotidae including *Pyemotes tritici*; *Tyrophagus putrescentiae*; Family Acaridae including *Acarus siro*; Family Araneida including *Latrodectus mactans*, *Tegenaria agrestis*, *Chiracanthium* sp, *Lycosa* sp *Achaearanea tepidariorum* and *Loxosceles reclusa*;

Pests from the Phylum Nematoda, for example, plant parasitic nematodes such as rootknot nematodes, *Meloidogyne* spp. such as *M. hapla*, *M. incognita*, *M. javanica*; cyst-forming nematodes, *Globodera* spp. such as *G. rostochiensis*; *Heterodera* spp. such as *H. avenae*, *H. glycines*, *H. schachtii*, *H. trifolii*; Seed gall nematodes, *Anguina* spp.; Stem and foliar nematodes, *Aphelenchoides* spp. such as *A. besseyi*; Sting nematodes, *Belonolaimus* spp. such as *B. longicaudatus*; Pine nematodes, *Bursaphelenchus* spp. such as *B. lignicolus*, *B. xylophilus*; Ring nematodes, *Criconema* spp., *Criconemella* spp. such as *C. xenoplax* and *C. ornata*; and, *Criconemoides* spp. such as *Criconemoides informis*; *Mesocriconema* spp.; Stem and bulb nematodes, *Ditylenchus* spp. such as *D. destructor*, *D. dipsaci*; Awl nematodes, *Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus*; Lesion nematodes, *Pratylenchus* spp. such as *P. brachyurus*, *P. neglectus*, *P. penetrans*, *P. curvitatus*, *P. goodeyi*; Burrowing nematodes, *Radopholus* spp. such as *R. similis*; *Rhadopholus* spp.; *Rhodopholus* spp.; Reniform nematodes, *Rotylenchus* spp. such as *R. robustus*, *R. reniformis*; *Scutellonema* spp.; Stubby-root nematode, *Trichodorus* spp. such as *T. obtusus*, *T. primitivus*; *Paratrichodorus* spp. such as *P. minor*; Stunt nematodes, *Tylenchorhynchus* spp. such as *T. claytoni*, *T. dubius*; Citrus nematodes, *Tylenchulus* spp. such as *T. semipenetrans*; Dagger nematodes, *Xiphinema* spp.; and other plant parasitic nematode species;

Insects from the order Isoptera for example *Calotermes flavicollis*, *Coptotermes* spp. such as *C. formosanus*, *C. gestroi*, *C. acinaciformis*; *Cornitermes cumulans*, *Cryptotermes* spp. such as *C. brevis*, *C. cavifrons*; *Globitermes sulfureus*, *Heterotermes* spp. such as *H. aureus*, *H. longiceps*, *H. tenuis*; *Leucotermes flavipes*, *Odontotermes* spp., *Incisitermes* spp. such as *I. minor*, *I. snyder*; *Marginitermes hubbardi*, *Mastotermes* spp. such as *M. darwiniensis Neocapritermes* spp. such as *N. opacus*, *N. parvus*; *Neotermes* spp., *Procornitermes* spp., *Zootermopsis* spp. such as *Z. angusticollis*, *Z. nevadensis*, *Reticulitermes* spp. such as *R. hesperus*, *R. tibialis*, *R. speratus*, *R. flavipes*, *R. grassei*, *R. lucifugus*, *R. santonensis*, *R. virginicus*; *Termes natalensis*, Insects from the order Blattaria for example *Blatta* spp. such as *B. orientalis*, *B. lateralis*; *Blattella* spp. such as *B. asahinae*, *B. germanica*; *Leucophaea maderae*, *Panchlora nivea*, *Periplaneta* spp. such as *P. americana*, *P. australasiae*, *P. brunnea*, *P. fuligginosa*, *P. japonica*; *Supella longipalpa*, *Parcoblatta pennsylvanica*, *Eurycotis floridana*, *Pycnoscelus surinamensis*, Insects from the order Siphonoptera for example *Cediopsylla simples*, *Ceratophyllus* spp., *Ctenocephalides* spp. such as *C. felis*, *C. canis*, *Xenopsylla cheopis*, *Pulex irritans*, *Trichodectes canis*, *Tunga penetrans*, and *Nosopsyllus fasciatus*, Insects from the order Thysanura for example *Lepisma saccharina*, *Ctenolepisma urbana*, and *Thermobia domestica*, Pests from the class Chilopoda for example *Geophilus* spp., *Scutigera* spp. such as *Scutigera coleoptrata*;

Pests from the class Diplopoda for example *Blaniulus guttulatus*, *Julus* spp., *Narceus* spp., Pests from the class Symphyla for example *Scutigerella immaculata*, Insects from the order Dermaptera, for example *Forficula auricularia*, Insects from the order Collembola, for example *Onychiurus* spp., such as *Onychiurus armatus*, Pests from the order Isopoda for example, *Armadillidium vulgare*, *Oniscus asellus*, *Porcelllio scaber*, Insects from the order Phthiraptera, for example *Damalinia* spp., *Pediculus* spp. such as *Pediculus humanus capitis*, *Pediculus humanus corporis*, *Pediculus humanus humanus*; *Pthirus pubis*, *Haematopinus* spp. such as *Haematopinus eurysternus*, *Haematopinus suis*; *Linognathus* spp. such as *Linognathus vituli*; *Bovicola bovis*, *Menopon gallinae*, *Menacanthus stramineus* and *Solenopotes capillatus*, *Trichodectes* spp., Examples of further pest species which may be controlled by compounds of formula (I) include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata*, *Succinea* spp.; from the class of the helminths, for example, *Ancylostoma duodenale*, *Ancylostoma ceylanicum*, *Acylostoma braziliensis*, *Ancylostoma* spp., *Ascaris lumbricoides*, *Ascaris* spp., *Brugia malayi*, *Brugia timori*, *Bunostomum* spp., *Chabertia* spp., *Clonorchis* spp., *Cooperia* spp., *Dicrocoelium* spp., *Dictyocaulus filaria*, *Diphyllobothrium latum*, *Dracunculus medinensis*, *Echinococcus granulosus*, *Echinococcus multilocularis*, *Enterobius vermicularis*, *Faciola* spp., *Haemonchus* spp. such as *Haemonchus contortus*; *Heterakis* spp., *Hymenolepis nana*, *Hyostrongulus* spp., *Loa Loa*, *Nematodirus* spp., *Oesophagostomum* spp., *Opisthorchis* spp., *Onchocerca volvulus*, *Ostertagia* spp., *Paragonimus* spp., *Schistosomen* spp., *Strongyloides fuelleborni*, *Strongyloides stercoralis*, *Stronyloides* spp., *Taenia saginata*, *Taenia solium*, *Trichinella spiralis*, *Trichinella nativa*, *Trichinella britovi*, *Trichinella nelsoni*, *Trichinella pseudopsiralis*, *Trichostrongulus* spp., *Trichuris trichiura*, *Wuchereria bancrofti*.

The compounds of the present invention are suitable for use in treating or protecting animals against infestation or infection by parasites. Therefore, the present invention also relates to the use of a compound of the present invention for the manufacture of a medicament for the treatment or protection of animals against infestation or infection by parasites. Furthermore, the present invention relates to a method of treating or protecting animals against infestation and infection by parasites, which comprises orally, topically or parenterally administering or applying to the animals a parasiticidally effective amount of a compound of the present invention.

The present invention also relates to the non-therapeutic use of compounds of the present invention for treating or protecting animals against infestation and infection by parasites. Moreover, the present invention relates to a non-therapeutic method of treating or protecting animals against infestation and infection by parasites, which comprises applying to a locus a parasiticidally effective amount of a compound of the present invention.

The compounds of the present invention are further suitable for use in combating or controlling parasites in and on animals. Furthermore, the present invention relates to a method of combating or controlling parasites in and on animals, which comprises contacting the parasites with a parasitically effective amount of a compound of the present invention.

The present invention also relates to the non-therapeutic use of compounds of the present invention for controlling or combating parasites. Moreover, the present invention relates to a non-therapeutic method of combating or controlling parasites, which comprises applying to a locus a parasiticidally effective amount of a compound of the present invention.

The compounds of the present invention can be effective through both contact (via soil, glass, wall, bed net, carpet, blankets or animal parts) and ingestion (e.g. baits). Furthermore, the compounds of the present invention can be applied to any and all developmental stages.

The compounds of the present invention can be applied as such or in form of compositions comprising the compounds of the present invention.

The compounds of the present invention can also be applied together with a mixing partner, which acts against pathogenic parasites, e.g. with synthetic coccidiosis compounds, polyetherantibiotics such as Amprolium, Robenidin, Toltrazuril, Monensin, Salinomycin, Maduramicin, Lasalocid, Narasin or Semduramicin, or with other mixing partners as defined above, or in form of compositions comprising said mixtures.

The compounds of the present invention and compositions comprising them can be applied orally, parenterally or topically, e.g. dermally. The compounds of the present invention can be systemically or non-systemically effective.

The application can be carried out prophylactically, therapeutically or non-therapeutically. Furthermore, the application can be carried out preventively to places at which occurrence of the parasites is expected.

As used herein, the term "contacting" includes both direct contact (applying the compounds/compositions directly on the parasite, including the application directly on the animal or excluding the application directly on the animal, e.g. at it's locus for the latter) and indirect contact (applying the compounds/compositions to the locus of the parasite). The contact of the parasite through application to its locus is an example of a non-therapeutic use of the compounds of the present invention.

The term "locus" means the habitat, food supply, breeding ground, area, material or environment in which a parasite is growing or may grow outside of the animal.

As used herein, the term "parasites" includes endo- and ectoparasites. In some embodiments of the present invention, endoparasites can be preferred. In other embodiments, ectoparasites can be preferred. Infestations in warm-blooded animals and fish include, but are not limited to, lice, biting lice, ticks, nasal bots, keds, biting flies, muscoid flies, flies, myiasitic fly larvae, chiggers, gnats, mosquitoes and fleas.

The compounds of the present invention are especially useful for combating parasites of the following orders and species, respectively:

fleas (Siphonaptera), e.g. *Ctenocephalides felis*, *Ctenocephalides canis*, *Xenopsylla cheopis*, *Pulex irritans*, *Tunga penetrans*, and *Nosopsyllus fasciatus*; cockroaches (Blattaria—Blattodea), e.g. *Blattella germanica*, *Blattella asahinae*, *Periplaneta americana*, *Periplaneta japonica*, *Periplaneta brunnea*, *Periplaneta fuligginosa*, *Periplaneta australasiae*, and *Blatta orientalis*; flies, mosquitoes (Diptera), e.g. *Aedes aegypti*, *Aedes albopictus*, *Aedes vexans*, *Anastrepha ludens*, *Anopheles maculipennis*, *Anopheles crucians*, *Anopheles albimanus*, *Anopheles gambiae*, *Anopheles freeborni*, *Anopheles leucosphyrus*, *Anopheles minimus*, *Anopheles quadrimaculatus*, *Calliphora vicina*, *Chrysomya bezziana*, *Chrysomya hominivorax*, *Chrysomya macellaria*, *Chrysops discalis*, *Chrysops silacea*, *Chrysops atlanticus*, *Cochliomyia hominivorax*, *Cordylobia anthropophaga*, *Culicoides furens*, *Culex pipiens*, *Culex nigripalpus*, *Culex quinquefasciatus*, *Culex tarsalis*, *Culiseta inornata*, *Culiseta melanura*, *Dermatobia hominis*, *Fannia canicularis*, *Gasterophilus intestinalis*, *Glossina morsitans*, *Glossina palpalis*, *Glossina fuscipes*, *Glossina tachinoides*, *Haematobia irritans*, *Haplodiplosis equestris*, *Hippelates* spp., *Hypoderma lineata*, *Leptoconops torrens*, *Lucilia caprina*, *Lucilia cuprina*, *Lucilia sericata*, *Lycoria pectoralis*, *Mansonia* spp., *Musca domestica*, *Muscina stabulans*, *Oestrus ovis*, *Phlebotomus argentipes*, *Psorophora columbiae*, *Psorophora discolor*, *Prosimulium mixtum*, *Sarcophaga haemorrhoidalis*, *Sarcophaga* sp., *Simulium vittatum*, *Stomoxys calcitrans*, *Tabanus bovinus*, *Tabanus atratus*, *Tabanus lineola*, and *Tabanus similis*; lice (Phthiraptera), e.g. *Pediculus humanus* capitis, *Pediculus humanus* corporis, *Pthirus pubis*, *Haematopinus eurysternus*, *Haematopinus suis*, *Linognathus vituli*, *Bovicola bovis*, *Menopon gallinae*, *Menacanthus stramineus* and *Solenopotes capillatus*; ticks and parasitic mites (Parasitiformes): ticks (Ixodida), e.g. *Ixodes scapularis*, *Ixodes holocyclus*, *Ixodes pacificus*, *Rhiphicephalus sanguineus*, *Dermacentor andersoni*, *Dermacentor variabilis*, *Amblyomma americanum*, *Ambryomma maculatum*, *Ornithodorus hermsi*, *Ornithodorus turicata* and parasitic mites (Mesostigmata), e.g. *Ornithonyssus bacoti* and *Dermanyssus gallinae*; Actinedida (Prostigmata) und Acaridida (Astigmata), e.g. *Acarapis* spp., *Cheyletiella* spp., *Ornithocheyletia* spp., *Myobia* spp., *Psorergates* spp., *Demodex* spp., *Trombicula* spp., *Listrophorus* spp., *Acarus* spp., *Tyrophagus* spp., *Caloglyphus* spp., *Hypodectes* spp., *Pterolichus* spp., *Psoroptes* spp., *Chorioptes* spp., *Otodectes* spp., *Sarcoptes* spp., *Notoedres* spp.,*Knemidocoptes* spp., *Cytodites* spp., and *Laminosioptes* spp; Bugs (Heteropterida): *Cimex lectularius*, *Cimex hemipterus*, *Reduvius senilis*, *Triatoma* spp., *Rhodnius* ssp., *Panstrongylus* ssp., and *Arilus critatus;* Anoplurida, e.g. *Haematopinus* spp., *Linognathus* spp., *Pediculus* spp., *Phtirus* spp., and *Solenopotes* spp.; Mallophagida (suborders Arnblycerina and Ischnocerina), e.g. *Trimenopon* spp., *Menopon* spp., *Trinoton* spp., *Bovicola* spp., *Werneckiella* spp., *Lepikentron* spp., *Trichodectes* spp., and *Felicola* spp.; Roundworms Nematoda: Wipeworms and Trichinosis (Trichosyringida), e.g. Trichinellidae (*Trichinella* spp.), (Trichuridae) *Trichuris* spp., *Capillaria* spp.; Rhabditida, e.g. *Rhabditis* spp., *Strongyloides* spp., *Helicephalobus* spp.; Strongylida, e.g. *Strongylus* spp., *Ancylostoma* spp., *Necator americanus*, *Bunostomum* spp. (Hookworm), *Trichostrongylus* spp., *Haemonchus contortus*, *Ostertagia* spp., *Cooperia* spp., *Nematodirus* spp., *Dictyocaulus* spp., *Cyathostoma* spp., *Oesophagostomum* spp., *Stephanurus dentatus, Ollulanus* spp., *Chabertia* spp., *Stephanurus dentatus, Syngamus trachea, Ancylostoma* spp., *Uncinaria* spp., *Globocephalus* spp., *Necator* spp., *Metastrongylus* spp., *Muellerius capillaris*, *Protostrongylus* spp., *Angiostrongylus* spp., *Parelaphostrongylus* spp., *Aleurostrongylus abstrusus*, and *Dioc-*

*tophyma renale*; Intestinal roundworms (Ascaridida), e.g. *Ascaris lumbricoides, Ascaris suum, Ascaridia galli, Parascaris equorum, Enterobius vermicularis* (Threadworm), *Toxocara canis, Toxascaris leonine, Skrjabinema* spp., and *Oxyuris equi; Camallanida*, e.g. *Dracunculus medinensis* (guinea worm); Spirurida, e.g. *Thelazia* spp., *Wuchereria* spp., *Brugia* spp., *Onchocerca* spp., *Dirofilari* spp.a, *Dipetalonema* spp., *Setaria* spp., *Elaeophora* spp., *Spirocerca lupi*, and *Habronema* spp.; Thorny headed worms (Acanthocephala), e.g. *Acanthocephalus* spp., *Macracanthorhynchus hirudinaceus* and *Oncicola* spp.; Planarians (Plathelminthes): Flukes (Trematoda), e.g. *Faciola* spp., *Fascioloides magna, Paragonimus* spp., *Dicrocoelium* spp., *Fasciolopsis buski, Clonorchis sinensis, Schistosoma* spp., *Trichobilharzia* spp., *Alaria alata, Paragonimus* spp., and *Nanocyetes* spp.; Cercomeromorpha, in particular Cestoda (Tapeworms), e.g. *Diphyllobothrium* spp., *Tenia* spp., *Echinococcus* spp., *Dipylidium caninum, Multiceps* spp., *Hymenolepis* spp., *Mesocestoides* spp., *Vampirolepis* spp., *Moniezia* spp., *Anoplocephala* spp., *Sirometra* spp., *Anoplocephala* spp., and *Hymenolepis* spp.

As used herein, the term "animal" includes warm-blooded animals (including humans) and fish. Preferred are mammals, such as cattle, sheep, swine, camels, deer, horses, pigs, poultry, rabbits, goats, dogs and cats, water buffalo, donkeys, fallow deer and reindeer, and also in fur-bearing animals such as mink, chinchilla and raccoon, birds such as hens, geese, turkeys and ducks and fish such as fresh- and salt-water fish such as trout, carp and eels. Particularly preferred are domestic animals, such as dogs or cats.

In general, "parasiticidally effective amount" means the amount of active ingredient needed to achieve an observable effect on growth, including the effects of necrosis, death, retardation, prevention, and removal, destruction, or otherwise diminishing the occurrence and activity of the target organism. The parasiticidally effective amount can vary for the various compounds/compositions used in the invention. A parasiticidally effective amount of the compositions will also vary according to the prevailing conditions such as desired parasiticidal effect and duration, target species, mode of application, and the like.

Generally, it is favorable to apply the compounds of the present invention in total amounts of 0.5 mg/kg to 100 mg/kg per day, preferably 1 mg/kg to 50 mg/kg per day.

For oral administration to warm-blooded animals, the formula I compounds may be formulated as animal feeds, animal feed premixes, animal feed concentrates, pills, solutions, pastes, suspensions, drenches, gels, tablets, boluses and capsules. In addition, the formula I compounds may be administered to the animals in their drinking water. For oral administration, the dosage form chosen should provide the animal with 0.01 mg/kg to 100 mg/kg of animal body weight per day of the formula I compound, preferably with 0.5 mg/kg to 100 mg/kg of animal body weight per day.

Alternatively, the formula I compounds may be administered to animals parenterally, for example, by intraruminal, intramuscular, intravenous or subcutaneous injection. The formula I compounds may be dispersed or dissolved in a physiologically acceptable carrier for subcutaneous injection. Alternatively, the formula I compounds may be formulated into an implant for subcutaneous administration. In addition the formula I compound may be transdermally administered to animals. For parenteral administration, the dosage form chosen should provide the animal with 0.01 mg/kg to 100 mg/kg of animal body weight per day of the formula I compound.

The formula I compounds may also be applied topically to the animals in the form of dips, dusts, powders, collars, medallions, sprays, shampoos, spot-on and pour-on formulations and in ointments or oil-in-water or water-in-oil emulsions. For topical application, dips and sprays usually contain 0.5 ppm to 5,000 ppm and preferably 1 ppm to 3,000 ppm of the formula I compound. In addition, the formula I compounds may be formulated as ear tags for animals, particularly quadrupeds such as cattle and sheep.

Suitable preparations are:
Solutions such as oral solutions, concentrates for oral administration after dilution, solutions for use on the skin or in body cavities, pouring-on formulations, gels;
Emulsions and suspensions for oral or dermal administration; semi-solid preparations;
Formulations wherein the active compound is processed in an ointment base or in an oil-in-water or water-in-oil emulsion base;
Solid preparations such as powders, premixes or concentrates, granules, pellets, tablets, boluses, capsules; aerosols and inhalants, and active compound-containing shaped articles.

Compositions suitable for injection are prepared by dissolving the active ingredient in a suitable solvent and optionally adding further auxiliaries such as acids, bases, buffer salts, preservatives, and solubilizers. Suitable auxiliaries for injection solutions are known in the art. The solutions are filtered and filled sterile.

Oral solutions are administered directly. Concentrates are administered orally after prior dilution to the use concentration. Oral solutions and concentrates are prepared according to the state of the art and as described above for injection solutions, sterile procedures not being necessary.

Solutions for use on the skin are trickled on, spread on, rubbed in, sprinkled on or sprayed on. Solutions for use on the skin are prepared according to the state of the art and according to what is described above for injection solutions, sterile procedures not being necessary.

Gels are applied to or spread on the skin or introduced into body cavities. Gels are prepared by treating solutions which have been prepared as described in the case of the injection solutions with sufficient thickener that a clear material having an ointment-like consistency results. Suitable thickeners are known in the art.

Pour-on formulations are poured or sprayed onto limited areas of the skin, the active compound penetrating the skin and acting systemically. Pour-on formulations are prepared by dissolving, suspending or emulsifying the active compound in suitable skin-compatible solvents or solvent mixtures. If appropriate, other auxiliaries such as colorants, bioabsorption-promoting substances, antioxidants, light stabilizers, adhesives are added. Suitable such auxiliaries are known in the art.

Emulsions can be administered orally, dermally or as injections. Emulsions are either of the water-in-oil type or of the oil-in-water type. They are prepared by dissolving the active compound either in the hydrophobic or in the hydrophilic phase and homogenizing this with the solvent of the other phase with the aid of suitable emulsifiers and, if appropriate, other auxiliaries such as colorants, absorption-promoting substances, preservatives, antioxidants, light stabilizers, viscosity-enhancing substances. Suitable hydrophobic phases (oils), suitable hydrophilic phases, suitable emulsifiers, and suitable further auxiliaries for emulsions are known in the art.

Suspensions can be administered orally or topically/dermally. They are prepared by suspending the active compound in a suspending agent, if appropriate with addition of other auxiliaries such as wetting agents, colorants, bioabsorption-promoting substances, preservatives, antioxidants, light stabilizers. Suitable suspending agents, and suitable other auxiliaries for suspensions including wetting agents are known in the art.

Semi-solid preparations can be administered orally or topically/dermally. They differ from the suspensions and emulsions described above only by their higher viscosity.

For the production of solid preparations, the active compound is mixed with suitable excipients, if appropriate with addition of auxiliaries, and brought into the desired form. Suitable auxiliaries for this purpose are known in the art.

The compositions which can be used in the invention can comprise generally from about 0.001 to 95% of the compound of the present invention.

Ready-to-use preparations contain the compounds acting against parasites, preferably ectoparasites, in concentrations of 10 ppm to 80 percent by weight, preferably from 0.1 to 65 percent by weight, more preferably from 1 to 50 percent by weight, most preferably from 5 to 40 percent by weight.

Preparations which are diluted before use contain the compounds acting against ectoparasites in concentrations of 0.5 to 90 percent by weight, preferably of 1 to 50 percent by weight.

Furthermore, the preparations comprise the compounds of formula I against endoparasites in concentrations of 10 ppm to 2 percent by weight, preferably of 0.05 to 0.9 percent by weight, very particularly preferably of 0.005 to 0.25 percent by weight.

Topical application may be conducted with compound-containing shaped articles such as collars, medallions, ear tags, bands for fixing at body parts, and adhesive strips and foils.

Generally it is favorable to apply solid formulations which release compounds of the present invention in total amounts of 10 mg/kg to 300 mg/kg, preferably 20 mg/kg to 200 mg/kg, most preferably 25 mg/kg to 160 mg/kg body weight of the treated animal in the course of three weeks.

EXAMPLES

With appropriate modification of the starting materials, the procedures as described in the preparation examples below were used to obtain further compounds of formula I. The compounds obtained in this manner are listed in the table that follows, together with physical data.

Compounds can be characterized e.g. by coupled High Performance Liquid Chromatography/mass spectrometry (HPLC/MS), by $^1$H-NMR and/or by their melting points.

Analytical HPLC/MS—Method 1: Agilent Eclipse Plus C18, 50×4.6 mm, ID 5 μm; Elution: A=10 mM Amm. Formate (0.1% Formic Acid), B=Acetonitrile (0.1% Formic Acid), Flow=1.25 ml/min. at 40° C.; Gradient: 10% B to 100% B—1.5 min, hold for 1 min, 1 min—100% B. Run Time=3.5 min.

Analytical HPLC/MS—Method 2: Kinetex XB C18 1.7μ 50×2.1 mm; A=Water+0.1% TFA, B=Acetonitrile, Flow=0.8 ml/min-1.0 ml/min in 1.5 min. at 60° C.; Gradient: 5% B to 100% B—1.5 min.

$^1$H-NMR: The signals are characterized by chemical shift (ppm, δ[delta]) vs. tetramethylsilane respectively, CDCl$_3$ for $^{13}$C-NMR, by their multiplicity and by their integral (relative number of hydrogen atoms given). The following abbreviations are used to characterize the multiplicity of the signals: m=multiplet, h=heptet, q=quartet, t=triplet, d=doublet and s=singlet.

Abbreviations used are: d for day(s), h for hour(s), min for minute(s), r.t./room temperature for 20-25° C., R$_t$ for retention time; DMSO for dimethyl sulfoxide, OAc for acetate, EtOAc for ethyl acetate, THF for tetrahydrofuran, t-BuOH for tert-butanol, dppfPdCl for [1,1'-Bis(diphenylphosphino) ferrocene]dichloropalladium(II), DIPEA for diisopropylethylamine, DCM for dichloromethane and DMAP for 4-Dimethylaminopyridine Preparation Examples Example C-1: 6-[(E)-[(2-isopropylphenyl)carbamothioylhydrazono]methyl]-N-[4-(trifluoromethoxy) phenyl]isoquinoline-1-carboxamide (C-1)

Step 1: 6-bromo-N-[4-(trifluoromethoxy)phenyl] isoquinoline-1-carboxamide

To a stirred solution of 6-bromoisoquinoline-1-carboxylic acid (1.68 g) and 4-(trifluoromethoxy)aniline (1.2 g) in CH$_2$Cl$_2$ (20 mL) were added EDCl (1.53 g) and DMAP (0.81 g) and the reaction mixture was stirred at r.t. for 16 h. An additional portion of and 4-(trifluoromethoxy)aniline (0.9 mL) and EDCl (0.2 g) were added and the reaction was stirred for an additional 20 h. The reaction mixture was then quenched with a solution of aq. HCl (1 M) then extracted with CH$_2$Cl$_2$. The organic phase was dried over MgSO$_4$, filtered and concentrated and used without further purification (2.5 g). LC/MS (method 1): Rt: 1.47 min; MS: m/z=410 (M+).

Step 2: 6-[(E)-prop-1-enyl]-N-[4-(trifluoromethoxy) phenyl]isoquinoline-1-carboxamide A stirred suspension of 6-bromo-N-[4-(trifluoromethoxy) phenyl]isoquinoline-1-carboxamide (2.5 g, 6.1 mmol), [(E)-prop-1-enyl]boronic acid (0.79 g), dppfPdCl$_2$ (0.22 g), K$_2$CO$_3$ (1.69 g) in DME/H$_2$O (25 mL, 2:1) was heated at 110° C. for 16 h. The reaction mixture was allowed to cool to r.t. then extracted with EtOAc. The organic phase was dried over MgSO4, filtered and concentrated. Purification by silica gel chromatography eluting with a gradient of CH/EE afforded the title compound (2.0 g). LC/MS (method 1): Rt: 1.54 min; MS: m/z=373 (M+).

Step 3: 6-formyl-N-[4-(trifluoromethoxy)phenyl] isoquinoline-1-carboxamide

To a stirred solution of 6-[(E)-prop-1-enyl]-N-[4-(trifluoromethoxy)phenyl]isoquinoline-1-carboxamide (2.0 g) and OsO$_4$ (1.3 mL, 2.5% in t-BuOH) in THF/H$_2$O (80 mL, 1:1) at 0° C. was added NaIO$_4$ (2.3 g) and the reaction mixture was stirred from 0° C. to r.t. over 16 h. The reaction mixture was then diluted with water and a saturated solution of NaS$_2$O$_3$ (100 mL) then extracted with EtOAc. The organic phase was dried over MgSO4, filtered and concentrated and the resultant crude material was purified by trituration with diisopropyl ether to afford 6-formyl-N-[4-(trifluoromethoxy)phenyl]isoquinoline-1-carboxamide (1.55 g, 80% yield). LC/MS (method 1): Rt: 1.27 min; MS: m/z=361 (M+).

Step 4: 6-[(E)-[(2-isopropylphenyl)carbamothioylhydrazono]methyl]-N-[4-(trifluoromethoxy)phenyl] isoquinoline-1-carboxamide A solution of 6-formyl-N-[4-(trifluoromethoxy)phenyl] isoquinoline-1-carboxamide (1.55 g) and 1-amino-3-(2-isopropylphenyl)thiourea (1.1 g) in EtOH (30 mL) was stirred at 60° C. for 4 h. The reaction mixture was then allowed to cool to r.t. and the crude product was isolated by filtration and purified by trituration with diisopropyl ether to afford 6-[(E)-[(2-isopropylphenyl)carbamothioylhydrazono]methyl]-N-[4-(trifluoromethoxy)phenyl]isoquinoline-1-carboxamide (C-1) (1.81 g, 76% yield). LC/MS (method 1): Rt: 1.45 min; MS: m/z=552 (M+). $^1$H NMR (400 MHz, THF-d$_8$) δ 11.13 (s, 1H), 10.66 (s, 1H), 9.63-9.55 (m, 2H), 8.58 (d, J=5.5 Hz, 1H), 8.36 (dd, J=9.2, 1.7 Hz, 1H), 8.18 (d, J=2.6 Hz, 2H), 8.07-7.93 (m, 3H), 7.42 (dd, J=7.8, 1.4 Hz, 1H), 7.36-7.25 (m, 3H), 7.25-7.12 (m, 2H), 3.58 (dp, J=2.3, 1.1 Hz, 6H), 3.26 (p, J=6.9 Hz, 1H), 2.51 (s, 4H), 1.72 (pt, J=2.0, 0.9 Hz, 8H), 1.27 (d, J=6.9 Hz, 6H).

Example C-2: 6-[(E)-[(Z)-[3-(2-isopropylphenyl)-4-oxo-thiazolidin-2-ylidene]hydrazono]methyl]-N-[4-(trifluoromethoxy)phenyl]isoquinoline-1-carboxamide A solution of 6-[(E)-[(2-isopropylphenyl)carbamothioylhydrazono]methyl]-N-[4-(trifluoromethoxy)phenyl]isoquinoline-1-carboxamide (C-1) (1.65 g), methyl bromoacetate (0.59 mL) and NaOAc (0.98 g) in EtOH (100 mL) was stirred at 50° C. for 16 h. The resultant precipate was isolated by filtration to afford 6-[(E)-[(Z)-[3-(2-isopropylphenyl)-4-oxo-thiazolidin-2-ylidene]hydrazono]methyl]-N-[4-(trifluoromethoxy)phenyl]isoquinoline-1-carboxamide (1.44 g, 81% yield). LC/MS (method 1): Rt: 1.49 min; MS: m/z=592 (M+). $^1$H NMR (400 MHz, THF-d$_8$) δ 10.65 (s, 1H), 9.60 (dd, J=9.2, 0.9 Hz, 1H), 8.57 (d, J=5.5 Hz, 1H), 8.24 (dd, J=9.1, 1.7 Hz, 1H), 8.13-8.08 (m, 1H), 8.07-7.96 (m, 3H), 7.50-7.37 (m, 2H), 7.28 (ddd, J=14.8, 7.5, 1.3 Hz, 3H), 7.16 (dd, J=7.9, 1.3 Hz, 1H), 4.14-3.99 (m, 2H), 3.57 (dq, J=2.2, 1.1 Hz, 6H), 2.88 (hept, J=6.9 Hz, 1H), 2.51 (s, 5H), 1.72 (ddp, J=3.1, 2.0, 1.0 Hz, 8H), 1.20 (dd, J=7.9, 6.9 Hz, 6H).

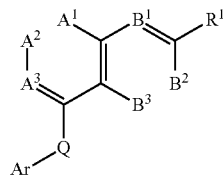

wherein 〜 denotes an attachment to Ar, and # denotes attachment to the 10-membered ring

| Comp | Ar | Q | A$^1$ | A$^2$ | A$^3$ | B$^1$ | B$^2$ | B$^3$ | R$^1$ | t$_R$ (min) | M+ (m/z) |
|---|---|---|---|---|---|---|---|---|---|---|---|
| C-1 | 4-(OCF$_3$)phenyl | -NH-C(=O)-# | CH | CH | N | CH | CH | CH | (2-isopropylphenyl)thiourea-hydrazone | 1.472 | 552.1 |
| C-2 | 4-(OCF$_3$)phenyl | -NH-C(=O)-# | CH | CH | N | CH | CH | CH | 3-(2-isopropylphenyl)-4-oxo-thiazolidin-2-ylidene hydrazone | 1.509 | 592.1 |
| C-3 | 4-(OCF$_3$)phenyl | -CH$_2$-NH-# | N | CH | N | CH | CH | CH | (2-isopropylphenyl)thiourea-hydrazone | 1.144 | 539.1 |
| C-4 | 4-(OCF$_3$)phenyl | -CH$_2$-NH-# | N | CH | N | CH | CH | CH | 3-(2-isopropylphenyl)-4-oxo-thiazolidin-2-ylidene hydrazone | 1.082 | 578.9 |

-continued
| | | Q 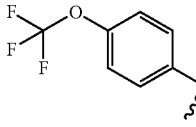 wherein denotes an attachment to Ar, and # denotes attachment to the 10-membered | | | | | | | | | |
|---|---|---|---|---|---|---|---|---|---|---|---|
| Comp | Ar | ring | A¹ | A² | A³ | B¹ | B² | B³ | R¹ | t_R (min) | M+ (m/z) |
| C-5 |  |  | N | CH | N | CH | CH | CH | 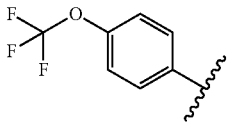 [SMILES: *c1ccc(OC(F)(F)F)cc1] | 1.026 | 551.2 |
| C-6 | 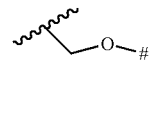 | 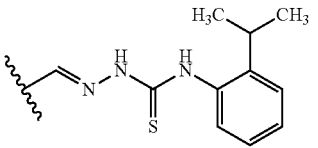 [SMILES: */C=N/NC(=S)Nc1ccccc1C(C)C] | N | CH | N | CH | CH | CH | 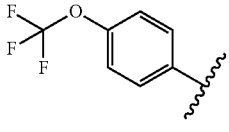 [SMILES: *c1ccc(OC(F)(F)F)cc1] | 2.037 | 538 |
| C-7 | 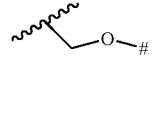 | 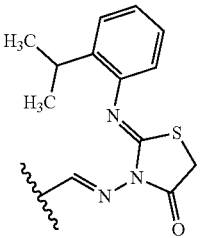 [SMILES: */C=N/N1C(=O)CS/C1=N\c1ccccc1C(C)C] | N | CH | N | CH | CH | CH | 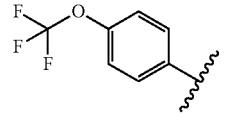 [SMILES: *c1ccc(OC(F)(F)F)cc1] | 2.123 | 580.2 |
| C-8 | 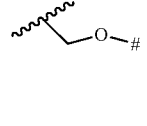 | 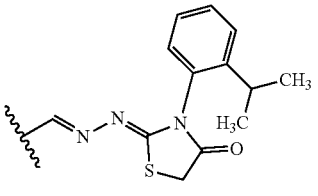 [SMILES: */C=N/N=C1\SCC(=O)N1c1ccccc1C(C)C] | N | CH | N | CH | CH | CH | 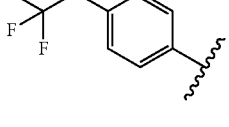 | 2.069 | 577.9 |
| C-9 | 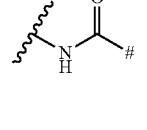 | 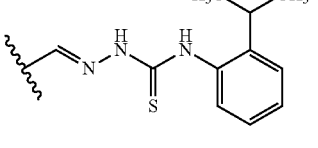 | CH | N | N | CH | CH | CH | 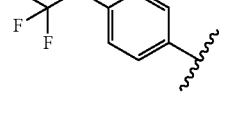 | 1.367 | 553 |
| C-10 | 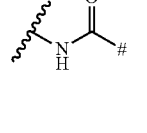 | 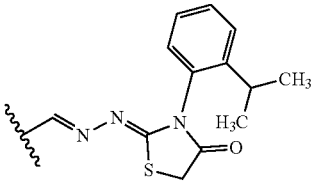 [SMILES: */C=N/N=C1\SCC(=O)N1c1ccccc1C(C)C] | CH | N | N | CH | CH | CH | | 1.392 | 593.1 |

| Comp | Ar | Q wherein  denotes an attachment to Ar, and # denotes attachment to the 10-membered ring | A¹ | A² | A³ | B¹ | B² | B³ | R¹ | $t_R$ (min) | M+ (m/z) |
|---|---|---|---|---|---|---|---|---|---|---|---|
| C-11 | 4-(trifluoromethoxy)phenyl | -NH-C(=O)-# | CH | N | N | CH | CH | CH | [2-isopropylphenyl-imino-thiazolidinone hydrazone group] | 1.425 | 593 |
| C-12 | 4-(trifluoromethoxy)phenyl | -NH-C(=O)-# | CH | N | N | CH | CH | CH | [2-isopropyl-5-methylphenyl thiosemicarbazone group] | 1.403 | 567.2 |
| C-13 | 4-(trifluoromethoxy)phenyl | -NH-C(=O)-# | CH | N | N | CH | CH | CH | [trimethoxy tetrahydropyran oxime group] | 1.273 | 565.2 |
| C-14 | 4-(trifluoromethoxy)phenyl | -NH-C(=O)-# | CH | N | N | CH | CH | CH | [2-isopropyl-5-methylphenyl-thiazolidinone hydrazone group] | 1.425 | 607.1 |

Biological Examples

If not otherwise specified, the test solutions are prepared as follows:

The active compound is dissolved at the desired concentration in a mixture of 1:1 (vol:vol) distilled water:acetone. The test solution is prepared at the day of use.

Test solutions are prepared in general at concentrations of 1000 ppm, 500 ppm, 300 ppm, 100 ppm and 30 ppm (wt/vol).

B.1. Boll Weevil (*Anthonomus grandis*)

For evaluating control of boll weevil (*Anthonomus grandis*) the test unit consisted of 96-well-microtiter plates containing an insect diet and 5-10 *A. grandis* eggs.

The compounds were formulated using a solution containing 75% v/v water and 25% v/v DMSO. Different concentrations of formulated compounds were sprayed onto the insect diet at 5 µl, using a custom built micro atomizer, at two replications.

After application, microtiter plates were incubated at about 25±1° C. and about 75±5% relative humidity for 5 days. Egg and larval mortality was then visually assessed.

In this test, the following compounds at 800 ppm showed over 75% mortality in comparison with untreated controls: C-1, C-2, C-3.

B.2. Diamond Back Moth (*Plutella xylostella*)

The active compound is dissolved at the desired concentration in a mixture of 1:1 (vol:vol) distilled water:acetone. Surfactant (Alkamuls® EL 620) is added at a rate of 0.1% (vol/vol). The test solution is prepared at the day of use.

Leaves of cabbage were dipped in test solution and air-dried. Treated leaves were placed in petri dish enlined with moist filter paper and inoculated with ten 3$^{rd}$ instar larvae. Mortality was recorded 72 hours after treatment. Feeding damages were also recorded using a scale of 0-100%.

In this test, the following compounds at 300 ppm showed over 75% mortality in comparison with untreated controls: C-1, C-2, C-3, C-4, C-6, C-8, C-9, C-10, C-11, C-12, C-13, C-14.

B.3 Silverleaf Whitefly (*Bemisia argentifolii*) (Adults)

The active compounds were formulated in cyclohexanone as a 10,000 ppm solution supplied in tubes. The tubes were inserted into an automated electrostatic sprayer equipped with an atomizing nozzle and they served as stock solutions for which lower dilutions were made in 50% acetone:50% water (v/v). A non-ionic surfactant (Kinetic®) was included in the solution at a volume of 0.01% (v/v).

Cotton plants at the cotyledon stage (one plant per pot) were sprayed by an automated electrostatic plant sprayer equipped with an atomizing spray nozzle. The plants were dried in the sprayer fume hood and then removed from the sprayer. Each pot was placed into a plastic cup and about 10 to 12 whitefly adults (approximately 3-5 days old) were introduced. The insects were collected using an aspirator and a nontoxic Tygon® tubing connected to a barrier pipette tip. The tip, containing the collected insects, was then gently inserted into the soil containing the treated plant, allowing insects to crawl out of the tip to reach the foliage for feeding. Cups were covered with a reusable screened lid. Test plants were maintained in a growth room at about 25° C. and about 20-40% relative humidity for 3 days, avoiding direct exposure to fluorescent light (24-hour photoperiod) to prevent trapping of heat inside the cup. Mortality was assessed 3 days after treatment, compared to untreated control plants.

In this test, the following compounds at 300 ppm showed over 75% mortality in comparison with untreated controls: C-2.

B.4. Southern Armyworm (*Spodoptera eridania*), 2nd Instar Larvae

The active compounds were formulated in cyclohexanone as a 10,000 ppm solution supplied in tubes. The tubes were inserted into an automated electrostatic sprayer equipped with an atomizing nozzle and they served as stock solutions for which lower dilutions were made in 50% acetone:50% water (v/v). A nonionic surfactant (Kinetic®) was included in the solution at a volume of 0.01% (v/v).

Lima bean plants (variety Sieva) were grown 2 plants to a pot and selected for treatment at the 1$^{st}$ true leaf stage. Test solutions were sprayed onto the foliage by an automated electrostatic plant sprayer equipped with an atomizing spray nozzle. The plants were dried in the sprayer fume hood and then removed from the sprayer. Each pot was placed into perforated plastic bags with a zip closure. About 10 to 11 armyworm larvae were placed into the bag and the bags zipped closed. Test plants were maintained in a growth room at about 25° C. and about 20-40% relative humidity for 4 days, avoiding direct exposure to fluorescent light (24 hour photoperiod) to prevent trapping of heat inside the bags. Mortality and reduced feeding were assessed 4 days after treatment, compared to untreated control plants.

In this test, the following compounds at 300 ppm showed over 75% mortality in comparison with untreated controls: C-1, C-2.

B.5. Tobacco Budworm (*Heliothis virescens*)

For evaluating control of tobacco budworm (*Heliothis virescens*) the test unit consisted of 96-well-microtiter plates containing an insect diet and 15-25 *H. virescens* eggs.

The compounds were formulated using a solution containing 75% v/v water and 25% v/v DMSO. Different concentrations of formulated compounds were sprayed onto the insect diet at 10 µl, using a custom built micro atomizer, at two replications.

After application, microtiter plates were incubated at about 28±1° C. and about 80±5% relative humidity for 5 days. Egg and larval mortality was then visually assessed.

In this test, the following compounds at 800 ppm showed over 75% mortality in comparison with untreated controls: C-1, C-2, C-3, C-6, C-7, C-8, C-9, C-10, C-11, C-12, C-13, C-14.

B.6. Yellow Fever Mosquito (*Aedes aegypti*)

For evaluating control of yellow fever mosquito (*Aedes aegypti*) the test unit consisted of 96-well-microtiter plates containing 200 µl of tap water per well and 5-15 freshly hatched *A. aegypti* larvae. The active compounds were formulated using a solution containing 75% (v/v) water and 25% (v/v) DMSO. Different concentrations of formulated compounds or mixtures were sprayed onto the insect diet at 2.5 µl, using a custom built micro atomizer, at two replications.

After application, microtiter plates were incubated at 28+1° C., 80+5% RH for 2 days. Larval mortality was then visually assessed.

In this test, the following compounds at 800 ppm showed over 75% mortality in comparison with untreated controls: C-1, C-2, C-9, C-10, C-11, C-13, C-14.

B.7. Orchid Thrips (*Dichromothrips corbetti*)

*Dichromothrips corbetti* adults used for bioassay were obtained from a colony maintained continuously under laboratory conditions. For testing purposes, the test compound is diluted in a 1:1 mixture of acetone:water (vol:vol), plus Kinetic® HV at a rate of 0.01% v/v.

Thrips potency of each compound was evaluated by using a floral-immersion technique. All petals of individual, intact orchid flowers were dipped into treatment solution and allowed to dry in Petri dishes. Treated petals were placed into individual re-sealable plastic along with about 20 adult thrips. All test arenas were held under continuous light and a temperature of about 28° C. for duration of the assay. After 3 days, the numbers of live thrips were counted on each petal. The percent mortality was recorded 72 hours after treatment.

In this test, the following compounds at 300 ppm showed over 75% mortality in comparison with untreated controls: C-1, C-2, C-10, C-11, C-12, C-13, C-14.

B.9. Western Flower Thrips (*Frankliniella occidentalis*)

The active compounds were formulated by a Tecan liquid handler in 100% cyclohexanone as a 10,000 ppm solution supplied in tubes. The 10,000 ppm solution was serially diluted in 100% cyclohexanone to make interim solutions. These served as stock solutions for which final dilutions were made by the Tecan in 50% acetone:50% water (v/v) into 10 or 20 ml glass vials. A nonionic surfactant (Kinetic®)

was included in the solution at a volume of 0.01% (v/v). The vials were then inserted into an automated electrostatic sprayer equipped with an atomizing nozzle for application to plants/insects.

Small (~2" in height) cotton plants are sprayed with test compounds at concentrations ranging from 300 to 0.01 ppm in acetone/water through the automated VPS. After drying, cotton leaves are removed and circular leaf discs (–1 cm diameter) are punched from the treated surface and transferred to clean 20 mL scintillation vials. Ten Western flower thrips (FRANOC) are aspirated into each scintillation vial. The vials with the leaf discs and thrips are kept in an upright incubator at 25° C. and 50% relative humidity with a 14:10 light:dark photoperiod. Each treatment is replicated twice.

Thrips mortality is assessed at 2 DAT (days after treatment), counting all thrips both dead and alive. [The average absolute mortality is calculated for each treatment.]

In this test, the following compounds at 300 ppm showed over 75% mortality in comparison with untreated controls: C-1, C-2, C-10.

We claim:

1. A compound of formula I 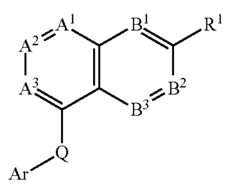 (I)

wherein $A^1$ is N or $CR^{A1}$;

$A^2$ is N or $CR^{A2}$;

$A^3$ is N or $CR^{A3}$;

wherein at least one of the $A^1$, $A^2$, $A^3$ is N;

$B^1$ is $CR^{B1}$;

$B^2$ is $CR^{B2}$;

$B^3$ is $CR^{B3}$;

$R^{A1}$, $R^{A2}$, and $R^{A3}$ independently of each other are selected from H, halogen, $N_3$, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, C(═O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(═O)—$NR^bR^c$, C(═O)—$R^d$, $SO_2NR^bR^c$, or $S(═O)_mR^e$, phenyl, phenoxy, phenylcarbonyl, phenylthio, or —$CH_2$-phenyl, wherein the phenyl rings are unsubstituted or substituted with $R^f$;

$R^{B1}$, $R^{B2}$, and $R^{B3}$, independently of each other are H, halogen, $N_3$, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_1$-$C_4$-alkyl-$C_3$-$C_6$-cycloalkoxy, wherein the alkyl, alkoxy, alkenyl, alkynyl, cycloalkyl and cycloalkoxy moieties are unsubstituted or substituted with halogen, C(═O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(═O)—$NR^bR^c$, C(═O)—$R^d$, $SO_2NR^bR^c$, or $S(═O)_mR^e$, phenyl, phenoxy, phenylcarbonyl, phenylthio, or —$CH_2$-phenyl, wherein the phenyl rings are unsubstituted or substituted with $R^f$;

Q is —N═C(X)—, —N($R^2$)—C(═NR)—, or —N($R^2$)—C(═S)—, —C($R^4R^5$)—O—, —C(═O)—O—, —$S(═O)_m$—C($R^7R^8$)—, —N($R^2$)—$S(═O)_m$—, —N($R^2$)—C($R^9R^{10}$)—, —C(═O)—C($R^{19}R^{20}$)—, —N($R^2$)—C(═O)—, —C($R^{13}R^{14}$)—C($R^{15}R^{16}$)—, or —C($R^{17}$)═C($R^{18}$)—; wherein Ar is bound to either side of Q;

X is identical or different, H, halogen, $SR^7$, $OR^8$, $N(R^3)_2$, —$CR^4$═N ($OCH_3$), CN, $C_1$-$C_6$-alkyl, $C_2$-$C_6$-alkenyl, $C_2$-$C_6$-alkynyl, $C_3$-$C_6$-cycloalkyl, wherein the alkyl, alkenyl, alkynyl and cycloalkyl moieties are unsubstituted or substituted with halogen;

phenyl, or —$CH_2$-phenyl, wherein the phenyl rings are unsubstituted or substituted with $R^f$;

R is identical or different, H, CN, $C_1$-$C_6$-alkyl, $C_2$-$C_6$-alkenyl, $C_2$-$C_6$-alkynyl, $C_3$-$C_6$-cycloalkyl, wherein the alkyl, alkenyl, alkynyl and cycloalkyl moieties are unsubstituted or substituted with halogen, $SR^7$, $OR^8$, $N(R^3)_2$, phenyl, or —$CH_2$-phenyl, wherein the phenyl rings are unsubstituted or substituted with $R^f$;

$R^2$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(O)—$OR^a$, $C_1$-$C_6$-alkylen-$NR^bR^c$, $C_1$-$C_6$-alkylen-CN, C(O)—$NR^bR^c$, C(O)—$R^d$, $SO_2NR^bR^c$, $S(═O)_m$ $R^e$, phenyl, or —$CH_2$-phenyl, wherein the phenyl rings are unsubstituted or substituted with $R^f$;

$R^3$ is H, $C_1$-$C_6$-alkyl, $C_1$-$C_6$-alkoxy, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, or $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, $C_1$-$C_6$-alkylene-CN, phenyl, or —$CH_2$-phenyl, wherein the phenyl rings are unsubstituted or substituted with $R^f$;

$R^4$, $R^5$, $R^7$, $R^8$, $R^9$, $R^{10}$, $R^{13}$, $R^{14}$, $R^{15}$, $R^{16}$, $R^{17}$, $R^{18}$, $R^{19}$, $R^{20}$ are, identical or different, H, halogen, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(═O)—$OR^a$, $C_1$-$C_6$-alkylene-$NR^bR^c$, $C_1$-$C_6$-alkylene-CN, C(═O)—$NR^bR^c$, C(═O)—$R^d$, $SO_2NR^bR^c$, $S(═O)_mR^e$, phenyl, or —$CH_2$-phenyl, wherein the phenyl rings are unsubstituted or substituted with $R^f$;

$R^6$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—OR$^a$, C$_1$-C$_6$-alkylene-NR$^b$R$^c$, C$_1$-C$_6$-alkylene-CN, C(=O)—NR$^b$R$^c$, C(=O)—R$^d$, SO$_2$NR$^b$R$^c$, S(=O)$_m$R$^e$, phenyl, —CH$_2$—C(=O)—OR$^a$, or —CH$_2$-phenyl, wherein the phenyl rings are unsubstituted or substituted with R$^f$;

Ar is phenyl or 5- or 6-membered hetaryl, which are unsubstituted or substituted with R$^{Ar}$, wherein R$^{Ar}$ is halogen, N$_3$, OH, CN, NO$_2$, —SCN, —SF$_5$, C$_1$-C$_6$-alkyl, C$_1$-C$_6$-alkoxy, C$_2$-C$_6$-alkenyl, tri-C$_1$-C$_6$-alkylsilyl, C$_2$-C$_6$-alkynyl, C$_1$-C$_6$-alkoxy-C$_1$-C$_4$-alkyl, C$_1$-C$_6$-alkoxy-C$_1$-C$_4$-alkoxy, C$_3$-C$_6$-cycloalkyl, C$_3$-C$_6$-cycloalkoxy, C$_3$-C$_6$-cycloalkyl-C$_1$-C$_4$-alkyl, C$_3$-C$_6$-cycloalkoxy-C$_1$-C$_4$-alkyl, wherein the alkyl, alkoxy, alkenyl, alkynyl, cycloalkyl and cycloalkoxy moieties are unsubstituted or substituted with halogen, C(=O)—OR$^a$, NR$^b$R$^c$, C$_1$-C$_6$-alkylene-NR$^b$R$^c$, O—C$_1$-C$_6$-alkylene-NR$^b$R$^c$, C$_1$-C$_6$-alkylene-CN, NH—C$_1$-C$_6$-alkylene-NR$^b$R$^c$, C(=O)—NR$^b$R$^c$, C(=O)—Rd, SO$_2$NR$^b$R$^c$, or S(=O)$_m$R$^e$, phenyl, phenoxy, phenylcarbonyl, phenylthio or —CH$_2$-phenyl, wherein phenyl rings are unsubstituted or substituted with R$^f$;

R$^1$ is a moiety of formula Y—Z-T-R$^{11}$ or Y—Z-T-R$^{12}$; wherein

Y is —CR$^{ya}$=N—, wherein the N is bound to Z;
—NR$^{yc}$—C(=O)—, wherein C(=O) is bound to Z; or
—NR$^{yc}$—C(=S)—, wherein C(=S) is bound to Z;

Z is a single bond;
—NR$^{zc}$—C(=O)—, wherein C(=O) is bound to T;
—NR$^{zc}$—C(=S)—, wherein C(=S) is bound to T;
—N=C(S—R$^{za}$)—, wherein T is bound to the carbon atom;
—O—C(=O)—, wherein T is bound to the carbon atom; or
—NR$^{zc}$—C(S—R$^{za}$)=, wherein T is bound to the carbon atom;

T is O, N or N-RT;

R$^{11}$ is C$_1$-C$_6$-alkyl, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_3$-C$_6$-cycloalkyl-C$_1$-C$_4$-alkyl, C$_1$-C$_4$-alkyl-C$_3$-C$_6$-cycloalkoxy, wherein the alkyl, alkoxy, alkenyl, alkynyl, cycloalkyl and cycloalkoxy moieties are unsubstituted or substituted with halogen, C$_1$-C$_6$-alkylene-NR$^b$R$^c$, C$_1$-C$_6$-alkylene-CN, C(=O)—NR$^b$R$^c$, C(=O)—R$^d$, aryl, aryl-carbonyl, aryl-C$_1$-C$_4$-alkyl, aryloxy-C$_1$-C$_4$-alkyl, heteroaryl, carbonyl-heteroaryl, heteroaryl-C$_1$-C$_4$-alkyl or heteroaryloxy-C$_1$-C$_4$-alkyl, wherein the phenyl rings are unsubstituted or substituted with R$^g$ and wherein the heteroaryl is a 5- or 6-membered monocyclic heteroaryl or a 8-, 9- or 10-membered bicyclic heteroaryl;

R$^{12}$ is a radical of the formula A$^1$;

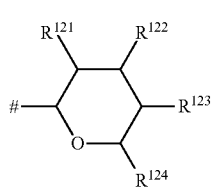

(A$^1$)

wherein # indicates the point of attachment to T; or
R$^1$ is

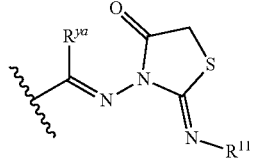

YZT-6 wherein

denotes attachment to the 10 membered hetaryl;

R$^{121}$, R$^{122}$, R$^{123}$ are, identical or different, H, halogen, C$_1$-C$_6$-alkyl, C$_2$-C$_6$-alkenyl, C$_2$-C$_6$-alkynyl, C$_1$-C$_6$-alkoxy-C$_1$-C$_4$-alkyl, C$_1$-C$_6$-alkoxy, C$_2$-C$_6$-alkenyloxy, C$_2$-C$_6$-alkynyloxy, C$_1$-C$_6$-alkoxy-C$_1$-C$_4$-alkoxy, C$_1$-C$_6$-alkylcarbonlyoxy, C$_1$-C$_6$-alkenylcarbonlyoxy, C$_3$-C$_6$-cycloalkylcarbonlyoxy, wherein the alkyl, alkoxy, alkenyl, alkenyloxy, alkynyl, alkynyloxy and cycloalkyl moieties are unsubstituted or substituted with halogen, or NR$^b$R$^c$, or one of R$^{121}$, R$^{122}$, R$^{123}$ may also be oxo;

R$^{124}$ is H, C$_1$-C$_6$-alkyl, C$_1$-C$_6$-alkoxy-C$_1$-C$_4$-alkyl, C$_1$-C$_6$-alkoxy, or C$_2$-C$_6$-alkenyloxy, wherein the alkyl, alkoxy, alkenyl and alkenyloxy moieties are unsubstituted or substituted with halogen;

and where

R$^{ya}$ is H, halogen, C$_1$-C$_6$-alkyl, C$_1$-C$_6$-alkoxy, C$_2$-C$_6$-alkenyl, C$_2$-C$_6$-alkynyl, C$_1$-C$_6$-alkoxy-C$_1$-C$_4$-alkyl, C$_3$-C$_6$-cycloalkyl, C$_1$-C$_4$-alkyl-C$_3$-C$_6$-cycloalkyl, C$_1$-C$_4$-alkyl-C$_3$-C$_6$-cycloalkoxy, wherein the alkyl, alkoxy, alkenyl, alkynyl, cycloalkyl and cycloalkoxy moieties are unsubstituted or substituted with halogen, C(=O)—OR$^a$, C$_1$-C$_6$-alkylene-NR$^b$R$^c$, C$_1$-C$_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

R$^{yc}$, R$^{zc}$ are, identical or different, H, C$_1$-C$_6$-alkyl, C$_2$-C$_6$-alkenyl, C$_2$-C$_6$-alkynyl, C$_1$-C$_4$-alkyl-C$_1$-C$_6$-alkoxy, C$_3$-C$_6$-cycloalkyl, C$_1$-C$_4$-alkyl-C$_3$-C$_6$-cycloalkyl, or C$_1$-C$_4$-alkyl-C$_3$-C$_6$-cycloalkoxy, wherein the alkyl, alkoxy, alkenyl, alkynyl, cycloalkyl and cycloalkoxy moieties are unsubstituted or substituted with halogen;

R$^T$ is H, C$_1$-C$_6$-alkyl, C$_2$-C$_6$-alkenyl, C$_2$-C$_6$-alkynyl, C$_1$-C$_4$-alkyl-C$_1$-C$_6$-alkoxy, C$_3$-C$_6$-cycloalkyl, C$_3$-C$_6$-cycloalkyl-C$_1$-C$_4$-alkyl, C$_3$-C$_6$-cycloalkoxy-C$_1$-C$_4$-alkyl, wherein the alkyl, alkoxy, alkenyl, alkynyl, cycloalkyl and cycloalkoxy moieties are unsubstituted or substituted with halogen, C(=O)—OR$^a$, C$_1$-C$_6$-alkylene-NR$^b$R$^c$, C$_1$-C$_6$-alkylene-CN, C(=O)—NR$^b$R$^c$, C(=O)—R$^d$, SO$_2$NR$^b$R$^c$, S(=O)$_m$R$^e$, phenyl, or —CH$_2$-phenyl, wherein the phenyl rings are unsubstituted or substituted with R$^f$;

R$^{zc}$ together with RT if present, may form C$_1$-C$_6$-alkylene or a linear C$_2$-C$_6$-alkenylene group, where in the linear C$_1$-C$_6$-alkylene and the linear C$_2$-C$_6$-alkenylene a CH$_2$ moiety may be replaced by a carbonyl or a C=N—R' and/or wherein 1 or 2 CH$_2$ moieties may be replaced by O or S and/or wherein the linear $C_1$-$C_6$-alkylene and the linear $C_2$-$C_6$-alkenylene may be unsubstituted or substituted with $R^h$;

$R^{za}$ is H, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_4$-alkyl-$C_1$-$C_6$-alkoxy, $C_3$-$C_6$-cycloalkyl, $C_1$-$C_4$-alkyl-$C_3$-$C_6$-cycloalkoxy, $C_1$-$C_4$-alkyl-$C_3$-$C_6$-cycloalkyl, wherein the alkyl, alkoxy, alkenyl, alkynyl, cycloalkyl and cycloalkoxy moieties are unsubstituted or substituted with halogen, $C_1$-$C_6$-alkylene-$NR^bR^c$, $C_1$-$C_6$-alkylene-CN, C(=O)—$NR^bR^c$, C(=O)—$R^d$, phenyl, phenylcarbonyl, or —$CH_2$-phenyl, wherein the phenyl rings are unsubstituted or substituted with $R^f$;

$R^{za}$ together with $R^T$ if present, may form $C_1$-$C_6$-alkylene or a linear $C_2$-$C_6$-alkenylene group, where in the linear $C_1$-$C_6$-alkylene and the linear $C_2$-$C_6$-alkenylene a $CH_2$ moiety may be replaced by a carbonyl or a C=N—R' and/or wherein 1 or 2 $CH_2$ moieties may be replaced by O or S and/or wherein the linear $C_1$-$C_6$-alkylene and the linear $C_2$-$C_6$-alkenylene may be unsubstituted or substituted with $R^h$;

$R^a$, $R^b$ and $R^c$ are, identical or different, H, $C_1$-$C_6$-alkyl, $C_1$-$C_6$-alkoxy, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, $C_1$-$C_6$-alkylene-CN, phenyl, or —$CH_2$-phenyl, wherein the phenyl rings are unsubstituted or substituted with $R^f$;

$R^d$ is H, $C_1$-$C_6$-alkyl, $C_2$-$C_6$-alkenyl, $C_2$-$C_6$-alkynyl, $C_1$-$C_6$-alkoxy-$C_1$-$C_4$-alkyl, $C_3$-$C_6$-cycloalkyl, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, phenyl, or —$CH_2$-phenyl, wherein the phenyl rings are unsubstituted or substituted with $R^f$;

$R^e$ is $C_1$-$C_6$-alkyl, $C_3$-$C_6$-cycloalkyl, $C_3$-$C_6$-cycloalkyl-$C_1$-$C_4$-alkyl, wherein the alkyl, cycloalkyl moieties are unsubstituted or substituted with halogen, phenyl and —$CH_2$-phenyl, wherein the phenyl rings are unsubstituted or substituted with $R^f$;

$R^f$ is halogen, $N_3$, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_3$-$C_6$-cycloalkoxyx-$C_1$-$C_4$-alkyl, wherein the alkyl, alkoxy, alkenyl, alkynyl, cycloalkyl and cycloalkoxy moieties are unsubstituted or substituted with halogen, C(=O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(=O)—$NR^bR^c$, C(=O)—$R^d$, $SO_2NR^bR^c$, or $S(=O)_mR^e$;

$R^g$ is halogen, $N_3$, OH, CN, $NO_2$, —SCN, —$SF_5$, $C_1$-$C_6$-alkyl, $C_1$-$C_6$-alkoxy, $C_2$-$C_6$-alkenyl, tri-$C_1$-$C_6$-alkylsilyl, $C_2$-$C_6$-alkynyl, $C_1$-$C_6$-alkoxy-$C_1$-$C_4$-alkyl, $C_1$-$C_6$-alkoxy-$C_1$-$C_4$-alkoxy, $C_3$-$C_6$-cycloalkyl, $C_3$-$C_6$-cycloalkoxy, $C_3$-$C_6$-cycloalkyl-$C_1$-$C_4$-alkyl, $C_3$-$C_6$-cycloalkoxy-$C_1$-$C_4$-alkyl, wherein the alkyl, alkoxy, alkenyl, alkynyl, cycloalkyl and cycloalkoxy moieties are unsubstituted or substituted with halogen, C(=O)—$OR^a$, $NR^bR^c$, $C_1$-$C_6$-alkylene-$NR^bR^c$, O—$C_1$-$C_6$-alkylene-$NR^bR^c$, $C_1$-$C_6$-alkylene-CN, NH—$C_1$-$C_6$-alkylene-$NR^bR^c$, C(=O)—$NR^bR^c$, C(=O)—$R^d$, $SO_2NR^bR^c$, or $S(=O)_mR^e$;

$R^h$ is halogen, OH, $C_1$-$C_6$-alkyl, $C_3$-$C_6$-cycloalkyl, or CN;

m is 0, 1, or 2;

or an N-oxide, stereoisomer, tautomer, or agriculturally or veterinarily acceptable salt thereof.

2. The compound of formula I according to claim 1, wherein $A^1$ is $CR^{A1}$, $A^2$ is $CR^{A2}$, $A^3$ is N.

3. The compound of formula I according to claim 1, wherein $A^1$ is $CR^{A1}$, $A^2$ is N, $A^3$ is $CR^{A3}$.

4. The compound of formula I according to claim 1, wherein $A^1$ is $CR^{A1}$, $A^2$ is N, $A^3$ is N.

5. The compound of formula I according to claim 1, wherein $R^{B1}$, $R^{B2}$, and $R^{B3}$, independently of each other are H, halogen, or $C_1$-$C_6$-alkyl.

6. The compound of formula I according to claim 1, wherein $R^1$ is a formula YZT-1 to YZT-5 or YZT-7 to YZT-9, wherein

denotes attachment to the 10 membered hetaryl;

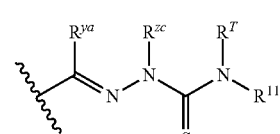

YZT-1

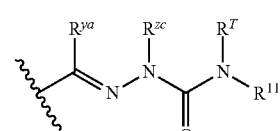

YZT-2

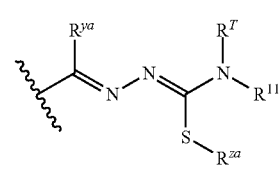

YZT-3

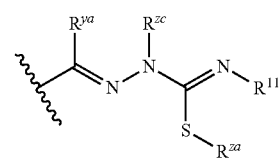

YZT-4

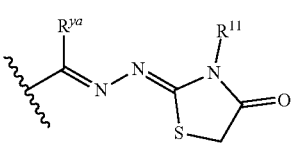

YZT-5

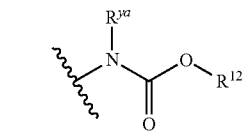

YZT-7

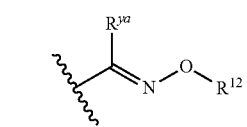

YZT-8

-continued
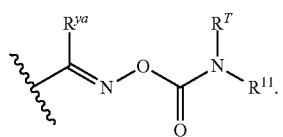
YZT-9
7. The compound of formula I according to claim 1, wherein Ar are formulas Ar-1 to Ar-20
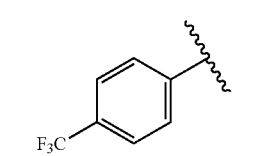
Ar-1
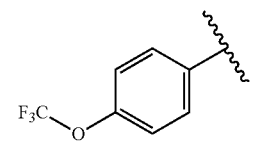
Ar-2
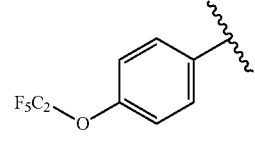
Ar-3
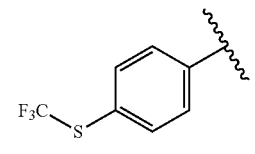
Ar-4
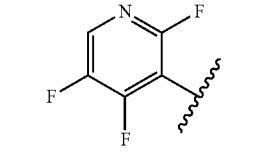
Ar-5
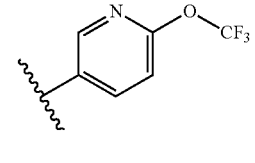
Ar-6
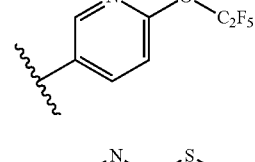
Ar-7
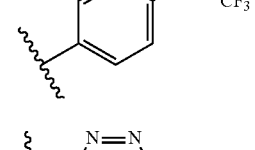
Ar-8
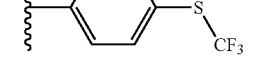
Ar-9
-continued
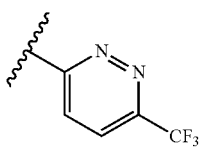
Ar-10
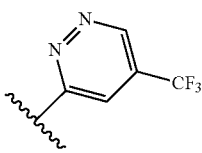
Ar-11
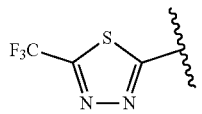
Ar-12
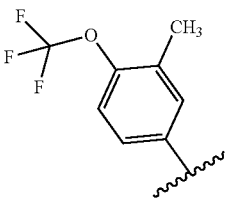
Ar-13
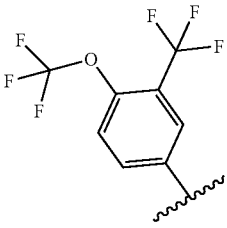
Ar-14
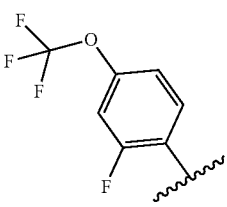
Ar-15
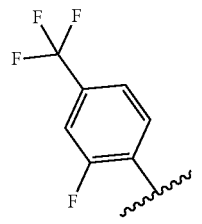
Ar-16
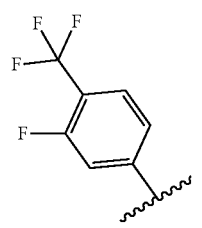
Ar-17

Ar-18

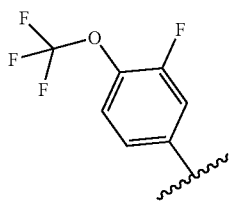

Ar-19

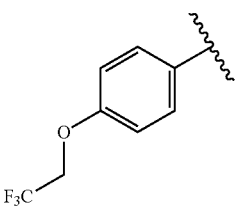

Ar-20

(structure)

8. A composition comprising a compound of formula I according to claim 1, an N-oxide or an agriculturally acceptable salt thereof, and a further active substance.

9. A method for combating or controlling invertebrate pests comprising contacting the pest or its food supply, habitat or breeding grounds with a pesticidally effective amount of at least one compound according to claim 1.

10. A method for protecting growing plants from attack or infestation by invertebrate pests comprising contacting a plant, or soil or water wherein the plant is growing, with a pesticidally effective amount of at least one compound according to claim 1.

11. A seed comprising a compound according to claim 1, or the enantiomer, diastereomer, or salt thereof, in an amount of from 0.1 g to 10 kg per 100 kg of seed.

12. A method for treating or protecting an animal from infestation or infection by invertebrate pests comprising bringing the animal in contact with a pesticidally effective amount of at least one compound of the formula I according to claim 1, a stereoisomer thereof and/or at least one veterinarily acceptable salt thereof.

\* \* \* \* \*